United States Patent [19]

Ashdown et al.

[11] 4,139,745
[45] Feb. 13, 1979

[54] TELEPHONE LINE TEST SYSTEM

[75] Inventors: Glynn R. Ashdown, Hawthorn Woods; Gary R. Smith, Buffalo Grove; Kenneth A. Finder, Highland Park, all of Ill.

[73] Assignee: Teradyne, Inc., Boston, Mass.

[21] Appl. No.: 629,102

[22] Filed: Nov. 5, 1975

[51] Int. Cl.$^2$ .......................... H04B 3/46; H04M 3/26
[52] U.S. Cl. ....................... 179/175.3 F; 179/175.3 R; 324/52
[58] Field of Search .................. 179/175.3 F, 175.3 R, 179/175.2 D; 324/51, 52; 444/1

[56] References Cited

U.S. PATENT DOCUMENTS

| | | | |
|---|---|---|---|
| 3,290,586 | 12/1966 | Anderson | 324/52 |
| 3,678,379 | 7/1972 | Arvay et al. | 324/51 |
| 3,692,961 | 9/1972 | Le Strat et al. | 179/175.2 D |
| 3,808,381 | 4/1974 | Jacobs et al. | 179/175.3 R |
| 3,812,303 | 5/1974 | Stewart | 324/51 |
| 3,829,627 | 8/1974 | Short | 179/175.2 R |
| 3,842,218 | 10/1974 | DeLuca et al. | 179/175.3 R |
| 3,891,895 | 6/1975 | Wittlinger | 324/51 |
| 3,944,914 | 3/1976 | Simmonds | 179/175.3 F |

OTHER PUBLICATIONS

Dynatel Corporation 720, Bulletin No. 7998-0007.

Primary Examiner—Douglas W. Olms

[57] ABSTRACT

A computer controlled system for the diagnostic testing of two wire telephone lines. The system comprises a control means having a programmed digital computer and associated memory, a line test network, a user station and an interface for interconnecting these elements and one or more telephone exchanges and a plurality of two wire telephone lines extending from the exchanges. The line test network is responsive to the digital computer and includes means for generating a plurality of line characteristic signals during a test cycle for a selected line. The characteristic signals are representative of the resistance and reactance between a reference potential and each of the two wires of a selected line, and between the two wires of the selected line. The line characteristic signals are transformed to signals indicative of the line identity, line length, type of termination, type and location of equipment connected to the line and existence, approximate location and type of faults along the line. The latter signals are categorized according to selected line condition, and stored in the memory for selective retrieval in response to control signals generated by a user at the user station.

14 Claims, 5 Drawing Figures

TELEPHONE LINE TEST SYSTEM

BACKGROUND OF THE INVENTION

The present invention is related to the subject matter of U.S. Patent application Ser. No. 622,054 now U.S. Pat. No. 4,113,998 filed on Oct. 14, 1975 and assigned to the same assignee as the present invention. That application is hereby incorporated by reference in the present application.

The present invention relates to computer test systems, and more particularly to a computer controlled system for performing a series of diagnostic test procedures on selected telephone subscriber lines extending from a central office.

In the service and maintenance of telephone system equipment, one important aspect is a rapid determination of the existence and location of problems directly related to the two-line subscriber telephone lines themselves. A telephone system central office has a large number, typically 10,000, "two wire" telephone lines extending to subscriber equipment. Each telephone line includes two wires, commonly referred to as "tip" and "ring", with a large number of these wire pairs being included in a cable having a cable jacket being connected to ground. At the central office, connections to a 50 volt battery provide enabling power on the line. In the United States, the average length of lines extending from the central office is 2.5 miles with the maximum length of approximately 10 miles.

One of the problems associated with maintenance service of the telephone lines lies in the relatively stringent requirements for maintaining the subscribers "on-line". If a faulty line is detected or reported and the fault cannot be located and serviced in a relatively short period, then the subscriber is usually re-connected to a new pair of wires in order to keep his equipment in service. When this is done, the previous pair of wires is abandoned. Consequently, after a period of time, cables typically have a large number of pairs of telephone wires which is only fractionally utilized. Increasing demand for telephone connections then require the very expensive project of laying new cables.

As would be expected, a great variety of approaches have been employed in an attempt to resolve this problem. Most such approaches have employed attempts at fault detection and location using test signals at frequencies in the range of voice frequencies, since these are the operating frequencies of the lines. One significant problem associated with the use of frequencies of this value in long line testing lies in the difficulty of making determinations of susceptance and conductance for the entire length of the line. Such measurements are needed to determine capacitative loading along the line. The resistive portion of the impedance increases with distance along the line, while the reactive portion decreases with distance along the line and for frequencies on the order of one kilohertz, these impedance values are approximately equal at a distance of 3 miles. Accordingly, this factor presents a limited distance for the determination of the characteristics of capacitive loading with a test frequency of 1 kilohertz. Additional problems arise from the necessity of protecting any measurement circuit from damage arising either from continuous direct low impedance connection to the battery through a short to the telephone wire connected to the battery, or from catastrophic high voltage, such as lightning striking the line when it is connected to the measurement circuit.

Furthermore, for many prior art test systems, the sheer mass of testing operations required for the large number of lines associated with each central office present a complex operating test procedure for the test station user. In order to improve the efficiency of these prior art test systems, central computers have been employed to perform testing algorithms on the various combinations of test results in order to determine which lines contain faults, as characterized by specific combinations of the measurement results. Such testing systems generally include means to store a data base for updated information concerning all of the lines emanating from a particular central office. This data base information would normally include length of the line, types of terminations and the types of equipment tied on to a line. Since many of these factors change fairly frequently, this data base is continually up-dated in the prior art test systems.

However, the test methods used for such systems and their implementation by the test systems are limited by the speed at which the tests can be performed, and the precision with which faults can be located so that correction may be achieved by a repairperson. Furthermore, the large data base which must be maintained requires a relatively high expenditure in order to provide the equipment necessary for storing and up-dating that data base. In addition, the data base storage portions of the prior art systems are configured so that a user must posses a relatively high skill level and to extract selected portions of the data base for display.

It is an object of the present invention to provide a system for testing telephone lines extending from one or more central offices whereby the lines are subjected to a series of diagnostic test routines to rapidly and economically determine both the existence and location of faults.

It is another object to provide a system for operation by a relatively unskilled operator wherein selected portions of a stored data base may be readily extracted.

It is a further object to provide a system for testing a large plurality of telephone lines extending from one or more central offices at a relatively high speed without requiring access to a data base generally representative of the previous condition of all the lined emanating from the central offices.

It is a further object of the present invention to provide a system for testing a large plurality of telephone lines emanating from one or more central offices wherein the plurality of a.c. and d.c. test signals are automatically applied in sequence to the lines, and the resultant test response signals are automatically processed in a corresponding sequence to detect the presence, character and location of faults and terminations.

It is still another object of the present invention to provide a test system for testing a large plurality of telephone lines extending from one or more central offices and for automatically diagnosing problems detected from the test measurements.

SUMMARY OF THE INVENTION

Broadly speaking, the present invention is a computer controlled system for testing of telephone subscriber lines. The system comprises a control means having a programmed digital computer and associated memory, a line test network, a user station and an interface for interconnecting these elements and one or more telephone exchanges and the plurality of telephone lines extending from such exchanges.

The line test network is responsive to the digital computer and includes means for generating a plurality of line characteristic signals during a test cycle for a selected line. The characteristic signals are representative of the resistance and reactance between a reference potential and each of the two wires of a selected line, and between the two wires of a selected line. Generally, a test cycle for a selected line includes a direct current test of the resistance between the tip and ring wires, as well as tests of resistance between battery and both the tip and ring wires, and between the ground and both the tip and ring wires. In a second portion of the measurement cycle, a measurement is also made of the total amount of alternating current hum or noise on the wire by means of rectification of any signals on the tip and ring wires, with the central office battery disconnected. In a third portion of the measurement cycle, measurements are made by applying a.c. voltage signals between combinations of the tip wire, the ring wire, the ground conductor, and measuring the in-phase and quadrature components of the resulting currents on those wires. The line response signals generated in response to the test signals are integrated over a predetermined measurement period to from line characteristic signals which are then transferred from the line test network to the digital computer.

In one form of the invention, the frequency of the test signal produced by the line test network is established at 30 Hz (or a sub-multiple thereof or an odd harmonic thereof no greater than 250 HZ) and the measurement period is established as 33.33 milliseconds (or equal to an integral multiple thereof) so that measurements of susceptance and conductance may be made for lines as long as 10 miles. With this measurment method, during the negative-going half-cycle of the test signal, the polarity of the response is reversed and the resultant waveform is integrated over the measurement period. As a result, contributions to noise from 60 Hertz sources are eliminated. It will be understood that multiples of one full cycle of the test signal can also be employed as the measurement period without losing the advantage of noise suppression and signal enhancement achieved. Preferably the measurement period equals one cycle period of the test frequency.

At the computer, the line characteristic signals are transformed to signals representative of the susceptance and conductance between each pair of conductors, thereby providing an indication of the capacitive load across the line, which are in turn adaptively processed to be transformed to signals representative of the line length, type of termination, line faults, and type and location of equipment connection to the line. These latter signals are then categorized according to line condition.

The control means provides three operating modes: ROUTINING, ADVISORY and LINE TEST. In the ROUTINING mode, the computer automatically directs diagnostic testing of the entire set of telephone lines of a single exchange (typically, on a daily basis in a few low usage hours) by accessing an exchange and directing the line test network to initiate its sequence of a.c. and d. c. measurements on each line extending from the exchange. Based on the results of these measurements, i.e. the line characteristic signals, the computer generates ROUTINING mode test result signals for qualitatively classifying each of the lines as "O.K.", "permanent busy", "trouble line" or "suspect line". The term "suspect line" is used to identify which show whichshow degradation but still possess satisfactory transmission and similar characteristics for commercial use. A "trouble line" is defined as a line in iminent danger of generating a customer complaint. This category of lines is further classified to specify the fault as a "short", "cross", "ground", "high background noise" or "activated pressure contactor". The computer further establishes a record of the permanent busy lines, suspect lines, trouble lines, and subclassifications thereof for a current time. In addition, the computer generates and stores test result signals which establish and up-date an historical record showing lines that have been classified as trouble lines or suspect lines for predetermined periods of time, e.g., up to one week, one - four weeks, one - two months, or over two months. Of course, these time periods are merely exemplary and in other embodiments different definitions may be utilized. Furthermore, any line that is reported by the computer as either a trouble or suspect line is automatically maintained in the historical record until the line is found to test o.k. for a predetermined period, e.g. fourteen consecutive days.

In the ADVISORY mode, the user may direct the computer to display selected portions of data generated and stored during ROUTINING mode, such as test result signals representative of:

(1) the lines in an exchange which currently are categorized as permanent busy lines, shorts, crosses and grounds, high background lines, suspect wet cable lines, suspect lines, activated pressure contactors, and high voltage lines;

(2) the history of trouble and suspect lines in an exchange, including the particular lines so classified for various time periods, and the history of particular lines for those time periods; and (3) a summary of the line status within a service area, including a current trouble summary, trouble line historical summary, suspect line historicial summary, severe shorts, crosses and grounds, and severe high background lines.

In the LINE TEST mode for a selected line, the digital computer may operate in response to specific directives entered at a user station to direct the line test network to initiate its sequence of a.c. and d.c. tests (or selected portions thereof) for a selected line of an exchange. For this operation for a selected line, the computer generates and displays to the user test results signals representative of the length of the line in miles and feet from the central office, also the number and types of termination (telephones, PABX, keyset, subscriber carrier, unbypassed loop extenders, foreign exchanges) and where applicable, the method of connection (bridged, tip to ground, ring to ground). In addition, the computer may provide signals indicative of specific faults such as excessive hum leakage, shorts, crosses, grounds, imbalance, improper battery voltage, residual a.c. and d.c. voltages, and the distance to shorts or crosses. Accordingly, the LINE TEST mode of operation is particularly useful in correcting identified faults. The computer in effect may direct a repairperson to a location where a test is needed and guides the repairperson in correcting the fault, since the type of fault is specified along with the approximate location of that fault.

BRIEF DESCRIPTION OF THE DRAWINGS

The foregoing and other objects of this invention, the various features thereof, as well as the invention itself, nay be more fully understood from the following description, when read together with the accompanying drawings in which.

DESCRIPTION OF PREFERRED EMBODIMENTS

Figure 1:
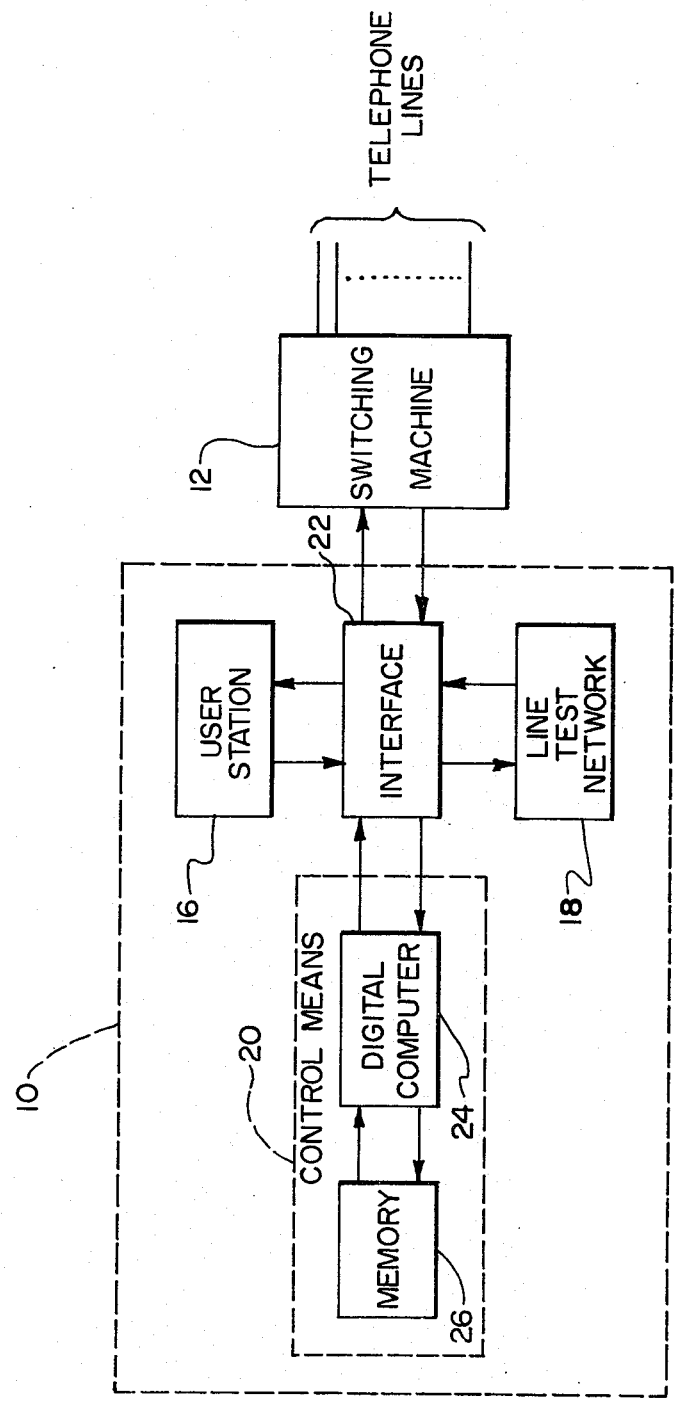
FIG. 1 shows, in block diagram form, a telephone line test system in accordance with the present invention.

FIG. 1 generally shows one preferred embodiment 10 of the present invention as connected to a switching machine 12 having a plurality of telephone lines extending therefrom. In that embodiment, a user station 16 with an associated display, line test network 18 and control means 20 are interconnected with the switching machine 12 by way of an interface 22. The control means 20 includes digital computer 24 and associated memory system 26. The system 10 selectively performs at least one diagnostic test upon selected ones of the two wire telephone lines extending from the switching machine 12, wherein the performance of each test includes a step of applying a test signal to a line under the test, receiving a line response signal, and generating a line characteristic signal.

The user station 16 includes user controlled means for generating at least one line select signal for identifying selected lines to be tested in the LINE TEST mode, and for generating a test sequence initiate (test select) signal associated with each of the user entered line select signals for identifying the particular a.c. and d.c. tests which are to be applied to the identified lines.

The computer 24 includes means responsive to the line select and test select signals produced by user station 16 (in the LINE TEST mode) to generate corresponding line select command and test select command signals, the latter signal being for directing line test network 18 to apply the specified tests to the selected line.

The computer 24 includes a means for automatically generating a sequence of line select command signals (in the ROUTINING mode) for identifying lines to be tested, and a test sequence initiate (test select) command signal for directing the network 18 to apply its sequence of a.c. and d.c. tests to each selected line.

In addition, the computer 24 includes means responsive to the line characteristic signals in the ROUTINING and LINE TEST modes to generate test result signals representative of line length, type of termination, type and location of attached equipment, and existence, location and type of faults on the associated line. In the ROUTINING mode, the test result signals are stored in memory 26, and in the LINE TEST mode the test result signals are transferred to user station 16 for display.

The line test network 18 includes means responsive to a test select command signal for selectively generating test signals, means for receiving line response signals, and means for generating a line characteristic signal for the selected line.

Generally, the line test network 18 is the same as the network disclosed in FIGS. 1–6 of the above-referenced application Ser. No. 622,054. Accordingly, the test signals generated by network 18 are substantially the same as those generated by the referenced network. Furthermore, response signals from the lines (as transferred by way of the switching machine 12 and interface 22, to network 18) are processed in substantially the same manner as that disclosed in the abovereferenced application, with the line characterization signals produced by network 18 corresponding to the digital output produced by the referenced network. The program input to the circuit in the above-referenced application corresponds to the test select command signal provided by interface 22 from digital computer 24 in the present invention.

The user station 16 further includes a user controlled means for generating test result select signals for specifying selected portions of the test result signals stored in the control means 20. The computer 24 includes means responsive to the test result select signals in the ADVISORY mode to transfer the specified portions to user station 16 for display. The display at station 16 is responsive to test result signals received from computer 24 to display those signals to the user.

In the present embodiment, the interface 22 serves to interconnect the user station 16, line test network 18, control means 20 and switching machine 12. In FIG. 1, interface 22 is shown in a single block. However, for alternative embodiments, the interface may be distributed throughout the system so that the particular geographical location of elements 12, 16, 18 and 20 may be conveniently arranged. Accordingly, in such embodiments appropriate modems and data transfer channel are included in the interface 22.

As illustrated in FIG. 1, the digital computer 24 is centrally located. In alternative embodiments, the computer 24 may be configured with remote portions which together perform the same function as computer 24 but wherein the specific subfunctions are performed at the remote locations.

Figure 2:
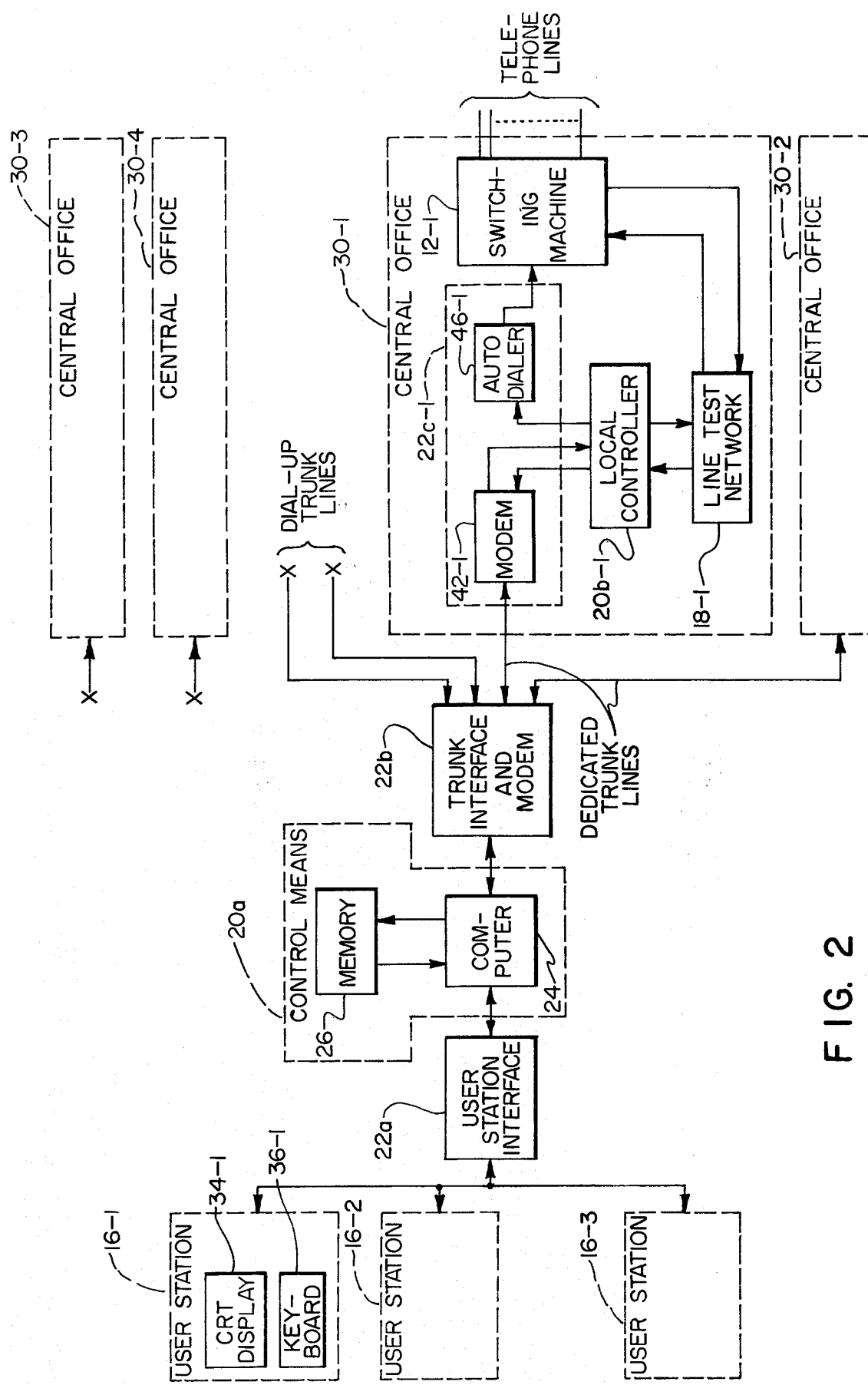
FIG. 2 shows, in block diagram form, an alternative configuration for the system of FIG. 1.

One such alternative embodiment is shown in FIG. 2. In the embodiment of FIG. 2, blocks having substantially similar functions to the embodiment of FIG. 1 are identified with identical reference numerals in FIG. 2. The lower case reference subscripts associated with such blocks identify the various remote portions. Substantially similar blocks within FIG. 2 are identified with common primary reference designations with differing appended reference numerals.

In the configuration of FIG. 2, four central offices 30-1 through 30-4 are shown interconnected to control means 20 and three user stations 16-1 through 16-3 via interface portions 22a and 22b. It will be understood that each central office includes switching machine 12 and plurality of telephone lines extending therefrom, a line test network 18 and an interface portion 22c. The various interface portions 22a, 22b and 22c act in concert to function in a manner corresponding to interface 22 in the system of FIG. 1.

In the FIG. 2 embodiment, the control means is configured in a manner having a central portion 20a and remote portions 20b-1 through 20b-4 located at the offices 30-1 through 30-4, respectively. As a result, any of the user stations may be interconnected with a selected one of the central offices. It will be understood that the central computer 24 is connected via trunk interface and modem 22b and by dedicated trunk lines to central offices 30-1 and 30-2, and by dial-up trunk lines to central offices 30-3 and 30-4 or other central offices. The user station interface 22a permits each of the user stations to interact with the selected central office on a time shared basis to computer 24.

As shown in FIG. 2, each user station includes a CRT display and keyboard (reference numerals 34-1 and 36-1, respectively for station 16-1) for transmitting user entered test select and line select signals to central computer 24. In some embodiments, the user may initiate LINE TEST mode operation wherein he may select particular ones of the a.c. and d.c. tests to be applied to a selected line. In all embodiments, the user may initiate the full battery of tests for a selected line.

The interface portions of the central office (reference numeral 22c-1 of central office 30-1) include a modem (42-1) and an automatic dialer (46-1) which controls access to the lines of the switching machine 12-1 through a test distributor associated therewith.

The central computer 24 controls the central office access as requested from the various user stations, provides message switching between the various central offices and user stations, provides interactive line analysis of the line characterization signals and conversion thereof to test result signals, and provides data storage as noted above (in conjunction with the ADVISORY mode operation).

In the configuration of FIG. 1, the control means 20 comprises a mini-computer, such as the M-365 manufactured by Teradyne, Boston, Massachusetts, which operates in conjunction with an associated memory. The computer is programmed as shown in Appendix I.

In the configuration of FIG. 2, the control means may comprise an M-365 at block 20a and a local controller at block 20b. Controller 20b also may be an M-365 mini-computer. In the FIG. 2 embodiment, local controller 20b may be programmed to transform the line characteristic signal to the test result signals, while the computer 24 may be programmed to perform the overall system administrative tasks, and ADVISORY mode data retrieval. The CRT display 34-1 may consist of an M-367 display manufactured by Teradyne, or any of a number of other commercially available well-known alternatives. The trunk interface 22b and modem 42-1 can be linked via standard telephone lines using Bell 103 full duplex 300 baud modems. The switching machine 12-1 may be typically an Automatic Electric type 20, step-by-step office. It will be understood that other embodiments may utilize well-known equivalent networks. Similarly, the automatic dialer in interface 22c-1 may be one of well-known forms in the telephone industry. The local controller 20b routes the line select command signals to the automatic dialer 46-1 and the test select command signals to the test network 18-1. The local controller further receives the line characteristic signals from network 18-1 and transfers the test result signals in suitable form to modem 42-1 for transmission to computer 24. As noted above, the test network 18-1 is substantially as disclosed in the above-referenced U.S. Patent Application.

At user station 16-1, keyboard 36-1 is a conventional keyboard having twelve keys, each corresponding to one of numerals 0-9, "#" and "*". In other embodiment, further keys may be utilized to accommodate different functions, e.g. interactive trouble diagnostics, or generation of hard copy records. The # key is used to prefix the accessing of a particular telephone line in the LINE TEST mode, and the * key is used to begin a new primary command operation, as described below. In this embodiment, signals representative of the keys depressed by the user are transferred to the computer 24 (or "entered") on a time shared basis.

For the FIG. 1 embodiment, computer 24 establishes the user station-to-central office link in both the ROUTINING and LINE TEST modes, directs (at its own initiative) the commencement of the ROUTINING mode test operations performed by network 18, directs (at user initiative) the commencement of the LINE TEST mode test operations performed by network 18, transforms the line characteristic signals to test result signals, stores the ROUTINING mode test result signals, transfers the LINE TEST mode test results signals to the user station, and also performs the ADVISORY mode data retrieval operations. For the FIG. 2 embodiment, computer 24 establishes the user station-to-central office link in both the ROUTINING and LINE TEST modes, while the local controller 20b directs (at its own initiative or in response to a control signal initiated at the computer 24) the ROUTINING mode test operations performed by network 18, directs (in response to a user-generated control signal applied by way of computer 24) the LINE TEST mode test operations performed by network 18 and transforms the line characteristic signals to test result signals and transfers those latter signals to computer 24. The computer 24 stores the ROUTINING mode test result signals, transfers the LINE TEST mode test result signals to the user station, and performs the ADVISORY mode data retrieval operations.

Using the above-described configurations, in the ROUTINING mode, the control means 20 directs the sequential accessing of each line in an exchange and, for each accessed line, directs line test network 18 to perform the plurality of a.c. and d.c. tests described in the referenced application within a short period of time (such as two seconds). Thus, in the ROUTINING mode, the testing of all telephone lines of a typical exchange may be accomplished in a few low usage hours each night. After the ROUTINING operations, each morning, for example, the user at the service center can generate a complete test result summary for all lines by interrogating the computer 24 in the ADVISORY mode to retrieve for display selected portions of the ROUTINING mode test result signals from the memory 26.

Figure 3A:
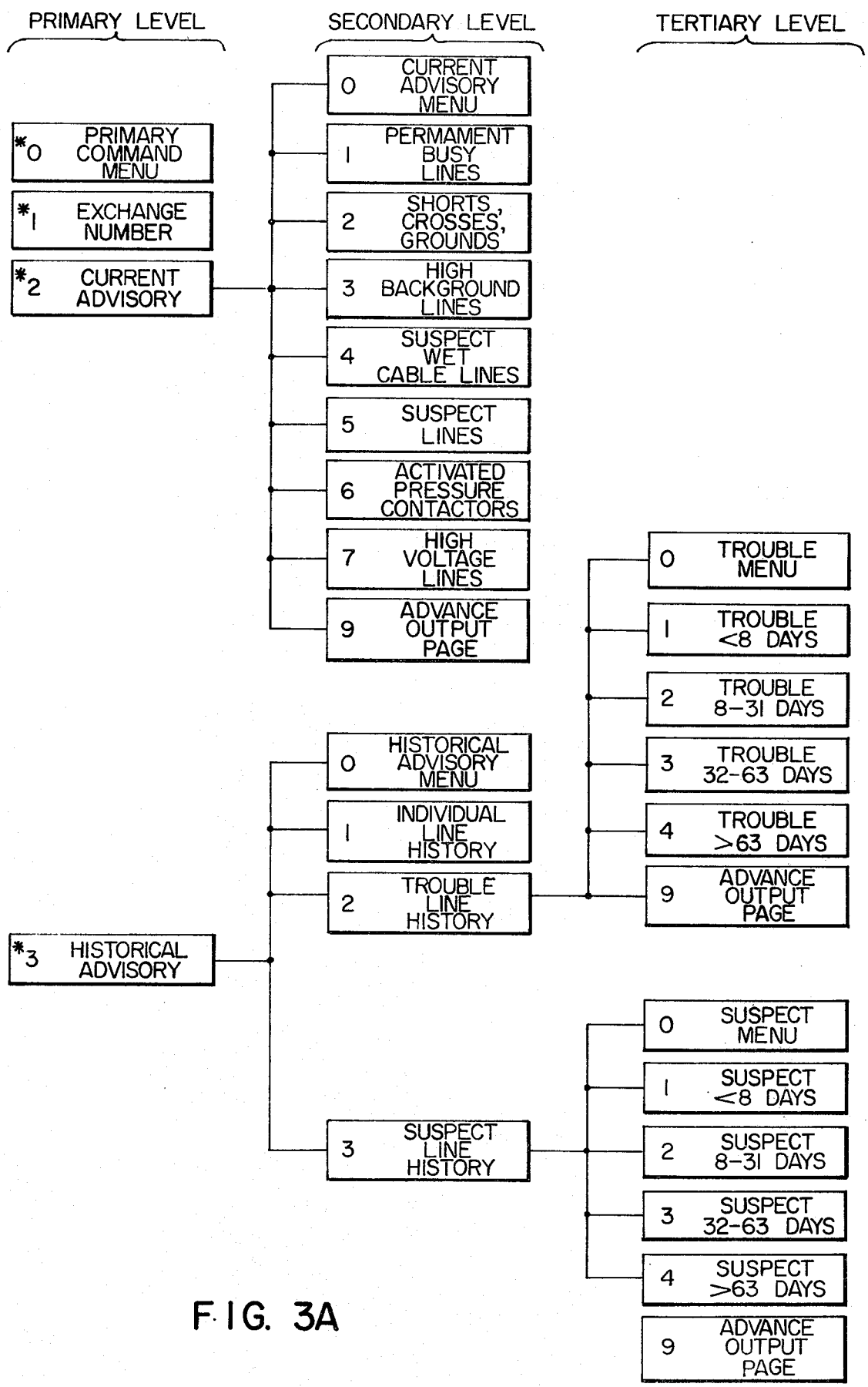
FIGS. 3A and 3B show the user command tree for the ADVISORY mode.
Figure 3B:
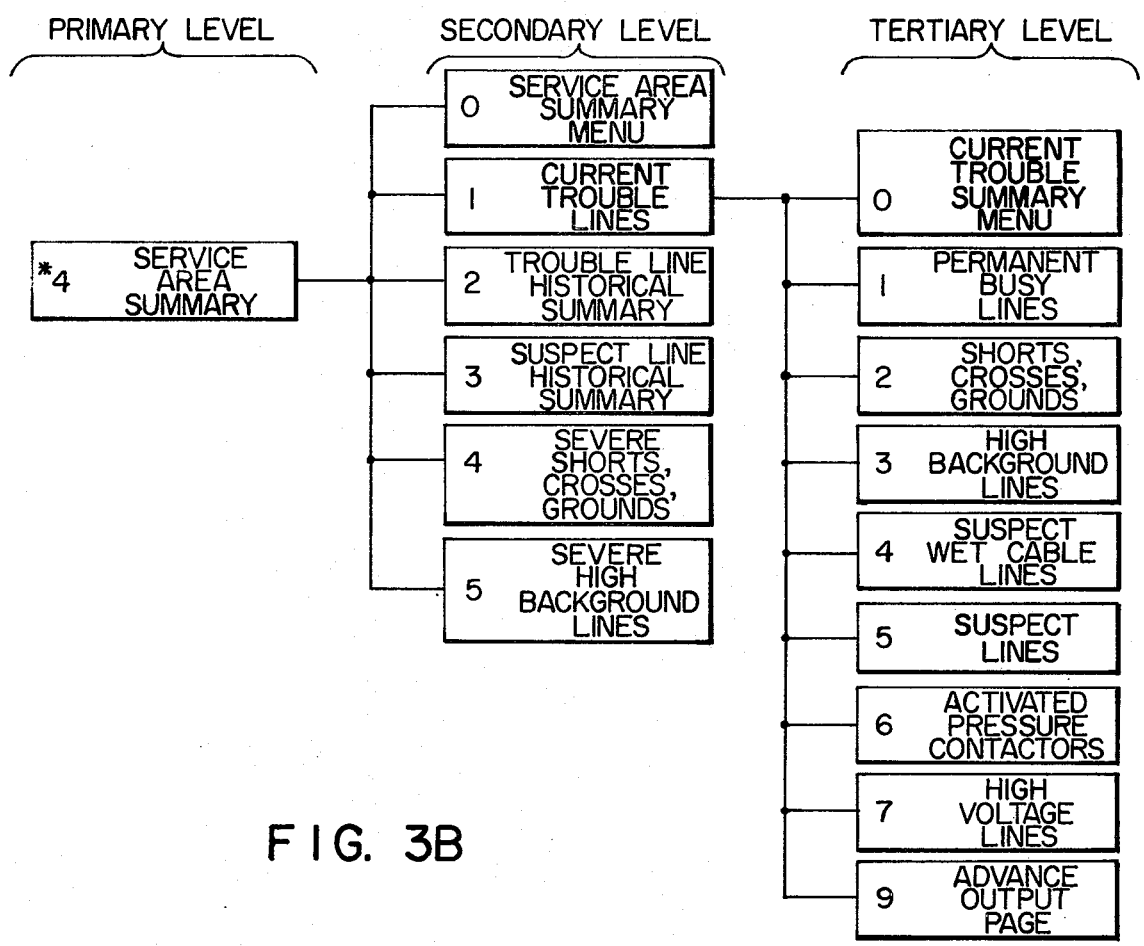

For the embodiment of FIG. 2, at one of the user stations, a user may operate the system in the ADVISORY mode by interacting with the computer 24 through the entry of user commands in accordance with the ADVISORY mode command tree illustrated in FIGS. 3A and B. For the embodiment shown, the user first enters a primary level command (comprising "*" and a digit), and then one or more secondary level commands associated with the primary level command. If desired, following entry of a secondary level command, the user may enter one or more of the associated tertiary level commands associated with the entered secondary level command. In the present embodiment, the user may only initiate operations corresponding to a new command at the same command level and associated with the previously entered higher level command without first retrieving to the primary command level. However, at any time, the user may interrupt a current ADVISORY mode operation and initiate a different such operation by entering a new primary level command and a desired sequence of secondary and tertiary level commands. In other embodiments of this invention, alternative command trees may be utilized which permit such command switching. A set of exemplary ADVISORY mode operations are described below in conjunction with Tables 1–15. These Tables illustrate the CRT display screen under the described conditions, and show computer-generated messages, and operator-generated responses. In Tables 1–15, the operator responses are underscored for clarity. The symbols ">" and ">>" represent prompters displayed to the user to indicate that secondary and tertiary level commands may be respectively entered by the user at a current time.

After the user selects an exchange, e.g., #837 in Table 1, the computer 24 directs the CRT display at the user station to read "4-TEL SERVICE, TYPE 0 FOR HELP," (line 1 of Table 1), followed by the selected exchange (line 2 of Table 1), thereby indicating a "ready" status. The user may then enter a primary command prefixed by * for ADVISORY mode operation, or enter a menu request "*0" (line 3 of Table 1) at his keyboard, to which the computer responds by displaying a primary command menu (as shown in lines 4–11 of Table 1). In response to this display, the user may change exchanges, select one of the three types of advisory information available, i.e., CURRENT TROUBLE ADVISORY, HISTORICAL ADVISORY, SERVICE AREA SUMMARY, by activating the * (or primary command) key followed by the appropriately numbered key on his keyboard associated with the desired advisory information. Alternatively the operator may switch to the LINE TEST mode and initiate an individual line test procedure in the LINE TEST mode for a selected line by activating the #key followed by the line number for the desired telephone line. The user may skip the * 0 step if he knows the menu, and merely perform one of the latter steps, i.e., enter * or # and the appropriate number.

If the user elects to change exchanges, he enters * 1 and then the NNX number of the desired exchange. Table 2 illustrates the CRT display for such an operation wherein the user successively entered four invalid exchange numbers, followed by 415-862, a valid exchange number.

When the user selects CURRENT TROUBLE ADVISORY, by entering * 2, he must then select one or more of the trouble categories:
1. permanent busy line
2. shorts, crosses and grounds
3. high background lines
4. suspect wet cable
5. suspect lines
6. activated pressure contactors
7. high voltage lines The user may request display of this menu by entering 0 before making his selection. In that case, the user is presented with the display shown in Table 3. When selecting one or more of these categories through the activation of the correspondingly numbered keys from his keyboard, the user may obtain the listing of all lines in the exchange that presently fall within the selected category. An exemplary listing for all six categories at exchange #415-862 is shown in Table 4 where the user has sequentially entered * 2, 1, 2, 3, 4, 5, 6, 7 at his keyboard. Thus, the CURRENT TROUBLE ADVISORY function provides the results of daily exchange routine testing.

When the user selects HISTORICAL TROUBLE ADVISORY, by entering * 3, he must then specify whether he desires an individual line history, or survey history for either trouble or suspect lines. The user may request display of this menu by entering 0 before making his selection. In that case, the user is presented with the display shown in Table 5 for exchange #837.

Table 6 illustrates the display following the selection of exchange #837 and the sequential entry of * 3 (selecting historical advisory), 3 (selecting suspect line history) and 0 (requesting a menu). Table 7 shows the display for the subsequent sequential entry of 1, 2 and 9 where the "9" entry directs the computer to advance to the next "page" of output display data.

Table 8 illustrates the display following the selecting of exchange #837 and the sequential entry of * 3, and the subsequent entry of 2 (selecting trouble line history), 0, 3 and 4. Tables 9 and 10 illustrate the display following selecting exchange #837 and the sequential entry of * 3, 0, 1 (selecting line numbers 837-3408 and 837-9889, respectively). The exemplary display (Table 9) for line number 837-3408 states that trouble history for the line in the past 204 days is unsatisfactory (with only sixteen "tested o.k.'s") and then indicates the status for each of the previous 8 days. In general, for the present embodiment, a trouble history is maintained in the memory for any line until it "tests o.k." for fourteen consecutive days, at which point the trouble history on that line would be deleted from the memory.

The user may also select service area summary data for a group of exchanges by entering * 4. The user may then request the menu illustrated in Table 11 (by entering 0) or may directly enter a number corresponding to one of the categories specified by that menu to specify what data he desired. Table 12 illustrates the display following the sequential entry of 1 (selecting current trouble summary), 0 (requesting a current trouble menu). Table 13-15 show the display for the sequential entry of 5, 2, and 7, respectively (following the entry of * 4, 1). Similar summary reports are produced for other service summary area menu entrees.

Figure 4:
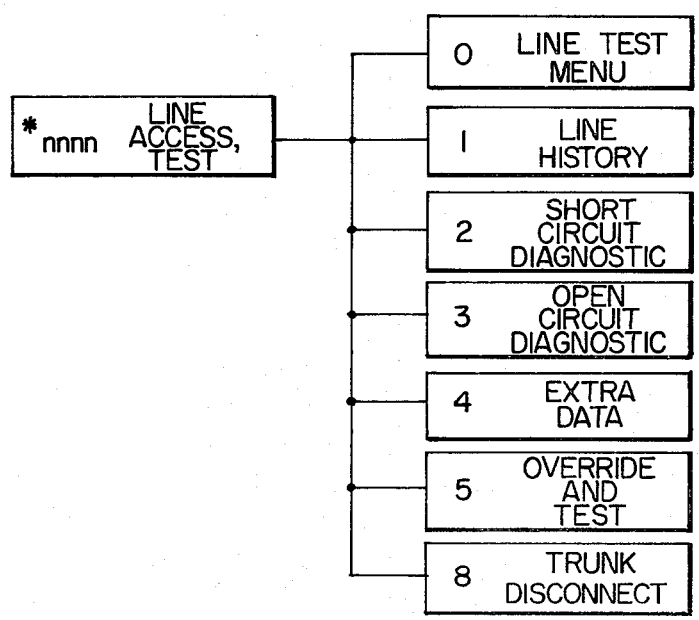
FIG. 4 shows the user command tree for the LINE TEST mode.

Using the above described configurations, in the LINE TEST mode, the user may initiate tests for individually selected lines through the entry of user commands in accordance with the LINE TEST command thus illustrated in FIG. 4. For the embodiment shown, the user may activate the # key of his keyboard, followed by entry of the number of the line to be tested. The control means 20 responds by automatically accessing and testing the line and indicating its condition via the user display. If the line passes all tests, the display indicates "tested o.k." and the cable and termination characteristics. If the line is on file as a trouble line (i.e., if is not "tested o.k." for 14 consecutive days), the line is identified as having a "trouble history". If the line is busy, that "busy" status is presented to the operator via the display.

Test results of problem lines are automatically converted by the computer into diagnostic display reports such as "suspect wet cable", "severs background". The display further presents the user with the number and type of terminations (e.g., "two straight line ringers - bridged), and in addition, the cable length in "truck miles" and in feet from the central office to the line termination. In the presently described embodiment, a truck mile is defined to be 5800 feet.

Following the test, the user may also enter 0 to direct the display of the LINE TEST menu:

1. line history
2. short circuit diagnostic
3. open circuit diagnostic
4. extra data
5. override and test By actuating the appropriate keys following the individual LINE TEST mode operation, the user directs the computer to display the data related to the menu entrees. The "extra data" category provides the user with data representative of the battery, a.c. and d.c. voltage and background on both the tip and ring wires, and line insulation status. Tables 16–18 illustrate typical displays provided to the user in response to the user operations described below. In these tables the user-entered characters are underscored for identification. The symbol ">" is displayed to the user as a prompter, indicating that a secondary command may be entered at a current time.

Table 16 illustrates an individual LINE TEST mode operation for testing line number 3470 for a selected exchange. The initial display indication was a tip-to-ground insulation fault for the particular line. The display further indicates that the line has a 20 Hz ringer with a bridged connection, and the cable length is 0.9 miles or 5400 feet. The line is characterized with negligible capacitance imbalance. In this example, after the computer directed the display of the basic line test result data, the user requested (by entering 0) the display of the LINE TEST menu, from which the user selected number 2, i.e., short circuit diagnostic. The computer responded at the display with "partial tip ground", and the trouble shooting instruction "test needed at subscriber drop".

Table 17 illustrates the user display for an individual LINE TEST mode operation for line number 9834, which tested o.k. and was indicated to have three "straight line ringers" in a bridged connection, with cable length 1.8 miles or 10,500 feet, with negligible capacitance imbalance. The user in this case also requested display of the LINE TEST menu, and from the requested menu, the user selected number 4 i.e., extra data. In response thereto, the computer directed the display of the battery, d.c. volts, a.c. volts and background measurements for the ring and tip lines and an indication that the line insulation was o.k.

Table 18 illustrates the user display for an individual LINE TEST mode operation for line number 9874. Initially the user entered #9874 from his keyboard. The computer then indicated that the line tests "busy" and automatically displayed the menu comprising "5 - override and test", "# line test", and "* primary command level".

As indicated in Table 18, the user entered "5" from his keyboard and computer 24 responded by indicating that the line is categorized as having a trouble history and further that the line has 1205 ohm short, that there are no ringers connected to the line, that the cable length is 3.1 mile or 18,600 feet, and that there is capacitance imbalance. The computer then offered the operator the opportunity to obtain further data relating to the line. If the user were to enter "0", the LINE TEST MENU as included would have been displayed. However, in this example, it is assumed that the user is familiar with the LINE TEST menu and that he does not enter 0 but instead successively enters 2, 3, and 4 to which the computer respectively responds as shown in Table 18. Accordingly, in response to 2, the display indicates a partial tip ring short and a test is needed at the subscriber drop. In response to entering of 3, the display indicates that there is an "open" at 3.2 miles of 18,600 feet from the central office and that open calibration is required at or near load point 3. In response to entry of 4, the display indicates the battery, d.c. volts, a.c. volts and background test values are given for both the tip and ring wires. In addition, the computer displays again that the line is characterized by a 1205 ohm short. Thus, for this example the line tests "busy" brought about by the short on the line, but the user elects to override and test. A partial tip to ring short is diagnosed and short circuit test called for at the subscriber drop.

In the present embodiment for the case where the user has performed a LINE TEST mode operation to a dial-up central office (e.g. block 30-3 in FIG. 2), the use may direct computer 24 to disconnect the trunk link by entering * 8. Otherwise, the computer 24 maintains the link for a predetermined time to permit the user to repeat the test or test a different line in the exchange, or to permit another user to test a line in the exchange. In this manner, the various users may save the dial-up testing time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

TABLE 1
---
-TEL SERVICE    TYPE 0 FOR HELP
    EXCHANGE #837
\*0
SELECT
1 TO CHANGE EXCHANGE #
2 FOR CURRENT ADVISORY
3 FOR HISTORICAL ADVISORY
4 FOR SERVICE AREA SUMMARY
8 TO DISCONNECT LINE
LINE TEST
\* PRIMARY COMMAND LEVEL

TABLE 2
---
\*1 EXCHANGE #555    -INVALID NUMBER-
\*1 EXCHANGE #777    -INVALID NUMBER-
\*1 EXCHANGE #415-555    -INVALID NUMBER-
\*1 EXCHANGE #862    -INVALID NUMBER-
\*1 EXCHANGE #415-862

TABLE 3
---
\*2 CURRENT TROUBLE ADVISORY FOR
    EXCHANGE #415-862    TYPE 0 FOR HELP
>0
SELECT
1 PERMANENT BUSY LINES
2 SHORTS, CROSES AND GROUNDS
3 HIGH BACKGROUND LINES
4 SUSPECT WET CABLE LINES
5 SUSPECT LINES
6 ACTIVATED PRESSURE CONTACTORS
7 HIGH VOLTAGE LINES
9 TO ADVANCE PAGE
LINE TEST
\* PRIMARY COMMAND LEVEL

TABLE 4
---
\*2 CURRENT TROUBLE ADVISORY FOR
    EXCHANGER #415-862    TYPE 0 FOR HELP
>1 PERMANENT BUSY LINES

TABLE 4-continued

```
2045    2399  2790  6584
>2 SHORTS. CROSSES AND GROUNDS   -SEVERE
2007    2075  2413  2569  2743  2813  2864  2879  2870  6044
6182    6280  6477  6483  6614  6680  6716  6756  6864
   SHORTS, CROSSES AND GROUNDS -MODERATE
2225    2598  2620  2633  2705  2972  6290  6344  6536  6812
6894
>3 HIGH BACKGROUND LINES    -SEVERE
              -NO FAULTS-
       HIGH BACKGROUND LINES    -MODERATE
2331    2332  2334  2335  6141  6147  6518  6608
>4 SUSPECT WET CABLE LINES
2040    2094  2410  2433  2434  2430  2457  2474  2562  2853
2955    6189  6548  6557  6705
>5 SUSPECT LINES
2025    2238  2285  2491  2495  2518  2510  2579  2587  2630
2962    2998  6023  6073  6079  6143  6181  6183  6217  6225
6516    6527  6569  6622  6681  6687  6694  6709  6700  6791
6821    6848  6867
>6 ACTIVATED PRESSURE CONTACTORS
              -NO FAULTS-
>7 HIGH VOLTAGE LINES
2106    2766  6372  9106
```

TABLE 5

```
*3 HISTORICAL ADVISORY FOR
   EXCHANGE #837   TYPE 0 FOR HELP
>0
SELECT
1 FOR INDIVIDUAL LINE HISTORY
2 FOR TROUBLE LINE HISTORY
3 FOR SUSPECT LINE HISTORY
# LINE TEST
* PRIMARY COMMAND LEVEL
```

TABLE 6

```
>3 SUSPECT LINE HISTORY FOR
   EXCHANGE #837   TYPE 0 FOR HELP
>>0
SELECT
1 SUSPECT LESS THAN 8 DAYS
2 SUSPECT 8 TO 31 DAYS
3 SUSPECT 32 TO 63 DAYS
4 SUSPECT OVER 63 DAYS
9 TO ADVANCE PAGE
LINE TEST
* PRIMARY COMMAND LEVEL
```

TABLE 7

```
>3 SUSPECT LINE HISTORY FOR
   EXCHANGE #837   TYPE 0 FOR HELP
>>1 SUSPECT LESS THAN 8 DAYS
2062   2151  2270  2488  2497  3040  3167  3171  3185  3425
5273   5323  5340  5368  5424  5457  5579  5585  5749  5787
6385   6401  6418  6431  6719  6753  6750  6875  6906  7110
7922   7938  8113  8167  8168  8187  8201  8210  8310  8336
9041   9043  9092  9322  9376  9530  9549  9777  9876  9900
9995
>>2 SUSPECT 8 TO 31 DAYS
2019   2024  2073  2083  2087  2156  2263  2278  2334  2359
3225   3261  3326  3320  3341  3403  3406  3407  3422  3444
5564   5574  5612  5621  5663  5695  5808  5838  5850  5875
6924   6925  6966  6971  6982  6984  7014  7017  7026  7038
7742   7774  7789  7794  7797  7865  7870  7884  7937  7939
7970   7995  8034  8075  8177  8190  8225  8250  8263  8284
9014   9033  9037  9064  9070  9082  9093  9121  9122  9126
PAGE 1    TYPE 9 TO ADVANCE PAGE
>>9 SUSPECT 8 TO 31 DAYS
9134   9171  9032  9311  9381        9433  9523  9548  9580  9605
9843   9851  9882  9880  9895  9907
PAGE 2                           LAST PAGE
```

TABLE 8

```
>2 TROUBLE LINE HISTORY FOR
   EXCHANGE #837   TYPE 0 FOR HELP
>>0
SELECT
1 TROUBLE LESS THAN 8 DAYS
2 TROUBLE 8 TO 31 DAYS
3 TROUBLE 32 to 63 DAYS
4 TROUBLE OVER 63 DAYS
9 TO ADVANCE PAGE
LINE TEST
```

TABLE 8-continued

```
* PRIMARY COMMAND LEVEL
>>3 TROUBLE 32 TO 63 DAYS
3237   3387  3890  5203  5594  5693  5965  6082  6935  7126
7182   7643  7652  7751  8260  8624  8878  8950  8969  9116
9356
>>4 TROUBLE OVER 63 DAYS
2316   3372  3408  3508  3884  5168  5169  5529  6408  6459
7082   7298  7325  7326  7383  7384  7435  7653  7736  8147
8698   8772  8814  9056  9835  9889
```

TABLE 9

```
*3 HISTORICAL ADVISORY FOR
   EXCHANGE #837   TYPE 0 FOR HELP
>1 HISTORY FOR LINE #837-3408
TROUBLE HISTORY FOR 204 DAYS
TESTED OK ON 16 DAYS
PAST 8 DAY HISTORY
         1 SUSPECT
         2 SUSPECT
         3 SUSPECT
         4 SUSPECT
         5 SUSPECT
         6 SUSPECT
         7 SUSPECT
         8 SUSPECT
```

TABLE 10

```
*3 HISTORICAL ADVISORY FOR
   EXCHANGE #837   TYPE 0 FOR HELP
>1 HISTORY FOR LINE #837-9889
TROUBLE HISTORY FOR 125 DAYS
TESTED OK ON 65 DAYS
PAST 8 DAY HISTORY
         1 PERMANENT BUSY
         2 PERMANENT BUSY
         3 PERMANENT BUSY
         4 PERMANENT BUSY
         5 PERMANENT BUSY
         6 PERMANENT BUSY
         7 OK
         8 PERMANENT BUSY
```

TABLE 11

```
*4 SERVICE AREA SUMMARY
   TYPE 0 FOR HELP
>0
SELECT
1 CURRENT TROUBLE SUMMARY
2 TROUBLE LINE HISTORICAL SUMMARY
3 SUSPECT LINE HISTORICAL SUMMARY
4 SEVERE SHORTS, CROSSES AND GROUNDS
5 SEVERE HIGH BACKGROUND LINES
9 TO ADVANCE PAGE
LINE TEST
* PRIMARY COMMAND LEVEL
```

TABLE 12

```
>1 SERVICE AREA SUMMARY
CURRENT TROUBLE SUMMARY  TYPE 0 FOR HELP
>>0
SELECT
1 PERMANENT BUSY LINES
2 SHORTS, CROSSSES AND GROUNDS
3 HIGH BACKGROUND LINES
4 SUSPECT WET CABLE LINES
5 SUSPECT LINES
6 ACTIVATED PRESSURE CONTACTORS
7 HIGH VOLTAGE LINES
9 TO ADVANCE PAGE
LINE TEST
* PRIMARY COMMAND LEVEL
```

TABLE 13

```
>>5 SERVICE AREA SUMMARY
CURRENT TROUBLE SUMMARY  TYPE 0 FOR HELP
NUMBER OF SUSPECT LINES
   EXCHANGE              FAULTS
   #415-862                 53
   #609-666                 12
   #609-837                 25
   TOTAL                    90
```

TABLE 14

>>2 SERVICE AREA SUMMARY
CURRENT TROUBLE SUMMARY TYPE 0 FOR HELP
NUMBER OF SHORTS, CROSSES AND GROUNDS

| EXCHANGE | SEVERE FAULTS | MODERATE FAULTS | TOTAL LINES |
|---|---|---|---|
| #415-862 | 19 | 11 | 30 |
| #609-666 | 5 | 2 | 7 |
| #609-837 | 7 | 6 | 13 |
| TOTAL | 31 | 19 | 50 |

TABLE 15

>>7 SERVICE AREA SUMMARY
CURRENT TROUBLE SUMMARY TYPE 0 FOR HELP
NUMBER OF HIGH VOLTAGE LINES

| EXCHANGE | FAULTS |
|---|---|
| #415-862 | 4 |
| #609-666 | 0 |
| #609-837 | 5 |
| TOTAL | 9 |

TABLE 16

TEST #3470 DIAL TEST TROUBLE HISTORY
    45 K TIP-GROUND
1 20HZ RINGER   -BRIDGED
CABLE LENGTH 0.9 MILES OR 5,400 FEET
NEGLIGIBLE CAPACITANCE IMBALANCE
    4-TEL SERVICE    TYPE 0 FOR HELP
>0
SELECT
1 LINE HISTORY
2 SHORT CIRCUIT DIAGNOSTIC
3 OPEN CIRCUIT DIAGNOSTIC
4 EXTRA DATA
LINE TEST
* PRIMARY COMMAND LEVEL
>2 PARTIAL TIP GROUND
TEST NEEDED AT SUBSCRIBER LOOP

TABLE 17

TEST #9034 DIAL TEST TESTED OK
3 STRAIGHT LINE RINGERS BRIDGED
CABLE LENGTH 1.8 MILES OR 10,500 FEET
NEGLIGIBLE CAPACITANCE IMBALANCE
    4-TEL SERVICE
>0
SELECT
1 LINE HISTORY
2 SHORT CIRCUIT DIAGNOSTIC
3 OPEN CIRCUIT DIAGNOSTIC
4 EXTRA DATA
LINE TEST
* PRIMARY COMMAND LEVEL

| | | | BACK- |
|---|---|---|---|
| >4 | BATTERY DC VOLTS | AC VOLTS | GROUND |
| RING | - 50.0 V  - 0.1 V | 0.0 V | 7 UA |
| TIP | 0.2 V  - 0.1 V | 0.0 V | 7 UA |

INSULATION OK

TABLE 18

TEST #9874  DIAL  BUSY
SELECT
5 TO OVERRIDE AND TEST
LINE TEST
* PRIMARY COMMAND LEVEL
>5 TEST   TROUBLE HISTORY

1205 OHM SHORT
NO RINGERS
CABLE LENGTH 3.2 MILES OR 18,600 FEET
NEGLIGIBLE CAPACITANCE IMBALANCE
    4-TEL SERVICE   TYPE 0 FOR HELP
>2 PARTIAL TIP RING SHORT
TEST NEEDED AT SUBSCRIBER DROP
>3 OPEN AT 3.2 MILES OR 18,600 FEET FROM CENTRAL OFFICE
OPEN CALIBRATION REQUIRED AT OR NEAR LOAD POINT
3

| | | | BACK- |
|---|---|---|---|
| >4 | BATTERY DC VOLTS | AC VOLTS | GROUND |
| RING | - 42.0 V  - 0.1 V | 0.0 V | 14 UA |
| TIP | - 7.1 V  - 0.1 V | 0.0 V | 15 UA |

1205 OHM SHORT

APPENDIX 1

EXCHANGE TESTER   --   13 MAY 1975

STARTING ADDRESS :  062213

```
15161  /  000000  =>  0
15162  /  465551  =>  SCA 15551
15163  /  465552  =>  SCA 15552
15164  /  465550  =>  SCA 15550
15165  /  465547  =>  SCA 15547
15166  /  325434  =>  IOR 15434
15167  /  465553  =>  SCA 15553
15170  /  335161  =>  IOR I 15161  (0000)
15171  /  625161  =>  ISZ 15161
15172  /  465546  =>  SCA 15546
15173  /  075542  =>  JSR I 15542  (60357)
15174  /  400530  =>  STA Z 0530
15175  /  031001  =>  031001
15176  /  160705  =>  AND 10705
15177  /  404340  =>  STA Z 4340
15200  /  004040  =>  LDL 4040
15201  /  325551  =>  IOR 15551
15202  /  075544  =>  JSR I 15544  (65304)
15203  /  000007  =>  LDL 0007
15204  /  165546  =>  AND 15546
15205  /  225207  =>  ADD 15207
15206  /  014000  =>  DSP
15207  /  015210  =>  015210
15210  /  015222  =>  015222
```

```
15211  /  015230   =>  015230
15212  /  015236   =>  015236
15213  /  015244   =>  015244
15214  /  015221   =>  015221
15215  /  015227   =>  015227
15216  /  015235   =>  015235
15217  /  015243   =>  015243
15220  /  000000   =>  0
15221  /  465553   =>  SCA 15553
15222  /  000000   =>  0
15223  /  465550   =>  SCA 15550
15224  /  000010   =>  LDL 0010
15225  /  465547   =>  SCA 15547
15226  /  125254   =>  JMP 15254
15227  /  465553   =>  SCA 15553
15230  /  000010   =>  LDL 0010
15231  /  465550   =>  SCA 15550
15232  /  000040   =>  LDL 0040
15233  /  465547   =>  SCA 15547
15234  /  125254   =>  JMP 15254
15235  /  465553   =>  SCA 15553
15236  /  000040   =>  LDL 0040
15237  /  465550   =>  SCA 15550
15240  /  000100   =>  LDL 0100
15241  /  465547   =>  SCA 15547
15242  /  125254   =>  JMP 15254
15243  /  465553   =>  SCA 15553
15244  /  000100   =>  LDL 0100
15245  /  465550   =>  SCA 15550
15246  /  000377   =>  LDL 0377
15247  /  465547   =>  SCA 15547
15250  /  000000   =>  0
15251  /  000000   =>  0
15252  /  000000   =>  0
15253  /  000000   =>  0
15254  /  000013   =>  LDL 0013
15255  /  465433   =>  SCA 15433
15256  /  000002   =>  LDL 0002
15257  /  225540       ADD 15540
15260  /  465431   =>  SCA 15431
15261  /  335431   =>  IOR I 15431 (0000)
15262  /  025000   =>  SNA
15263  /  125417   =>  JMP 15417
15264  /  625431   =>  ISZ 15431
15265  /  465432   =>  SCA 15432
15266  /  000000   =>  0
15267  /  000000   =>  0
15270  /  335431   =>  IOR I 15431 (0000)
15271  /  465555   =>  SCA 15555
15272  /  625431   =>  ISZ 15431
15273  /  335431   =>  IOR I 15431 (0000)
15274  /  165434   =>  AND 15434
15275  /  365553   =>  XOR 15553
15276  /  755363   =>  JNA 15363
15277  /  625431   =>  ISZ 15431
15300  /  335431   =>  IOR I 15431 (0000)
15301  /  625431   =>  ISZ 15431
15302  /  165541   =>  AND 15541
15303  /  425554   =>  STA 15554
15304  /  265550   =>  SUB 15550
15305  /  026010   =>  SPA CLA
15306  /  125366   =>  JMP 15366
15307  /  325554   =>  IOR 15554
15310  /  265547   =>  SUB 15547
15311  /  022010   =>  SMA CLA
```

| | | | |
|---|---|---|---|
| 15312 | / | 125366 | JMP 15366 |
| 15313 | / | 000000 | 0 |
| 15314 | / | 000000 | 0 |
| 15315 | / | 000000 | 0 |
| 15316 | / | 000000 | 0 |
| 15317 | / | 000000 | 0 |
| 15320 | / | 000000 | 0 |
| 15321 | / | 000000 | 0 |
| 15322 | / | 000000 | 0 |
| 15323 | / | 525552 | SZW 15552 |
| 15324 | / | 125340 | JMP 15340 |
| 15325 | / | 075542 | JSR I 15542 (60357) |
| 15326 | / | 401411 | STA Z 1411 |
| 15327 | / | 160523 | AND 10523 |
| 15330 | / | 402711 | STA Z 2711 |
| 15331 | / | 241040 | SUB Z 1040 |
| 15332 | / | 004040 | LDL 4040 |
| 15333 | / | 065441 | JSR 15441 |
| 15334 | / | 000000 | 0 |
| 15335 | / | 000000 | 0 |
| 15336 | / | 000000 | 0 |
| 15337 | / | 000000 | 0 |
| 15340 | / | 665433 | DSZ 15433 |
| 15341 | / | 125352 | JMP 15352 |
| 15342 | / | 000000 | 0 |
| 15343 | / | 000000 | 0 |
| 15344 | / | 000000 | 0 |
| 15345 | / | 000000 | 0 |
| 15346 | / | 075542 | JSR I 15542 (60357) |
| 15347 | / | 744000 | JZA 14000 |
| 15350 | / | 000012 | LDL 0012 |
| 15351 | / | 465433 | SCA 15433 |
| 15352 | / | 075542 | JSR I 15542 (60357) |
| 15353 | / | 404000 | STA Z 4000 |
| 15354 | / | 325555 | IOR 15555 |
| 15355 | / | 075545 | JSR I 15545 (67204) |
| 15356 | / | 125366 | JMP 15366 |
| 15357 | / | 000000 | 0 |
| 15360 | / | 000000 | 0 |
| 15361 | / | 000000 | 0 |
| 15362 | / | 000000 | 0 |
| 15363 | / | 625431 | ISZ 15431 |
| 15364 | / | 625431 | ISZ 15431 |
| 15365 | / | 020000 | NOP |
| 15366 | / | 665432 | DSZ 15432 |
| 15367 | / | 125270 | JMP 15270 |
| 15370 | / | 000000 | 0 |
| 15371 | / | 000000 | 0 |
| 15372 | / | 525552 | SZW 15552 |
| 15373 | / | 125413 | JMP 15413 |
| 15374 | / | 075542 | JSR I 15542 (60357) |
| 15375 | / | 401001 | STA Z 1001 |
| 15376 | / | 234016 | ADD I 14016 (0000) |
| 15377 | / | 174014 | AND I 14014 (0000) |
| 15400 | / | 111605 | JMP I Z 1605 (314025) |
| 15401 | / | 234027 | ADD I 14027 (0000) |
| 15402 | / | 112410 | JMP I Z 2410 (12000) |
| 15403 | / | 400040 | STA Z 0040 |
| 15404 | / | 065441 | JSR 15441 |
| 15405 | / | 000000 | 0 |
| 15406 | / | 000000 | 0 |
| 15407 | / | 000000 | 0 |
| 15410 | / | 000000 | 0 |
| 15411 | / | 000000 | 0 |
| 15412 | / | 000000 | 0 |

```
15413  /  020010   ->   CLA
15414  /  625161   ->   ISZ 15161
15415  /  020010   ->   CLA
15416  /  135161   ->   JMP I 15161 (0000)
15417  /  075542   ->   JSR I 15542 (60357)
15420  /  401001   ->   STA Z 1001
15421  /  234016   ->   ADD I 14016 (0000)
15422  /  174010   ->   AND I 14010 (0000)
15423  /  112324   ->   JMP I Z 2324 (702463)
15424  /  172231   ->   AND I 12231 (0000)
15425  /  402205   ->   STA Z 2205
15426  /  031722   ->   031722
15427  /  040040   ->   JSR Z 0040
15430  /  125415   ->   JMP 15415
15431  /  000000   ->   0
15432  /  000000   ->   0
15433  /  000000   ->   0
15434  /  200000   ->   ADD Z 0000
15435  /  000000   ->   0
15436  /  000000   ->   0
15437  /  000000   ->   0
15440  /  000000   ->   0
15441  /  000000   ->   0
15442  /  000003   ->   LDL 0003
15443  /  165546   ->   AND 15546
15444  /  225446   ->   ADD 15446
15445  /  014000   ->   DSP
15446  /  015447   ->   015447
15447  /  015454   ->   015454
15450  /  015462   ->   015462
15451  /  015467   ->   015467
15452  /  015474   ->   015474
15453  /  000000   ->   0
15454  /  075542   ->   JSR I 15542 (60357)
15455  /  140523        AND Z 0523
15456  /  234024   ->   ADD I 14024 (0000)
15457  /  100116   ->   JMP Z 0116
15460  /  407000   ->   STA Z 7000
15461  /  125504   ->   JMP 15504
15462  /  075542   ->   JSR I 15542 (60357)
15463  /  704024   ->   PCT 14024
15464  /  174063   ->   AND I 14063 (0000)
15465  /  610040   ->   ISZ I Z 0040 (0000)
15466  /  125504   ->   JMP 15504
15467  /  075542   ->   JSR I 15542 (60357)
15470  /  636240   ->   ISZ I 16240 (160305)
15471  /  241740   ->   SUB Z 1740
15472  /  666300   ->   DSZ 16300
15473  /  125504   ->   JMP 15504
15474  /  075542   ->   JSR I 15542 (60357)
15475  /  172605   ->   AND I 12605 (0000)
15476  /  224066   ->   ADD 14066
15477  /  630040   ->   ISZ I 10040 (130531)
15500  /  000000   ->   0
15501  /  000000   ->   0
15502  /  000000   ->   0
15503  /  000000   ->   0
15504  /  075542   ->   JSR I 15542 (60357)
15505  /  400401   ->   STA Z 0401
15506  /  312340   ->   IOR I Z 2340 (544113)
15507  /  170640   ->   AND I 10640 (41456)
15510  /  004040   ->   LDL 4040
15511  /  565553   ->   SNW 15553
15512  /  125520   ->   JMP 15520
15513  /  075542   ->   JSR I 15542 (60357)
```

```
15514  /  242217  =>  SUB Z 2217
15515  /  250214  =>  SUB I Z 0214 (0277)
15516  /  050040  =>  JSR I Z 0040 (0000)
15517  /  125524  =>  JMP 15524
15520  /  075542  =>  JSR I 15542 (60357)
15521  /  232523  =>  ADD I 12523 (0000)
15522  /  200503  =>  ADD Z 0503
15523  /  240040  =>  SUB Z 0040
15524  /  075542  =>  JSR I 15542 (60357)
15525  /  401011  =>  STA Z 1011
15526  /  232417  =>  ADD I 12417 (0000)
15527  /  223174  =>  ADD 13174
15530  /  400040  =>  STA Z 0040
15531  /  000000  =>  0
15532  /  000000  =>  0
15533  /  000000  =>  0
15534  /  000000  =>  0
15535  /  000001  =>  LDL 0001
15536  /  465552  =>  SCA 15552
15537  /  135441  =>  JMP I 15441 (0000)
15540  /  020050  =>  CLA CLL
15541  /  000377  =>  LDL 0377
15542  /  060357  =>  JSR 10357
15543  /  044033  =>  JSR Z 4033
15544  /  065304  =>  JSR 15304
15545  /  067204  =>  JSR 17204
15546  /  000000  =>  0
15547  /  000000  =>  0
15550  /  000000  =>  0
15551  /  000000  =>  0
15552  /  000000  =>  0
15553  /  000000  =>  0
15554  /  000000  =>  0
15555  /  000000  =>  0
15556  /  000000  =>  0
15557  /  466202  =>  SCA 16202
15560  /  466204  =>  SCA 16204
15561  /  466203  =>  SCA 16203
15562  /  466200  =>  SCA 16200
15563  /  466201  =>  SCA 16201
15564  /  000000  =>  0
15565  /  000000  =>  0
15566  /  000000  =>  0
15567  /  000000  =>  0
15570  /  000002  =>  LDL 0002
15571  /  226170  =>  ADD 16170
15572  /  466156  =>  SCA 16156
15573  /  336156  =>  IOR I 16156 (0000)
15574  /  025000  =>  SNA
15575  /  125614  =>  JMP 15614
15576  /  626156  =>  ISZ 16156
15577  /  466166  =>  SCA 16166
15600  /  000000  =>  0
15601  /  000000  =>  0
15602  /  336156  =>  IOR I 16156 (0000)
15603  /  366202  =>  XOR 16202
15604  /  745617  =>  JZA 15617
15605  /  000003  =>  LDL 0003
15606  /  226156  =>  ADD 16156
15607  /  466156  =>  SCA 16156
15610  /  666166  =>  DSZ 16166
15611  /  125602  =>  JMP 15602
15612  /  000000  =>  0
15613  /  000000  =>  0
15614  /  126130  =>  JMP 16130
```

```
15615  /  000000   =>   0
15616  /  000000   =>   0
15617  /  000001   =>   LDL 0001
15620  /  466203   =>   SCA 16203
15621  /  326167   =>   IOR 16167
15622  /  025010   =>   SNA CLA
15623  /  126147   =>   JMP 16147
15624  /  000000   =>   0
15625  /  000000   =>   0
15626  /  000000   =>   0
15627  /  000000   =>   0
15630  /  626156   =>   ISZ 16156
15631  /  336156   =>   IOR I 16156 (0000)
15632  /  626156   =>   ISZ 16156
15633  /  466204   =>   SCA 16204
15634  /  126005   =>   JMP 16005
15635  /  326204   =>   IOR 16204
15636  /  426157   =>   STA 16157
15637  /  166171   =>   AND 16171
15640  /  025010   =>   SNA CLA
15641  /  125670   =>   JMP 15670
15642  /  000377   =>   LDL 0377
15643  /  166157   =>   AND 16157
15644  /  466201   =>   SCA 16201
15645  /  076174   =>   JSR I 16174 (60357)
15646  /  742405   =>   JZA 12405
15647  /  232405        ADD I 12405 (0000)
15650  /  044017   =>   JSR Z 4017
15651  /  134006   =>   JMP I 14006 (0000)
15652  /  172240   =>   AND I 12240 (0000)
15653  /  200123        ADD Z 0123
15654  /  244000   =>   SUB Z 4000
15655  /  326201   =>   IOR 16201
15656  /  076175   =>   JSR I 16175 (44033)
15657  /  000003   =>   LDL 0003
15660  /  076174   =>   JSR I 16174 (60357)
15661  /  400401   =>   STA Z 0401
15662  /  312300   =>   IOR I Z 2300 (102561)
15663  /  126147   =>   JMP 16147
15664  /  000000   =>   0
15665  /  000000   =>   0
15666  /  000000   =>   0
15667  /  000000   =>   0
15670  /  076174   =>   JSR I 16174 (60357)
15671  /  742001   =>   JZA 12001
15672  /  232440   =>   ADD I 12440 (0000)
15673  /  704004   =>   PCT 14004
15674  /  013140   =>   013140
15675  /  101123   =>   JMP Z 1123
15676  /  241722   =>   SUB Z 1722
15677  /  310040   =>   IOR I Z 0040 (0000)
15700  /  000000   =>   0
15701  /  000000   =>   0
15702  /  000010   =>   LDL 0010
15703  /  466164   =>   SCA 16164
15704  /  000001   =>   LDL 0001
15705  /  466165   =>   SCA 16165
15706  /  076174   =>   JSR I 16174 (60357)
15707  /  744040   =>   JZA 14040
15710  /  004040   =>   LDL 4040
15711  /  326165   =>   IOR 16165
15712  /  076175   =>   JSR I 16175 (44033)
15713  /  000001   =>   LDL 0001
15714  /  626165   =>   ISZ 16165
15715  /  000003   =>   LDL 0003
```

```
15716  /  166157  =>  AND 16157
15717  /  225721  =>  ADD 15721
15720  /  014000  =>  DSP
15721  /  015722  =>  015722
15722  /  015733  =>  015733
15723  /  015741  =>  015741
15724  /  015750  =>  015750
15725  /  015761  =>  015761
15726  /  000000  =>  0
15727  /  000000  =>  0
15730  /  000000  =>  0
15731  /  000000  =>  0
15732  /  000000  =>  0
15733  /  076174  =>  JSR I 16174 (60357)
15734  /  401713  =>  STA Z 1713
15735  /  004040  =>  LDL 4040
15736  /  125772  =>  JMP 15772
15737  /  000000  =>  0
15740  /  000000  =>  0
15741  /  076174  =>  JSR I 16174 (60357)
15742  /  402325  =>  STA Z 2325
15743  /  232005  =>  ADD I 12005 (0000)
15744  /  032400  =>  RTL 4
15745  /  125772  =>  JMP 15772
15746  /  000000  =>  0
15747  /  000000  =>  0
15750  /  076174  =>  JSR I 16174 (60357)
15751  /  402422  =>  STA Z 2422
15752  /  172502  =>  AND I 12502 (0000)
15753  /  140540  =>  AND Z 0540
15754  /  141116  =>  AND Z 1116
15755  /  050040  =>  JSR I Z 0040 (0000)
15756  /  125772  =>  JMP 15772
15757  /  000000  =>  0
15760  /  000000  =>  0
15761  /  076174  =>  JSR I 16174 (60357)
15762  /  402005  =>  STA Z 2005
15763  /  221501  =>  ADD 11501
15764  /  160516  =>  AND 10516
15765  /  244002  =>  SUB Z 4002
15766  /  252331  =>  SUB I Z 2331 (402322)
15767  /  004040  =>  LDL 4040
15770  /  000000  =>  0
15771  /  000000  =>  0
15772  /  666164  =>  DSZ 16164
15773  /  024010  =>  SKP CLA
15774  /  126147  =>  JMP 16147
15775  /  326157  =>  IOR 16157
15776  /  034240  =>  CLL SHR 2
15777  /  466157  =>  SCA 16157
20003  /  000000  =>  0
20004  /  420034  =>  STA 20034
20005  /  026010  =>  SPA CLA
20006  /  120035  =>  JMP 20035
20007  /  070045  =>  JSR I 20045 (60357)
20010  /  404000  =>  STA Z 4000
20011  /  320034  =>  IOR 20034
20012  /  026000  =>  SPA
20013  /  020006  =>  NAC
20014  /  420033  =>  STA 20033
20015  /  070047  =>  JSR I 20047 (43715)
20016  /  020044  =>  CLL CMA
20017  /  070046  =>  JSR I 20046 (44033)
20020  /  000004  =>  LDL 0004
20021  /  070045  =>  JSR I 20045 (60357)
```

```
20022  /  560000   =>   SNW 20000
20023  /  320033   =>   IOR 20033
20024  /  070046   =>   JSR I 20046 (44033)
20025  /  000001   =>   LDL 0001
20026  /  070045   =>   JSR I 20045 (60357)
20027  /  402525   =>   STA Z 2525
20030  /  004040   =>   LDL 4040
20031  /  020010   =>   CLA
20032  /  130003   =>   JMP I 20003 (0000)
20033  /  000000   =>   0
20034  /  000000   =>   0
20035  /  070045   =>   JSR I 20045 (60357)
20036  /  405500   =>   STA Z 5500
20037  /  120011   =>   JMP 20011
20040  /  000000   =>   0
20041  /  000000   =>   0
20042  /  000000   =>   0
20043  /  000000   =>   0
20044  /  000012   =>   LDL 0012
20045  /  060357   =>   JSR 20357
20046  /  044033   =>   JSR Z 4033
20047  /  043715   =>   JSR Z 3715
30004  /  000000   =>   0
30005  /  020010   =>   CLA
30006  /  460044   =>   SCA 30044
30007  /  330040   =>   IOR I 30040 (51672)
30010  /  070043   =>   JSR I 30043 (50004)
30011  /  000310   =>   LDL 0310
30012  /  000536   =>   LDL 0536
30013  /  120036   =>   JMP 30036
30014  /  000000   =>   0
30015  /  000000   =>   0
30016  /  000000   =>   0
30017  /  000000   =>   0
30020  /  330041   =>   IOR I 30041 (51670)
30021  /  070043   =>   JSR I 30043 (50004)
30022  /  000310   =>   LDL 0310
30023  /  000536   =>   LDL 0536
30024  /  120036   =>   JMP 30036
30025  /  330040   =>   IOR I 30040 (51672)
30026  /  036140   =>   CLL SHL 1
30027  /  230040   =>   ADD I 30040 (51672)
30030  /  230042   =>   ADD I 30042 (51676)
30031  /  026010   =>   SPA CLA
30032  /  120036   =>   JMP 30036
30033  /  000001   =>   LDL 0001
30034  /  460044   =>   SCA 30044
30035  /  130004   =>   JMP I 30004 (0000)
30036  /  620004   =>   ISZ 30004
30037  /  120035   =>   JMP 30035
30040  /  051672   =>   JSR I Z 1672 (0001)
30041  /  051670   =>   JSR I Z 1670 (641660)
30042  /  051676   =>   JSR I Z 1676 (454156)
30043  /  050004   =>   JSR I Z 0004 (320600)
30044  /  000000   =>   0
30045  /  000000   =>   0
30046  /  020010   =>   CLA
30047  /  470130   =>   SCA I 30130 (30044)
30050  /  470131   =>   SCA I 30131 (43641)
30051  /  470122   =>   SCA I 30122 (43640)
30052  /  470121   =>   SCA I 30121 (43651)
30053  /  470117   =>   SCA I 30117 (43643)
30054  /  470120   =>   SCA I 30120 (43642)
30055  /  000000   =>   0
30056  /  000000   =>   0
```

```
30057  /  000000  =>  0
30060  /  000000  =>  0
30061  /  070125  =>  JSR I 30125 (30004)
30062  /  120107  =>  JMP 30107
30063  /  000000  =>  0
30064  /  000000  =>  0
30065  /  000000  =>  0
30066  /  000000  =>  0
30067  /  070126  =>  JSR I 30126 (41340)
30070  /  020000  =>  NOP
30071  /  120107  =>  JMP 30107
30072  /  070127  =>  JSR I 30127 (43203)
30073  /  020000  =>  NOP
30074  /  000000  =>  0
30075  /  000000  =>  0
30076  /  000000  =>  0
30077  /  000000  =>  0
30100  /  070124  =>  JSR I 30124 (41262)
30101  /  042236  =>  JSR Z 2236
30102  /  042241  =>  JSR Z 2241
30103  /  000000  =>  0
30104  /  000000  =>  0
30105  /  000000  =>  0
30106  /  000000  =>  0
30107  /  130045  =>  JMP I 30045 (0000)
30110  /  000000  =>  0
30111  /  000000  =>  0
30112  /  000000  =>  0
30113  /  000000  =>  0
30114  /  060357  =>  JSR 30357
30115  /  044033  =>  JSR Z 4033
30116  /  043715  =>  JSR Z 3715
30117  /  043643  =>  JSR Z 3643
30120  /  043642  =>  JSR Z 3642
30121  /  043651  =>  JSR Z 3651
30122  /  043640  =>  JSR Z 3640
30123  /  043670  =>  JSR Z 3670
30124  /  041262  =>  JSR Z 1262
30125  /  030004  =>  030004
30126  /  041340  =>  JSR Z 1340
30127  /  043203  =>  JSR Z 3203
30130  /  030044  =>  030044
30131  /  043641  =>  JSR Z 3641
40001  /  000000  =>  0
40002  /  020010  =>  CLA
40003  /  570032  =>  SNW I 40032 (43641)
40004  /  120016  =>  JMP 40016
40005  /  530035  =>  SZW I 40035 (42235)
40006  /  120027  =>  JMP 40027
40007  /  070034  =>  JSR I 40034 (60357)
40010  /  741617  =>  JZA 41617
40011  /  402211  =>  STA Z 2211
40012  /  160705  =>  AND 40705
40013  /  222300  =>  ADD 42300
40014  /  120027  =>  JMP 40027
40015  /  000000  =>  0
40016  /  070033  =>  JSR I 40033 (42547)
40017  /  043632  =>  JSR Z 3632
40020  /  000000  =>  0
40021  /  070033  =>  JSR I 40033 (42547)
40022  /  043652  =>  JSR Z 3652
40023  /  000001  =>  LDL 0001
40024  /  070033  =>  JSR I 40033 (42547)
40025  /  043644  =>  JSR Z 3644
40026  /  000002  =>  LDL 0002
```

```
40027  /  000000  ->  0
40030  /  020010  ->  CLA
40031  /  130001  ->  JMP I 40001 (0000)
40032  /  043641  ->  JSR Z 3641
40033  /  042547  ->  JSR Z 2547
40034  /  060357  ->  JSR 40357
40035  /  042235  ->  JSR Z 2235
40036  /  000000  ->  0
40037  /  020010  ->  CLA
40040  /  460270  ->  SCA 40270
40041  /  020010  ->  CLA
40042  /  330265  ->  IOR I 40265 (43651)
40043  /  330263  ->  IOR I 40263 (43640)
40044  /  330264  ->  IOR I 40264 (30044)
40045  /  330267  ->  IOR I 40267 (42231)
40046  /  750244  ->  JNA 40244
40047  /  330260  ->  IOR I 40260 (41335)
40050  /  260243  ->  SUB 40243
40051  /  027010  ->  SPA SNA CLA
40052  /  120221  ->  JMP 40221
40053  /  530266  ->  SZW I 40266 (42232)
40054  /  120233  ->  JMP 40233
40055  /  000000  ->  0
40056  /  000000  ->  0
40057  /  000000  ->  0
40060  /  000000  ->  0
40061  /  070261  ->  JSR I 40261 (60357)
40062  /  401720  ->  STA Z 1720
40063  /  051640  ->  JSR I Z 1640 (171426)
40064  /  012440  ->  012440
40065  /  004040  ->  LDL 4040
40066  /  000000  ->  0
40067  /  000000  ->  0
40070  /  330257  ->  IOR I 40257 (41336)
40071  /  025000  ->  SNA
40072  /  120114  ->  JMP 40114
40073  /  070256  ->  JSR I 40256 (43715)
40074  /  040254  ->  JSR Z 0254
40075  /  420270  ->  STA 40270
40076  /  070262  ->  JSR I 40262 (44033)
40077  /  000002  ->  LDL 0002
40100  /  070261  ->  JSR I 40261 (60357)
40101  /  560000  ->  SNW 40000
40102  /  000000  ->  0
40103  /  000000  ->  0
40104  /  330257  ->  IOR I 40257 (41336)
40105  /  070262  ->  JSR I 40262 (44033)
40106  /  000001  ->  LDL 0001
40107  /  070261  ->  JSR I 40261 (60357)
40110  /  401511  ->  STA Z 1511
40111  /  140523  ->  AND Z 0523
40112  /  401722  ->  STA Z 1722
40113  /  400040  ->  STA Z 0040
40114  /  020010  ->  CLA
40115  /  330260  ->  IOR I 40260 (41335)
40116  /  070256  ->  JSR I 40256 (43715)
40117  /  040254  ->  JSR Z 0254
40120  /  025000  ->  SNA
40121  /  120130  ->  JMP 40130
40122  /  070262  ->  JSR I 40262 (44033)
40123  /  000003  ->  LDL 0003
40124  /  070261  ->  JSR I 40261 (60357)
40125  /  540000  ->  SNW Z 0000
40126  /  000000  ->  0
40127  /  000000  ->  0
```

```
40130  /  020010  □▷  CLA
40131  /  330260  □▷  IOR I 40260 (41335)
40132  /  070262  □▷  JSR I 40262 (44033)
40133  /  000001  □▷  LDL 0001
40134  /  070261  □▷  JSR I 40261 (60357)
40135  /  606040  □▷  ISZ Z 6040
40136  /  060505  □▷  JSR 40505
40137  /  244006  □▷  SUB Z 4006
40140  /  221715  □▷  ADD 41715
40141  /  400305  □▷  STA Z 0305
40142  /  162422  □▷  AND 42422
40143  /  011440  □▷  011440
40144  /  170606  □▷  AND I 40606 (260677)
40145  /  110305  □▷  JMP I Z 0305 (0324)
40146  /  741720  □▷  JZA 41720
40147  /  051640  □▷  JSR I Z 1640 (171426)
40150  /  030114  □▷  030114
40151  /  110222  □▷  JMP I Z 0222 (204017)
40152  /  012411  □▷  012411
40153  /  171640  □▷  AND I 41640 (462240)
40154  /  220521  □▷  ADD 40521
40155  /  251122  □▷  SUB I Z 1122 (0000)
40156  /  050440  □▷  JSR I Z 0440 (144065)
40157  /  004040  □▷  LDL 4040
40160  /  560270  □▷  SNW 40270
40161  /  120206  □▷  JMP 40206
40162  /  020010  □▷  CLA
40163  /  070261  □▷  JSR I 40261 (60357)
40164  /  012440  □▷  012440
40165  /  172240  □▷  AND I 42240 (0000)
40166  /  160501  □▷  AND 40501
40167  /  224014  □▷  ADD 44014
40170  /  170104  □▷  AND I 40104 (330257)
40171  /  402017  □▷  STA Z 2017
40172  /  111624  □▷  JMP I Z 1624 (451574)
40173  /  400040  □▷  STA Z 0040
40174  /  000000  □▷  0
40175  /  000000  □▷  0
40176  /  320270  □▷  IOR 40270
40177  /  070262  □▷  JSR I 40262 (44033)
40200  /  000002  □▷  LDL 0002
40201  /  000000  □▷  0
40202  /  000000  □▷  0
40203  /  120241  □▷  JMP 40241
40204  /  000000  □▷  0
40205  /  000000  □▷  0
40206  /  020010  □▷  CLA
40207  /  070261  □▷  JSR I 40261 (60357)
40210  /  171640  □▷  AND I 41640 (462240)
40211  /  170606  □▷  AND I 40606 (260677)
40212  /  110305  □▷  JMP I Z 0305 (0324)
40213  /  402311  □▷  STA Z 2311
40214  /  040540  □▷  JSR Z 0540
40215  /  170640  □▷  AND I 40640 (320672)
40216  /  060125  □▷  JSR 40125
40217  /  142400  □▷  AND Z 2400
40220  /  120241  □▷  JMP 40241
40221  /  070261  □▷  JSR I 40261 (60357)
40222  /  401720  □▷  STA Z 1720
40223  /  051640  □▷  JSR I Z 1640 (171426)
40224  /  012440  □▷  012440
40225  /  030516  □▷  030516
40226  /  242201  □▷  SUB Z 2201
40227  /  144017  □▷  AND Z 4017
40230  /  060611  □▷  JSR 40611
```

```
40231  /  030500  ->  RTR 5
40232  /  120241  ->  JMP 40241
40233  /  070261  ->  JSR I 40261 (60357)
40234  /  401411  ->  STA Z 1411
40235  /  160540  ->  AND 40540
40236  /  231017  ->  ADD I 41017 (0000)
40237  /  222405  ->  ADD 42405
40240  /  040040  ->  JSR Z 0040
40241  /  020010  ->  CLA
40242  /  130036  ->  JMP I 40036 (0000)
40243  /  000002  ->  LDL 0002
40244  /  070261  ->  JSR I 40261 (60357)
40245  /  400301  ->  STA Z 0301
40246  /  161617  ->  AND 41617
40247  /  244003  ->  SUB Z 4003
40250  /  011403  ->  011403
40251  /  251401  ->  SUB I Z 1401 (40001)
40252  /  240500  ->  SUB Z 0500
40253  /  120241  ->  JMP 40241
40254  /  000012  ->  LDL 0012
40255  /  017765  ->  017765
40256  /  043715  ->  JSR Z 3715
40257  /  041336  ->  JSR Z 1336
40260  /  041335  ->  JSR Z 1335
40261  /  060357  ->  JSR 40357
40262  /  044033  ->  JSR Z 4033
40263  /  043640  ->  JSR Z 3640
40264  /  030044  ->  030044
40265  /  043651  ->  JSR Z 3651
40266  /  042232  ->  JSR Z 2232
40267  /  042231  ->  JSR Z 2231
40270  /  000000  ->  0
40271  /  000000  ->  0
40272  /  070341  ->  JSR I 40341 (60357)
40273  /  742324  ->  JZA 42324
40274  /  072426  ->  JSR I 42426 (332446)
40275  /  750040  ->  JNA 40040
40276  /  330344  ->  IOR I 40344 (42247)
40277  /  070343  ->  JSR I 40343 (20003)
40300  /  070341  ->  JSR I 40341 (60357)
40301  /  404023  ->  STA Z 4023
40302  /  220724  ->  ADD 40724
40303  /  267500  ->  SUB 47500
40304  /  330345  ->  IOR I 40345 (42244)
40305  /  070343  ->  JSR I 40343 (20003)
40306  /  070341  ->  JSR I 40341 (60357)
40307  /  404023  ->  STA Z 4023
40310  /  242224  ->  SUB Z 2224
40311  /  267500  ->  SUB 47500
40312  /  330346  ->  IOR I 40346 (42251)
40313  /  070343  ->  JSR I 40343 (20003)
40314  /  070341  ->  JSR I 40341 (60357)
40315  /  740724  ->  JZA 40724
40316  /  072426  ->  JSR I 42426 (332446)
40317  /  750040  ->  JNA 40040
40320  /  330347  ->  IOR I 40347 (42225)
40321  /  070343  ->  JSR I 40343 (20003)
40322  /  070341  ->  JSR I 40341 (60357)
40323  /  404007  ->  STA Z 4007
40324  /  220724  ->  ADD 40724
40325  /  267500  ->  SUB 47500
40326  /  330350  ->  IOR I 40350 (42224)
40327  /  070343  ->  JSR I 40343 (20003)
40330  /  070341  ->  JSR I 40341 (60357)
40331  /  404007  ->  STA Z 4007
```

```
40332  /  242224   =>  SUB Z 2224
40333  /  267500   =>  SUB 47500
40334  /  330351   =>  IOR I 40351 (42226)
40335  /  070343   =>  JSR I 40343 (20003)
40336  /  070341   =>  JSR I 40341 (60357)
40337  /  740000   =>  JZA 40000
40340  /  130271   =>  JMP I 40271 (0000)
40341  /  060357   =>  JSR 40357
40342  /  044033   =>  JSR Z 4033
40343  /  020003   =>  020003
40344  /  042247   =>  JSR Z 2247
40345  /  042244   =>  JSR Z 2244
40346  /  042251   =>  JSR Z 2251
40347  /  042225   =>  JSR Z 2225
40350  /  042224   =>  JSR Z 2224
40351  /  042226   =>  JSR Z 2226
40352  /  000000   =>  0
40353  /  070411   =>  JSR I 40411 (60357)
40354  /  742320   =>  JZA 42320
40355  /  030102   =>  030102
40356  /  267500   =>  SUB 47500
40357  /  330414   =>  IOR I 40414 (42241)
40360  /  070413   =>  JSR I 40413 (20003)
40361  /  000000   =>  0
40362  /  000000   =>  0
40363  /  000000   =>  0
40364  /  000000   =>  0
40365  /  070411   =>  JSR I 40411 (60357)
40366  /  404023   =>  STA Z 4023
40367  /  070301   =>  JSR I 40301 (404023)
40370  /  022675   =>  022675
40371  /  004040   =>  LDL 4040
40372  /  330415   =>  IOR I 40415 (42236)
40373  /  070413   =>  JSR I 40413 (20003)
40374  /  070411   =>  JSR I 40411 (60357)
40375  /  404023   =>  STA Z 4023
40376  /  152405   =>  AND I Z 2405 (304100)
40377  /  152075   =>  AND I Z 2075 (21010)
40400  /  004040   =>  LDL 4040
40401  /  330416   =>  IOR I 40416 (42240)
40402  /  070413   =>  JSR I 40413 (20003)
40403  /  020010   =>  CLA
40404  /  130352   =>  JMP I 40352 (0000)
40405  /  000000   =>  0
40406  /  000000   =>  0
40407  /  000000   =>  0
40410  /  000000   =>  0
40411  /  060357   =>  JSR 40357
40412  /  044033   =>  JSR Z 4033
40413  /  020003   =>  020003
40414  /  042241   =>  JSR Z 2241
40415  /  042236   =>  JSR Z 2236
40416  /  042240   =>  JSR Z 2240
40417  /  040420   =>  JSR Z 0420
40420  /  001440   =>  LDL 1440
40421  /  000454   =>  LDL 0454
40422  /  000536   =>  LDL 0536
40423  /  000454   =>  LDL 0454
40424  /  777634   =>  LDL -0144
40425  /  777716   =>  LDL -0062
40426  /  040427   =>  JSR Z 0427
40427  /  001440   =>  LDL 1440
40430  /  000620   =>  LDL 0620
40431  /  777406   =>  LDL -0372
40432  /  777406   =>  LDL -0372
```

```
40433  /  777634   =>   LDL -0144
40434  /  777716   =>   LDL -0062
40435  /  040436   =>   JSR Z 0436
40436  /  002114   =>   LDL 2114
40437  /  000226   =>   LDL 0226
40440  /  777634   =>   LDL -0144
40441  /  777634   =>   LDL -0144
40442  /  777634   =>   LDL -0144
40443  /  777766   =>   LDL -0012
40444  /  040445   =>   JSR Z 0445
40445  /  000764   =>   LDL 0764
40446  /  777014   =>   LDL -0764
40447  /  777470   =>   LDL -0310
40450  /  000454   =>   LDL 0454
40451  /  000000   =>   0
40452  /  000000   =>   0
40453  /  040454   =>   JSR Z 0454
40454  /  000764   =>   LDL 0764
40455  /  777014   =>   LDL -0764
40456  /  777470   =>   LDL -0310
40457  /  000454   =>   LDL 0454
40460  /  000000   =>   0
40461  /  000000   =>   0
40462  /  040463   =>   JSR Z 0463
40463  /  002032   =>   LDL 2032
40464  /  000226   =>   LDL 0226
40465  /  777634   =>   LDL -0144
40466  /  776504   =>   LDL -1274
40467  /  000000        0
40470  /  000000   =>   0
40471  /  040472   =>   JSR Z 0472
40472  /  002032   =>   LDL 2032
40473  /  000226        LDL 0226
40474  /  777634   =>   LDL -0144
40475  /  776504   =>   LDL -1274
40476  /  000000   =>   0
40477  /  000000   =>   0
40500  /  000000   =>   0
40501  /  460667   =>   SCA 40667
40502  /  330667   =>   IOR I 40667 (0000)
40503  /  620667   =>   ISZ 40667
40504  /  460702   =>   SCA 40702
40505  /  330667   =>   IOR I 40667 (0000)
40506  /  620667   =>   ISZ 40667
40507  /  460704   =>   SCA 40704
40510  /  000000   =>   0
40511  /  000000   =>   0
40512  /  000000   =>   0
40513  /  000000   =>   0
40514  /  330667   =>   IOR I 40667 (0000)
40515  /  620667   =>   ISZ 40667
40516  /  460701   =>   SCA 40701
40517  /  330667   =>   IOR I 40667 (0000)
40520  /  620667   =>   ISZ 40667
40521  /  460703   =>   SCA 40703
40522  /  000000   =>   0
40523  /  000000   =>   0
40524  /  000000   =>   0
40525  /  000000   =>   0
40526  /  330667   =>   IOR I 40667 (0000)
40527  /  620667   =>   ISZ 40667
40530  /  460705   =>   SCA 40705
40531  /  330667   =>   IOR I 40667 (0000)
40532  /  620667   =>   ISZ 40667
40533  /  460706   =>   SCA 40706
```

```
40534  /  000000  =>  0
40535  /  000000  =>  0
40536  /  000000  =>  0
40537  /  000000  =>  0
40540  /  460700  =>  SCA 40700
40541  /  460676  =>  SCA 40676
40542  /  460677  =>  SCA 40677
40543  /  000000  =>  0
40544  /  000000  =>  0
40545  /  000000  =>  0
40546  /  000000  =>  0
40547  /  330674  =>  IOR I 40674 (41251)
40550  /  460670  =>  SCA 40670
40551  /  330675  =>  IOR I 40675 (41260)
40552  /  460671  =>  SCA 40671
40553  /  000000  =>  0
40554  /  000000  =>  0
40555  /  000000  =>  0
40556  /  000000  =>  0
40557  /  320704  =>  IOR 40704
40560  /  026010  =>  SPA CLA
40561  /  000001  =>  LDL 0001
40562  /  460707  =>  SCA 40707
40563  /  000000  =>  0
40564  /  000000  =>  0
40565  /  000000  =>  0
40566  /  000000  =>  0
40567  /  020010  =>  CLA
40570  /  320670  =>  IOR 40670
40571  /  260702  =>  SUB 40702
40572  /  260676  =>  SUB 40676
40573  /  420672  =>  STA 40672
40574  /  260701  =>  SUB 40701
40575  /  026010  =>  SPA CLA
40576  /  120655  =>  JMP 40655
40577  /  000000  =>  0
40600  /  000000  =>  0
40601  /  000000  =>  0
40602  /  000000  =>  0
40603  /  020010  =>  CLA
40604  /  320671  =>  IOR 40671
40605  /  260704  =>  SUB 40704
40606  /  260677  =>  SUB 40677
40607  /  420673  =>  STA 40673
40610  /  260703  =>  SUB 40703
40611  /  520707  =>  SZW 40707
40612  /  020006  =>  NAC
40613  /  026010  =>  SPA CLA
40614  /  120655  =>  JMP 40655
40615  /  000000  =>  0
40616  /  000000  =>  0
40617  /  000000  =>  0
40620  /  000000  =>  0
40621  /  000001  =>  LDL 0001
40622  /  220700  =>  ADD 40700
40623  /  460700  =>  SCA 40700
40624  /  000000  =>  0
40625  /  000000  =>  0
40626  /  320705  =>  IOR 40705
40627  /  220676  =>  ADD 40676
40630  /  460676  =>  SCA 40676
40631  /  000000  =>  0
40632  /  000000  =>  0
40633  /  320706  =>  IOR 40706
40634  /  220677  =>  ADD 40677
```

| | | | |
|---|---|---|---|
| 40635 | / | 460677 | ⇒ SCA 40677 |
| 40636 | / | 000000 | ⇒ 0 |
| 40637 | / | 000000 | ⇒ 0 |
| 40640 | / | 320672 | ⇒ IOR 40672 |
| 40641 | / | 460670 | ⇒ SCA 40670 |
| 40642 | / | 000000 | ⇒ 0 |
| 40643 | / | 000000 | ⇒ 0 |
| 40644 | / | 320673 | ⇒ IOR 40673 |
| 40645 | / | 460671 | ⇒ SCA 40671 |
| 40646 | / | 000000 | ⇒ 0 |
| 40647 | / | 000000 | ⇒ 0 |
| 40650 | / | 120567 | ⇒ JMP 40567 |
| 40651 | / | 000000 | ⇒ 0 |
| 40652 | / | 000000 | ⇒ 0 |
| 40653 | / | 000000 | ⇒ 0 |
| 40654 | / | 000000 | ⇒ 0 |
| 40655 | / | 320670 | ⇒ IOR 40670 |
| 40656 | / | 470674 | ⇒ SCA I 40674 (41251) |
| 40657 | / | 320671 | ⇒ IOR 40671 |
| 40660 | / | 470675 | ⇒ SCA I 40675 (41260) |
| 40661 | / | 320700 | ⇒ IOR 40700 |
| 40662 | / | 130500 | ⇒ JMP I 40500 (0000) |
| 40663 | / | 000000 | ⇒ 0 |
| 40664 | / | 000000 | ⇒ 0 |
| 40665 | / | 000000 | 0 |
| 40666 | / | 000000 | ⇒ 0 |
| 40667 | / | 000000 | ⇒ 0 |
| 40670 | / | 000000 | ⇒ 0 |
| 40671 | / | 000000 | 0 |
| 40672 | / | 000000 | ⇒ 0 |
| 40673 | / | 000000 | ⇒ 0 |
| 40674 | / | 041251 | ⇒ JSR Z 1251 |
| 40675 | / | 041260 | ⇒ JSR Z 1260 |
| 40676 | / | 000000 | ⇒ 0 |
| 40677 | / | 000000 | ⇒ 0 |
| 40700 | / | 000000 | ⇒ 0 |
| 40701 | / | 000000 | ⇒ 0 |
| 40702 | / | 000000 | ⇒ 0 |
| 40703 | / | 000000 | ⇒ 0 |
| 40704 | / | 000000 | ⇒ 0 |
| 40705 | / | 000000 | ⇒ 0 |
| 40706 | / | 000000 | ⇒ 0 |
| 40707 | / | 000000 | ⇒ 0 |
| 40710 | / | 000000 | ⇒ 0 |
| 40711 | / | 020010 | ⇒ CLA |
| 40712 | / | 461261 | ⇒ SCA 41261 |
| 40713 | / | 461257 | ⇒ SCA 41257 |
| 40714 | / | 461256 | ⇒ SCA 41256 |
| 40715 | / | 461253 | ⇒ SCA 41253 |
| 40716 | / | 461255 | ⇒ SCA 41255 |
| 40717 | / | 000000 | ⇒ 0 |
| 40720 | / | 000000 | ⇒ 0 |
| 40721 | / | 000000 | ⇒ 0 |
| 40722 | / | 000000 | ⇒ 0 |
| 40723 | / | 331233 | ⇒ IOR I 41233 (43635) |
| 40724 | / | 461251 | ⇒ SCA 41251 |
| 40725 | / | 331232 | ⇒ IOR I 41232 (43646) |
| 40726 | / | 421260 | ⇒ STA 41260 |
| 40727 | / | 036340 | ⇒ CLL SHL 3 |
| 40730 | / | 271233 | ⇒ SUB I 41233 (43635) |
| 40731 | / | 022010 | ⇒ SMA CLA |
| 40732 | / | 121103 | ⇒ JMP 41103 |
| 40733 | / | 531234 | ⇒ SZW I 41234 (43631) |
| 40734 | / | 331235 | ⇒ IOR I 41235 (40462) |
| 40735 | / | 571234 | ⇒ SNW I 41234 (43631) |

```
40736  /  331236   => IOR I 41236 (40471)
40737  /  421250   => STA 41250
40740  /  071244   => JSR I 41244 (40500)
40741  /  461261   => SCA 41261
40742  /  000000   => 0
40743  /  000000   => 0
40744  /  000000   => 0
40745  /  000000   => 0
40746  /  321251   => IOR 41251
40747  /  261230   => SUB 41230
40750  /  026010   => SPA CLA
40751  /  121021   => JMP 41021
40752  /  531234   => SZW I 41234 (43631)
40753  /  331237   => IOR I 41237 (40444)
40754  /  571234   => SNW I 41234 (43631)
40755  /  331240   => IOR I 41240 (40453)
40756  /  421247   => STA 41247
40757  /  071244   => JSR I 41244 (40500)
40760  /  461256   => SCA 41256
40761  /  321251   => IOR 41251
40762  /  261230   => SUB 41230
40763  /  026010   => SPA CLA
40764  /  121021   => JMP 41021
40765  /  321250   => IOR 41250
40766  /  071244   => JSR I 41244 (40500)
40767  /  025000   => SNA
40770  /  121215   => JMP 41215
40771  /  221261   => ADD 41261
40772  /  461261   => SCA 41261
40773  /  000000   => 0
40774  /  000000   => 0
40775  /  000000   => 0
40776  /  000000   => 0
40777  /  321260   => IOR 41260
41000  /  022010   => SMA CLA
41001  /  121006   => JMP 41006
41002  /  321251   => IOR 41251
41003  /  261230   => SUB 41230
41004  /  026010   => SPA CLA
41005  /  121021   => JMP 41021
41006  /  321247   => IOR 41247
41007  /  071244   => JSR I 41244 (40500)
41010  /  025000   => SNA
41011  /  121215   => JMP 41215
41012  /  221256   => ADD 41256
41013  /  461256   => SCA 41256
41014  /  120761   => JMP 40761
41015  /  000000   => 0
41016  /  000000   => 0
41017  /  000000   => 0
41020  /  000000   => 0
41021  /  321260   => IOR 41260
41022  /  020006   => NAC
41023  /  026000   => SPA
41024  /  020010   => CLA
41025  /  461254   => SCA 41254
41026  /  000000   => 0
41027  /  000000   => 0
41030  /  000000   => 0
41031  /  000000   => 0
41032  /  531234   => SZW I 41234 (43631)
41033  /  000404   => LDL 0404
41034  /  571234   => SNW I 41234 (43631)
41035  /  000310   => LDL 0310
41036  /  421252   => STA 41252
```

```
41037  /  034240   -> CLL SHR 2
41040  /  221254   -> ADD 41254
41041  /  071245   -> JSR I 41245 (43715)
41042  /  041252   -> JSR Z 1252
41043  /  025000   -> SNA
41044  /  061204   -> JSR 41204
41045  /  421253   -> STA 41253
41046  /  261231   -> SUB 41231
41047  /  026010   -> SPA CLA
41050  /  121057   -> JMP 41057
41051  /  000007   -> LDL 0007
41052  /  461253   -> SCA 41253
41053  /  000000   -> 0
41054  /  000000   -> 0
41055  /  000000   -> 0
41056  /  000000   -> 0
41057  /  321252   -> IOR 41252
41060  /  071246   -> JSR I 41246 (43670)
41061  /  041253   -> JSR Z 1253
41062  /  221260   -> ADD 41260
41063  /  461260      SCA 41260
41064  /  000036   -> LDL 0036
41065  /  071246   -> JSR I 41246 (43670)
41066  /  041253   -> JSR Z 1253
41067  /  020006      NAC
41070  /  221251   -> ADD 41251
41071  /  461251   -> SCA 41251
41072  /  000000   -> 0
41073  /  000000   -> 0
41074  /  000000   -> 0
41075  /  000000   -> 0
41076  /  121172   -> JMP 41172
41077  /  000000   -> 0
41100  /  000000   -> 0
41101  /  000000   -> 0
41102  /  000000   -> 0
41103  /  020010   -> CLA
41104  /  331241   -> IOR I 41241 (40417)
41105  /  071244   -> JSR I 41244 (40500)
41106  /  221257   -> ADD 41257
41107  /  461257   -> SCA 41257
41110  /  331243   -> IOR I 41243 (40435)
41111  /  071244   -> JSR I 41244 (40500)
41112  /  221261   -> ADD 41261
41113  /  461261   -> SCA 41261
41114  /  000000   -> 0
41115  /  000000   -> 0
41116  /  000000   -> 0
41117  /  000000   -> 0
41120  /  331242   -> IOR I 41242 (40426)
41121  /  071244   -> JSR I 41244 (40500)
41122  /  221257   -> ADD 41257
41123  /  461257   -> SCA 41257
41124  /  000000   -> 0
41125  /  000000   -> 0
41126  /  000000   -> 0
41127  /  000000   -> 0
41130  /  321251   -> IOR 41251
41131  /  261230   -> SUB 41230
41132  /  026010   -> SPA CLA
41133  /  121172   -> JMP 41172
41134  /  777470   -> LDL -0310
41135  /  221260   -> ADD 41260
41136  /  026010   -> SPA CLA
41137  /  121172   -> JMP 41172
```

```
41140  /  000000  -> 0
41141  /  000000  -> 0
41142  /  000000  -> 0
41143  /  000000  -> 0
41144  /  024000  -> SKP
41145  /  621255  -> ISZ 41255
41146  /  000001  -> LDL 0001
41147  /  221257  -> ADD 41257
41150  /  461257  -> SCA 41257
41151  /  321260  -> IOR 41260
41152  /  261165  -> SUB 41165
41153  /  461260  -> SCA 41260
41154  /  321251  -> IOR 41251
41155  /  261164  -> SUB 41164
41156  /  461251  -> SCA 41251
41157  /  121172  -> JMP 41172
41160  /  000000  -> 0
41161  /  000000  -> 0
41162  /  000000  -> 0
41163  /  000000  -> 0
41164  /  001130  -> LDL 1130
41165  /  000620  -> LDL 0620
41166  /  000000  -> 0
41167  /  000000  -> 0
41170  /  000000  -> 0
41171  /  000000  -> 0
41172  /  020010  -> CLA
41173  /  321253  -> IOR 41253
41174  /  221261  -> ADD 41261
41175  /  221257  -> ADD 41257
41176  /  221256  -> ADD 41256
41177  /  130710  -> JMP I 40710 (0000)
41200  /  000000  -> 0
41201  /  000000  -> 0
41202  /  000000  -> 0
41203  /  000000  -> 0
41204  /  000000  -> 0
41205  /  321252  -> IOR 41252
41206  /  034140  -> CLL SHR 1
41207  /  261254  -> SUB 41254
41210  /  026010  -> SPA CLA
41211  /  000001  -> LDL 0001
41212  /  131204  -> JMP I 41204 (0000)
41213  /  000454  -> LDL 0454
41214  /  000454  -> LDL 0454
41215  /  621255  -> ISZ 41255
41216  /  000001  -> LDL 0001
41217  /  221256  -> ADD 41256
41220  /  461256  -> SCA 41256
41221  /  321260  -> IOR 41260
41222  /  261214  -> SUB 41214
41223  /  461260  -> SCA 41260
41224  /  321251  -> IOR 41251
41225  /  261213  -> SUB 41213
41226  /  461251  -> SCA 41251
41227  /  121172  -> JMP 41172
41230  /  000454  -> LDL 0454
41231  /  000006  -> LDL 0006
41232  /  043646  -> JSR Z 3646
41233  /  043635  -> JSR Z 3635
41234  /  043631  -> JSR Z 3631
41235  /  040462  -> JSR Z 0462
41236  /  040471  -> JSR Z 0471
41237  /  040444  -> JSR Z 0444
41240  /  040453  -> JSR Z 0453
```

```
41241  /  040417  ->  JSR Z 0417
41242  /  040426  ->  JSR Z 0426
41243  /  040435  ->  JSR Z 0435
41244  /  040500  ->  JSR Z 0500
41245  /  043715  ->  JSR Z 3715
41246  /  043670  ->  JSR Z 3670
41247  /  000000  ->  0
41250  /  000000  ->  0
41251  /  000000  ->  0
41252  /  000000  ->  0
41253  /  000000  ->  0
41254  /  000000  ->  0
41255  /  000000  ->  0
41256  /  000000  ->  0
41257  /  000000  ->  0
41260  /  000000  ->  0
41261  /  000000  ->  0
41262  /  000000  ->  0
41263  /  020010  ->  CLA
41264  /  461337  ->  SCA 41337
41265  /  331262      IOR I 41262 (0000)
41266  /  012000  ->  AIL
41267  /  621262  ->  ISZ 41262
41270  /  421324  ->  STA 41324
41271  /  026000  ->  SPA
41272  /  020006  ->  NAC
41273  /  461326  ->  SCA 41326
41274  /  331262  ->  IOR I 41262 (0000)
41275  /  012000  ->  AIL
41276  /  621262  ->  ISZ 41262
41277  /  421325  ->  STA 41325
41300  /  026000  ->  SPA
41301  /  020006  ->  NAC
41302  /  036140  ->  CLL SHL 1
41303  /  221326  ->  ADD 41326
41304  /  071333  ->  JSR I 41333 (43670)
41305  /  041330  ->  JSR Z 1330
41306  /  421326  ->  STA 41326
41307  /  071334  ->  JSR I 41334 (43715)
41310  /  041331  ->  JSR Z 1331
41311  /  461335  ->  SCA 41335
41312  /  321326  ->  IOR 41326
41313  /  071334  ->  JSR I 41334 (43715)
41314  /  041332  ->  JSR Z 1332
41315  /  461336  ->  SCA 41336
41316  /  321335  ->  IOR 41335
41317  /  261327  ->  SUB 41327
41320  /  026010  ->  SPA CLA
41321  /  000001  ->  LDL 0001
41322  /  461337  ->  SCA 41337
41323  /  131262  ->  JMP I 41262 (0000)
41324  /  000000  ->  0
41325  /  000000  ->  0
41326  /  000000  ->  0
41327  /  000002  ->  LDL 0002
41330  /  000012  ->  LDL 0012
41331  /  000074  ->  LDL 0074
41332  /  000536  ->  LDL 0536
41333  /  043670  ->  JSR Z 3670
41334  /  043715  ->  JSR Z 3715
41335  /  000000  ->  0
41336  /  000000  ->  0
41337  /  000000  ->  0
41340  /  000000  ->  0
```

```
41341  /  020010  ->  CLA
41342  /  462227  ->  SCA 42227
41343  /  462230  ->  SCA 42230
41344  /  462234  ->  SCA 42234
41345  /  462233  ->  SCA 42233
41346  /  462235  ->  SCA 42235
41347  /  462221  ->  SCA 42221
41350  /  462222  ->  SCA 42222
41351  /  462252  ->  SCA 42252
41352  /  462240  ->  SCA 42240
41353  /  462250  ->  SCA 42250
41354  /  462245  ->  SCA 42245
41355  /  462242  ->  SCA 42242
41356  /  462246  ->  SCA 42246
41357  /  462243  ->  SCA 42243
41360  /  462241  ->  SCA 42241
41361  /  462236  ->  SCA 42236
41362  /  462237  ->  SCA 42237
41363  /  462231  ->  SCA 42231
41364  /  462232  ->  SCA 42232
41365  /  461743  ->  SCA 41743
41366  /  332177  ->  IOR I 42177 (51673)
41367  /  272200  ->  SUB I 42200 (51671)
41370  /  026010  ->  SPA CLA
41371  /  000001  ->  LDL 0001
41372  /  462223  ->  SCA 42223
41373  /  562223  ->  SNW 42223
41374  /  332200  ->  IOR I 42200 (51671)
41375  /  522223  ->  SZW 42223
41376  /  332177  ->  IOR I 42177 (51673)
41377  /  472177  ->  SCA I 42177 (51673)
41400  /  562223  ->  SNW 42223
41401  /  332204  ->  IOR I 42204 (51675)
41402  /  522223  ->  SZW 42223
41403  /  332203  ->  IOR I 42203 (51677)
41404  /  472203  ->  SCA I 42203 (51677)
41405  /  000000  ->  0
41406  /  000000  ->  0
41407  /  572213  ->  SNW I 42213 (55410)
41410  /  122145  ->  JMP 42145
41411  /  332216  ->  IOR I 42216 (51544)
41412  /  261745  ->  SUB 41745
41413  /  022010  ->  SMA CLA
41414  /  000001  ->  LDL 0001
41415  /  462234  ->  SCA 42234
41416  /  572214  ->  SNW I 42214 (55406)
41417  /  122145  ->  JMP 42145
41420  /  332217  ->  IOR I 42217 (51545)
41421  /  261745  ->  SUB 41745
41422  /  022010  ->  SMA CLA
41423  /  000001  ->  LDL 0001
41424  /  462233  ->  SCA 42233
41425  /  332215  ->  IOR I 42215 (51543)
41426  /  261745  ->  SUB 41745
41427  /  022010  ->  SMA CLA
41430  /  000001  ->  LDL 0001
41431  /  462235  ->  SCA 42235
41432  /  000000  ->  0
41433  /  000000  ->  0
41434  /  332216  ->  IOR I 42216 (51544)
41435  /  261746  ->  SUB 41746
41436  /  022010  ->  SMA CLA
41437  /  000001  ->  LDL 0001
41440  /  562235  ->  SNW 42235
41441  /  462235  ->  SCA 42235
```

```
41442  /  020010  ->  CLA
41443  /  332217  ->  IOR I 42217 (51545)
41444  /  261746  ->  SUB 41746
41445  /  022010  ->  SMA CLA
41446  /  000001  ->  LDL 0001
41447  /  562235  ->  SNW 42235
41450  /  462235  ->  SCA 42235
41451  /  020010  ->  CLA
41452  /  000000  ->  0
41453  /  000000  ->  0
41454  /  000000  ->  0
41455  /  000000  ->  0
41456  /  522234  ->  SZW 42234
41457  /  121470      JMP 41470
41460  /  622227  ->  ISZ 42227
41461  /  522233  ->  SZW 42233
41462  /  121476  ->  JMP 41476
41463  /  332176      IOR I 42176 (51670)
41464  /  272175  ->  SUB I 42175 (51672)
41465  /  026010  ->  SPA CLA
41466  /  622227  ->  ISZ 42227
41467  /  121476  ->  JMP 41476
41470  /  522233  ->  SZW 42233
41471  /  121476  ->  JMP 41476
41472  /  622227  ->  ISZ 42227
41473  /  622227  ->  ISZ 42227
41474  /  000000  ->  0
41475  /  000000  ->  0
41476  /  522235  ->  SZW 42235
41477  /  121520  ->  JMP 41520
41500  /  622230  ->  ISZ 42230
41501  /  562227  ->  SNW 42227
41502  /  121525  ->  JMP 41525
41503  /  322227  ->  IOR 42227
41504  /  262172  ->  SUB 42172
41505  /  462253  ->  SCA 42253
41506  /  522253  ->  SZW 42253
41507  /  332176  ->  IOR I 42176 (51670)
41510  /  562253  ->  SNW 42253
41511  /  332175  ->  IOR I 42175 (51672)
41512  /  272177  ->  SUB I 42177 (51673)
41513  /  026010  ->  SPA CLA
41514  /  622230  ->  ISZ 42230
41515  /  121525  ->  JMP 41525
41516  /  000000  ->  0
41517  /  000000  ->  0
41520  /  522227  ->  SZW 42227
41521  /  000002  ->  LDL 0002
41522  /  462230  ->  SCA 42230
41523  /  000000  ->  0
41524  /  000000  ->  0
41525  /  020010  ->  CLA
41526  /  322230  ->  IOR 42230
41527  /  025000  ->  SNA
41530  /  122144  ->  JMP 42144
41531  /  262172  ->  SUB 42172
41532  /  021010  ->  SZA CLA
41533  /  121540  ->  JMP 41540
41534  /  332177  ->  IOR I 42177 (51673)
41535  /  121551  ->  JMP 41551
41536  /  000000  ->  0
41537  /  000000  ->  0
41540  /  322227  ->  IOR 42227
41541  /  262172  ->  SUB 42172
41542  /  021010  ->  SZA CLA
```

```
41543  /  121550   =>   JMP 41550
41544  /  332175   =>   IOR I 42175 (51672)
41545  /  121551   =>   JMP 41551
41546  /  000000   =>   0
41547  /  000000   =>   0
41550  /  332176   =>   IOR I 42176 (51670)
41551  /  422221   =>   STA 42221
41552  /  261744   =>   SUB 41744
41553  /  022010   =>   SMA CLA
41554  /  000001   =>   LDL 0001
41555  /  462231   =>   SCA 42231
41556  /  522231   =>   SZW 42231
41557  /  122144   =>   JMP 42144
41560  /  322221   =>   IOR 42221
41561  /  221747   =>   ADD 41747
41562  /  462222   =>   SCA 42222
41563  /  000000   =>   0
41564  /  000000   =>   0
41565  /  332203   =>   IOR I 42203 (51677)
41566  /  026000   =>   SPA
41567  /  121572   =>   JMP 41572
41570  /  621743   =>   ISZ 41743
41571  /  024000   =>   SKP
41572  /  020006   =>   NAC
41573  /  072211   =>   JSR I 42211 (43670)
41574  /  042155   =>   JSR Z 2155
41575  /  072212   =>   JSR I 42212 (43715)
41576  /  042173   =>   JSR Z 2173
41577  /  561743   =>   SNW 41743
41600  /  020006   =>   NAC
41601  /  462252   =>   SCA 42252
41602  /  322230   =>   IOR 42230
41603  /  262172   =>   SUB 42172
41604  /  021010   =>   SZA CLA
41605  /  121644   =>   JMP 41644
41606  /  322252   =>   IOR 42252
41607  /  422240   =>   STA 42240
41610  /  272201   =>   SUB I 42201 (51676)
41611  /  022010   =>   SMA CLA
41612  /  121625   =>   JMP 41625
41613  /  522234   =>   SZW 42234
41614  /  121625   =>   JMP 41625
41615  /  332175   =>   IOR I 42175 (51672)
41616  /  262222   =>   SUB 42222
41617  /  022010   =>   SMA CLA
41620  /  121625   =>   JMP 41625
41621  /  000000   =>   0
41622  /  000000   =>   0
41623  /  332201   =>   IOR I 42201 (51676)
41624  /  462240   =>   SCA 42240
41625  /  322240   =>   IOR 42240
41626  /  272202   =>   SUB I 42202 (51674)
41627  /  022010   =>   SMA CLA
41630  /  121762   =>   JMP 41762
41631  /  522233   =>   SZW 42233
41632  /  121762   =>   JMP 41762
41633  /  332176   =>   IOR I 42176 (51670)
41634  /  262222   =>   SUB 42222
41635  /  022010   =>   SMA CLA
41636  /  121762   =>   JMP 41762
41637  /  332202   =>   IOR I 42202 (51674)
41640  /  462240   =>   SCA 42240
41641  /  121762   =>   JMP 41762
41642  /  000000   =>   0
41643  /  000000   =>   0
```

```
41644  /  332201   =>   IOR I 42201 (51676)
41645  /  462240   =>   SCA 42240
41646  /  322227   =>   IOR 42227
41647  /  262172   =>   SUB 42172
41650  /  021010   =>   SZA CLA
41651  /  121705   =>   JMP 41705
41652  /  322240   =>   IOR 42240
41653  /  272202   =>   SUB I 42202 (51674)
41654  /  022010   =>   SMA CLA
41655  /  121666   =>   JMP 41666
41656  /  522233   =>   SZW 42233
41657  /  121666   =>   JMP 41666
41660  /  332176   =>   IOR I 42176 (51670)
41661  /  262222   =>   SUB 42222
41662  /  022010   =>   SMA CLA
41663  /  121666   =>   JMP 41666
41664  /  332202   =>   IOR I 42202 (51674)
41665  /  462240   =>   SCA 42240
41666  /  322240   =>   IOR 42240
41667  /  262252   =>   SUB 42252
41670  /  022010   =>   SMA CLA
41671  /  121762   =>   JMP 41762
41672  /  522235   =>   SZW 42235
41673  /  121762   =>   JMP 41762
41674  /  332177   =>   IOR I 42177 (51673)
41675  /  262222   =>   SUB 42222
41676  /  022010   =>   SMA CLA
41677  /  121762   =>   JMP 41762
41700  /  322252   =>   IOR 42252
41701  /  462240   =>   SCA 42240
41702  /  121762   =>   JMP 41762
41703  /  000000   =>   0
41704  /  000000   =>   0
41705  /  332202   =>   IOR I 42202 (51674)
41706  /  422240   =>   STA 42240
41707  /  272201   =>   SUB I 42201 (51676)
41710  /  022010   =>   SMA CLA
41711  /  121722   =>   JMP 41722
41712  /  522234   =>   SZW 42234
41713  /  121722   =>   JMP 41722
41714  /  332175   =>   IOR I 42175 (51672)
41715  /  262222   =>   SUB 42222
41716  /  022010   =>   SMA CLA
41717  /  121722   =>   JMP 41722
41720  /  332201   =>   IOR I 42201 (51676)
41721  /  462240   =>   SCA 42240
41722  /  322240   =>   IOR 42240
41723  /  262252   =>   SUB 42252
41724  /  022010   =>   SMA CLA
41725  /  121762   =>   JMP 41762
41726  /  522235   =>   SZW 42235
41727  /  121762   =>   JMP 41762
41730  /  332177   =>   IOR I 42177 (51673)
41731  /  262222   =>   SUB 42222
41732  /  022010   =>   SMA CLA
41733  /  121762   =>   JMP 41762
41734  /  322252   =>   IOR 42252
41735  /  462240   =>   SCA 42240
41736  /  121762   =>   JMP 41762
41737  /  000000   =>   0
41740  /  000000   =>   0
41741  /  000000   =>   0
41742  /  000000   =>   0
41743  /  000000   =>   0
41744  /  000702   =>   LDL 0702
```

```
41745  /  000515   =>   LDL 0515
41746  /  003720   =>   LDL 3720
41747  /  000144   =>   LDL 0144
41750  /  000000   =>   0
41751  /  000000   =>   0
41752  /  000000   =>   0
41753  /  000000   =>   0
41754  /  000000   =>   0
41755  /  000000   =>   0
41756  /  000000   =>   0
41757  /  000000   =>   0
41760  /  000000   =>   0
41761  /  000000   =>   0
41762  /  322240   =>   IOR 42240
41763  /  026000   =>   SPA
41764  /  020006   =>   NAC
41765  /  072211   =>   JSR I 42211 (43670)
41766  /  042152   =>   JSR Z 2152
41767  /  072212   =>   JSR I 42212 (43715)
41770  /  042174   =>   JSR Z 2174
41771  /  222153   =>   ADD 42153
41772  /  462237   =>   SCA 42237
41773  /  000000   =>   0
41774  /  000000   =>   0
41775  /  332177   =>   IOR I 42177 (51673)
41776  /  262154   =>   SUB 42154
41777  /  022010   =>   SMA CLA
42000  /  122014   =>   JMP 42014
42001  /  000000   =>   0
42002  /  000000   =>   0
42003  /  322240   =>   IOR 42240
42004  /  262252   =>   SUB 42252
42005  /  026000   =>   SPA
42006  /  020006   =>   NAC
42007  /  262237   =>   SUB 42237
42010  /  022010   =>   SMA CLA
42011  /  122014   =>   JMP 42014
42012  /  322252   =>   IOR 42252
42013  /  122015   =>   JMP 42015
42014  /  322240   =>   IOR 42240
42015  /  462242   =>   SCA 42242
42016  /  332175   =>   IOR I 42175 (51672)
42017  /  262154   =>   SUB 42154
42020  /  022010   =>   SMA CLA
42021  /  122037   =>   JMP 42037
42022  /  322240   =>   IOR 42240
42023  /  272201   =>   SUB I 42201 (51676)
42024  /  026000   =>   SPA
42025  /  020006   =>   NAC
42026  /  262237   =>   SUB 42237
42027  /  022010   =>   SMA CLA
42030  /  122037   =>   JMP 42037
42031  /  332201   =>   IOR I 42201 (51676)
42032  /  462246   =>   SCA 42246
42033  /  000001   =>   LDL 0001
42034  /  462250   =>   SCA 42250
42035  /  000000   =>   0
42036  /  000000   =>   0
42037  /  332176   =>   IOR I 42176 (51670)
42040  /  262154   =>   SUB 42154
42041  /  022010   =>   SMA CLA
42042  /  122063   =>   JMP 42063
42043  /  322240   =>   IOR 42240
42044  /  272202   =>   SUB I 42202 (51674)
42045  /  026000   =>   SPA
```

```
42046  /  020006  =>  NAC
42047  /  262237  =>  SUB 42237
42050  /  022010  =>  SMA CLA
42051  /  122063  =>  JMP 42063
42052  /  332202  =>  IOR I 42202 (51674)
42053  /  422243  =>  STA 42243
42054  /  562250  =>  SNW 42250
42055  /  462246  =>  SCA 42246
42056  /  000001  =>  LDL 0001
42057  /  462245  =>  SCA 42245
42060  /  122071  =>  JMP 42071
42061  /  000000  =>  0
42062  /  000000  =>  0
42063  /  522250  =>  SZW 42250
42064  /  322246  =>  IOR 42246
42065  /  562250  =>  SNW 42250
42066  /  322242  =>  IOR 42242
42067  /  422243  =>  STA 42243
42070  /  462246  =>  SCA 42246
42071  /  322242  =>  IOR 42242
42072  /  026000  =>  SPA
42073  /  020006  =>  NAC
42074  /  072211  =>  JSR I 42211 (43670)
42075  /  042173  =>  JSR Z 2173
42076  /  072212  =>  JSR I 42212 (43715)
42077  /  042155  =>  JSR Z 2155
42100  /  020006  =>  NAC
42101  /  462241  =>  SCA 42241
42102  /  000000  =>  0
42103  /  000000  =>  0
42104  /  322246  =>  IOR 42246
42105  /  222243  =>  ADD 42243
42106  /  032140  =>  CLL RTL 1
42107  /  034200  =>  SHR 2
42110  /  462236  =>  SCA 42236
42111  /  000000  =>  0
42112  /  000000  =>  0
42113  /  332203  =>  IOR I 42203 (51677)
42114  /  262241  =>  SUB 42241
42115  /  462251  =>  SCA 42251
42116  /  332201  =>  IOR I 42201 (51676)
42117  /  262246  =>  SUB 42246
42120  /  462247  =>  SCA 42247
42121  /  332202  =>  IOR I 42202 (51674)
42122  /  262243  =>  SUB 42243
42123  /  462244  =>  SCA 42244
42124  /  000000  =>  0
42125  /  000000  =>  0
42126  /  332177  =>  IOR I 42177 (51673)
42127  /  262221  =>  SUB 42221
42130  /  462226  =>  SCA 42226
42131  /  332175  =>  IOR I 42175 (51672)
42132  /  262221  =>  SUB 42221
42133  /  462225  =>  SCA 42225
42134  /  332176  =>  IOR I 42176 (51670)
42135  /  262221  =>  SUB 42221
42136  /  462224  =>  SCA 42224
42137  /  000000  =>  0
42140  /  000000  =>  0
42141  /  621340  =>  ISZ 41340
42142  /  621340  =>  ISZ 41340
42143  /  131340  =>  JMP I 41340 (0000)
42144  /  621340  =>  ISZ 41340
42145  /  000001  =>  LDL 0001
42146  /  462232  =>  SCA 42232
```

```
42147   /   122143   ->   JMP 42143
42150   /   000000   ->   0
42151   /   000000   ->   0
42152   /   000015   ->   LDL 0015
42153   /   000050   ->   LDL 0050
42154   /   000536   ->   LDL 0536
42155   /   000027   ->   LDL 0027
42156   /   000000   ->   0
42157   /   000000   ->   0
42160   /   000000   ->   0
42161   /   000000   ->   0
42162   /   000000   ->   0
42163   /   000000   ->   0
42164   /   000000   ->   0
42165   /   000000   ->   0
42166   /   000000   ->   0
42167   /   000000   ->   0
42170   /   000000   ->   0
42171   /   000000   ->   0
42172   /   000001   ->   LDL 0001
42173   /   000012   ->   LDL 0012
42174   /   000144   ->   LDL 0144
42175   /   051672   ->   JSR I Z 1672 (0001)
42176   /   051670   ->   JSR I Z 1670 (641660)
42177   /   051673   ->   JSR I Z 1673 (204104)
42200   /   051671   ->   JSR I Z 1671 (101660)
42201   /   051676   ->   JSR I Z 1676 (454156)
42202   /   051674   ->   JSR I Z 1674 (201374)
42203   /   051677   ->   JSR I Z 1677 (704071)
42204   /   051675   ->   JSR I Z 1675 (444156)
42205   /   055425   ->   JSR I Z 5425 (616000)
42206   /   055423   ->   JSR I Z 5423 (213000)
42207   /   055426   ->   JSR I Z 5426 (10000)
42210   /   055424   ->   JSR I Z 5424 (132302)
42211   /   043670   ->   JSR Z 3670
42212   /   043715   ->   JSR Z 3715
42213   /   055410   ->   JSR I Z 5410 (132202)
42214   /   055406   ->   JSR I Z 5406 (41431)
42215   /   051543   ->   JSR I Z 1543 (303702)
42216   /   051544   ->   JSR I Z 1544 (444156)
42217   /   051545   ->   JSR I Z 1545 (441574)
42220   /   055403   ->   JSR I Z 5403 (41431)
42221   /   000000   ->   0
42222   /   000000   ->   0
42223   /   000000   ->   0
42224   /   000000   ->   0
42225   /   000000   ->   0
42226   /   000000   ->   0
42227   /   000000   ->   0
42230   /   000000   ->   0
42231   /   000000   ->   0
42232   /   000000   ->   0
42233   /   000000   ->   0
42234   /   000000   ->   0
42235   /   000000   ->   0
42236   /   000000   ->   0
42237   /   000000   ->   0
42240   /   000000   ->   0
42241   /   000000   ->   0
42242   /   000000   ->   0
42243   /   000000   ->   0
42244   /   000000   ->   0
42245   /   000000   ->   0
42246   /   000000   ->   0
42247   /   000000   ->   0
```

```
42250  /  000000  ->  0
42251  /  000000      0
42252  /  000000  ->  0
42253  /  000000  ->  0
42254  /  000000  ->  0
42255  /  020010      CLA
42256  /  572357  ->  SNW I 42357 (43651)
42257  /  122271  ->  JMP 42271
42260  /  072355  ->  JSR I 42355 (60357)
42261  /  742325  ->  JZA 42325
42262  /  022303  ->  022303
42263  /  221102  ->  ADD 41102
42264  /  052240  ->  JSR I Z 2240 (702463)
42265  /  030122  ->  030122
42266  /  221105  ->  ADD 41105
42267  /  224040  ->  ADD 44040
42270  /  004040  ->  LDL 4040
42271  /  572356  ->  SNW I 42356 (43640)
42272  /  122307  ->  JMP 42307
42273  /  072355  ->  JSR I 42355 (60357)
42274  /  742516  ->  JZA 42516
42275  /  023120  ->  023120
42276  /  012323  ->  012323
42277  /  050440  ->  JSR I Z 0440 (144065)
42300  /  141716  ->  AND Z 1716
42301  /  074014  ->  JSR I 44014 (164022)
42302  /  111605  ->  JMP I Z 1605 (314025)
42303  /  400104  ->  STA Z 0104
42304  /  012024  ->  012024
42305  /  052240  ->  JSR I Z 2240 (702463)
42306  /  400040  ->  STA Z 0040
42307  /  572360  ->  SNW I 42360 (30044)
42310  /  122316  ->  JMP 42316
42311  /  072355  ->  JSR I 42355 (60357)
42312  /  741305  ->  JZA 41305
42313  /  312305  ->  IOR I Z 2305 (102310)
42314  /  244040  ->  SUB Z 4040
42315  /  004040  ->  LDL 4040
42316  /  572362  ->  SNW I 42362 (43643)
42317  /  122331  ->  JMP 42331
42320  /  072355  ->  JSR I 42355 (60357)
42321  /  741720  ->  JZA 41720
42322  /  052201  ->  JSR I Z 2201 (0000)
42323  /  241722  ->  SUB Z 1722
42324  /  401116  ->  STA Z 1116
42325  /  240522  ->  SUB Z 0522
42326  /  030520  ->  STL RTR 5
42327  /  244040  ->  SUB Z 4040
42330  /  004040  ->  LDL 4040
42331  /  572361  ->  SNW I 42361 (43642)
42332  /  122342  ->  JMP 42342
42333  /  072355  ->  JSR I 42355 (60357)
42334  /  741720  ->  JZA 41720
42335  /  051640  ->  JSR I Z 1640 (171426)
42336  /  031122  ->  031122
42337  /  032511  ->  032511
42340  /  244040  ->  SUB Z 4040
42341  /  004040  ->  LDL 4040
42342  /  572363  ->  SNW I 42363 (51400)
42343  /  122354  ->  JMP 42354
42344  /  532362  ->  SZW I 42362 (43643)
42345  /  122354  ->  JMP 42354
42346  /  072355  ->  JSR I 42355 (60357)
42347  /  741617  ->  JZA 41617
```

```
42350  /  400201   => STA Z 0201
42351  /  242405   => SUB Z 2405
42352  /  223140   => ADD 43140
42353  /  400040   => STA Z 0040
42354  /  132254   => JMP I 42254  (0000)
42355  /  060357   => JSR 40357
42356  /  043640   => JSR Z 3640
42357  /  043651   => JSR Z 3651
42360  /  030044   => 030044
42361  /  043642   => JSR Z 3642
42362  /  043643   => JSR Z 3643
42363  /  051400   => JSR I Z 1400  (30004)
42364  /  000000   => 0
42365  /  020010   => CLA
42366  /  072437   => JSR I 42437  (60357)
42367  /  742340   => JZA 42340
42370  /  464007   => SCA 44007
42371  /  402205   => STA Z 2205
42372  /  150111   => AND I Z 0111  (43406)
42373  /  160405   => AND 40405
42374  /  222374   => ADD 42374
42375  /  232407   => ADD I 42407  (72437)
42376  /  750040   => JNA 40040
42377  /  332442   => IOR I 42442  (43647)
42400  /  072441   => JSR I 42441  (20003)
42401  /  072437   => JSR I 42437  (60357)
42402  /  404023   => STA Z 4023
42403  /  220775   => ADD 40775
42404  /  004040   => LDL 4040
42405  /  332443   => IOR I 42443  (43645)
42406  /  072441   => JSR I 42441  (20003)
42407  /  072437   => JSR I 42437  (60357)
42410  /  404023   => STA Z 4023
42411  /  242275   => SUB Z 2275
42412  /  004040   => LDL 4040
42413  /  332444   => IOR I 42444  (43650)
42414  /  072441   => JSR I 42441  (20003)
42415  /  072437   => JSR I 42437  (60357)
42416  /  740724   => JZA 40724
42417  /  077500   => JSR I 47500  (327506)
42420  /  332445   => IOR I 42445  (43636)
42421  /  072441   => JSR I 42441  (20003)
42422  /  072437   => JSR I 42437  (60357)
42423  /  404007   => STA Z 4007
42424  /  220775   => ADD 40775
42425  /  004040   => LDL 4040
42426  /  332446   => IOR I 42446  (43634)
42427  /  072441   => JSR I 42441  (20003)
42430  /  072437   => JSR I 42437  (60357)
42431  /  404007   => STA Z 4007
42432  /  242275   => SUB Z 2275
42433  /  004040   => LDL 4040
42434  /  332447   => IOR I 42447  (43637)
42435  /  072441   => JSR I 42441  (20003)
42436  /  132364   => JMP I 42364  (0000)
42437  /  060357   => JSR 40357
42440  /  044033   => JSR Z 4033
42441  /  020003   => 020003
42442  /  043647   => JSR Z 3647
42443  /  043645   => JSR Z 3645
42444  /  043650   => JSR Z 3650
42445  /  043636   => JSR Z 3636
42446  /  043634   => JSR Z 3634
42447  /  043637   => JSR Z 3637
42450  /  000000   => 0
```

```
42451  /  020010   =>   CLA
42452  /  532546   =>   SZW I 42546 (41337)
42453  /  122527   =>   JMP 42527
42454  /  532545   =>   SZW I 42545 (42231)
42455  /  122525   =>   JMP 42525
42456  /  072541   =>   JSR I 42541 (60357)
42457  /  740301   =>   JZA 40301
42460  /  021405   =>   021405
42461  /  401405   =>   STA Z 1405
42462  /  160724   =>   AND 40724
42463  /  104000   =>   JMP 7 4000
42464  /  332537   =>   IOR I 42537 (41336)
42465  /  025000   =>   SNA
42466  /  122505   =>   JMP 42505
42467  /  072543   =>   JSR I 42543 (43715)
42470  /  042536   =>   JSR Z 2536
42471  /  072544   =>   JSR I 42544 (44033)
42472  /  000002   =>   LDL 0002
42473  /  072541   =>   JSR I 42541 (60357)
42474  /  560000   =>   SNW 40000
42475  /  332537   =>   IOR I 42537 (41336)
42476  /  072544   =>   JSR I 42544 (44033)
42477  /  000001   =>   LDL 0001
42500  /  072541   =>   JSR I 42541 (60357)
42501  /  401511   =>   STA Z 1511
42502  /  140523   =>   AND Z 0523
42503  /  401722   =>   STA Z 1722
42504  /  400040   =>   STA Z 0040
42505  /  332540   =>   IOR I 42540 (41335)
42506  /  072543   =>   JSR I 42543 (43715)
42507  /  042536   =>   JSR Z 2536
42510  /  025000   =>   SNA
42511  /  122516   =>   JMP 42516
42512  /  072544   =>   JSR I 42544 (44033)
42513  /  000003   =>   LDL 0003
42514  /  072541   =>   JSR I 42541 (60357)
42515  /  540000   =>   SNW 7 0000
42516  /  332540   =>   IOR I 42540 (41335)
42517  /  072544   =>   JSR I 42544 (44033)
42520  /  000001   =>   LDL 0001
42521  /  072541   =>   JSR I 42541 (60357)
42522  /  606040   =>   ISZ Z 6040
42523  /  060505   =>   JSR 40505
42524  /  240040   =>   SUB Z 0040
42525  /  020010   =>   CLA
42526  /  132450   =>   JMP I 42450 (0000)
42527  /  020010   =>   CLA
42530  /  072541   =>   JSR I 42541 (60357)
42531  /  741617   =>   JZA 41617
42532  /  400301   =>   STA Z 0301
42533  /  021405   =>   021405
42534  /  004040   =>   LDL 4040
42535  /  122525   =>   JMP 42525
42536  /  000012   =>   LDL 0012
42537  /  041336   =>   JSR Z 1336
42540  /  041335   =>   JSR Z 1335
42541  /  060357   =>   JSR 40357
42542  /  043670   =>   JSR 7 3670
42543  /  043715   =>   JSR Z 3715
42544  /  044033   =>   JSR Z 4033
42545  /  042231   =>   JSR 7 2231
42546  /  041337   =>   JSR Z 1337
42547  /  000000   =>   0
42550  /  000000   =>   0
```

```
42551  /  000000   => 0
42552  /  000000   => 0
42553  /  000000   => 0
42554  /  020010   => CLA
42555  /  463130   => SCA 43130
42556  /  463131   => SCA 43131
42557  /  463127   => SCA 43127
42560  /  463125   => SCA 43125
42561  /  463124   => SCA 43124
42562  /  463126   => SCA 43126
42563  /  000000   => 0
42564  /  000000   => 0
42565  /  000000   => 0
42566  /  000000   => 0
42567  /  332547   => IOR I 42547 (0000)
42570  /  622547   => ISZ 42547
42571  /  463073   => SCA 43073
42572  /  332547   => IOR I 42547 (0000)
42573  /  463124   => SCA 43124
42574  /  333073   => IOR I 43073 (0000)
42575  /  423074   => STA 43074
42576  /  025000   => SNA
42577  /  123013   => JMP 43013
42600  /  163112   => AND 43112
42601  /  423130   => STA 43130
42602  /  025010   => SNA CLA
42603  /  122640   => JMP 42640
42604  /  073115   => JSR I 43115 (60357)
42605  /  740040   => JZA 40040
42606  /  323130   => IOR 43130
42607  /  073116   => JSR I 43116 (44033)
42610  /  000001   => LDL 0001
42611  /  073115   => JSR I 43115 (60357)
42612  /  402324   => STA Z 2324
42613  /  220111   => ADD 40111
42614  /  071024   => JSR I 41024 (20010)
42615  /  401411   => STA Z 1411
42616  /  160540   => AND 40540
42617  /  221116   => ADD 41116
42620  /  070522   => JSR I 40522 (0000)
42621  /  004040   => LDL 4040
42622  /  323130   => IOR 43130
42623  /  263113   => SUB 43113
42624  /  025010   => SNA CLA
42625  /  777715   => LDL -0063
42626  /  223114   => ADD 43114
42627  /  073120   => JSR I 43120 (60103)
42630  /  073115   => JSR I 43115 (60357)
42631  /  404040   => STA Z 4040
42632  /  554000   => SNW I Z 4000 (44002)
42633  /  063034   => JSR 43034
42634  /  000000   => 0
42635  /  000000   => 0
42636  /  000000   => 0
42637  /  000000   => 0
42640  /  020010   => CLA
42641  /  323074   => IOR 43074
42642  /  034340   => CLL SHR 3
42643  /  163112   => AND 43112
42644  /  423131   => STA 43131
42645  /  025010   => SNA CLA
42646  /  122703   => JMP 42703
42647  /  073115   => JSR I 43115 (60357)
```

```
42650  /  740040   ->   JZA 40040
42651  /  323131   ->   IOR 43131
42652  /  073116   ->   JSR I 43116 (44033)
42653  /  000001   ->   LDL 0001
42654  /  073115   ->   JSR I 43115 (60357)
42655  /  406260   ->   STA Z 6260
42656  /  103240   ->   JMP Z 3240
42657  /  221116   ->   ADD 41116
42660  /  070522   ->   JSR I 40522 (0000)
42661  /  004040   ->   LDL 4040
42662  /  323131   ->   IOR 43131
42663  /  263113   ->   SUB 43113
42664  /  025010   ->   SNA CLA
42665  /  777715   ->   LDL -0063
42666  /  223114   ->   ADD 43114
42667  /  073120   ->   JSR I 43120 (60103)
42670  /  073115   ->   JSR I 43115 (60357)
42671  /  404040   ->   STA Z 4040
42672  /  404040   ->   STA Z 4040
42673  /  404040   ->   STA Z 4040
42674  /  404040   ->   STA Z 4040
42675  /  554000   ->   SNW I Z 4000 (44002)
42676  /  063034   ->   JSR 43034
42677  /  000000   ->   0
42700  /  000000   ->   0
42701  /  000000   ->   0
42702  /  000000   ->   0
42703  /  020010   ->   CLA
42704  /  323074   ->   IOR 43074
42705  /  034640   ->   CLL SHR 6
42706  /  163112   ->   AND 43112
42707  /  463127   ->   SCA 43127
42710  /  000000   ->   0
42711  /  000000   ->   0
42712  /  000000   ->   0
42713  /  000000   ->   0
42714  /  020010   ->   CLA
42715  /  323074   ->   IOR 43074
42716  /  035140   ->   CLL SHR 11
42717  /  163112   ->   AND 43112
42720  /  423125   ->   STA 43125
42721  /  223127   ->   ADD 43127
42722  /  263112   ->   SUB 43112
42723  /  022000   ->   SMA
42724  /  020010   ->   CLA
42725  /  223112   ->   ADD 43112
42726  /  423126   ->   STA 43126
42727  /  025010   ->   SNA CLA
42730  /  122765   ->   JMP 42765
42731  /  073115   ->   JSR I 43115 (60357)
42732  /  740040   ->   JZA 40040
42733  /  323126   ->   IOR 43126
42734  /  073116   ->   JSR I 43116 (44033)
42735  /  000001   ->   LDL 0001
42736  /  073115   ->   JSR I 43115 (60357)
42737  /  400622   ->   STA Z 0622
42740  /  052140   ->   JSR I Z 2140 (144067)
42741  /  230514   ->   ADD I 40514 (330667)
42742  /  050324   ->   JSR I Z 0324 (441740)
42743  /  112605   ->   JMP I Z 2605 (304117)
42744  /  402211   ->   STA Z 2211
42745  /  160705   ->   AND 40705
42746  /  220040   ->   ADD 40040
```

```
42747  /  323126  =>  IOR 43126
42750  /  263113  =>  SUB 43113
42751  /  025010  =>  SNA CLA
42752  /  777715  =>  LDL -0063
42753  /  223114  =>  ADD 43114
42754  /  073120  =>  JSR I 43120 (60103)
42755  /  073115  =>  JSR I 43115 (60357)
42756  /  404055  =>  STA Z 4055
42757  /  400040  =>  STA Z 0040
42760  /  063034  =>  JSR 43034
42761  /  000000  =>  0
42762  /  000000  =>  0
42763  /  000000  =>  0
42764  /  000000  =>  0
42765  /  020010  =>  CLA
42766  /  323124  =>  IOR 43124
42767  /  021010  =>  SZA CLA
42770  /  122775  =>  JMP 42775
42771  /  573121  =>  SNW I 43121 (43626)
42772  /  123013  =>  JMP 43013
42773  /  063101  =>  JSR 43101
42774  /  123013  =>  JMP 43013
42775  /  323124  =>  IOR 43124
42776  /  263113  =>  SUB 43113
42777  /  021010  =>  SZA CLA
43000  /  123005  =>  JMP 43005
43001  /  573122  =>  SNW I 43122 (43630)
43002  /  123013  =>  JMP 43013
43003  /  063101  =>  JSR 43101
43004  /  123013  =>  JMP 43013
43005  /  533123  =>  SZW I 43123 (43627)
43006  /  063101  =>  JSR 43101
43007  /  000000  =>  0
43010  /  000000  =>  0
43011  /  000000  =>  0
43012  /  000000  =>  0
43013  /  020010  =>  CLA
43014  /  563127  =>  SNW 43127
43015  /  123026  =>  JMP 43026
43016  /  323127  =>  IOR 43127
43017  /  463111  =>  SCA 43111
43020  /  073115  =>  JSR I 43115 (60357)
43021  /  404000  =>  STA Z 4000
43022  /  073115  =>  JSR I 43115 (60357)
43023  /  560000  =>  SNW 40000
43024  /  663111  =>  DSZ 43111
43025  /  123022  =>  JMP 43022
43026  /  622547  =>  ISZ 42547
43027  /  132547  =>  JMP I 42547 (0000)
43030  /  000000  =>  0
43031  /  000000  =>  0
43032  /  000000  =>  0
43033  /  000000  =>  0
43034  /  000000  =>  0
43035  /  323124  =>  IOR 43124
43036  /  025000  =>  SNA
43037  /  123063  =>  JMP 43063
43040  /  263113  =>  SUB 43113
43041  /  025000  =>  SNA
43042  /  123055  =>  JMP 43055
43043  /  000000      0
43044  /  000000  =>  0
43045  /  000000  =>  0
```

```
43046  /  000000  ->  0
43047  /  073115  ->  JSR I 43115 (60357)
43050  /  221116  ->  ADD 41116
43051  /  070040  ->  JSR I 40040 (460270)
43052  /  123071  ->  JMP 43071
43053  /  000000  ->  0
43054  /  000000  ->  0
43055  /  073115  ->  JSR I 43115 (60357)
43056  /  241120  ->  SUB Z 1120
43057  /  004040  ->  LDL 4040
43060  /  123071  ->  JMP 43071
43061  /  000000  ->  0
43062  /  000000  ->  0
43063  /  073115  ->  JSR I 43115 (60357)
43064  /  022211  ->  022211
43065  /  040705  ->  JSR Z 0705
43066  /  040040  ->  JSR Z 0040
43067  /  000000  ->  0
43070  /  000000  ->  0
43071  /  020010  ->  CLA
43072  /  133034  ->  JMP I 43034 (0000)
43073  /  000000  ->  0
43074  /  000000  ->  0
43075  /  000000  ->  0
43076  /  000000  ->  0
43077  /  000000  ->  0
43100  /  000000  ->  0
43101  /  000000  ->  0
43102  /  073115  ->  JSR I 43115 (60357)
43103  /  560000  ->  SNW 40000
43104  /  133101  ->  JMP I 43101 (0000)
43105  /  000000  ->  0
43106  /  000000  ->  0
43107  /  000000  ->  0
43110  /  000000  ->  0
43111  /  000000  ->  0
43112  /  000007  ->  LDL 0007
43113  /  000001  ->  LDL 0001
43114  /  000323  ->  LDL 0323
43115  /  060357  ->  JSR 40357
43116  /  044033  ->  JSR Z 4033
43117  /  041255  ->  JSR Z 1255
43120  /  060103  ->  JSR 40103
43121  /  043626  ->  JSR Z 3626
43122  /  043630  ->  JSR Z 3630
43123  /  043627  ->  JSR Z 3627
43124  /  000000  ->  0
43125  /  000000  ->  0
43126  /  000000  ->  0
43127  /  000000  ->  0
43130  /  000000  ->  0
43131  /  000000  ->  0
43132  /  000000  ->  0
43133  /  020010  ->  CLA
43134  /  333200  ->  IOR I 43200 (41257)
43135  /  063163  ->  JSR 43163
43136  /  463175  ->  SCA 43175
43137  /  333202  ->  IOR I 43202 (41261)
43140  /  063163  ->  JSR 43163
43141  /  036340  ->  CLL SHL 3
43142  /  323175  ->  IOR 43175
43143  /  463175  ->  SCA 43175
43144  /  333177  ->  IOR I 43177 (41256)
```

| | | | | |
|---|---|---|---|---|
| 43145 | / | 063163 | => | JSR 43163 |
| 43146 | / | 036640 | => | CLL SHL 6 |
| 43147 | / | 323175 | => | IOR 43175 |
| 43150 | / | 463175 | => | SCA 43175 |
| 43151 | / | 333201 | => | IOR I 43201 (41253) |
| 43152 | / | 063163 | => | JSR 43163 |
| 43153 | / | 037140 | => | CLL SHL 11 |
| 43154 | / | 323175 | => | IOR 43175 |
| 43155 | / | 423175 | => | STA 43175 |
| 43156 | / | 133132 | => | JMP I 43132 (0000) |
| 43157 | / | 000000 | => | 0 |
| 43160 | / | 000000 | => | 0 |
| 43161 | / | 000000 | => | 0 |
| 43162 | / | 000000 | => | 0 |
| 43163 | / | 000000 | => | 0 |
| 43164 | / | 263176 | => | SUB 43176 |
| 43165 | / | 022000 | => | SMA |
| 43166 | / | 020010 | => | CLA |
| 43167 | / | 223176 | => | ADD 43176 |
| 43170 | / | 133163 | => | JMP I 43163 (0000) |
| 43171 | / | 000000 | => | 0 |
| 43172 | / | 000000 | => | 0 |
| 43173 | / | 000000 | => | 0 |
| 43174 | / | 000000 | => | 0 |
| 43175 | / | 000000 | => | 0 |
| 43176 | / | 000007 | => | LDL 0007 |
| 43177 | / | 041256 | => | JSR Z 1256 |
| 43200 | / | 041257 | => | JSR Z 1257 |
| 43201 | / | 041253 | => | JSR Z 1253 |
| 43202 | / | 041261 | => | JSR Z 1261 |
| 43203 | / | 000000 | => | 0 |
| 43204 | / | 020010 | => | CLA |
| 43205 | / | 463631 | => | SCA 43631 |
| 43206 | / | 463652 | => | SCA 43652 |
| 43207 | / | 463644 | => | SCA 43644 |
| 43210 | / | 463632 | => | SCA 43632 |
| 43211 | / | 463651 | => | SCA 43651 |
| 43212 | / | 463640 | => | SCA 43640 |
| 43213 | / | 463626 | => | SCA 43626 |
| 43214 | / | 463630 | => | SCA 43630 |
| 43215 | / | 463627 | => | SCA 43627 |
| 43216 | / | 463631 | => | SCA 43631 |
| 43217 | / | 463635 | => | SCA 43635 |
| 43220 | / | 463646 | => | SCA 43646 |
| 43221 | / | 463633 | => | SCA 43633 |
| 43222 | / | 463642 | => | SCA 43642 |
| 43223 | / | 463537 | => | SCA 43537 |
| 43224 | / | 463643 | => | SCA 43643 |
| 43225 | / | 463641 | => | SCA 43641 |
| 43226 | / | 533625 | => | SZW I 43625 (42232) |
| 43227 | / | 123524 | => | JMP 43524 |
| 43230 | / | 333623 | => | IOR I 43623 (51543) |
| 43231 | / | 263564 | => | SUB 43564 |
| 43232 | / | 022010 | => | SMA CLA |
| 43233 | / | 123247 | => | JMP 43247 |
| 43234 | / | 000000 | => | 0 |
| 43235 | / | 000000 | => | 0 |
| 43236 | / | 000000 | => | 0 |
| 43237 | / | 000000 | => | 0 |
| 43240 | / | 333574 | => | IOR I 43574 (42226) |
| 43241 | / | 463635 | | SCA 43635 |
| 43242 | / | 333577 | => | IOR I 43577 (42251) |
| 43243 | / | 463646 | => | SCA 43646 |

```
43244  /  073602  ->  JSR I 43602 (40710)
43245  /  021000  ->  SZA
43246  /  073604  ->  JSR I 43604 (43132)
43247  /  463632  ->  SCA 43632
43250  /  333605  ->  IOR I 43605 (41251)
43251  /  463637  ->  SCA 43637
43252  /  333606  ->  IOR I 43606 (41260)
43253  /  463650  ->  SCA 43650
43254  /  533603  ->  SZW I 43603 (41255)
43255  /  000001  ->  LDL 0001
43256  /  463626  ->  SCA 43626
43257  /  000000  ->  0
43260  /  000000  ->  0
43261  /  000001  ->  LDL 0001
43262  /  463631  ->  SCA 43631
43263  /  333621  ->  IOR I 43621 (51544)
43264  /  263564  ->  SUB 43564
43265  /  022010  ->  SMA CLA
43266  /  123300  ->  JMP 43300
43267  /  000000  ->  0
43270  /  000000  ->  0
43271  /  333575  ->  IOR I 43575 (42225)
43272  /  463635  ->  SCA 43635
43273  /  333600  ->  IOR I 43600 (42247)
43274  /  463646  ->  SCA 43646
43275  /  073602  ->  JSR I 43602 (40710)
43276  /  021000  ->  SZA
43277  /  073604  ->  JSR I 43604 (43132)
43300  /  463652  ->  SCA 43652
43301  /  333605  ->  IOR I 43605 (41251)
43302  /  463636  ->  SCA 43636
43303  /  333606  ->  IOR I 43606 (41260)
43304  /  463647  ->  SCA 43647
43305  /  533603  ->  SZW I 43603 (41255)
43306  /  000001  ->  LDL 0001
43307  /  463630  ->  SCA 43630
43310  /  333622  ->  IOR I 43622 (51545)
43311  /  263564  ->  SUB 43564
43312  /  022010  ->  SMA CLA
43313  /  123325  ->  JMP 43325
43314  /  000000  ->  0
43315  /  000000  ->  0
43316  /  333576  ->  IOR I 43576 (42224)
43317  /  463635  ->  SCA 43635
43320  /  333601  ->  IOR I 43601 (42244)
43321  /  463646  ->  SCA 43646
43322  /  073602  ->  JSR I 43602 (40710)
43323  /  021000  ->  SZA
43324  /  073604  ->  JSR I 43604 (43132)
43325  /  463644  ->  SCA 43644
43326  /  333605  ->  IOR I 43605 (41251)
43327  /  463634  ->  SCA 43634
43330  /  333606  ->  IOR I 43606 (41260)
43331  /  463645  ->  SCA 43645
43332  /  533603  ->  SZW I 43603 (41255)
43333  /  000001  ->  LDL 0001
43334  /  463627  ->  SCA 43627
43335  /  000000  ->  0
43336  /  000000  ->  0
43337  /  000000  ->  0
43340  /  000000  ->  0
43341  /  323632  ->  IOR 43632
43342  /  323652  ->  IOR 43652
```

```
43343  /  323644  =>  IOR 43644
43344  /  021010  =>  SZA CLA
43345  /  000001  =>  LDL 0001
43346  /  463537  =>  SCA 43537
43347  /  523537  =>  SZW 43537
43350  /  123374  =>  JMP 43374
43351  /  333611  =>  IOR I 43611 (51673)
43352  /  263565  =>  SUB 43565
43353  /  026010  =>  SPA CLA
43354  /  123516  =>  JMP 43516
43355  /  333623  =>  IOR I 43623 (51543)
43356  /  263564  =>  SUB 43564
43357  /  022010  =>  SMA CLA
43360  /  123366  =>  JMP 43366
43361  /  333615  =>  IOR I 43615 (51677)
43362  /  223566  =>  ADD 43566
43363  /  026010  =>  SPA CLA
43364  /  123424  =>  JMP 43424
43365  /  000001  =>  LDL 0001
43366  /  463640  =>  SCA 43640
43367  /  123531  =>  JMP 43531
43370  /  000000  =>  0
43371  /  000000  =>  0
43372  /  000000  =>  0
43373  /  000000  =>  0
43374  /  323652  =>  IOR 43652
43375  /  223644  =>  ADD 43644
43376  /  021010  =>  SZA CLA
43377  /  123455  =>  JMP 43455
43400  /  000000  =>  0
43401  /  000000  =>  0
43402  /  000000  =>  0
43403  /  000000  =>  0
43404  /  323632  =>  IOR 43632
43405  /  035140  =>  CLL SHR 11
43406  /  163567  =>  AND 43567
43407  /  263567  =>  SUB 43567
43410  /  021010  =>  SZA CLA
43411  /  123550  =>  JMP 43550
43412  /  333611  =>  IOR I 43611 (51673)
43413  /  263566  =>  SUB 43566
43414  /  022010  =>  SMA CLA
43415  /  123455  =>  JMP 43455
43416  /  000001  =>  LDL 0001
43417  /  463651  =>  SCA 43651
43420  /  000000  =>  0
43421  /  000000  =>  0
43422  /  000000  =>  0
43423  /  000000  =>  0
43424  /  333611  =>  IOR I 43611 (51673)
43425  /  463637  =>  SCA 43637
43426  /  333607  =>  IOR I 43607 (51672)
43427  /  463636  =>  SCA 43636
43430  /  333610  =>  IOR I 43610 (51670)
43431  /  463634  =>  SCA 43634
43432  /  000000  =>  0
43433  /  000000  =>  0
43434  /  000000  =>  0
43435  /  000000  =>  0
43436  /  333615  =>  IOR I 43615 (51677)
43437  /  463650      SCA 43650
43440  /  333613  =>  IOR I 43613 (51676)
43441  /  463647  =>  SCA 43647
```

```
43442  /  333614   =>   IOR I 43614 (51674)
43443  /  463645   =>   SCA 43645
43444  /  000000   =>   0
43445  /  000000   =>   0
43446  /  000000   =>   0
43447  /  000000   =>   0
43450  /  123531   =>   JMP 43531
43451  /  000000   =>   0
43452  /  000000   =>   0
43453  /  000000   =>   0
43454  /  000000   =>   0
43455  /  020010   =>   CLA
43456  /  523632   =>   SZW 43632
43457  /  123516   =>   JMP 43516
43460  /  523652   =>   SZW 43652
43461  /  123510   =>   JMP 43510
43462  /  563644   =>   SNW 43644
43463  /  123516   =>   JMP 43516
43464  /  323644   =>   IOR 43644
43465  /  423540   =>   STA 43540
43466  /  163570   =>   AND 43570
43467  /  021010   =>   SZA CLA
43470  /  123516   =>   JMP 43516
43471  /  000300   =>   LDL 0300
43472  /  163540   =>   AND 43540
43473  /  363571   =>   XOR 43571
43474  /  743516   =>   JZA 43516
43475  /  323540   =>   IOR 43540
43476  /  035140   =>   CLL SHR 11
43477  /  163567   =>   AND 43567
43500  /  263572   =>   SUB 43572
43501  /  026010   =>   SPA CLA
43502  /  123516   =>   JMP 43516
43503  /  000001   =>   LDL 0001
43504  /  463642   =>   SCA 43642
43505  /  123531   =>   JMP 43531
43506  /  000000   =>   0
43507  /  000000   =>   0
43510  /  523644   =>   SZW 43644
43511  /  123516   =>   JMP 43516
43512  /  323652   =>   IOR 43652
43513  /  123465   =>   JMP 43465
43514  /  000000   =>   0
43515  /  000000   =>   0
43516  /  623203   =>   ISZ 43203
43517  /  323537   =>   IOR 43537
43520  /  025010   =>   SNA CLA
43521  /  000001   =>   LDL 0001
43522  /  463641   =>   SCA 43641
43523  /  323537   =>   IOR 43537
43524  /  133203   =>   JMP I 43203 (0000)
43525  /  000000   =>   0
43526  /  000000   =>   0
43527  /  000000   =>   0
43530  /  000000   =>   0
43531  /  020010   =>   CLA
43532  /  463632   =>   SCA 43632
43533  /  463652   =>   SCA 43652
43534  /  463644   =>   SCA 43644
43535  /  463537   =>   SCA 43537
43536  /  123517   =>   JMP 43517
43537  /  000000   =>   0
43540  /  000000   =>   0
```

```
43541   /   000000   =>   0
43542   /   000000   =>   0
43543   /   000000   =>   0
43544   /   000000   =>   0
43545   /   000000   =>   0
43546   /   000000   =>   0
43547   /   000000   =>   0
43550   /   573624   =>   SNW I 43624 (51400)
43551   /   123455   =>   JMP 43455
43552   /   323632   =>   IOR 43632
43553   /   034640   =>   CLL SHR 6
43554   /   163567   =>   AND 43567
43555   /   263573   =>   SUB 43573
43556   /   022010   =>   SMA CLA
43557   /   000001   =>   LDL 0001
43560   /   463643   =>   SCA 43643
43561   /   563643   =>   SNW 43643
43562   /   123455   =>   JMP 43455
43563   /   123531   =>   JMP 43531
43564   /   023420   =>   SMA SZA SNL STL
43565   /   000062   =>   LDL 0062
43566   /   000310   =>   LDL 0310
43567   /   000007   =>   LDL 0007
43570   /   000477   =>   LDL 0477
43571   /   000300   =>   LDL 0300
43572   /   000004   =>   LDL 0004
43573   /   000002   =>   LDL 0002
43574   /   042226   =>   JSR Z 2226
43575   /   042225   =>   JSR Z 2225
43576   /   042224   =>   JSR Z 2224
43577   /   042251   =>   JSR Z 2251
43600   /   042247   =>   JSR Z 2247
43601   /   042244   =>   JSR Z 2244
43602   /   040710   =>   JSR Z 0710
43603   /   041255   =>   JSR Z 1255
43604   /   043132   =>   JSR Z 3132
43605   /   041251   =>   JSR Z 1251
43606   /   041260   =>   JSR Z 1260
43607   /   051672   =>   JSR I Z 1672 (0001)
43610   /   051670   =>   JSR I Z 1670 (641660)
43611   /   051673   =>   JSR I Z 1673 (204104)
43612   /   051671   =>   JSR I Z 1671 (101660)
43613   /   051676   =>   JSR I Z 1676 (454156)
43614   /   051674   =>   JSR I Z 1674 (201374)
43615   /   051677   =>   JSR I Z 1677 (704071)
43616   /   051675   =>   JSR I Z 1675 (444156)
43617   /   042227   =>   JSR Z 2227
43620   /   042230   =>   JSR Z 2230
43621   /   051544   =>   JSR I Z 1544 (444156)
43622   /   051545   =>   JSR I Z 1545 (441574)
43623   /   051543   =>   JSR I Z 1543 (303702)
43624   /   051400   =>   JSR I Z 1400 (30004)
43625   /   042232   =>   JSR Z 2232
43626   /   000000   =>   0
43627   /   000000   =>   0
43630   /   000000   =>   0
43631   /   000000   =>   0
43632   /   000000   =>   0
43633   /   000000   =>   0
43634   /   000000   =>   0
43635   /   000000   =>   0
43636   /   000000   =>   0
43637   /   000000   =>   0
```

```
43640   /   000000   ->   0
43641   /   000000        0
43642   /   000000   ->   0
43643   /   000000   ->   0
43644   /   000000   ->   0
43645   /   000000   ->   0
43646   /   000000   ->   0
43647   /   000000   ->   0
43650   /   000000   ->   0
43651   /   000000   ->   0
43652   /   000000   ->   0
43653   /   000000   ->   0
43654   /   463667   ->   SCA 43667
43655   /   333653   ->   IOR I 43653 (0000)
43656   /   623653   ->   ISZ 43653
43657   /   025000   ->   SNA
43660   /   133653   ->   JMP I 43653 (0000)
43661   /   363667   ->   XOR 43667
43662   /   743665   ->   JZA 43665
43663   /   623653   ->   ISZ 43653
43664   /   123655   ->   JMP 43655
43665   /   323653   ->   IOR 43653
43666   /   014000   ->   DSP
43667   /   000000   ->   0
43670   /   000000   ->   0
43671   /   463760   ->   SCA 43760
43672   /   333670   ->   IOR I 43670 (0000)
43673   /   463761   ->   SCA 43761
43674   /   000023   ->   LDL 0023
43675   /   463757   ->   SCA 43757
43676   /   020040   ->   CLL
43677   /   463763   ->   SCA 43763
43700   /   323760   ->   IOR 43760
43701   /   030100   ->   RTR 1
43702   /   463760   ->   SCA 43760
43703   /   663757   ->   DSZ 43757
43704   /   123710   ->   JMP 43710
43705   /   623670   ->   ISZ 43670
43706   /   323760   ->   IOR 43760
43707   /   133670   ->   JMP I 43670 (0000)
43710   /   323763   ->   IOR 43763
43711   /   024440   ->   SZL CLL
43712   /   233761   ->   ADD I 43761 (0000)
43713   /   030100   ->   RTR 1
43714   /   123677   ->   JMP 43677
43715   /   000000   ->   0
43716   /   463761   ->   SCA 43761
43717   /   333715   ->   IOR I 43715 (0000)
43720   /   623715   ->   ISZ 43715
43721   /   012000   ->   AIL
43722   /   020046   ->   CLL NAC
43723   /   423760   ->   STA 43760
43724   /   743746   ->   JZA 43746
43725   /   000023   ->   LDL 0023
43726   /   463757   ->   SCA 43757
43727   /   463763   ->   SCA 43763
43730   /   323763   ->   IOR 43763
43731   /   032100   ->   RTL 1
43732   /   423763   ->   STA 43763
43733   /   223760   ->   ADD 43760
43734   /   024400   ->   SZL
43735   /   423763   ->   STA 43763
43736   /   020010   ->   CLA
```

```
43737  /  323761  =>  IOR 43761
43740  /  032100  =>  RTL 1
43741  /  463761  =>  SCA 43761
43742  /  663757  =>  DSZ 43757
43743  /  123730  =>  JMP 43730
43744  /  323761  =>  IOR 43761
43745  /  133715  =>  JMP I 43715 (0000)
43746  /  073762  =>  JSR I 43762 (60357)
43747  /  740301  =>  JZA 40301
43750  /  161617  =>  AND 41617
43751  /  244004  =>  SUB Z 4004
43752  /  112611  =>  JMP I Z 2611 (102602)
43753  /  040540  =>  JSR Z 0540
43754  /  023140  =>  023140
43755  /  604100  =>  ISZ Z 4100
43756  /  133715  =>  JMP I 43715 (0000)
43757  /  000000  =>  0
43760  /  000000  =>  0
43761  /  000000  =>  0
43762  /  060357  =>  JSR 40357
43763  /  000000  =>  0
43764  /  000000  =>  0
43765  /  063770  =>  JSR 43770
43766  /  000006  =>  LDL 0006
43767  /  133764  =>  JMP I 43764 (0000)
43770  /  000000  =>  0
43771  /  464026  =>  SCA 44026
43772  /  000007  =>  LDL 0007
43773  /  273770  =>  SUB I 43770 (0000)
43774  /  464025  =>  SCA 44025
43775  /  324026  =>  IOR 44026
43776  /  664025  =>  DSZ 44025
43777  /  024000  =>  SKP
44000  /  124003  =>  JMP 44003
44001  /  036340  =>  CLL SHL 3
44002  /  123776  =>  JMP 43776
44003  /  464026  =>  SCA 44026
44004  /  333770  =>  IOR I 43770 (0000)
44005  /  623770  =>  ISZ 43770
44006  /  424025  =>  STA 44025
44007  /  744021  =>  JZA 44021
44010  /  324026  =>  IOR 44026
44011  /  032300  =>  RTL 3
44012  /  424026  =>  STA 44026
44013  /  032100  =>  RTL 1
44014  /  164022  =>  AND 44022
44015  /  324023  =>  IOR 44023
44016  /  074024  =>  JSR I 44024 (60103)
44017  /  664025  =>  DSZ 44025
44020  /  124010  =>  JMP 44010
44021  /  133770  =>  JMP I 43770 (0000)
44022  /  000007  =>  LDL 0007
44023  /  000260  =>  LDL 0260
44024  /  060103  =>  JSR 40103
44025  /  000000  =>  0
44026  /  000000  =>  0
44027  /  000000  =>  0
44030  /  064033  =>  JSR 44033
44031  /  000006  =>  LDL 0006
44032  /  134027  =>  JMP I 44027 (0000)
44033  /  000000  =>  0
44034  /  464120  =>  SCA 44120
44035  /  464123  =>  SCA 44123
```

```
44036  /  324115   ->   IOR 44115
44037  /  464122   ->   SCA 44122
44040  /  334033   ->   IOR I 44033 (0000)
44041  /  624033   ->   ISZ 44033
44042  /  026000   ->   SPA
44043  /  624123   ->   ISZ 44123
44044  /  022000   ->   SMA
44045  /  020006   ->   NAC
44046  /  224116   ->   ADD 44116
44047  /  464121   ->   SCA 44121
44050  /  464067   ->   SCA 44067
44051  /  020040   ->   CLL
44052  /  324120   ->   IOR 44120
44053  /  424120   ->   STA 44120
44054  /  274122   ->   SUB I 44122 (0000)
44055  /  020400   ->   SNL
44056  /  624067   ->   ISZ 44067
44057  /  020400   ->   SNL
44060  /  124053   ->   JMP 44053
44061  /  564121   ->   SNW 44121
44062  /  124067   ->   JMP 44067
44063  /  664121   ->   DSZ 44121
44064  /  020000   ->   NOP
44065  /  020010   ->   CLA
44066  /  124076   ->   JMP 44076
44067  /  000000   ->   0
44070  /  021000   ->   SZA
44071  /  624123   ->   ISZ 44123
44072  /  564123   ->   SNW 44123
44073  /  777760   ->   LDL -0020
44074  /  224103   ->   ADD 44103
44075  /  074117   ->   JSR I 44117 (60103)
44076  /  624122   ->   ISZ 44122
44077  /  534122   ->   SZW I 44122 (0000)
44100  /  124050   ->   JMP 44050
44101  /  524121   ->   SZW 44121
44102  /  134033   ->   JMP I 44033 (0000)
44103  /  000260   ->   LDL 0260
44104  /  224120   ->   ADD 44120
44105  /  074117   ->   JSR I 44117 (60103)
44106  /  134033   ->   JMP I 44033 (0000)
44107  /  303240   ->   IOR Z 3240
44110  /  023420   ->   SMA SZA SNL STL
44111  /  001750   ->   LDL 1750
44112  /  000144   ->   LDL 0144
44113  /  000012   ->   LDL 0012
44114  /  000000   ->   0
44115  /  044107   ->   JSR Z 4107
44116  /  000006   ->   LDL 0006
44117  /  060103   ->   JSR 40103
44120  /  000000   ->   0
44121  /  000000   ->   0
44122  /  000000   ->   0
44123  /  000000   ->   0
44124  /  062307   ->   JSR 42307
44125  /  020010   ->   CLA
44126  /  324140   ->   IOR 44140
44127  /  074141   ->   JSR I 44141 (45362)
44130  /  334146   ->   IOR I 44146 (46663)
44131  /  074141   ->   JSR I 44141 (45362)
44132  /  334143   ->   IOR I 44143 (46660)
44133  /  074141   ->   JSR I 44141 (45362)
44134  /  334142   ->   IOR I 44142 (46657)
```

```
44135  /  074141  =>  JSR I 44141 (45362)
44136  /  020010  =>  CLA
44137  /  134124  =>  JMP I 44124 (62307)
44140  /  011000  =>  011000
44141  /  045362  =>  JSR Z 5362
44142  /  046657  =>  JSR Z 6657
44143  /  046660  =>  JSR Z 6660
44144  /  046661  =>  JSR Z 6661
44145  /  046662  =>  JSR Z 6662
44146  /  046663  =>  JSR Z 6663
44147  /  046664  =>  JSR Z 6664
44150  /  046665  =>  JSR Z 6665
44151  /  046666  =>  JSR Z 6666
44152  /  046667  =>  JSR Z 6667
44153  /  046670  =>  JSR Z 6670
44154  /  046671  =>  JSR Z 6671
44155  /  046672  =>  JSR Z 6672
44156  /  046673  =>  JSR Z 6673
44157  /  046674  =>  JSR Z 6674
44160  /  000000  =>  0
44161  /  424175  =>  STA 44175
44162  /  026010  =>  SPA CLA
44163  /  000001  =>  LDL 0001
44164  /  464176  =>  SCA 44176
44165  /  324175  =>  IOR 44175
44166  /  026000  =>  SPA
44167  /  020006  =>  NAC
44170  /  074200  =>  JSR I 44200 (43715)
44171  /  044177  =>  JSR Z 4177
44172  /  524176  =>  SZW 44176
44173  /  020006  =>  NAC
44174  /  134160  =>  JMP I 44160 (0000)
44175  /  000000  =>  0
44176  /  000000  =>  0
44177  /  000012  =>  LDL 0012
44200  /  043715  =>  JSR Z 3715
44201  /  000001  =>  LDL 0001
44202  /  200000  =>  ADD Z 0000
44203  /  000000  =>  0
44204  /  000004  =>  LDL 0004
44205  /  240000  =>  SUB Z 0000
44206  /  000000  =>  0
44207  /  010000  =>  010000
44210  /  400000  =>  STA Z 0000
44211  /  100000  =>  JMP Z 0000
44212  /  300000  =>  IOR Z 0000
44213  /  000000  =>  0
44214  /  020010  =>  CLA
44215  /  064500  =>  JSR 44500
44216  /  044276  =>  JSR Z 4276
44217  /  565350  =>  SNW 45350
44220  /  124253  =>  JMP 44253
44221  /  325350  =>  IOR 45350
44222  /  026010  =>  SPA CLA
44223  /  000001  =>  LDL 0001
44224  /  464274  =>  SCA 44274
44225  /  064763  =>  JSR 44763
44226  /  064570  =>  JSR 44570
44227  /  044272  =>  JSR Z 4272
44230  /  165352  =>  AND 45352
44231  /  754267  =>  JNA 44267
44232  /  000021  =>  LDL 0021
44233  /  265347  =>  SUB 45347
```

```
44234  /  026000  ->  SPA
44235  /  124260       JMP 44260
44236  /  025000  ->  SNA
44237  /  124250  ->  JMP 44250
44240  /  464275  ->  SCA 44275
44241  /  325350  ->  IOR 45350
44242  /  030140  ->  CLL RTR 1
44243  /  664275  ->  DSZ 44275
44244  /  124242  ->  JMP 44242
44245  /  024400  ->  SZL
44246  /  225353  ->  ADD 45353
44247  /  024000  ->  SKP
44250  /  325350  ->  IOR 45350
44251  /  524274  ->  SZW 44274
44252  /  020006  ->  NAC
44253  /  464275  ->  SCA 44275
44254  /  064536  ->  JSR 44536
44255  /  044276  ->  JSR Z 4276
44256  /  324275  ->  IOR 44275
44257  /  134213  ->  JMP I 44213 (0000)
44260  /  464275  ->  SCA 44275
44261  /  325350  ->  IOR 45350
44262  /  036140  ->  CLL SHL 1
44263  /  624275  ->  ISZ 44275
44264  /  124262  ->  JMP 44262
44265  /  022000  ->  SMA
44266  /  124251  ->  JMP 44251
44267  /  020010  ->  CLA
44270  /  324273  ->  IOR 44273
44271  /  124251  ->  JMP 44251
44272  /  000021  ->  LDL 0021
44273  /  364110  ->  XOR 44110
44274  /  000000  ->  0
44275  /  000000  ->  0
44276  /  000000  ->  0
44277  /  000000  ->  0
44300  /  000000  ->  0
44301  /  000240  ->  LDL 0240
44302  /  075357  ->  JSR I 45357 (60103)
44303  /  064500  ->  JSR 44500
44304  /  045337  ->  JSR Z 5337
44305  /  525350  ->  SZW 45350
44306  /  124312  ->  JMP 44312
44307  /  000260  ->  LDL 0260
44310  /  075357  ->  JSR I 45357 (60103)
44311  /  134300  ->  JMP I 44300 (0000)
44312  /  325350  ->  IOR 45350
44313  /  022000  ->  SMA
44314  /  124321  ->  JMP 44321
44315  /  020006  ->  NAC
44316  /  465350  ->  SCA 45350
44317  /  000255  ->  LDL 0255
44320  /  075357  ->  JSR I 45357 (60103)
44321  /  020010  ->  CLA
44322  /  464475  ->  SCA 44475
44323  /  000021  ->  LDL 0021
44324  /  265347  ->  SUB 45347
44325  /  026000  ->  SPA
44326  /  124353  ->  JMP 44353
44327  /  025000  ->  SNA
44330  /  124357  ->  JMP 44357
44331  /  064500  ->  JSR 44500
44332  /  044476  ->  JSR Z 4476
```

```
44333  /  065137   => JSR  45137
44334  /  044204   => JSR Z 4204
44335  /  000021   => LDL  0021
44336  /  265347   => SUB  45347
44337  /  026000   => SPA
44340  /  124345   => JMP  44345
44341  /  025000   => SNA
44342  /  124350   => JMP  44350
44343  /  664475   => DSZ  44475
44344  /  124331   => JMP  44331
44345  /  064536   => JSR  44536
44346  /  044476   => JSR Z 4476
44347  /  124357   => JMP  44357
44350  /  664475   => DSZ  44475
44351  /  020000   => NOP
44352  /  124357   => JMP  44357
44353  /  065224   => JSR  45224
44354  /  044204   => JSR Z 4204
44355  /  624475   => ISZ  44475
44356  /  124323   => JMP  44323
44357  /  000021   => LDL  0021
44360  /  265347   => SUB  45347
44361  /  425307   => STA  45307
44362  /  744372   => JZA  44372
44363  /  325350   => IOR  45350
44364  /  030140   => CLL RTR 1
44365  /  665307   => DSZ  45307
44366  /  124364   => JMP  44364
44367  /  465350   => SCA  45350
44370  /  024400   => SZL
44371  /  625350   => ISZ  45350
44372  /  325354   => IOR  45354
44373  /  464473   => SCA  44473
44374  /  464474   => SCA  44474
44375  /  000006   => LDL  0006
44376  /  224475   => ADD  44475
44377  /  424475   => STA  44475
44400  /  023010   => SMA SZA CLA
44401  /  124413   => JMP  44413
44402  /  075356   => JSR I 45356  (60357)
44403  /  605600   => ISZ Z 5600
44404  /  624474   => ISZ  44474
44405  /  564475   => SNW  44475
44406  /  124413   => JMP  44413
44407  /  000260   => LDL  0260
44410  /  075357   => JSR I 45357  (60103)
44411  /  624475   => ISZ  44475
44412  /  124407   => JMP  44407
44413  /  464424   => SCA  44424
44414  /  020040   => CLL
44415  /  325350   => IOR  45350
44416  /  425350   => STA  45350
44417  /  274473   => SUB I 44473  (0000)
44420  /  020400   => SNL
44421  /  624424   => ISZ  44424
44422  /  020400   => SNL
44423  /  124416   => JMP  44416
44424  /  000000   => 0
44425  /  021000   => SZA
44426  /  624474   => ISZ  44474
44427  /  564474   => SNW  44474
44430  /  124433   => JMP  44433
44431  /  225355   => ADD  45355
```

```
44432  /  075357   =>   JSR I 45357 (60103)
44433  /  664475   =>   DSZ 44475
44434  /  024000   =>   SKP
44435  /  124455   =>   JMP 44455
44436  /  624473   =>   ISZ 44473
44437  /  565350   =>   SNW 45350
44440  /  124443   =>   JMP 44443
44441  /  334473   =>   IOR I 44473 (0000)
44442  /  754413   =>   JNA 44413
44443  /  324475   =>   IOR 44475
44444  /  027010   =>   SPA SNA CLA
44445  /  124461   =>   JMP 44461
44446  /  000260   =>   LDL 0260
44447  /  075357   =>   JSR I 45357 (60103)
44450  /  664475   =>   DSZ 44475
44451  /  124446   =>   JMP 44446
44452  /  000256   =>   LDL 0256
44453  /  075357   =>   JSR I 45357 (60103)
44454  /  124461   =>   JMP 44461
44455  /  000256   =>   LDL 0256
44456  /  075357   =>   JSR I 45357 (60103)
44457  /  624474   =>   ISZ 44474
44460  /  124436   =>   JMP 44436
44461  /  064536   =>   JSR 44536
44462  /  045337   =>   JSR Z 5337
44463  /  134300   =>   JMP I 44300 (0000)
44464  /  303240   =>   IOR Z 3240
44465  /  023420   =>   SMA SZA SNL STL
44466  /  001750   =>   LDL 1750
44467  /  000144   =>   LDL 0144
44470  /  000012   =>   LDL 0012
44471  /  000001   =>   LDL 0001
44472  /  000000   =>   0
44473  /  000000   =>   0
44474  /  000000   =>   0
44475  /  000000   =>   0
44476  /  000000   =>   0
44477  /  000000   =>   0
44500  /  000000   =>   0
44501  /  020050   =>   CLA CLL
44502  /  334500   =>   IOR I 44500 (0000)
44503  /  465310   =>   SCA 45310
44504  /  624500   =>   ISZ 44500
44505  /  324546   =>   IOR 44546
44506  /  064510   =>   JSR 44510
44507  /  134500   =>   JMP I 44500 (0000)
44510  /  000000   =>   0
44511  /  465311   =>   SCA 45311
44512  /  000002   =>   LDL 0002
44513  /  465307   =>   SCA 45307
44514  /  335311   =>   IOR I 45311 (0000)
44515  /  475310   =>   SCA I 45310 (0000)
44516  /  625311   =>   ISZ 45311
44517  /  625310   =>   ISZ 45310
44520  /  665307   =>   DSZ 45307
44521  /  124514   =>   JMP 44514
44522  /  134510   =>   JMP I 44510 (0000)
44523  /  000000   =>   0
44524  /  020050   =>   CLA CLL
44525  /  334523   =>   IOR I 44523 (0000)
44526  /  624523   =>   ISZ 44523
44527  /  465311   =>   SCA 45311
44530  /  334523   =>   IOR I 44523 (0000)
```

```
44531  /  624523  => ISZ 44523
44532  /  465310  => SCA 45310
44533  /  325311  => IOR 45311
44534  /  064510  => JSR 44510
44535  /  134523  => JMP I 44523 (0000)
44536  /  000000  => 0
44537  /  064547  => JSR 44547
44540  /  324546  => IOR 44546
44541  /  465310  => SCA 45310
44542  /  334536  => IOR I 44536 (0000)
44543  /  624536  => ISZ 44536
44544  /  064510  => JSR 44510
44545  /  134536  => JMP I 44536 (0000)
44546  /  045347  => JSR Z 5347
44547  /  000000  => 0
44550  /  020050  => CLA CLL
44551  /  465347  => SCA 45347
44552  /  465350  => SCA 45350
44553  /  465351  => SCA 45351
44554  /  134547  => JMP I 44547 (0000)
44555  /  000000  => 0
44556  /  020050  => CLA CLL
44557  /  325351  => IOR 45351
44560  /  020006  => NAC
44561  /  465351  => SCA 45351
44562  /  032100  => RTL 1
44563  /  020006  => NAC
44564  /  225350  => ADD 45350
44565  /  020004  => CMA
44566  /  465350  => SCA 45350
44567  /  134555  => JMP I 44555 (0000)
44570  /  000000  => 0
44571  /  000001  => LDL 0001
44572  /  234570  => ADD I 44570 (0000)
44573  /  624570  => ISZ 44570
44574  /  425361  => STA 45361
44575  /  020002  => DAC
44576  /  465360  => SCA 45360
44577  /  525350  => SZW 45350
44600  /  124607  => JMP 44607
44601  /  575361  => SNW I 45361 (0000)
44602  /  124640  => JMP 44640
44603  /  335361  => IOR I 45361 (0000)
44604  /  026010  => SPA CLA
44605  /  124636  => JMP 44636
44606  /  124642  => JMP 44642
44607  /  535361  => SZW I 45361 (0000)
44610  /  124615  => JMP 44615
44611  /  325350  => IOR 45350
44612  /  026010  => SPA CLA
44613  /  124642  => JMP 44642
44614  /  124636  => JMP 44636
44615  /  325350  => IOR 45350
44616  /  375361  => XOR I 45361 (0000)
44617  /  026010  => SPA CLA
44620  /  124611  => JMP 44611
44621  /  325347  => IOR 45347
44622  /  275360  => SUB I 45360 (0000)
44623  /  025000  => SNA
44624  /  124630  => JMP 44630
44625  /  026010     SPA CLA
44626  /  124603  => JMP 44603
44627  /  124611  => JMP 44611
```

```
44630  /  325350   ->   IOR 45350
44631  /  275361   ->   SUB I 45361 (0000)
44632  /  025000   ->   SNA
44633  /  124640   ->   JMP 44640
44634  /  026010   ->   SPA CLA
44635  /  124642   ->   JMP 44642
44636  /  000001   ->   LDL 0001
44637  /  134570   ->   JMP I 44570 (0000)
44640  /  000002   ->   LDL 0002
44641  /  134570   ->   JMP I 44570 (0000)
44642  /  000004   ->   LDL 0004
44643  /  134570   ->   JMP I 44570 (0000)
44644  /  000000   ->   0
44645  /  020050   ->   CLA CLL
44646  /  525350   ->   SZW 45350
44647  /  624644   ->   ISZ 44644
44650  /  134644   ->   JMP I 44644 (0000)
44651  /  000000   ->   0
44652  /  464671   ->   SCA 44671
44653  /  325350   ->   IOR 45350
44654  /  026010   ->   SPA CLA
44655  /  024000   ->   SKP
44656  /  624651   ->   ISZ 44651
44657  /  324671   ->   IOR 44671
44660  /  134651   ->   JMP I 44651 (0000)
44661  /  000000   ->   0
44662  /  464671   ->   SCA 44671
44663  /  325350   ->   IOR 45350
44664  /  022010   ->   SMA CLA
44665  /  024000   ->   SKP
44666  /  624661   ->   ISZ 44661
44667  /  324671   ->   IOR 44671
44670  /  134661   ->   JMP I 44661 (0000)
44671  /  000000   ->   0
44672  /  000000   ->   0
44673  /  020050   ->   CLA CLL
44674  /  034320   ->   STL SHR 3
44675  /  165347   ->   AND 45347
44676  /  264211   ->   SUB 44211
44677  /  025000   ->   SNA
44700  /  124752   ->   JMP 44752
44701  /  264212   ->   SUB 44212
44702  /  025010   ->   SNA CLA
44703  /  064547   ->   JSR 44547
44704  /  465324   ->   SCA 45324
44705  /  325350   ->   IOR 45350
44706  /  164721   ->   AND 44721
44707  /  325351   ->   IOR 45351
44710  /  744744   ->   JZA 44744
44711  /  325350   ->   IOR 45350
44712  /  026010   ->   SPA CLA
44713  /  124722   ->   JMP 44722
44714  /  030220   ->   STL PTR 2
44715  /  165350   ->   AND 45350
44716  /  754725   ->   JNA 44725
44717  /  064771   ->   JSR 44771
44720  /  124714   ->   JMP 44714
44721  /  377777   ->   XOR I 47777 (0000)
44722  /  625324   ->   ISZ 45324
44723  /  064555   ->   JSR 44555
44724  /  124714   ->   JMP 44714
44725  /  325351   ->   IOR 45351
44726  /  022010   ->   SMA CLA
```

```
44727  /  124742  ->  JMP 44742
44730  /  324721  ->  IOR 44721
44731  /  365350  ->  XOR 45350
44732  /  754734  ->  JNA 44734
44733  /  065004  ->  JSR 45004
44734  /  020040  ->  CLL
44735  /  000001  ->  LDL 0001
44736  /  225350  ->  ADD 45350
44737  /  465350  ->  SCA 45350
44740  /  465351  ->  SCA 45351
44741  /  124705  ->  JMP 44705
44742  /  325350  ->  IOR 45350
44743  /  754746  ->  JNA 44746
44744  /  465347  ->  SCA 45347
44745  /  465350  ->  SCA 45350
44746  /  465351  ->  SCA 45351
44747  /  525324  ->  SZW 45324
44750  /  064555  ->  JSR 44555
44751  /  134672  ->  JMP I 44672 (0000)
44752  /  075356  ->  JSR I 45356 (60357)
44753  /  740530  ->  JZA 40530
44754  /  201716  ->  ADD Z 1716
44755  /  051624  ->  JSR I Z 1624 (451574)
44756  /  401726  ->  STA Z 1726
44757  /  052206  ->  JSR I Z 2206 (444131)
44760  /  141727  ->  AND Z 1727
44761  /  560040  ->  SNW 40040
44762  /  134672  ->  JMP I 44672 (0000)
44763  /  000000  ->  0
44764  /  020050  ->  CLA CLL
44765  /  325350  ->  IOR 45350
44766  /  026010  ->  SPA CLA
44767  /  064555  ->  JSR 44555
44770  /  134763  ->  JMP I 44763 (0000)
44771  /  000000  ->  0
44772  /  020050  ->  CLA CLL
44773  /  065027  ->  JSR 45027
44774  /  325350  ->  IOR 45350
44775  /  164721  ->  AND 44721
44776  /  024400  ->  SZL
44777  /  324210  ->  IOR 44210
45000  /  465350  ->  SCA 45350
45001  /  665347  ->  DSZ 45347
45002  /  020000  ->  NOP
45003  /  134771  ->  JMP I 44771 (0000)
45004  /  000000  ->  0
45005  /  020050  ->  CLA CLL
45006  /  065017  ->  JSR 45017
45007  /  325350  ->  IOR 45350
45010  /  036140  ->  CLL SHL 1
45011  /  164210  ->  AND 44210
45012  /  325350  ->  IOR 45350
45013  /  465350  ->  SCA 45350
45014  /  625347  ->  ISZ 45347
45015  /  020000  ->  NOP
45016  /  135004  ->  JMP I 45004 (0000)
45017  /  000000  ->  0
45020  /  325350  ->  IOR 45350
45021  /  030100  ->  RTR 1
45022  /  465350  ->  SCA 45350
45023  /  325351  ->  IOR 45351
45024  /  030100  ->  RTR 1
45025  /  465351  ->  SCA 45351
```

```
45026  /  135017  ->  JMP I 45017 (0000)
45027  /  000000      0
45030  /  325351  ->  IOR 45351
45031  /  032100  ->  RTL 1
45032  /  465351  ->  SCA 45351
45033  /  325350  ->  IOR 45350
45034  /  032100  ->  RTL 1
45035  /  465350  ->  SCA 45350
45036  /  135027  ->  JMP I 45027 (0000)
45037  /  000000  ->  0
45040  /  020050  ->  CLA CLL
45041  /  335037  ->  IOR I 45037 (0000)
45042  /  625037  ->  ISZ 45037
45043  /  425121  ->  STA 45121
45044  /  465060  ->  SCA 45060
45045  /  064644  ->  JSR 44644
45046  /  125120  ->  JMP 45120
45047  /  625121  ->  ISZ 45121
45050  /  335121  ->  IOR I 45121 (0000)
45051  /  745117  ->  JZA 45117
45052  /  065004  ->  JSR 45004
45053  /  064500  ->  JSR 44500
45054  /  045341  ->  JSR Z 5341
45055  /  325351  ->  IOR 45351
45056  /  465343  ->  SCA 45343
45057  /  064536  ->  JSR 44536
45060  /  000000  ->  0
45061  /  065004  ->  JSR 45004
45062  /  325347  ->  IOR 45347
45063  /  265341  ->  SUB 45341
45064  /  025000  ->  SNA
45065  /  125106  ->  JMP 45106
45066  /  026010  ->  SPA CLA
45067  /  125061  ->  JMP 45061
45070  /  064523  ->  JSR 44523
45071  /  045341  ->  JSR Z 5341
45072  /  045327  ->  JSR Z 5327
45073  /  325343  ->  IOR 45343
45074  /  465312  ->  SCA 45312
45075  /  064500  ->  JSR 44500
45076  /  045341  ->  JSR Z 5341
45077  /  325351  ->  IOR 45351
45100  /  465343  ->  SCA 45343
45101  /  064536  ->  JSR 44536
45102  /  045327  ->  JSR Z 5327
45103  /  325312  ->  IOR 45312
45104  /  465351  ->  SCA 45351
45105  /  125062  ->  JMP 45062
45106  /  020050  ->  CLA CLL
45107  /  325351  ->  IOR 45351
45110  /  225343  ->  ADD 45343
45111  /  465351  ->  SCA 45351
45112  /  032100  ->  RTL 1
45113  /  225350  ->  ADD 45350
45114  /  225342  ->  ADD 45342
45115  /  465350  ->  SCA 45350
45116  /  064672  ->  JSR 44672
45117  /  135037  ->  JMP I 45037 (0000)
45120  /  064536  ->  JSR 44536
45121  /  000000  ->  0
45122  /  135037  ->  JMP I 45037 (0000)
45123  /  000000  ->  0
45124  /  064500  ->  JSR 44500
```

```
45125  /  045345   ->   JSR Z 5345
45126  /  335123   ->   IOR I 45123 (0000)
45127  /  625123   ->   ISZ 45123
45130  /  465132   ->   SCA 45132
45131  /  064536   ->   JSR 44536
45132  /  000000   ->   0
45133  /  064555   ->   JSR 44555
45134  /  065037   ->   JSR 45037
45135  /  045345   ->   JSR Z 5345
45136  /  135123   ->   JMP I 45123 (0000)
45137  /  000000   ->   0
45140  /  020050   ->   CLA CLL
45141  /  335137   ->   IOR I 45137 (0000)
45142  /  625137   ->   ISZ 45137
45143  /  065176   ->   JSR 45176
45144  /  325332   ->   IOR 45332
45145  /  465351   ->   SCA 45351
45146  /  465350   ->   SCA 45350
45147  /  325351   ->   IOR 45351
45150  /  030100   ->   RTR 1
45151  /  465351   ->   SCA 45351
45152  /  665325   ->   DSZ 45325
45153  /  125164   ->   JMP 45164
45154  /  525326   ->   SZW 45326
45155  /  064555   ->   JSR 44555
45156  /  325327   ->   IOR 45327
45157  /  224201   ->   ADD 44201
45160  /  225331   ->   ADD 45331
45161  /  465347   ->   SCA 45347
45162  /  064672   ->   JSR 44672
45163  /  135137   ->   JMP I 45137 (0000)
45164  /  020410   ->   SNL CLA
45165  /  125172   ->   JMP 45172
45166  /  020040   ->   CLL
45167  /  325330   ->   IOR 45330
45170  /  225350   ->   ADD 45350
45171  /  465350   ->   SCA 45350
45172  /  325350   ->   IOR 45350
45173  /  030100   ->   RTR 1
45174  /  465350   ->   SCA 45350
45175  /  125147   ->   JMP 45147
45176  /  000000   ->   0
45177  /  465201   ->   SCA 45201
45200  /  064523   ->   JSR 44523
45201  /  000000   ->   0
45202  /  045331   ->   JSR Z 5331
45203  /  325350   ->   IOR 45350
45204  /  365332   ->   XOR 45332
45205  /  164210   ->   AND 44210
45206  /  465326   ->   SCA 45326
45207  /  064763   ->   JSR 44763
45210  /  064500   ->   JSR 44500
45211  /  045327   ->   JSR Z 5327
45212  /  064536   ->   JSR 44536
45213  /  045331   ->   JSR Z 5331
45214  /  064763   ->   JSR 44763
45215  /  064500   ->   JSR 44500
45216  /  045331   ->   JSR Z 5331
45217  /  064547   ->   JSR 44547
45220  /  000023   ->   LDL 0023
45221  /  465325   ->   SCA 45325
45222  /  020040   ->   CLL
45223  /  135176   ->   JMP I 45176 (0000)
```

| | | | |
|---|---|---|---|
| 45224 | / | 000000 | -> | 0 |
| 45225 | / | 020050 | -> | CLA CLL |
| 45226 | / | 335224 | -> | IOR I 45224 (0000) |
| 45227 | / | 625224 | -> | ISZ 45224 |
| 45230 | / | 065176 | -> | JSR 45176 |
| 45231 | / | 064536 | -> | JSR 44536 |
| 45232 | / | 045331 | -> | JSR Z 5331 |
| 45233 | / | 064644 | -> | JSR 44644 |
| 45234 | / | 125301 | -> | JMP 45301 |
| 45235 | / | 064555 | -> | JSR 44555 |
| 45236 | / | 064500 | -> | JSR 44500 |
| 45237 | / | 045331 | -> | JSR Z 5331 |
| 45240 | / | 064547 | -> | JSR 44547 |
| 45241 | / | 064536 | -> | JSR 44536 |
| 45242 | / | 045327 | -> | JSR Z 5327 |
| 45243 | / | 065004 | -> | JSR 45004 |
| 45244 | / | 020050 | -> | CLA CLL |
| 45245 | / | 325351 | -> | IOR 45351 |
| 45246 | / | 032100 | -> | RTL 1 |
| 45247 | / | 465351 | -> | SCA 45351 |
| 45250 | / | 665325 | -> | DSZ 45325 |
| 45251 | / | 125266 | -> | JMP 45266 |
| 45252 | / | 325351 | -> | IOR 45351 |
| 45253 | / | 465350 | -> | SCA 45350 |
| 45254 | / | 465351 | -> | SCA 45351 |
| 45255 | / | 020040 | -> | CLL |
| 45256 | / | 065017 | -> | JSR 45017 |
| 45257 | / | 525326 | -> | SZW 45326 |
| 45260 | / | 064555 | -> | JSR 44555 |
| 45261 | / | 325347 | -> | IOR 45347 |
| 45262 | / | 265331 | -> | SUB 45331 |
| 45263 | / | 465347 | -> | SCA 45347 |
| 45264 | / | 064672 | -> | JSR 44672 |
| 45265 | / | 135224 | -> | JMP I 45224 (0000) |
| 45266 | / | 325350 | -> | IOR 45350 |
| 45267 | / | 032100 | -> | RTL 1 |
| 45270 | / | 465350 | -> | SCA 45350 |
| 45271 | / | 325332 | -> | IOR 45332 |
| 45272 | / | 225350 | -> | ADD 45350 |
| 45273 | / | 465330 | -> | SCA 45330 |
| 45274 | / | 020400 | -> | SNL |
| 45275 | / | 125245 | -> | JMP 45245 |
| 45276 | / | 225330 | -> | ADD 45330 |
| 45277 | / | 465350 | -> | SCA 45350 |
| 45300 | / | 125245 | -> | JMP 45245 |
| 45301 | / | 075356 | -> | JSR I 45356 (60357) |
| 45302 | / | 740604 | -> | JZA 40604 |
| 45303 | / | 112640 | -> | JMP I Z 2640 (444127) |
| 45304 | / | 023140 | -> | 023140 |
| 45305 | / | 605600 | -> | ISZ Z 5600 |
| 45306 | / | 135224 | -> | JMP I 45224 (0000) |
| 45307 | / | 000000 | -> | 0 |
| 45310 | / | 000000 | -> | 0 |
| 45311 | / | 000000 | -> | 0 |
| 45312 | / | 000000 | -> | 0 |
| 45313 | / | 000000 | -> | 0 |
| 45314 | / | 000000 | -> | 0 |
| 45315 | / | 000000 | -> | 0 |
| 45316 | / | 000000 | -> | 0 |
| 45317 | / | 000000 | -> | 0 |
| 45320 | / | 000000 | -> | 0 |
| 45321 | / | 000000 | -> | 0 |
| 45322 | / | 000000 | -> | 0 |

```
45323  /  000000  ->  0
45324  /  000000  ->  0
45325  /  000000  ->  0
45326  /  000000  ->  0
45327  /  000000  ->  0
45330  /  000000  ->  0
45331  /  000000  ->  0
45332  /  000000  ->  0
45333  /  000000  ->  0
45334  /  000000  ->  0
45335  /  000000  ->  0
45336  /  000000  ->  0
45337  /  000000  ->  0
45340  /  000000  ->  0
45341  /  000000  ->  0
45342  /  000000  ->  0
45343  /  000000  ->  0
45344  /  000000  ->  0
45345  /  000000  ->  0
45346  /  000000  ->  0
45347  /  000000  ->  0
45350  /  000000  ->  0
45351  /  000000  ->  0
45352  /  000003  ->  LDL 0003
45353  /  000001  ->  LDL 0001
45354  /  044464  ->  JSR Z 4464
45355  /  000260  ->  LDL 0260
45356  /  060357  ->  JSR 40357
45357  /  060103  ->  JSR 40103
45360  /  000000  ->  0
45361  /  000000  ->  0
45362  /  044136  ->  JSR Z 4136
45363  /  425440  ->  STA 45440
45364  /  165435  ->  AND 45435
45365  /  325436  ->  IOR 45436
45366  /  465400  ->  SCA 45400
45367  /  325440  ->  IOR 45440
45370  /  035140  ->  CLL SHR 11
45371  /  165435  ->  AND 45435
45372  /  325437  ->  IOR 45437
45373  /  465377  ->  SCA 45377
45374  /  725376  ->  SMT 45376
45375  /  755401  ->  JNA 45401
45376  /  000244  ->  LDL 0244
45377  /  050020  ->  JSR I Z 0020 (320000)
45400  /  460000  ->  SCA 40000
45401  /  065423  ->  JSR 45423
45402  /  000200  ->  LDL 0200
45403  /  165377  ->  AND 45377
45404  /  745415  ->  JZA 45415
45405  /  725407  ->  SMT 45407
45406  /  755412  ->  JNA 45412
45407  /  000244  ->  LDL 0244
45410  /  250000  ->  SUB I Z 0000 (100103)
45411  /  660000  ->  DSZ 40000
45412  /  065423  ->  JSR 45423
45413  /  000377  ->  LDL 0377
45414  /  165411  ->  AND 45411
45415  /  135362  ->  JMP I 45362 (44136)
45416  /  000000  ->  0
45417  /  000000      0
45420  /  000000  ->  0
45421  /  000000  ->  0
```

```
45422  /  000000   ->  0
45423  /  045402   ->  JSR Z 5402
45424  /  000144   ->  LDL 0144
45425  /  465433   ->  SCA 45433
45426  /  325434   ->  IOR 45434
45427  /  665433   ->  DSZ 45433
45430  /  125427   ->  JMP 45427
45431  /  020050   ->  CLA CLL
45432  /  135423   ->  JMP I 45423 (45402)
45433  /  000000   ->  0
45434  /  000000   ->  0
45435  /  000377   ->  LDL 0377
45436  /  460000   ->  SCA 40000
45437  /  050000   ->  JSR I Z 0000 (100103)
45440  /  020000   ->  NOP
45441  /  000000   ->  0
45442  /  000002   ->  LDL 0002
45443  /  326200   ->  IOR 46200
45444  /  076217   ->  JSR I 46217 (45362)
45445  /  000377   ->  LDL 0377
45446  /  165753   ->  AND 45753
45447  /  326201   ->  IOR 46201
45450  /  076217   ->  JSR I 46217 (45362)
45451  /  007400   ->  LDL 7400
45452  /  165753   ->  AND 45753
45453  /  034640   ->  CLL SHR 6
45454  /  025000   ->  SNA
45455  /  000020   ->  LDL 0020
45456  /  326202   ->  IOR 46202
45457  /  326200   ->  IOR 46200
45460  /  076217   ->  JSR I 46217 (45362)
45461  /  000007   ->  LDL 0007
45462  /  165753   ->  AND 45753
45463  /  225472   ->  ADD 45472
45464  /  014000   ->  DSP
45465  /  000000   ->  0
45466  /  000000   ->  0
45467  /  000000   ->  0
45470  /  000000   ->  0
45471  /  000000   ->  0
45472  /  045473   ->  JSR Z 5473
45473  /  045510   ->  JSR Z 5510
45474  /  045510   ->  JSR Z 5510
45475  /  045510   ->  JSR Z 5510
45476  /  045540   ->  JSR Z 5540
45477  /  045544   ->  JSR Z 5544
45500  /  045553   ->  JSR Z 5553
45501  /  045553   ->  JSR Z 5553
45502  /  045572   ->  JSR Z 5572
45503  /  000000   ->  0
45504  /  000000   ->  0
45505  /  000000   ->  0
45506  /  000000   ->  0
45507  /  000000   ->  0
45510  /  000070   ->  LDL 0070
45511  /  165753   ->  AND 45753
45512  /  366203   ->  XOR 46203
45513  /  745530   ->  JZA 45530
45514  /  020010   ->  CLA
45515  /  466254   ->  SCA 46254
45516  /  466247   ->  SCA 46247
45517  /  000001   ->  LDL 0001
45520  /  466253   ->  SCA 46253
```

```
45521  /  000300   ->   LDL  0300
45522  /  165753   ->   AND  45753
45523  /  034640   ->   CLL  SHR  6
45524  /  225603   ->   ADD  45603
45525  /  012000   ->   AIL
45526  /  465637   ->   SCA  45637
45527  /  125635   ->   JMP  45635
45530  /  000001   ->   LDL  0001
45531  /  466254   ->   SCA  46254
45532  /  466247   ->   SCA  46247
45533  /  000003   ->   LDL  0003
45534  /  466253   ->   SCA  46253
45535  /  326204   ->   IOR  46204
45536  /  465637   ->   SCA  45637
45537  /  125635   ->   JMP  45635
45540  /  000001   ->   LDL  0001
45541  /  466247   ->   SCA  46247
45542  /  466254   ->   SCA  46254
45543  /  125517   ->   JMP  45517
45544  /  000010   ->   LDL  0010
45545  /  165753   ->   AND  45753
45546  /  021010   ->   SZA  CLA
45547  /  000001   ->   LDL  0001
45550  /  466247   ->   SCA  46247
45551  /  466254   ->   SCA  46254
45552  /  125533   ->   JMP  45533
45553  /  000010   ->   LDL  0010
45554  /  165753   ->   AND  45753
45555  /  025010   ->   SNA  CLA
45556  /  000001   ->   LDL  0001
45557  /  466254   ->   SCA  46254
45560  /  466247   ->   SCA  46247
45561  /  000002   ->   LDL  0002
45562  /  466253   ->   SCA  46253
45563  /  000300   ->   LDL  0300
45564  /  165753   ->   AND  45753
45565  /  034640   ->   CLL  SHR  6
45566  /  225611   ->   ADD  45611
45567  /  012000   ->   AIL
45570  /  465637   ->   SCA  45637
45571  /  125635   ->   JMP  45635
45572  /  000001   ->   LDL  0001
45573  /  466247   ->   SCA  46247
45574  /  466254   ->   SCA  46254
45575  /  125561   ->   JMP  45561
45576  /  000000   ->   0
45577  /  000000   ->   0
45600  /  000000   ->   0
45601  /  000000   ->   0
45602  /  000000   ->   0
45603  /  045604   ->   JSR  Z  5604
45604  /  045617   ->   JSR  Z  5617
45605  /  045621   ->   JSR  Z  5621
45606  /  045621   ->   JSR  Z  5621
45607  /  045623   ->   JSR  Z  5623
45610  /  000000   ->   0
45611  /  045612   ->   JSR  Z  5612
45612  /  045627   ->   JSR  Z  5627
45613  /  045627   ->   JSR  Z  5627
45614  /  045631   ->   JSR  Z  5631
45615  /  045633        JSR  Z  5633
45616  /  000000   ->   0
45617  /  000006   ->   LDL  0006
```

```
45620  /  240000  ->  SUB Z 0000
45621  /  000003  ->  LDL 0003
45622  /  200000  ->  ADD Z 0000
45623  /  777777  ->  LDL -0001
45624  /  314632  ->  IOR I Z 4632 (41123)
45625  /  777774  ->  LDL -0004
45626  /  243656  ->  SUB Z 3656
45627  /  000004  ->  LDL 0004
45630  /  200000  ->  ADD Z 0000
45631  /  000000  ->  0
45632  /  314631  ->  IOR I Z 4631 (55655)
45633  /  777775  ->  LDL -0003
45634  /  243656  ->  SUB Z 3656
45635  /  020010  ->  CLA
45636  /  076226  ->  JSR I 46226 (44536)
45637  /  045627  ->  JSR Z 5627
45640  /  076225  ->  JSR I 46225 (44500)
45641  /  045761  ->  JSR Z 5761
45642  /  000014  ->  LDL 0014
45643  /  465763  ->  SCA 45763
45644  /  326253  ->  IOR 46253
45645  /  030740  ->  CLL RTR 7
45646  /  526247  ->  SZW 46247
45647  /  326205  ->  IOR 46205
45650  /  526254  ->  SZW 46254
45651  /  326206  ->  IOR 46206
45652  /  325753  ->  IOR 45753
45653  /  476220  ->  SCA I 46220 (45434)
45654  /  326207  ->  IOR 46207
45655  /  466251  ->  SCA 46251
45656  /  001750  ->  LDL 1750
45657  /  466250  ->  SCA 46250
45660  /  336220  ->  IOR I 46220 (45434)
45661  /  666250  ->  DSZ 46250
45662  /  125661  ->  JMP 45661
45663  /  076221  ->  JSR I 46221 (45423)
45664  /  020010  ->  CLA
45665  /  326210  ->  IOR 46210
45666  /  076217  ->  JSR I 46217 (45362)
45667  /  426252  ->  STA 46252
45670  /  166211  ->  AND 46211
45671  /  755704  ->  JNA 45704
45672  /  000200  ->  LDL 0200
45673  /  166252  ->  AND 46252
45674  /  425756  ->  STA 45756
45675  /  755747  ->  JNA 45747
45676  /  666251  ->  DSZ 46251
45677  /  125656  ->  JMP 45656
45700  /  000200  ->  LDL 0200
45701  /  465756  ->  SCA 45756
45702  /  007777  ->  LDL 7777
45703  /  125726  ->  JMP 45726
45704  /  000200  ->  LDL 0200
45705  /  166252  ->  AND 46252
45706  /  465756  ->  SCA 45756
45707  /  326212  ->  IOR 46212
45710  /  076217  ->  JSR I 46217 (45362)
45711  /  425765  ->  STA 45765
45712  /  166213  ->  AND 46213
45713  /  037040  ->  CLL SHL 10
45714  /  465766  ->  SCA 45766
45715  /  566247  ->  SNW 46247
45716  /  000200  ->  LDL 0200
```

```
45717  /  165765  ->  AND 45765
45720  /  465765  ->  SCA 45765
45721  /  326214  ->  IOR 46214
45722  /  076217  ->  JSR I 46217 (45362)
45723  /  325766  ->  IOR 45766
45724  /  525765  ->  SZW 45765
45725  /  020006  ->  NAC
45726  /  526254  ->  SZW 46254
45727  /  020006  ->  NAC
45730  /  425755  ->  STA 45755
45731  /  036240  ->  CLL SHL 2
45732  /  465754  ->  SCA 45754
45733  /  000002  ->  LDL 0002
45734  /  366253  ->  XOR 46253
45735  /  755741  ->  JNA 45741
45736  /  325754  ->  IOR 45754
45737  /  036140  ->  CLL SHL 1
45740  /  465754  ->  SCA 45754
45741  /  325755  ->  IOR 45755
45742  /  036540  ->  CLL SHL 5
45743  /  465764  ->  SCA 45764
45744  /  526107  ->  SZW 46107
45745  /  065773  ->  JSR 45773
45746  /  135441  ->  JMP I 45441 (0000)
45747  /  525752  ->  SZW 45752
45750  /  125676  ->  JMP 45676
45751  /  125730  ->  JMP 45730
45752  /  000000  ->  0
45753  /  000000  ->  0
45754  /  000000  ->  0
45755  /  000000  ->  0
45756  /  000000  ->  0
45757  /  000000  ->  0
45760  /  000000  ->  0
45761  /  000000  ->  0
45762  /  000000  ->  0
45763  /  000014  ->  LDL 0014
45764  /  000000  ->  0
45765  /  000000  ->  0
45766  /  000000  ->  0
45767  /  000000  ->  0
45770  /  000000  ->  0
45771  /  000000  ->  0
45772  /  000000  ->  0
45773  /  000000  ->  0
45774  /  000001  ->  LDL 0001
45775  /  166107  ->  AND 46107
45776  /  756013  ->  JNA 46013
45777  /  000002  ->  LDL 0002
46000  /  166107  ->  AND 46107
46001  /  746004  ->  JZA 46004
46002  /  525756  ->  SZW 45756
46003  /  126013  ->  JMP 46013
46004  /  000004  ->  LDL 0004
46005  /  166107  ->  AND 46107
46006  /  746105  ->  JZA 46105
46007  /  325753  ->  IOR 45753
46010  /  366110  ->  XOR 46110
46011  /  166111  ->  AND 46111
46012  /  756105  ->  JNA 46105
46013  /  020010  ->  CLA
46014  /  336243  ->  IOR I 46243 (60124)
46015  /  466101  ->  SCA 46101
```

```
46016  /  336244   ->   IOR I 46244 (60140)
46017  /  466103   ->   SCA 46103
46020  /  326112   ->   IOR 46112
46021  /  436243   ->   STA I 46243 (60124)
46022  /  476244   ->   SCA I 46244 (60140)
46023  /  076245   ->   JSR I 46245 (60357)
46024  /  744000   ->   JZA 44000
46025  /  007777   ->   LDL 7777
46026  /  165753   ->   AND 45753
46027  /  076246   ->   JSR I 46246 (43770)
46030  /  000004   ->   LDL 0004
46031  /  076245   ->   JSR I 46245 (60357)
46032  /  404000   ->   STA Z 4000
46033  /  076226   ->   JSR I 46226 (44536)
46034  /  045763   ->   JSR Z 5763
46035  /  076230   ->   JSR I 46230 (45137)
46036  /  045761   ->   JSR Z 5761
46037  /  076227   ->   JSR I 46227 (44300)
46040  /  020000   ->   NOP
46041  /  020000   ->   NOP
46042  /  000003   ->   LDL 0003
46043  /  166253   ->   AND 46253
46044  /  226046   ->   ADD 46046
46045  /  014000   ->   DSP
46046  /  046047   ->   JSR Z 6047
46047  /  046053   ->   JSR Z 6053
46050  /  046057   ->   JSR Z 6057
46051  /  046063   ->   JSR Z 6063
46052  /  046067   ->   JSR Z 6067
46053  /  076245   ->   JSR I 46245 (60357)
46054  /  404040   ->   STA Z 4040
46055  /  400040   ->   STA Z 0040
46056  /  126073   ->   JMP 46073
46057  /  076245   ->   JSR I 46245 (60357)
46060  /  402501   ->   STA Z 2501
46061  /  400040   ->   STA Z 0040
46062  /  126073   ->   JMP 46073
46063  /  076245   ->   JSR I 46245 (60357)
46064  /  402525   ->   STA Z 2525
46065  /  400040   ->   STA Z 0040
46066  /  126073   ->   JMP 46073
46067  /  076245   ->   JSR I 46245 (60357)
46070  /  402640   ->   STA Z 2640
46071  /  400040   ->   STA Z 0040
46072  /  126073   ->   JMP 46073
46073  /  525756   ->   SZW 45756
46074  /  000041   ->   LDL 0041
46075  /  226215   ->   ADD 46215
46076  /  076242   ->   JSR I 46242 (60103)
46077  /  076245   ->   JSR I 46245 (60357)
46100  /  404000   ->   STA Z 4000
46101  /  000000   ->   0
46102  /  476243   ->   SCA I 46243 (60124)
46103  /  000000   ->   0
46104  /  476244   ->   SCA I 46244 (60140)
46105  /  020000   ->   NOP
46106  /  135773   ->   JMP I 45773 (0000)
46107  /  000000   ->   0
46110  /  000000   ->   0
46111  /  000077   ->   LDL 0077
46112  /  000000   ->   0
46113  /  000000   ->   0
46114  /  000000   ->   0
```

```
46115  /  000000  ->  0
46116  /  000000  ->  0
46117  /  000000  ->  0
46120  /  465753  ->  SCA 45753
46121  /  126126  ->  JMP 46126
46122  /  066150  ->  JSR 46150
46123  /  024000  ->  SKP
46124  /  626117  ->  ISZ 46117
46125  /  136117  ->  JMP I 46117 (0000)
46126  /  000001  ->  LDL 0001
46127  /  465752  ->  SCA 45752
46130  /  065441  ->  JSR 45441
46131  /  525764  ->  SZW 45764
46132  /  126135  ->  JMP 46135
46133  /  076236  ->  JSR I 46236 (44547)
46134  /  126141  ->  JMP 46141
46135  /  076226  ->  JSR I 46226 (44536)
46136  /  045763  ->  JSR Z 5763
46137  /  076230  ->  JSR I 46230 (45137)
46140  /  045761  ->  JSR Z 5761
46141  /  076225  ->  JSR I 46225 (44500)
46142  /  045757  ->  JSR Z 5757
46143  /  020010  ->  CLA
46144  /  325754  ->  IOR 45754
46145  /  565756  ->  SNW 45756
46146  /  626117  ->  ISZ 46117
46147  /  136117  ->  JMP I 46117 (0000)
46150  /  000000  ->  0
46151  /  000000  ->  0
46152  /  465752  ->  SCA 45752
46153  /  065441  ->  JSR 45441
46154  /  565756  ->  SNW 45756
46155  /  126166  ->  JMP 46166
46156  /  525764  ->  SZW 45764
46157  /  126163  ->  JMP 46163
46160  /  076236  ->  JSR I 46236 (44547)
46161  /  076225  ->  JSR I 46225 (44500)
46162  /  045757  ->  JSR Z 5757
46163  /  020010  ->  CLA
46164  /  325754  ->  IOR 45754
46165  /  136150  ->  JMP I 46150 (0000)
46166  /  626150  ->  ISZ 46150
46167  /  565764  ->  SNW 45764
46170  /  126160  ->  JMP 46160
46171  /  076226  ->  JSR I 46226 (44536)
46172  /  045763  ->  JSR Z 5763
46173  /  076230  ->  JSR I 46230 (45137)
46174  /  045761  ->  JSR Z 5761
46175  /  076225  ->  JSR I 46225 (44500)
46176  /  045757  ->  JSR Z 5757
46177  /  126163  ->  JMP 46163
46200  /  010000  ->  010000
46201  /  011000  ->  011000
46202  /  000006  ->  LDL 0006
46203  /  000040  ->  LDL 0040
46204  /  045625  ->  JSR Z 5625
46205  /  400000  ->  STA Z 0000
46206  /  200000  ->  ADD Z 0000
46207  /  003720  ->  LDL 3720
46210  /  210000  ->  ADD I Z 0000 (100103)
46211  /  000001      LDL 0001
46212  /  212000  ->  ADD I Z 2000 (101773)
46213  /  000017  ->  LDL 0017
```

```
46214   /   213000   ->   ADD I Z 3000 (644110)
46215   /   000240   ->   LDL 0240
46216   /   047051   ->   JSR Z 7051
46217   /   045362   ->   JSR Z 5362
46220   /   045434   ->   JSR Z 5434
46221   /   045423   ->   JSR Z 5423
46222   /   211000   ->   ADD I Z 1000 (244156)
46223   /   012000   ->   AIL
46224   /   013000   ->   013000
46225   /   044500   ->   JSR Z 4500
46226   /   044536   ->   JSR Z 4536
46227   /   044300   ->   JSR Z 4300
46230   /   045137   ->   JSR Z 5137
46231   /   045224   ->   JSR Z 5224
46232   /   045037   ->   JSR Z 5037
46233   /   044555   ->   JSR Z 4555
46234   /   045123   ->   JSR Z 5123
46235   /   044672   ->   JSR Z 4672
46236   /   044547   ->   JSR Z 4547
46237   /   044570   ->   JSR Z 4570
46240   /   045347   ->   JSR Z 5347
46241   /   045350   ->   JSR Z 5350
46242   /   060103   ->   JSR 40103
46243   /   060124   ->   JSR 40124
46244   /   060140   ->   JSR 40140
46245   /   060357   ->   JSR 40357
46246   /   043770   ->   JSR Z 3770
46247   /   000000   ->   0
46250   /   000000   ->   0
46251   /   000000   ->   0
46252   /   000000   ->   0
46253   /   000000   ->   0
46254   /   000000   ->   0
46255   /   000000   ->   0
46256   /   426715   ->   STA 46715
46257   /   436702   ->   STA I 46702 (45434)
46260   /   466471   ->   SCA 46471
46261   /   000000   ->   0
46262   /   326675   ->   IOR 46675
46263   /   076700   ->   JSR I 46700 (45362)
46264   /   326660   ->   IOR 46660
46265   /   076700   ->   JSR I 46700 (45362)
46266   /   326661   ->   IOR 46661
46267   /   076700   ->   JSR I 46700 (45362)
46270   /   166664   ->   AND 46664
46271   /   756337   ->   JNA 46337
46272   /   326471   ->   IOR 46471
46273   /   035440   ->   CLL SHR 14
46274   /   066474   ->   JSR 46474
46275   /   066464   ->   JSR 46464
46276   /   326471   ->   IOR 46471
46277   /   035040   ->   CLL SHR 10
46300   /   066474   ->   JSR 46474
46301   /   066464   ->   JSR 46464
46302   /   066531   ->   JSR 46531
46303   /   066464   ->   JSR 46464
46304   /   020010   ->   CLA
46305   /   326666   ->   IOR 46666
46306   /   166556   ->   AND 46556
46307   /   756331   ->   JNA 46331
46310   /   326471   ->   IOR 46471
46311   /   034440   ->   CLL SHR 4
46312   /   066557   ->   JSR 46557
```

```
46313  /  066464   ->  JSR 46464
46314  /  326471   ->  IOR 46471
46315  /  066557   ->  JSR 46557
46316  /  066464   ->  JSR 46464
46317  /  326471   ->  IOR 46471
46320  /  466473   ->  SCA 46473
46321  /  066531   ->  JSR 46531
46322  /  066464   ->  JSR 46464
46323  /  020010   ->  CLA
46324  /  326665   ->  IOR 46665
46325  /  166556   ->  AND 46556
46326  /  756335   ->  JNA 46335
46327  /  626255   ->  ISZ 46255
46330  /  136255   ->  JMP I 46255 (0000)
46331  /  076714   ->  JSR I 46714 (44124)
46332  /  777777   ->  LDL -0001
46333  /  426473   ->  STA 46473
46334  /  024000   ->  SKP
46335  /  000001   ->  LDL 0001
46336  /  126327   ->  JMP 46327
46337  /  326471   ->  IOR 46471
46340  /  366473   ->  XOR 46473
46341  /  426472   ->  STA 46472
46342  /  166676   ->  AND 46676
46343  /  756413   ->  JNA 46413
46344  /  000360   ->  LDL 0360
46345  /  166472   ->  AND 46472
46346  /  756376   ->  JNA 46376
46347  /  000017   ->  LDL 0017
46350  /  166471   ->  AND 46471
46351  /  025000   ->  SNA
46352  /  000012   ->  LDL 0012
46353  /  466472   ->  SCA 46472
46354  /  000017   ->  LDL 0017
46355  /  166473   ->  AND 46473
46356  /  025000   ->  SNA
46357  /  000012   ->  LDL 0012
46360  /  020006   ->  NAC
46361  /  226472   ->  ADD 46472
46362  /  025000   ->  SNA
46363  /  126375   ->  JMP 46375
46364  /  026000   ->  SPA
46365  /  126376   ->  JMP 46376
46366  /  466472   ->  SCA 46472
46367  /  000001   ->  LDL 0001
46370  /  066557   ->  JSR 46557
46371  /  066464   ->  JSR 46464
46372  /  666472   ->  DSZ 46472
46373  /  126367   ->  JMP 46367
46374  /  126317   ->  JMP 46317
46375  /  126413   ->  JMP 46413
46376  /  020010   ->  CLA
46377  /  326671   ->  IOR 46671
46400  /  326660   ->  IOR 46660
46401  /  076700   ->  JSR I 46700 (45362)
46402  /  000000   ->  0
46403  /  000000   ->  0
46404  /  000000   ->  0
46405  /  066531   ->  JSR 46531
46406  /  066446   ->  JSR 46446
46407  /  020010       CLA
46410  /  326660   ->  IOR 46660
46411  /  076700   ->  JSR I 46700 (45362)
```

```
46412  /  126302   ->  JMP 46302
46413  /  326660       IOR 46660
46414  /  076700   ->  JSR I 46700 (45362)
46415  /  326663   ->  IOR 46663
46416  /  076700   ->  JSR I 46700 (45362)
46417  /  326657   ->  IOR 46657
46420  /  076700   ->  JSR I 46700 (45362)
46421  /  066531   ->  JSR 46531
46422  /  066430   ->  JSR 46430
46423  /  126272   ->  JMP 46272
46424  /  000000   ->  0
46425  /  000000   ->  0
46426  /  000000   ->  0
46427  /  000000   ->  0
46430  /  000000   ->  0
46431  /  020010   ->  CLA
46432  /  076713   ->  JSR I 46713 (60357)
46433  /  744040   ->  JZA 44040
46434  /  161740   ->  AND 41740
46435  /  220501   ->  ADD 40501
46436  /  043140   ->  JSR Z 3140
46437  /  010624   ->  010624
46440  /  052240   ->  JSR I Z 2240 (702463)
46441  /  100116   ->  JMP Z 0116
46442  /  072520   ->  JSR I 42520 (0001)
46443  /  744040   ->  JZA 44040
46444  /  004040   ->  LDL 4040
46445  /  136430   ->  JMP I 46430 (0000)
46446  /  000000   ->  0
46447  /  020010   ->  CLA
46450  /  076713   ->  JSR I 46713 (60357)
46451  /  744040   ->  JZA 44040
46452  /  240523   ->  SUB Z 0523
46453  /  244003   ->  SUB Z 4003
46454  /  171616   ->  AND I 41616 (262222)
46455  /  402214   ->  STA Z 2214
46456  /  234022   ->  ADD I 44022 (0007)
46457  /  043140   ->  JSR Z 3140
46460  /  052222   ->  JSR I Z 2222 (43004)
46461  /  172274   ->  AND I 42274 (742516)
46462  /  404000   ->  STA Z 4000
46463  /  136446   ->  JMP I 46446 (0000)
46464  /  000000   ->  0
46465  /  626530   ->  ISZ 46530
46466  /  020000   ->  NOP
46467  /  076714   ->  JSR I 46714 (44124)
46470  /  126330   ->  JMP 46330
46471  /  000000   ->  0
46472  /  000000   ->  0
46473  /  000000   ->  0
46474  /  000000   ->  0
46475  /  166677   ->  AND 46677
46476  /  426716   ->  STA 46716
46477  /  326664   ->  IOR 46664
46500  /  326657   ->  IOR 46657
46501  /  466520   ->  SCA 46520
46502  /  066531   ->  JSR 46531
46503  /  126521   ->  JMP 46521
46504  /  326663   ->  IOR 46663
46505  /  076700   ->  JSR I 46700 (45362)
46506  /  326520   ->  IOR 46520
46507  /  076700   ->  JSR I 46700 (45362)
46510  /  326661   ->  IOR 46661
```

```
46511  /  076700  => JSR I 46700 (45362)
46512  /  166677  => AND 46677
46513  /  366716  => XOR 46716
46514  /  021010  => SZA CLA
46515  /  126523  => JMP 46523
46516  /  626474  => ISZ 46474
46517  /  136474  => JMP I 46474 (0000)
46520  /  000000  => 0
46521  /  626526  => ISZ 46526
46522  /  126504  => JMP 46504
46523  /  626527  => ISZ 46527
46524  /  020000  => NOP
46525  /  126517  => JMP 46517
46526  /  000000  => 0
46527  /  000000  => 0
46530  /  000000  => 0
46531  /  000000  => 0
46532  /  001750  => LDL 1750
46533  /  466554  => SCA 46554
46534  /  020010  => CLA
46535  /  326661  => IOR 46661
46536  /  076700  => JSR I 46700 (45362)
46537  /  426556  => STA 46556
46540  /  166667  => AND 46667
46541  /  756552  => JNA 46552
46542  /  001750  => LDL 1750
46543  /  466555  => SCA 46555
46544  /  336702  => IOR I 46702 (45434)
46545  /  666555  => DSZ 46555
46546  /  126545  => JMP 46545
46547  /  666554  => DSZ 46554
46550  /  126534  => JMP 46534
46551  /  024010  => SKP CLA
46552  /  626531  => ISZ 46531
46553  /  136531  => JMP I 46531 (0000)
46554  /  000000  => 0
46555  /  000000  => 0
46556  /  000000  => 0
46557  /  000000  => 0
46560  /  166677  => AND 46677
46561  /  426716  => STA 46716
46562  /  466565  => SCA 46565
46563  /  000000  => 0
46564  /  756572  => JNA 46572
46565  /  000000  => 0
46566  /  066474  => JSR 46474
46567  /  024000  => SKP
46570  /  626557  => ISZ 46557
46571  /  136557  => JMP I 46557 (0000)
46572  /  000012  => LDL 0012
46573  /  566565  => SNW 46565
46574  /  466565  => SCA 46565
46575  /  020010  => CLA
46576  /  326631  => IOR 46631
46577  /  020000  => NOP
46600  /  066635  => JSR 46635
46601  /  020010  => CLA
46602  /  326671  => IOR 46671
46603  /  326660  => IOR 46660
46604  /  076700  => JSR I 46700 (45362)
46605  /  020010  => CLA
46606  /  326632  => IOR 46632
46607  /  020000  => NOP
```

```
46610  /  066635   ->   JSR 46635
46611  /  020010        CLA
46612  /  326660   ->   IOR 46660
46613  /  076700   ->   JSR I 46700 (45362)
46614  /  020010   ->   CLA
46615  /  326633   ->   IOR 46633
46616  /  020000   ->   NOP
46617  /  066635   ->   JSR 46635
46620  /  666565   ->   DSZ 46565
46621  /  126601   ->   JMP 46601
46622  /  020010   ->   CLA
46623  /  326634   ->   IOR 46634
46624  /  020000   ->   NOP
46625  /  066635   ->   JSR 46635
46626  /  626557   ->   ISZ 46557
46627  /  020000   ->   NOP
46630  /  136557   ->   JMP I 46557 (0000)
46631  /  000620   ->   LDL 0620
46632  /  000076   ->   LDL 0076
46633  /  000046   ->   LDL 0046
46634  /  000062   ->   LDL 0062
46635  /  000000   ->   0
46636  /  426645   ->   STA 46645
46637  /  746643   ->   JZA 46643
46640  /  066646   ->   JSR 46646
46641  /  666645   ->   DSZ 46645
46642  /  126640   ->   JMP 46640
46643  /  020010   ->   CLA
46644  /  136635   ->   JMP I 46635 (0000)
46645  /  000000   ->   0
46646  /  000000   ->   0
46647  /  000144   ->   LDL 0144
46650  /  466656   ->   SCA 46656
46651  /  336702   ->   IOR I 46702 (45434)
46652  /  666656   ->   DSZ 46656
46653  /  126652   ->   JMP 46652
46654  /  020010   ->   CLA
46655  /  136646   ->   JMP I 46646 (0000)
46656  /  000000   ->   0
46657  /  020000   ->   NOP
46660  /  021000   ->   SZA
46661  /  220000   ->   ADD 40000
46662  /  221000   ->   ADD 41000
46663  /  027000   ->   SPA SNA
46664  /  000020   ->   LDL 0020
46665  /  000040   ->   LDL 0040
46666  /  000100   ->   LDL 0100
46667  /  000200   ->   LDL 0200
46670  /  000020   ->   LDL 0020
46671  /  000002   ->   LDL 0002
46672  /  000010   ->   LDL 0010
46673  /  000004   ->   LDL 0004
46674  /  000014   ->   LDL 0014
46675  /  011000   ->   011000
46676  /  777400   ->   LDL -0400
46677  /  000017   ->   LDL 0017
46700  /  045362   ->   JSR Z 5362
46701  /  045440   ->   JSR Z 5440
46702  /  045434   ->   JSR Z 5434
46703  /  045423   ->   JSR Z 5423
46704  /  210000   ->   ADD I Z 0000 (101003)
46705  /  211000   ->   ADD I Z 1000 (244156)
46706  /  212000   ->   ADD I Z 2000 (101773)
```

```
46707  /  213000  => ADD I Z 3000 (644110)
46710  /  010000  => 010000
46711  /  012000  => AIL
46712  /  013000  => 013000
46713  /  060357  => JSR 40357
46714  /  044124  => JSR Z 4124
46715  /  000000  => 0
46716  /  000000  => 0
46717  /  000000  => 0
46720  /  167040  => AND 47040
46721  /  467036  => SCA 47036
46722  /  327041  => IOR 47041
46723  /  077050  => JSR I 47050 (45362)
46724  /  427037  => STA 47037
46725  /  167042  => AND 47042
46726  /  746756  => JZA 46756
46727  /  000200  => LDL 0200
46730  /  167036  => AND 47036
46731  /  746756  => JZA 46756
46732  /  000007  => LDL 0007
46733  /  167036  => AND 47036
46734  /  267043  => SUB 47043
46735  /  025000  => SNA
46736  /  126754  => JMP 46754
46737  /  026000  => SPA
46740  /  126761  => JMP 46761
46741  /  000007  => LDL 0007
46742  /  167037  => AND 47037
46743  /  267043  => SUB 47043
46744  /  027010  => SPA SNA CLA
46745  /  126756  => JMP 46756
46746  /  000010  => LDL 0010
46747  /  167036  => AND 47036
46750  /  756756  => JNA 46756
46751  /  000010  => LDL 0010
46752  /  167037  => AND 47037
46753  /  756756  => JNA 46756
46754  /  000400  => LDL 0400
46755  /  024000  => SKP
46756  /  002400  => LDL 2400
46757  /  327036  => IOR 47036
46760  /  136717  => JMP I 46717 (0000)
46761  /  000007  => LDL 0007
46762  /  167037  => AND 47037
46763  /  267043  => SUB 47043
46764  /  022010  => SMA CLA
46765  /  126756  => JMP 46756
46766  /  000003  => LDL 0003
46767  /  167036  => AND 47036
46770  /  367044  => XOR 47044
46771  /  747020  => JZA 47020
46772  /  000003  => LDL 0003
46773  /  167037  => AND 47037
46774  /  367044  => XOR 47044
46775  /  757003  => JNA 47003
46776  /  000030  => LDL 0030
46777  /  167036  => AND 47036
47000  /  367045  => XOR 47045
47001  /  746754  => JZA 46754
47002  /  126756  => JMP 46756
47003  /  327036  => IOR 47036
47004  /  367037  => XOR 47037
47005  /  427010  => STA 47010
```

| | | | |
|---|---|---|---|
| 47006 | / | 167046 | AND 47046 |
| 47007 | / | 746754 | JZA 46754 |
| 47010 | / | 000000 | 0 |
| 47011 | / | 167047 | AND 47047 |
| 47012 | / | 756756 | JNA 46756 |
| 47013 | / | 000030 | LDL 0030 |
| 47014 | / | 367036 | XOR 47036 |
| 47015 | / | 167047 | AND 47047 |
| 47016 | / | 746756 | JZA 46756 |
| 47017 | / | 126754 | JMP 46754 |
| 47020 | / | 000003 | LDL 0003 |
| 47021 | / | 167037 | AND 47037 |
| 47022 | / | 367044 | XOR 47044 |
| 47023 | / | 746754 | JZA 46754 |
| 47024 | / | 000030 | LDL 0030 |
| 47025 | / | 167037 | AND 47037 |
| 47026 | / | 367045 | XOR 47045 |
| 47027 | / | 746754 | JZA 46754 |
| 47030 | / | 126756 | JMP 46756 |
| 47031 | / | 000000 | 0 |
| 47032 | / | 000000 | 0 |
| 47033 | / | 000000 | 0 |
| 47034 | / | 000000 | 0 |
| 47035 | / | 000000 | 0 |
| 47036 | / | 000000 | 0 |
| 47037 | / | 000000 | 0 |
| 47040 | / | 000377 | LDL 0377 |
| 47041 | / | 211000 | ADD I Z 1000 (244156) |
| 47042 | / | 000200 | LDL 0200 |
| 47043 | / | 000004 | LDL 0004 |
| 47044 | / | 000003 | LDL 0003 |
| 47045 | / | 000010 | LDL 0010 |
| 47046 | / | 000070 | LDL 0070 |
| 47047 | / | 000030 | LDL 0030 |
| 47050 | / | 045362 | JSR Z 5362 |
| 47051 | / | 000000 | 0 |
| 47052 | / | 477612 | SCA I 47612 (45753) |
| 47053 | / | 000004 | LDL 0004 |
| 47054 | / | 467065 | SCA 47065 |
| 47055 | / | 077610 | JSR I 47610 (46150) |
| 47056 | / | 024000 | SKP |
| 47057 | / | 127063 | JMP 47063 |
| 47060 | / | 667065 | DSZ 47065 |
| 47061 | / | 127055 | JMP 47055 |
| 47062 | / | 024000 | SKP |
| 47063 | / | 827051 | ISZ 47051 |
| 47064 | / | 137051 | JMP I 47051 (0000) |
| 47065 | / | 000000 | 0 |
| 47066 | / | 000000 | 0 |
| 47067 | / | 000000 | 0 |
| 47070 | / | 000000 | 0 |
| 47071 | / | 000000 | 0 |
| 47072 | / | 467645 | SCA 47645 |
| 47073 | / | 000004 | LDL 0004 |
| 47074 | / | 567646 | SNW 47646 |
| 47075 | / | 000002 | LDL 0002 |
| 47076 | / | 467651 | SCA 47651 |
| 47077 | / | 000020 | LDL 0020 |
| 47100 | / | 567646 | SNW 47646 |
| 47101 | / | 000004 | LDL 0004 |
| 47102 | / | 427647 | STA 47647 |
| 47103 | / | 036240 | CLL SHL 2 |
| 47104 | / | 467653 | SCA 47653 |

```
47105  /  327234   -> IOR 47234
47106  /  467650   -> SCA 47650
47107  /  467652   -> SCA 47652
47110  /  020010   -> CLA
47111  /  627652   -> ISZ 47652
47112  /  327645   -> IOR 47645
47113  /  077607   -> JSR I 47607 (46117)
47114  /  020000   -> NOP
47115  /  077643   -> JSR I 47643 (44160)
47116  /  427224   -> STA 47224
47117  /  477650   -> SCA I 47650 (0000)
47120  /  627650   -> ISZ 47650
47121  /  537611   -> SZW I 47611 (45756)
47122  /  127151   -> JMP 47151
47123  /  000001   -> LDI 0001
47124  /  367652   -> XOR 47652
47125  /  747152   -> JZA 47152
47126  /  000000   -> 0
47127  /  757152   -> JNA 47152
47130  /  777776   -> LDL -0002
47131  /  227650   -> ADD 47650
47132  /  012000   -> AIL
47133  /  427225   -> STA 47225
47134  /  227224   -> ADD 47224
47135  /  026000   -> SPA
47136  /  020006   -> NAC
47137  /  035040   -> CLL SHR 10
47140  /  467226   -> SCA 47226
47141  /  327225   -> IOR 47225
47142  /  267224   -> SUB 47224
47143  /  026000   -> SPA
47144  /  020006   -> NAC
47145  /  267226   -> SUB 47226
47146  /  027010   -> SPA SNA CLA
47147  /  127212   -> JMP 47212
47150  /  024000   -> SKP
47151  /  000001   -> LDI 0001
47152  /  467126   -> SCA 47126
47153  /  467644   -> SCA 47644
47154  /  327652   -> IOR 47652
47155  /  267653   -> SUB 47653
47156  /  026010   -> SPA CLA
47157  /  127110   -> JMP 47110
47160  /  000000   -> 0
47161  /  000000   -> 0
47162  /  000000   -> 0
47163  /  000000   -> 0
47164  /  000000   -> 0
47165  /  327647   -> IOR 47647
47166  /  427223   -> STA 47223
47167  /  020006   -> NAC
47170  /  227650   -> ADD 47650
47171  /  467650   -> SCA 47650
47172  /  467225   -> SCA 47225
47173  /  237650   -> ADD I 47650 (0000)
47174  /  627650   -> ISZ 47650
47175  /  667223   -> DSZ 47223
47176  /  127173   -> JMP 47173
47177  /  026000   -> SPA
47200  /  627225   -> ISZ 47225
47201  /  026000      SPA
47202  /  020006   -> NAC
47203  /  034240   -> CLL SHR 2
```

```
47204   /   527646   ->   SZW 47646
47205   /   034240        CLL SHR ?
47206   /   527225   ->   SZW 47225
47207   /   020006   ->   NAC
47210   /   427224   ->   STA 47224
47211   /   127222   ->   JMP 47222
47212   /   327644   ->   IOR 47644
47213   /   227604   ->   ADD 47604
47214   /   427644   ->   STA 47644
47215   /   267651   ->   SUB 47651
47216   /   026010   ->   SPA CLA
47217   /   127154   ->   JMP 47154
47220   /   627071   ->   ISZ 47071
47221   /   327224   ->   IOR 47224
47222   /   137071   ->   JMP I 47071 (0000)
47223   /   000000   ->   0
47224   /   000000   ->   0
47225   /   000000   ->   0
47226   /   000000   ->   0
47227   /   000000   ->   0
47230   /   000000   ->   0
47231   /   000000   ->   0
47232   /   000000   ->   0
47233   /   000000   ->   0
47234   /   047235   ->   JSR Z 7235
47235   /   000000   ->   0
47236   /   000000   ->   0
47237   /   000000   ->   0
47240   /   000000   ->   0
47241   /   000000   ->   0
47242   /   000000   ->   0
47243   /   000000   ->   0
47244   /   000000   ->   0
47245   /   000000   ->   0
47246   /   000000   ->   0
47247   /   000000   ->   0
47250   /   000000   ->   0
47251   /   000000   ->   0
47252   /   000000   ->   0
47253   /   000000   ->   0
47254   /   000000   ->   0
47255   /   000000   ->   0
47256   /   000000   ->   0
47257   /   000000   ->   0
47260   /   000000   ->   0
47261   /   000000   ->   0
47262   /   000000   ->   0
47263   /   000000   ->   0
47264   /   000000   ->   0
47265   /   000000   ->   0
47266   /   000000   ->   0
47267   /   000000   ->   0
47270   /   000000   ->   0
47271   /   000000   ->   0
47272   /   000000   ->   0
47273   /   000000   ->   0
47274   /   000000   ->   0
47275   /   000000   ->   0
47276   /   000000   ->   0
47277   /   000000   ->   0
47300   /   000000   ->   0
47301   /   000000   ->   0
47302   /   000000   ->   0
```

```
47303   /   000000   ->   0
47304   /   000000   ->   0
47305   /   000000   ->   0
47306   /   000000   ->   0
47307   /   000000   ->   0
47310   /   000000   ->   0
47311   /   000000   ->   0
47312   /   000000   ->   0
47313   /   000000   ->   0
47314   /   000000   ->   0
47315   /   000000   ->   0
47316   /   000000   ->   0
47317   /   000000   ->   0
47320   /   000000   ->   0
47321   /   000000   ->   0
47322   /   000000   ->   0
47323   /   000000   ->   0
47324   /   000000   ->   0
47325   /   000000   ->   0
47326   /   000000   ->   0
47327   /   000000   ->   0
47330   /   000000   ->   0
47331   /   000000   ->   0
47332   /   000000   ->   0
47333   /   000000   ->   0
47334   /   000000   ->   0
47335   /   000000   ->   0
47336   /   000000   ->   0
47337   /   000000   ->   0
47340   /   000000   ->   0
47341   /   000000   ->   0
47342   /   000000   ->   0
47343   /   000000   ->   0
47344   /   000000   ->   0
47345   /   000000   ->   0
47346   /   000000   ->   0
47347   /   000000   ->   0
47350   /   000000   ->   0
47351   /   000000   ->   0
47352   /   000000   ->   0
47353   /   000000   ->   0
47354   /   000000   ->   0
47355   /   000000   ->   0
47356   /   000000   ->   0
47357   /   000000   ->   0
47360   /   000000   ->   0
47361   /   000000   ->   0
47362   /   000000   ->   0
47363   /   000000   ->   0
47364   /   000000   ->   0
47365   /   000000   ->   0
47366   /   000000   ->   0
47367   /   000000   ->   0
47370   /   000000   ->   0
47371   /   000000   ->   0
47372   /   000000   ->   0
47373   /   000000   ->   0
47374   /   000000   ->   0
47375   /   000000   ->   0
47376   /   000000   ->   0
47377   /   000000        0
47400   /   000000   ->   0
47401   /   000000   ->   0
```

```
47402  /  000000   ->   0
47403  /  000000   ->   0
47404  /  000000   ->   0
47405  /  000000   ->   0
47406  /  000000   ->   0
47407  /  000000   ->   0
47410  /  025000   ->   SNA
47411  /  127432   ->   JMP 47432
47412  /  427435   ->   STA 47435
47413  /  026010   ->   SPA CLA
47414  /  000001   ->   LDL 0001
47415  /  467434   ->   SCA 47434
47416  /  327435   ->   IOR 47435
47417  /  026000   ->   SPA
47420  /  020006   ->   NAC
47421  /  427435   ->   STA 47435
47422  /  036140   ->   CLL SHL 1
47423  /  227435   ->   ADD 47435
47424  /  427435   ->   STA 47435
47425  /  036440   ->   CLL SHL 4
47426  /  227435   ->   ADD 47435
47427  /  034640   ->   CLL SHR 6
47430  /  527434   ->   SZW 47434
47431  /  020006   ->   NAC
47432  /  427435   ->   STA 47435
47433  /  137407   ->   JMP I 47407 (0000)
47434  /  000000   ->   0
47435  /  000000   ->   0
47436  /  000000   ->   0
47437  /  167605   ->   AND 47605
47440  /  467506   ->   SCA 47506
47441  /  467511   ->   SCA 47511
47442  /  467510   ->   SCA 47510
47443  /  000700   ->   LDL 0700
47444  /  327506   ->   IOR 47506
47445  /  077613   ->   JSR I 47613 (46717)
47446  /  427507   ->   STA 47507
47447  /  477612   ->   SCA I 47612 (45753)
47450  /  077610   ->   JSR I 47610 (46150)
47451  /  127456   ->   JMP 47456
47452  /  077623   ->   JSR I 47623 (44213)
47453  /  567511   ->   SNW 47511
47454  /  627436   ->   ISZ 47436
47455  /  137436   ->   JMP I 47436 (0000)
47456  /  000600   ->   LDL 0600
47457  /  327506   ->   IOR 47506
47460  /  427507   ->   STA 47507
47461  /  477612   ->   SCA I 47612 (45753)
47462  /  077610   ->   JSR I 47610 (46150)
47463  /  127466   ->   JMP 47466
47464  /  020000   ->   NOP
47465  /  127452   ->   JMP 47452
47466  /  002500   ->   LDL 2500
47467  /  327506   ->   IOR 47506
47470  /  427507   ->   STA 47507
47471  /  477612   ->   SCA I 47612 (45753)
47472  /  077610   ->   JSR I 47610 (46150)
47473  /  127475   ->   JMP 47475
47474  /  127452   ->   JMP 47452
47475  /  000001   ->   LDL 0001
47476  /  467510   ->   SCA 47510
47477  /  002400   ->   LDL 2400
47500  /  327506   ->   IOR 47506
```

```
47501  /  427507  =>  STA 47507
47502  /  077607  =>  JSR I 47607 (46117)
47503  /  627511  =>  ISZ 47511
47504  /  020000  =>  NOP
47505  /  127452  =>  JMP 47452
47506  /  000000  =>  0
47507  /  000000  =>  0
47510  /  000000  =>  0
47511  /  000000  =>  0
47512  /  000000  =>  0
47513  /  000000  =>  0
47514  /  000000  =>  0
47515  /  000000  =>  0
47516  /  167605  =>  AND 47605
47517  /  467555  =>  SCA 47555
47520  /  467510  =>  SCA 47510
47521  /  527561  =>  SZW 47561
47522  /  000700  =>  LDL 0700
47523  /  327606  =>  IOR 47606
47524  /  327555  =>  IOR 47555
47525  /  077613  =>  JSR I 47613 (46717)
47526  /  427507  =>  STA 47507
47527  /  477612  =>  SCA I 47612 (45753)
47530  /  077610  =>  JSR I 47610 (46150)
47531  /  127536  =>  JMP 47536
47532  /  077623  =>  JSR I 47623 (44213)
47533  /  567511  =>  SNW 47511
47534  /  627515  =>  ISZ 47515
47535  /  137515  =>  JMP I 47515 (0000)
47536  /  000600  =>  LDL 0600
47537  /  327555  =>  IOR 47555
47540  /  427507  =>  STA 47507
47541  /  477612  =>  SCA I 47612 (45753)
47542  /  077610  =>  JSR I 47610 (46150)
47543  /  127545  =>  JMP 47545
47544  /  127532  =>  JMP 47532
47545  /  000001  =>  LDL 0001
47546  /  467510  =>  SCA 47510
47547  /  002400  =>  LDL 2400
47550  /  327555  =>  IOR 47555
47551  /  427507  =>  STA 47507
47552  /  077607  =>  JSR I 47607 (46117)
47553  /  627511  =>  ISZ 47511
47554  /  127532  =>  JMP 47532
47555  /  000000  =>  0
47556  /  000000  =>  0
47557  /  000000  =>  0
47560  /  000000  =>  0
47561  /  000001  =>  LDL 0001
47562  /  000000  =>  0
47563  /  077643  =>  JSR I 47643 (44160)
47564  /  137562  =>  JMP I 47562 (0000)
47565  /  000000  =>  0
47566  /  000000  =>  0
47567  /  000000  =>  0
47570  /  000000  =>  0
47571  /  036140  =>  CLL SHL 1
47572  /  427576  =>  STA 47576
47573  /  036240  =>  CLL SHL 2
47574  /  227576  =>  ADD 47576
47575  /  137570  =>  JMP I 47570 (0000)
47576  /  000000  =>  0
47577  /  000000  =>  0
```

```
47600  /  020010   ->   CLA
47601  /  327603   ->   IOR 47603
47602  /  137577   ->   JMP I 47577 (0000)
47603  /  030324   ->   030324
47604  /  000001   ->   LDL 0001
47605  /  000077   ->   LDL 0077
47606  /  000600   ->   LDL 0600
47607  /  046117   ->   JSR Z 6117
47610  /  046150   ->   JSR Z 6150
47611  /  045756   ->   JSR Z 5756
47612  /  045753   ->   JSR Z 5753
47613  /  046717   ->   JSR Z 6717
47614  /  045752   ->   JSR Z 5752
47615  /  045441   ->   JSR Z 5441
47616  /  045763   ->   JSR Z 5763
47617  /  045761   ->   JSR Z 5761
47620  /  045757   ->   JSR Z 5757
47621  /  044536   ->   JSR Z 4536
47622  /  044500   ->   JSR Z 4500
47623  /  044213   ->   JSR Z 4213
47624  /  045137   ->   JSR Z 5137
47625  /  045224   ->   JSR Z 5224
47626  /  044300   ->   JSR Z 4300
47627  /  045362   ->   JSR Z 5362
47630  /  045440   ->   JSR Z 5440
47631  /  045434   ->   JSR Z 5434
47632  /  045423   ->   JSR Z 5423
47633  /  210000   ->   ADD I Z 0000 (100103)
47634  /  211000   ->   ADD I Z 1000 (244156)
47635  /  212000   ->   ADD I Z 2000 (101773)
47636  /  213000   ->   ADD I Z 3000 (644110)
47637  /  010000   ->   010000
47640  /  011000   ->   011000
47641  /  012000   ->   AIL
47642  /  013000   ->   013000
47643  /  044160   ->   JSR Z 4160
47644  /  000000   ->   0
47645  /  000000   ->   0
47646  /  000000   ->   0
47647  /  000000   ->   0
47650  /  000000   ->   0
47651  /  000000   ->   0
47652  /  000000   ->   0
47653  /  000000   ->   0
47654  /  000000   ->   0
47655  /  020010   ->   CLA
47656  /  337741   ->   IOR I 47741 (55434)
47657  /  026000   ->   SPA
47660  /  020006   ->   NAC
47661  /  077734   ->   JSR I 47734 (50004)
47662  /  000702   ->   LDL 0702
47663  /  001130   ->   LDL 1130
47664  /  127707   ->   JMP 47707
47665  /  337742   ->   IOR I 47742 (55431)
47666  /  026000   ->   SPA
47667  /  020006   ->   NAC
47670  /  077734   ->   JSR I 47734 (50004)
47671  /  000702   ->   LDL 0702
47672  /  001130   ->   LDL 1130
47673  /  127707   ->   JMP 47707
47674  /  337743   ->   IOR I 47743 (55426)
47675  /  026000   ->   SPA
47676  /  020006   ->   NAC
```

```
47677  /  067713   => JSR 47713
47700  /  127707   => JMP 47707
47701  /  337744   => IOR I 47744 (55424)
47702  /  026000   => SPA
47703  /  020006   => NAC
47704  /  067713   => JSR 47713
47705  /  024000   => SKP
47706  /  000001   => LDL 0001
47707  /  427746   => STA 47746
47710  /  025010   => SNA CLA
47711  /  627654   => ISZ 47654
47712  /  137654   => JMP I 47654 (0000)
47713  /  000000   => 0
47714  /  427745   => STA 47745
47715  /  077734   => JSR I 47734 (50004)
47716  /  007640   => LDL 7640
47717  /  011610   => 011610
47720  /  024000   => SKP
47721  /  127727   => JMP 47727
47722  /  327745   => IOR 47745
47723  /  077734   => JSR I 47734 (50004)
47724  /  002570   => LDL 2570
47725  /  003100   => LDL 3100
47726  /  024000   => SKP
47727  /  627713   => ISZ 47713
47730  /  137713   => JMP I 47713 (0000)
47731  /  000000   => 0
47732  /  046117   => JSR Z 6117
47733  /  045362   => JSR Z 5362
47734  /  050004   => JSR I Z 0004 (320600)
47735  /  055432   => JSR I Z 5432 (132302)
47736  /  055427   => JSR I Z 5427 (132302)
47737  /  055433   => JSR I Z 5433 (616200)
47740  /  055430   => JSR I Z 5430 (616100)
47741  /  055434   => JSR I Z 5434 (12000)
47742  /  055431   => JSR I Z 5431 (11000)
47743  /  055426   => JSR I Z 5426 (10000)
47744  /  055424   => JSR I Z 5424 (132302)
47745  /  000000   => 0
47746  /  000000   => 0
47747  /  000000   => 0
47750  /  020010   => CLA
47751  /  337772   => IOR I 47772 (55413)
47752  /  277774   => SUB I 47774 (55421)
47753  /  077776   => JSR I 47776 (50004)
47754  /  777730   => LDL -0050
47755  /  000050   => LDL 0050
47756  /  127764   => JMP 47764
47757  /  337773   => IOR I 47773 (55412)
47760  /  277775   => SUB I 47775 (55420)
47761  /  077776   => JSR I 47776 (50004)
47762  /  777730   => LDL -0050
47763  /  000050   => LDL 0050
47764  /  627747   => ISZ 47747
47765  /  020000   => NOP
47766  /  137747   => JMP I 47747 (0000)
47767  /  000000   => 0
47770  /  000000   => 0
47771  /  000000   => 0
47772  /  055413   => JSR I Z 5413 (132202)
47773  /  055412   => JSR I Z 5412 (210000)
47774  /  055421   => JSR I Z 5421 (132202)
47775  /  055420   => JSR I Z 5420 (212000)
47776  /  050004   => JSR I Z 0004 (320600)
47777  /  000000   => 0
```

```
50004  /  000000  => 0
50005  /  420020  => STA 50020
50006  /  270004  => SUB I 50004 (0000)
50007  /  620004  => ISZ 50004
50010  /  026010  => SPA CLA
50011  /  120016  => JMP 50016
50012  /  320020  => IOR 50020
50013  /  270004  => SUB I 50004 (0000)
50014  /  620004  => ISZ 50004
50015  /  027010  => SPA SNA CLA
50016  /  620004  => ISZ 50004
50017  /  130004  => JMP I 50004 (0000)
50020  /  000000  => 0
50021  /  000000  => 0
50022  /  020010  => CLA
50023  /  330050  => IOR I 50050 (55405)
50024  /  070053  => JSR I 50053 (50004)
50025  /  766170  => JNL 56170
50026  /  011610  => 011610
50027  /  120040  => JMP 50040
50030  /  330051  => IOR I 50051 (55404)
50031  /  070053  => JSR I 50053 (50004)
50032  /  766170  => JNL 56170
50033  /  011610  => 011610
50034  /  120040  => JMP 50040
50035  /  620021  => ISZ 50021
50036  /  020000  => NOP
50037  /  130021  => JMP I 50021 (0000)
50040  /  020010  => CLA
50041  /  320047  => IOR 50047
50042  /  070052  => JSR I 50052 (45362)
50043  /  120037  => JMP 50037
50044  /  000000  => 0
50045  /  000000  => 0
50046  /  000000  => 0
50047  /  011000  => 011000
50050  /  055405  => JSR I Z 5405 (131513)
50051  /  055404  => JSR I Z 5404 (46631)
50052  /  045362  => JSR Z 5362
50053  /  050004  => JSR I Z 0004 (320600)
50054  /  000000  => 0
50055  /  020010  => CLA
50056  /  330107  => IOR I 50107 (55421)
50057  /  070106  => JSR I 50106 (50004)
50060  /  777634  => LDL -0144
50061  /  000144  => LDL 0144
50062  /  120103  => JMP 50103
50063  /  330110  => IOR I 50110 (55420)
50064  /  070106  => JSR I 50106 (50004)
50065  /  777634  => LDL -0144
50066  /  000144  => LDL 0144
50067  /  120103  => JMP 50103
50070  /  330111  => IOR I 50111 (55405)
50071  /  070106  => JSR I 50106 (50004)
50072  /  777470  => LDL -0310
50073  /  000310  => LDL 0310
50074  /  120103  => JMP 50103
50075  /  330112  => IOR I 50112 (55404)
50076  /  070106     JSR I 50106 (50004)
50077  /  777470  => LDL -0310
50100  /  000310  => LDL 0310
50101  /  024000  => SKP
50102  /  620054     ISZ 50054
50103  /  130054  => JMP I 50054 (0000)
50104  /  000000  => 0
50105  /  000000  => 0
```

```
50106   /   050004   ⊃⊃   JSR I Z 0004 (320600)
50107   /   055421   ⊃⊃   JSR I Z 5421 (132202)
50110   /   055420   ⊃⊃   JSR I Z 5420 (212000)
50111   /   055405   ⊃⊃   JSR I Z 5405 (131513)
50112   /   055404   ⊃⊃   JSR I Z 5404 (46631)
50113   /   000000   ⊃⊃   0
50114   /   020010   ⊃⊃   CLA
50115   /   330157   ⊃⊃   IOR I 50157 (55413)
50116   /   070161   ⊃⊃   JSR I 50161 (50004)
50117   /   766252   ⊃⊃   JNL 56252
50120   /   770140   ⊃⊃   LDL -7640
50121   /   120140   ⊃⊃   JMP 50140
50122   /   330157   ⊃⊃   IOR I 50157 (55413)
50123   /   026000   ⊃⊃   SPA
50124   /   020006   ⊃⊃   NAC
50125   /   420152   ⊃⊃   STA 50152
50126   /   020006   ⊃⊃   NAC
50127   /   220155   ⊃⊃   ADD 50155
50130   /   027000   ⊃⊃   SPA SNA
50131   /   000012   ⊃⊃   LDL 0012
50132   /   460153   ⊃⊃   SCA 50153
50133   /   320152   ⊃⊃   IOR 50152
50134   /   070162   ⊃⊃   JSR I 50162 (43715)
50135   /   050153   ⊃⊃   JSR I Z 0153 (0375)
50136   /   420154   ⊃⊃   STA 50154
50137   /   120151   ⊃⊃   JMP 50151
50140   /   330160   ⊃⊃   IOR I 50160 (55412)
50141   /   070161   ⊃⊃   JSR I 50161 (50004)
50142   /   766252   ⊃⊃   JNL 56252
50143   /   770140   ⊃⊃   LDL -7640
50144   /   120147   ⊃⊃   JMP 50147
50145   /   330160   ⊃⊃   IOR I 50160 (55412)
50146   /   120123   ⊃⊃   JMP 50123
50147   /   620113   ⊃⊃   ISZ 50113
50150   /   020000   ⊃⊃   NOP
50151   /   130113   ⊃⊃   JMP I 50113 (0000)
50152   /   000000   ⊃⊃   0
50153   /   000000   ⊃⊃   0
50154   /   000000   ⊃⊃   0
50155   /   011610   ⊃⊃   011610
50156   /   055437   ⊃⊃   JSR I Z 5437 (13000)
50157   /   055413   ⊃⊃   JSR I Z 5413 (132202)
50160   /   055412   ⊃⊃   JSR I Z 5412 (210000)
50161   /   050004   ⊃⊃   JSR I Z 0004 (320600)
50162   /   043715   ⊃⊃   JSR Z 3715
50163   /   000000   ⊃⊃   0
50164   /   020010   ⊃⊃   CLA
50165   /   460263   ⊃⊃   SCA 50263
50166   /   330262   ⊃⊃   IOR I 50262 (55412)
50167   /   060225   ⊃⊃   JSR 50225
50170   /   120206   ⊃⊃   JMP 50206
50171   /   000040   ⊃⊃   LDL 0040
50172   /   460263   ⊃⊃   SCA 50263
50173   /   330261   ⊃⊃   IOR I 50261 (55413)
50174   /   060250   ⊃⊃   JSR 50250
50175   /   120177   ⊃⊃   JMP 50177
50176   /   620163   ⊃⊃   ISZ 50163
50177   /   320263   ⊃⊃   IOR 50263
50200   /   130163   ⊃⊃   JMP I 50163 (0000)
50201   /   000000   ⊃⊃   0
50202   /   000000   ⊃⊃   0
50203   /   000000   ⊃⊃   0
50204   /   000000   ⊃⊃   0
50205   /   000000   ⊃⊃   0
50206   /   330261   ⊃⊃   IOR I 50261 (55413)
```

```
50207   /   060225   ->   JSR 50225
50210   /   120177   ->   JMP 50177
50211   /   000020   ->   LDL 0020
50212   /   460263   ->   SCA 50263
50213   /   330262   ->   IOR I 50262 (55412)
50214   /   060250   ->   JSR 50250
50215   /   120177   ->   JMP 50177
50216   /   120176   ->   JMP 50176
50217   /   000000   ->   0
50220   /   000000   ->   0
50221   /   000000   ->   0
50222   /   000000   ->   0
50223   /   000000   ->   0
50224   /   000000   ->   0
50225   /   000000   ->   0
50226   /   020000   ->   NOP
50227   /   020006   ->   NAC
50230   /   460245   ->   SCA 50245
50231   /   320246   ->   IOR 50246
50232   /   260245   ->   SUB 50245
50233   /   023000   ->   SMA SZA
50234   /   750240   ->   JNA 50240
50235   /   220247   ->   ADD 50247
50236   /   022010   ->   SMA CLA
50237   /   620225   ->   ISZ 50225
50240   /   130225   ->   JMP I 50225 (0000)
50241   /   000000   ->   0
50242   /   000000   ->   0
50243   /   000000   ->   0
50244   /   000000   ->   0
50245   /   000000   ->   0
50246   /   011444   ->   011444
50247   /   000310   ->   LDL 0310
50250   /   000000   ->   0
50251   /   026000   ->   SPA
50252   /   020006   ->   NAC
50253   /   260257   ->   SUB 50257
50254   /   027010   ->   SPA SNA CLA
50255   /   620250   ->   ISZ 50250
50256   /   130250   ->   JMP I 50250 (0000)
50257   /   000144   ->   LDL 0144
50260   /   000000   ->   0
50261   /   055413   ->   JSR I Z 5413 (132202)
50262   /   055412   ->   JSR I Z 5412 (210000)
50263   /   000000   ->   0
50264   /   000000   ->   0
50265   /   000003   ->   LDL 0003
50266   /   460450   ->   SCA 50450
50267   /   000003   ->   LDL 0003
50270   /   460451   ->   SCA 50451
50271   /   000464   ->   LDL 0464
50272   /   070423   ->   JSR I 50423 (46117)
50273   /   020000   ->   NOP
50274   /   470426        SCA I 50426 (55412)
50275   /   000424   ->   LDL 0424
50276   /   070423   ->   JSR I 50423 (46117)
50277   /   020000   ->   NOP
50300   /   430425        STA I 50425 (55413)
50301   /   270426        SUB I 50426 (55412)
50302   /   026010   ->   SPA CLA
50303   /   330444   ->   IOR I 50444 (46673)
50304   /   430427   ->   STA I 50427 (55437)
50305   /   330443   ->   IOR I 50443 (46672)
50306   /   420452   ->   STA 50452
50307   /   330441   ->   IOR I 50441 (46670)
```

```
50310  /  330431  ->  IOR I 50431 (46660)
50311  /  070424  ->  JSR I 50424 (45362)
50312  /  000464  ->  LDL 0464
50313  /  070423  ->  JSR I 50423 (46117)
50314  /  020000  ->  NOP
50315  /  000424  ->  LDL 0424
50316  /  070423  ->  JSR I 50423 (46117)
50317  /  020000  ->  NOP
50320  /  020010  ->  CLA
50321  /  320452  ->  IOR 50452
50322  /  330431  ->  IOR I 50431 (46660)
50323  /  070424  ->  JSR I 50424 (45362)
50324  /  005464  ->  LDL 5464
50325  /  070423  ->  JSR I 50423 (46117)
50326  /  020000  ->  NOP
50327  /  005424  ->  LDL 5424
50330  /  070423  ->  JSR I 50423 (46117)
50331  /  020000  ->  NOP
50332  /  020010  ->  CLA
50333  /  330433  ->  IOR I 50433 (46662)
50334  /  070424  ->  JSR I 50424 (45362)
50335  /  170445  ->  AND I 50445 (46674)
50336  /  360452  ->  XOR 50452
50337  /  740343  ->  JZA 50343
50340  /  660451  ->  DSZ 50451
50341  /  120320  ->  JMP 50320
50342  /  120415  ->  JMP 50415
50343  /  330441  ->  IOR I 50441 (46670)
50344  /  320452  ->  IOR 50452
50345  /  330431  ->  IOR I 50431 (46660)
50346  /  070424  ->  JSR I 50424 (45362)
50347  /  004464  ->  LDL 4464
50350  /  070423  ->  JSR I 50423 (46117)
50351  /  020000  ->  NOP
50352  /  004424  ->  LDL 4424
50353  /  070423  ->  JSR I 50423 (46117)
50354  /  020000  ->  NOP
50355  /  020010  ->  CLA
50356  /  330441  ->  IOR I 50441 (46670)
50357  /  330431  ->  IOR I 50431 (46660)
50360  /  070424  ->  JSR I 50424 (45362)
50361  /  020010  ->  CLA
50362  /  230425  ->  ADD I 50425 (55413)
50363  /  230426  ->  ADD I 50426 (55412)
50364  /  026000  ->  SPA
50365  /  020006  ->  NAC
50366  /  260422  ->  SUB 50422
50367  /  026010  ->  SPA CLA
50370  /  120414  ->  JMP 50414
50371  /  006464  ->  LDL 6464
50372  /  070423  ->  JSR I 50423 (46117)
50373  /  020000  ->  NOP
50374  /  420446  ->  STA 50446
50375  /  270426  ->  SUB I 50426 (55412)
50376  /  026000  ->  SPA
50377  /  020006  ->  NAC
50400  /  460453  ->  SCA 50453
50401  /  000424  ->  LDL 0424
50402  /  070423  ->  JSR I 50423 (46117)
50403  /  020000  ->  NOP
50404  /  420447  ->  STA 50447
50405  /  270425  ->  SUB I 50425 (55413)
50406  /  026000  ->  SPA
50407  /  020006  ->  NAC
50410  /  220453  ->  ADD 50453
```

```
50411  /  260422   =>   SUB 50422
50412  /  026010   =>   SPA CLA
50413  /  120417   =>   JMP 50417
50414  /  620264   =>   ISZ 50264
50415  /  020010   =>   CLA
50416  /  130264   =>   JMP I 50264 (0000)
50417  /  660450   =>   DSZ 50450
50420  /  120267   =>   JMP 50267
50421  /  120415   =>   JMP 50415
50422  /  000620   =>   LDL 0620
50423  /  046117   =>   JSR Z 6117
50424  /  045362   =>   JSR Z 5362
50425  /  055413   =>   JSR I Z 5413 (132202)
50426  /  055412   =>   JSR I Z 5412 (210000)
50427  /  055437   =>   JSR I Z 5437 (13000)
50430  /  046657   =>   JSR Z 6657
50431  /  046660   =>   JSR Z 6660
50432  /  046661   =>   JSR Z 6661
50433  /  046662   =>   JSR Z 6662
50434  /  046663   =>   JSR Z 6663
50435  /  046664   =>   JSR Z 6664
50436  /  046665   =>   JSR Z 6665
50437  /  046666   =>   JSR Z 6666
50440  /  046667   =>   JSR Z 6667
50441  /  046670   =>   JSR Z 6670
50442  /  046671   =>   JSR Z 6671
50443  /  046672   =>   JSR Z 6672
50444  /  046673   =>   JSR Z 6673
50445  /  046674   =>   JSR Z 6674
50446  /  000000   =>   0
50447  /  000000   =>   0
50450  /  000000   =>   0
50451  /  000000   =>   0
50452  /  000000   =>   0
50453  /  000000   =>   0
50454  /  000000   =>   0
50455  /  460504   =>   SCA 50504
50456  /  320503   =>   IOR 50503
50457  /  460506   =>   SCA 50506
50460  /  320504   =>   IOR 50504
50461  /  032640   =>   CLL RTL 6
50462  /  420505   =>   STA 50505
50463  /  032100   =>   RTL 1
50464  /  161060   =>   AND 51060
50465  /  321061   =>   IOR 51061
50466  /  071066   =>   JSR I 51066 (60103)
50467  /  320506   =>   IOR 50506
50470  /  361062   =>   XOR 51062
50471  /  750474   =>   JNA 50474
50472  /  321063   =>   IOR 51063
50473  /  071066   =>   JSR I 51066 (60103)
50474  /  320505   =>   IOR 50505
50475  /  032440   =>   CLL RTL 4
50476  /  420505   =>   STA 50505
50477  /  660506   =>   DSZ 50506
50500  /  120463   =>   JMP 50463
50501  /  020010   =>   CLA
50502  /  130454   =>   JMP I 50454 (0000)
50503  /  000004   =>   LDL 0004
50504  /  000000   =>   0
50505  /  000000   =>   0
50506  /  000000   =>   0
50507  /  060230   =>   JSR 50230
50510  /  000005   =>   LDL 0005
50511  /  460522   =>   SCA 50522
```

```
50512  /  060524  ->  JSR 50524
50513  /  120517  ->  JMP 50517
50514  /  420523  ->  STA 50523
50515  /  620507  ->  ISZ 50507
50516  /  130507  ->  JMP I 50507 (60230)
50517  /  660522  ->  DSZ 50522
50520  /  120512  ->  JMP 50512
50521  /  120516  ->  JMP 50516
50522  /  000005  ->  LDL 0005
50523  /  000000  ->  0
50524  /  050513  ->  JSR I Z 0513 (442467)
50525  /  000003  ->  LDL 0003
50526  /  460711  ->  SCA 50711
50527  /  460726  ->  SCA 50726
50530  /  460712  ->  SCA 50712
50531  /  020010  ->  CLA
50532  /  320713  ->  IOR 50713
50533  /  460714  ->  SCA 50714
50534  /  320715  ->  IOR 50715
50535  /  460716  ->  SCA 50716
50536  /  320717  ->  IOR 50717
50537  /  060727  ->  JSR 50727
50540  /  120710  ->  JMP 50710
50541  /  320750  ->  IOR 50750
50542  /  160720  ->  AND 50720
50543  /  750556  ->  JNA 50556
50544  /  320750  ->  IOR 50750
50545  /  160721  ->  AND 50721
50546  /  750577  ->  JNA 50577
50547  /  320750  ->  IOR 50750
50550  /  160722  ->  AND 50722
50551  /  750621  ->  JNA 50621
50552  /  320750  ->  IOR 50750
50553  /  160723  ->  AND 50723
50554  /  750643  ->  JNA 50643
50555  /  120710  ->  JMP 50710
50556  /  320750  ->  IOR 50750
50557  /  160713  ->  AND 50713
50560  /  360720  ->  XOR 50720
50561  /  750710  ->  JNA 50710
50562  /  320750  ->  IOR 50750
50563  /  160724  ->  AND 50724
50564  /  320712  ->  IOR 50712
50565  /  460712  ->  SCA 50712
50566  /  320714  ->  IOR 50714
50567  /  360720  ->  XOR 50720
50570  /  460714  ->  SCA 50714
50571  /  660716  ->  DSZ 50716
50572  /  024000  ->  SKP
50573  /  120666  ->  JMP 50666
50574  /  320717  ->  IOR 50717
50575  /  060727  ->  JSR 50727
50576  /  120710  ->  JMP 50710
50577  /  320750  ->  IOR 50750
50600  /  160713  ->  AND 50713
50601  /  360721  ->  XOR 50721
50602  /  750710  ->  JNA 50710
50603  /  320750  ->  IOR 50750
50604  /  160724  ->  AND 50724
50605  /  036440  ->  CLL SHL 4
50606  /  320712  ->  IOR 50712
50607  /  460712  ->  SCA 50712
50610  /  320714  ->  IOR 50714
50611  /  360721  ->  XOR 50721
50612  /  460714  ->  SCA 50714
```

| | | | | |
|---|---|---|---|---|
| 50613 | / | 660716 | -> | DSZ 50716 |
| 50614 | / | 024000 | -> | SKP |
| 50615 | / | 120666 | -> | JMP 50666 |
| 50616 | / | 320717 | -> | IOR 50717 |
| 50617 | / | 060727 | -> | JSR 50727 |
| 50620 | / | 120710 | -> | JMP 50710 |
| 50621 | / | 320750 | -> | IOR 50750 |
| 50622 | / | 160713 | -> | AND 50713 |
| 50623 | / | 360722 | -> | XOR 50722 |
| 50624 | / | 750710 | -> | JNA 50710 |
| 50625 | / | 320750 | -> | IOR 50750 |
| 50626 | / | 160724 | -> | AND 50724 |
| 50627 | / | 037040 | -> | CLL SHL 10 |
| 50630 | / | 320712 | -> | IOR 50712 |
| 50631 | / | 460712 | -> | SCA 50712 |
| 50632 | / | 320714 | -> | IOR 50714 |
| 50633 | / | 360722 | -> | XOR 50722 |
| 50634 | / | 460714 | -> | SCA 50714 |
| 50635 | / | 660716 | -> | DSZ 50716 |
| 50636 | / | 024000 | -> | SKP |
| 50637 | / | 120666 | -> | JMP 50666 |
| 50640 | / | 320717 | -> | IOR 50717 |
| 50641 | / | 060727 | -> | JSR 50727 |
| 50642 | / | 120710 | -> | JMP 50710 |
| 50643 | / | 320750 | -> | IOR 50750 |
| 50644 | / | 160713 | -> | AND 50713 |
| 50645 | / | 360723 | -> | XOR 50723 |
| 50646 | / | 750710 | -> | JNA 50710 |
| 50647 | / | 320750 | -> | IOR 50750 |
| 50650 | / | 160724 | -> | AND 50724 |
| 50651 | / | 037440 | -> | CLL SHL 14 |
| 50652 | / | 320712 | -> | IOR 50712 |
| 50653 | / | 460712 | -> | SCA 50712 |
| 50654 | / | 320714 | -> | IOR 50714 |
| 50655 | / | 360723 | -> | XOR 50723 |
| 50656 | / | 460714 | -> | SCA 50714 |
| 50657 | / | 660716 | -> | DSZ 50716 |
| 50660 | / | 024000 | -> | SKP |
| 50661 | / | 120666 | -> | JMP 50666 |
| 50662 | / | 320717 | -> | IOR 50717 |
| 50663 | / | 060727 | -> | JSR 50727 |
| 50664 | / | 120710 | -> | JMP 50710 |
| 50665 | / | 120556 | -> | JMP 50556 |
| 50666 | / | 020010 | -> | CLA |
| 50667 | / | 320714 | -> | IOR 50714 |
| 50670 | / | 750710 | | JNA 50710 |
| 50671 | / | 320726 | -> | IOR 50726 |
| 50672 | / | 360712 | -> | XOR 50712 |
| 50673 | / | 740703 | -> | JZA 50703 |
| 50674 | / | 660711 | | DSZ 50711 |
| 50675 | / | 024000 | -> | SKP |
| 50676 | / | 120710 | -> | JMP 50710 |
| 50677 | / | 020010 | -> | CLA |
| 50700 | / | 320712 | -> | IOR 50712 |
| 50701 | / | 460726 | -> | SCA 50726 |
| 50702 | / | 120531 | -> | JMP 50531 |
| 50703 | / | 320750 | -> | IOR 50750 |
| 50704 | / | 160725 | -> | AND 50725 |
| 50705 | / | 036640 | -> | CLL SHL 6 |
| 50706 | / | 320712 | -> | IOR 50712 |
| 50707 | / | 620507 | -> | ISZ 50507 |
| 50710 | / | 130507 | -> | JMP I 50507 (60230) |
| 50711 | / | 000003 | -> | LDL 0003 |
| 50712 | / | 000000 | -> | 0 |
| 50713 | / | 001700 | -> | LDL 1700 |

```
50714  /  001700  => LDL 1700
50715  /  000004  => LDL 0004
50716  /  000004  => LDL 0004
50717  /  210000  => ADD I Z 0000 (100103)
50720  /  000100  => LDL 0100
50721  /  000200  => LDL 0200
50722  /  000400  => LDL 0400
50723  /  001000  => LDL 1000
50724  /  000017  => LDL 0017
50725  /  006000  => LDL 6000
50726  /  000000  => 0
50727  /  050540  => JSR I Z 0540 (44002)
50730  /  460746  => SCA 50746
50731  /  003720  => LDL 3720
50732  /  460745  => SCA 50745
50733  /  700747  => PCT 50747
50734  /  020000  => NOP
50735  /  700746  => PCT 50746
50736  /  120742  => JMP 50742
50737  /  460750  => SCA 50750
50740  /  620727  => ISZ 50727
50741  /  130727  => JMP I 50727 (50540)
50742  /  660745  => DSZ 50745
50743  /  120733  => JMP 50733
50744  /  120741  => JMP 50741
50745  /  002424  => LDL 2424
50746  /  210000  => ADD I Z 0000 (100103)
50747  /  000240  => LDL 0240
50750  /  000000  => 0
50751  /  000000  => 0
50752  /  161047  => AND 51047
50753  /  421050  => STA 51050
50754  /  261064  => SUB 51064
50755  /  022010  => SMA CLA
50756  /  121041  => JMP 51041
50757  /  060507  => JSR 50507
50760  /  161047  => AND 51047
50761  /  461056  => SCA 51056
50762  /  321052  => IOR 51052
50763  /  060727  => JSR 50727
50764  /  121041  => JMP 51041
50765  /  020010  => CLA
50766  /  321065  => IOR 51065
50767  /  461054  => SCA 51054
50770  /  060507  => JSR 50507
50771  /  121041  => JMP 51041
50772  /  161047  => AND 51047
50773  /  421055  => STA 51055
50774  /  361056  => XOR 51056
50775  /  751001  => JNA 51001
50776  /  661054  => DSZ 51054
50777  /  120770  => JMP 50770
51000  /  121041  => JMP 51041
51001  /  321055  => IOR 51055
51002  /  421056  => STA 51056
51003  /  361050  => XOR 51050
51004  /  741040  => JZA 51040
51005  /  006000  => LDL 6000
51006  /  461053  => SCA 51053
51007  /  321051  => IOR 51051
51010  /  060727  => JSR 50727
51011  /  121041  => JMP 51041
51012  /  000400  => LDL 0400
51013  /  461054  => SCA 51054
51014  /  060507  => JSR 50507
```

```
51015  /  121041  =>  JMP 51041
51016  /  161047  =>  AND 51047
51017  /  421055  =>  STA 51055
51020  /  361056  =>  XOR 51056
51021  /  751025  =>  JNA 51025
51022  /  661054  =>  DSZ 51054
51023  /  121014  =>  JMP 51014
51024  /  121041  =>  JMP 51041
51025  /  321057  =>  IOR 51057
51026  /  060727  =>  JSR 50727
51027  /  121041  =>  JMP 51041
51030  /  060507  =>  JSR 50507
51031  /  121041  =>  JMP 51041
51032  /  421056  =>  STA 51056
51033  /  361050  =>  XOR 51050
51034  /  741040  =>  JZA 51040
51035  /  661053  =>  DSZ 51053
51036  /  121007  =>  JMP 51007
51037  /  121041  =>  JMP 51041
51040  /  620751  =>  ISZ 50751
51041  /  020010  =>  CLA
51042  /  321057  =>  IOR 51057
51043  /  060727  =>  JSR 50727
51044  /  020000  =>  NOP
51045  /  020010  =>  CLA
51046  /  130751  =>  JMP I 50751 (0000)
51047  /  177777  =>  AND I 57777 (0000)
51050  /  000000  =>  0
51051  /  014000  =>  DSP
51052  /  012000  =>  AIL
51053  /  000000  =>  0
51054  /  000000  =>  0
51055  /  000000  =>  0
51056  /  000000  =>  0
51057  /  010000  =>  010000
51060  /  000017  =>  LDL 0017
51061  /  000260  =>  LDL 0260
51062  /  000003  =>  LDL 0003
51063  /  000272  =>  LDL 0272
51064  /  022000  =>  SMA
51065  /  030000  =>  030000
51066  /  060103      JSR 50103
51067  /  000000  =>  0
51070  /  061171  =>  JSR 51171
51071  /  020000  =>  NOP
51072  /  531366      SZW I 51366 (57776)
51073  /  121101  =>  JMP 51101
51074  /  071355  =>  JSR I 51355 (50163)
51075  /  024000  =>  SKP
51076  /  121101  =>  JMP 51101
51077  /  061210  =>  JSR 51210
51100  /  121134  =>  JMP 51134
51101  /  071371  =>  JSR I 51371 (47654)
51102  /  024000  =>  SKP
51103  /  121115  =>  JMP 51115
51104  /  071364  =>  JSR I 51364 (60357)
51105  /  741706  =>  JZA 51706
51106  /  061103  =>  JSR 51103
51107  /  054024  =>  JSR I Z 4024 (4441)
51110  /  052324  =>  JSR I Z 2324 (702463)
51111  /  401411  =>  STA Z 1411
51112  /  160540  =>  AND 50540
51113  /  004040  =>  LDL 4040
51114  /  121134  =>  JMP 51134
51115  /  071361  =>  JSR I 51361 (50054)
```

```
51116  /  024000  =>  SKP
51117  /  121130  =>  JMP 51130
51120  /  061257  =>  JSR 51257
51121  /  121134  =>  JMP 51134
51122  /  000000  =>  0
51123  /  000000  =>  0
51124  /  000000  =>  0
51125  /  000000  =>  0
51126  /  000000  =>  0
51127  /  000000  =>  0
51130  /  061147  =>  JSR 51147
51131  /  020000  =>  NOP
51132  /  020010  =>  CLA
51133  /  621067  =>  ISZ 51067
51134  /  020010  =>  CLA
51135  /  131067  =>  JMP I 51067 (0000)
51136  /  000000  =>  0
51137  /  000000  =>  0
51140  /  000000  =>  0
51141  /  000000  =>  0
51142  /  000000  =>  0
51143  /  000000  =>  0
51144  /  000000  =>  0
51145  /  000000  =>  0
51146  /  000000  =>  0
51147  /  000000  =>  0
51150  /  071367  =>  JSR I 51367 (61212)
51151  /  024000  =>  SKP
51152  /  121167  =>  JMP 51167
51153  /  020010  =>  CLA
51154  /  071364  =>  JSR I 51364 (60357)
51155  /  402325  =>  STA Z 2325
51156  /  232005  =>  ADD I 52005 (122017)
51157  /  032440  =>  CLL RTL 4
51160  /  270524  =>  SUB I 50524 (50513)
51161  /  400301  =>  STA Z 0301
51162  /  021405  =>  021405
51163  /  404000  =>  STA Z 4000
51164  /  000001  =>  LDL 0001
51165  /  461375  =>  SCA 51375
51166  /  024000  =>  SKP
51167  /  621147  =>  ISZ 51147
51170  /  131147  =>  JMP I 51147 (0000)
51171  /  000000  =>  0
51172  /  020010  =>  CLA
51173  /  461377  =>  SCA 51377
51174  /  461400  =>  SCA 51400
51175  /  461374  =>  SCA 51374
51176  /  461402  =>  SCA 51402
51177  /  461401  =>  SCA 51401
51200  /  461373  =>  SCA 51373
51201  /  461375  =>  SCA 51375
51202  /  461376  =>  SCA 51376
51203  /  131171  =>  JMP I 51171 (0000)
51204  /  000000  =>  0
51205  /  000000  =>  0
51206  /  000000  =>  0
51207  /  000000  =>  0
51210  /  000000  =>  0
51211  /  020010  =>  CLA
51212  /  071356  =>  JSR I 51356 (60026)
51213  /  121243  =>  JMP 51243
51214  /  000000  =>  0
51215  /  000000  =>  0
51216  /  000000  =>  0
51217  /  071357  =>  JSR I 51357 (60004)
```

```
51220  /  061234   ->   JSR 51234
51221  /  000000   ->   0
51222  /  000000   ->   0
51223  /  000000   ->   0
51224  /  071360   ->   JSR I 51360 (50113)
51225  /  061251   ->   JSR 51251
51226  /  000000   ->   0
51227  /  000000   ->   0
51230  /  000000   ->   0
51231  /  621210   ->   ISZ 51210
51232  /  020010   ->   CLA
51233  /  131210   ->   JMP I 51210 (0000)
51234  /  000000   ->   0
51235  /  000001   ->   LDL 0001
51236  /  461377   ->   SCA 51377
51237  /  131234   ->   JMP I 51234 (0000)
51240  /  000000   ->   0
51241  /  000000   ->   0
51242  /  000000   ->   0
51243  /  000001   ->   LDL 0001
51244  /  461400   ->   SCA 51400
51245  /  121231   ->   JMP 51231
51246  /  000000   ->   0
51247  /  000000   ->   0
51250  /  000000   ->   0
51251  /  000000   ->   0
51252  /  461374   ->   SCA 51374
51253  /  131251   ->   JMP I 51251 (0000)
51254  /  000000   ->   0
51255  /  000000   ->   0
51256  /  000000   ->   0
51257  /  000000   ->   0
51260  /  000001   ->   LDL 0001
51261  /  461402   ->   SCA 51402
51262  /  071362   ->   JSR I 51362 (50021)
51263  /  121314   ->   JMP 51314
51264  /  071363        JSR I 51363 (47747)
51265  /  121327   ->   JMP 51327
51266  /  071370   ->   JSR I 51370 (61250)
51267  /  121345   ->   JMP 51345
51270  /  561377        SNW 51377
51271  /  121305   ->   JMP 51305
51272  /  071364   ->   JSR I 51364 (60357)
51273  /  402516   ->   STA Z 2516
51274  /  023120   ->   023120
51275  /  012323   ->   012323
51276  /  050440   ->   JSR I Z 0440 (14406S)
51277  /  141717   ->   AND Z 1717
51300  /  204005   ->   ADD Z 4005
51301  /  302405   ->   IOR Z 2405
51302  /  160405   ->   AND 50405
51303  /  224000   ->   ADD 54000
51304  /  024000   ->   SKP
51305  /  621257   ->   ISZ 51257
51306  /  020010   ->   CLA
51307  /  131257   ->   JMP I 51257 (0000)
51310  /  000000   ->   0
51311  /  000000   ->   0
51312  /  000000   ->   0
51313  /  000000   ->   0
51314  /  071364   ->   JSR I 51364 (60357)
51315  /  402017   ->   STA Z 2017
51316  /  270522   ->   SUB I 50522 (0005)
51317  /  401411   ->   STA Z 1411
51320  /  160540   ->   AND 50540
51321  /  231017   ->   ADD I 51017 (4210??)
```

```
51322  /  222440  => ADD 52440
51323  /  004040  => LDL 4040
51324  /  000001  => LDL 0001
51325  /  461401  => SCA 51401
51326  /  121306  => JMP 51306
51327  /  071364  => JSR I 51364 (60357)
51330  /  401116  => STA Z 1116
51331  /  172005  => AND I 52005 (122017)
51332  /  220124  => ADD 50124
51333  /  112605  => JMP I Z 2605 (304117)
51334  /  400201  => STA Z 0201
51335  /  242405  => SUB Z 2405
51336  /  223140  => ADD 53140
51337  /  032524  => 032524
51340  /  170606  => AND I 50606 (320712)
51341  /  400040  => STA Z 0040
51342  /  000001  => LDL 0001
51343  /  461373  => SCA 51373
51344  /  121306  => JMP 51306
51345  /  000001  => LDL 0001
51346  /  461376  => SCA 51376
51347  /  071364  => JSR I 51364 (60357)
51350  /  400630  => STA Z 0630
51351  /  401411  => STA Z 1411
51352  /  160540  => AND 50540
51353  /  004040  => LDL 4040
51354  /  121306  => JMP 51306
51355  /  050163  => JSR I Z 0163 (454157)
51356  /  060026  => JSR 50026
51357  /  060004  => JSR 50004
51360  /  050113  => JSR I Z 0113 (100112)
51361  /  050054  => JSR I Z 0054 (0000)
51362  /  050021  => JSR I Z 0021 (20400)
51363  /  047747  => JSR Z 7747
51364  /  060357  => JSR 50357
51365  /  044033  => JSR Z 4033
51366  /  057776  => JSR I Z 7776 (74314)
51367  /  061212  => JSR 51212
51370  /  061250  => JSR 51250
51371  /  047654  => JSR Z 7654
51372  /  047746  => JSR Z 7746
51373  /  000000  => 0
51374  /  000000  => 0
51375  /  000000  => 0
51376  /  000000  => 0
51377  /  000000  => 0
51400  /  000000  => 0
51401  /  000000  => 0
51402  /  000000  => 0
51403  /  000000  => 0
51404  /  071626  => JSR I 51626 (44536)
51405  /  055256  => JSR I Z 5256 (72422)
51406  /  071620  => JSR I 51620 (45123)
51407  /  055252  => JSR I Z 5252 (55425)
51410  /  071617  => JSR I 51617 (44763)
51411  /  071627  => JSR I 51627 (45224)
51412  /  051537  => JSR I Z 1537 (444127)
51413  /  071616  => JSR I 51616 (44500)
51414  /  051555  => JSR I Z 1555 (204025)
51415  /  071630  => JSR I 51630 (45137)
51416  /  051541  => JSR I Z 1541 (0000)
51417  /  071631  => JSR I 51631 (44213)
51420  /  461544  => SCA 51544
51421  /  071626  => JSR I 51626 (44536)
51422  /  055260  => JSR I Z 5260 (42226)
```

```
51423  /  071620   =>   JSR I 51620 (45123)
51424  /  055254   =>   JSR I Z 5254 (172622)
51425  /  071617   =>   JSR I 51617 (44763)
51426  /  071627   =>   JSR I 51627 (45224)
51427  /  051537   =>   JSR I Z 1537 (444127)
51430  /  071616   =>   JSR I 51616 (44500)
51431  /  051557   =>   JSR I Z 1557 (441574)
51432  /  071630   =>   JSR I 51630 (45137)
51433  /  051541   =>   JSR I Z 1541 (0000)
51434  /  071631   =>   JSR I 51631 (44213)
51435  /  461545   =>   SCA 51545
51436  /  071626   =>   JSR I 51626 (44536)
51437  /  055250   =>   JSR I Z 5250 (72407)
51440  /  071617   =>   JSR I 51617 (44763)
51441  /  071627   =>   JSR I 51627 (45224)
51442  /  051537   =>   JSR I Z 1537 (444127)
51443  /  071616   =>   JSR I 51616 (44500)
51444  /  051553   =>   JSR I Z 1553 (101570)
51445  /  071630   =>   JSR I 51630 (45137)
51446  /  051541   =>   JSR I Z 1541 (0000)
51447  /  071631   =>   JSR I 51631 (44213)
51450  /  461543   =>   SCA 51543
51451  /  071626   =>   JSR I 51626 (44536)
51452  /  055274   =>   JSR I Z 5274 (42227)
51453  /  071620   =>   JSR I 51620 (45123)
51454  /  051553   =>   JSR I Z 1553 (101570)
51455  /  071630   =>   JSR I 51630 (45137)
51456  /  051541   =>   JSR I Z 1541 (0000)
51457  /  071631   =>   JSR I 51631 (44213)
51460  /  026000   =>   SPA
51461  /  020010   =>   CLA
51462  /  461673        SCA 51673
51463  /  071626   =>   JSR I 51626 (44536)
51464  /  055276   =>   JSR I Z 5276 (20000)
51465  /  071620   =>   JSR I 51620 (45123)
51466  /  051553        JSR I Z 1553 (101570)
51467  /  071630   =>   JSR I 51630 (45137)
51470  /  051541   =>   JSR I Z 1541 (0000)
51471  /  071631   =>   JSR I 51631 (44213)
51472  /  026000   =>   SPA
51473  /  020010   =>   CLA
51474  /  461671   =>   SCA 51671
51475  /  071626   =>   JSR I 51626 (44536)
51476  /  055270   =>   JSR I Z 5270 (240102)
51477  /  071620   =>   JSR I 51620 (45123)
51500  /  051555   =>   JSR I Z 1555 (204025)
51501  /  071630   =>   JSR I 51630 (45137)
51502  /  051541   =>   JSR I Z 1541 (0000)
51503  /  071631   =>   JSR I 51631 (44213)
51504  /  026000   =>   SPA
51505  /  020010   =>   CLA
51506  /  461672   =>   SCA 51672
51507  /  071626   =>   JSR I 51626 (44536)
51510  /  055272   =>   JSR I Z 5272 (72704)
51511  /  071620   =>   JSR I 51620 (45123)
51512  /  051557   =>   JSR I Z 1557 (441574)
51513  /  071630   =>   JSR I 51630 (45137)
51514  /  051541   =>   JSR I Z 1541 (0000)
51515  /  071631   =>   JSR I 51631 (44213)
51516  /  026000   =>   SPA
51517  /  020010   =>   CLA
51520  /  461670   =>   SCA 51670
51521  /  331657   =>   IOR I 51657 (55442)
51522  /  461676   =>   SCA 51676
51523  /  331660   =>   IOR I 51660 (55440)
51524  /  461674   =>   SCA 51674
```

```
51525  /  331661   =>  IOR I 51661 (55443)
51526  /  461677   =>  SCA 51677
51527  /  331662   =>  IOR I 51662 (55441)
51530  /  461675   =>  SCA 51675
51531  /  131403   =>  JMP I 51403 (0000)
51532  /  000000   =>  0
51533  /  000000   =>  0
51534  /  000000   =>  0
51535  /  000000   =>  0
51536  /  000000   =>  0
51537  /  000006   =>  LDL 0006
51540  /  310000   =>  IOR I Z 0000 (100103)
51541  /  000004   =>  LDL 0004
51542  /  240000   =>  SUB Z 0000
51543  /  000000   =>  0
51544  /  000000   =>  0
51545  /  000000   =>  0
51546  /  000000   =>  0
51547  /  000000   =>  0
51550  /  000000   =>  0
51551  /  000000   =>  0
51552  /  000000   =>  0
51553  /  000000   =>  0
51554  /  000000   =>  0
51555  /  000000   =>  0
51556  /  000000   =>  0
51557  /  000000   =>  0
51560  /  000000   =>  0
51561  /  053264   =>  JSR I Z 3264 (444136)
51562  /  054614   =>  JSR I Z 4614 (152313)
51563  /  055262   =>  JSR I Z 5262 (260000)
51564  /  055264   =>  JSR I Z 5264 (72422)
51565  /  055403   =>  JSR I Z 5403 (41431)
51566  /  055417   =>  JSR I Z 5417 (616200)
51567  /  055300   =>  JSR I Z 5300 (100427)
51570  /  055302   =>  JSR I Z 5302 (45755)
51571  /  055304   =>  JSR I Z 5304 (161700)
51572  /  055306   =>  JSR I Z 5306 (101107)
51573  /  055410   =>  JSR I Z 5410 (132202)
51574  /  055406   =>  JSR I Z 5406 (41431)
51575  /  055411   =>  JSR I Z 5411 (616000)
51576  /  055407   =>  JSR I Z 5407 (46633)
51577  /  055437   =>  JSR I Z 5437 (13000)
51600  /  060357   =>  JSR 50357
51601  /  060103   =>  JSR 50103
51602  /  060142   =>  JSR 50142
51603  /  060124   =>  JSR 50124
51604  /  060140   =>  JSR 50140
51605  /  046150   =>  JSR Z 6150
51606  /  046117   =>  JSR Z 6117
51607  /  045362   =>  JSR Z 5362
51610  /  047515   =>  JSR Z 7515
51611  /  047436   =>  JSR Z 7436
51612  /  045753   =>  JSR Z 5753
51613  /  047510   =>  JSR Z 7510
51614  /  047507   =>  JSR Z 7507
51615  /  047511   =>  JSR Z 7511
51616  /  044500   =>  JSR Z 4500
51617  /  044763   =>  JSR Z 4763
51620  /  045123   =>  JSR Z 5123
51621  /  045037   =>  JSR Z 5037
51622  /  044651   =>  JSR Z 4651
51623  /  044547   =>  JSR Z 4547
51624  /  044661   =>  JSR Z 4661
51625  /  044555   =>  JSR Z 4555
51626  /  044536   =>  JSR Z 4536
```

```
51627  /  045224  =>  JSR Z 5224
51630  /  045137  =>  JSR Z 5137
51631  /  044213  =>  JSR Z 4213
51632  /  044644  =>  JSR Z 4644
51633  /  044570  =>  JSR Z 4570
51634  /  044300  =>  JSR Z 4300
51635  /  045347  =>  JSR Z 5347
51636  /  045350  =>  JSR Z 5350
51637  /  055434  =>  JSR I Z 5434 (120000)
51640  /  055431  =>  JSR I Z 5431 (110000)
51641  /  055433  =>  JSR I Z 5433 (616200)
51642  /  055430  =>  JSR I Z 5430 (616100)
51643  /  055432  =>  JSR I Z 5432 (132302)
51644  /  055427  =>  JSR I Z 5427 (132302)
51645  /  055413  =>  JSR I Z 5413 (132202)
51646  /  055412  =>  JSR I Z 5412 (210000)
51647  /  055436  =>  JSR I Z 5436 (616300)
51650  /  055421  =>  JSR I Z 5421 (132202)
51651  /  055420  =>  JSR I Z 5420 (212000)
51652  /  055405  =>  JSR I Z 5405 (131513)
51653  /  055404  =>  JSR I Z 5404 (46631)
51654  /  055416  =>  JSR I Z 5416 (132202)
51655  /  055415  =>  JSR I Z 5415 (211000)
51656  /  055414  =>  JSR I Z 5414 (616100)
51657  /  055442  =>  JSR I Z 5442 (46624)
51660  /  055440      JSR I Z 5440 (140123)
51661  /  055443  =>  JSR I Z 5443 (140123)
51662  /  055441  =>  JSR I Z 5441 (10400)
51663  /  055425  =>  JSR I Z 5425 (616000)
51664  /  055423      JSR I Z 5423 (213000)
51665  /  055426  =>  JSR I Z 5426 (10000)
51666  /  055424  =>  JSR I Z 5424 (132302)
51667  /  057776  =>  JSR I Z 7776 (74314)
51670  /  000000  =>  0
51671  /  000000  =>  0
51672  /  000000  =>  0
51673  /  000000  =>  0
51674  /  000000  =>  0
51675  /  000000  =>  0
51676  /  000000  =>  0
51677  /  000000  =>  0
51700  /  000000  =>  0
51701  /  462656  =>  SCA 52656
51702  /  461734  =>  SCA 51734
51703  /  322656  =>  IOR 52656
51704  /  422656  =>  STA 52656
51705  /  025010  =>  SNA CLA
51706  /  131700  =>  JMP I 51700 (0000)
51707  /  072570  =>  JSR I 52570 (60357)
51710  /  740040  =>  JZA 50040
51711  /  322656  =>  IOR 52656
51712  /  020002  =>  DAC
51713  /  162551  =>  AND 52551
51714  /  421776  =>  STA 51776
51715  /  222552  =>  ADD 52552
51716  /  012000  =>  AIL
51717  /  421725  =>  STA 51725
51720  /  751724  =>  JNA 51724
51721  /  777774  =>  LDL -0004
51722  /  221776  =>  ADD 51776
51723  /  121713  =>  JMP 51713
51724  /  072607  =>  JSR I 52607 (44536)
51725  /  000000  =>  0
51726  /  072577  =>  JSR I 52577 (44500)
51727  /  052100  =>  JSR I Z 2100 (102110)
51730  /  072614  =>  JSR I 52614 (4457
```

```
51731  /  052450   => JSR I Z 2450 (2350)
51732  /  162553   => AND 52553
51733  /  741747   => JZA 51747
51734  /  000000   => 0
51735  /  751704   => JNA 51704
51736  /  072610   => JSR I 52610 (45224)
51737  /  052452   => JSR I Z 2452 (42320)
51740  /  072612   => JSR I 52612 (44213)
51741  /  072576   => JSR I 52576 (44033)
51742  /  000005   => LDL 0005
51743  /  072570   => JSR I 52570 (60357)
51744  /  401340   => STA Z 1340
51745  /  404000   => STA Z 4000
51746  /  121761   => JMP 51761
51747  /  121752   => JMP 51752
51750  /  521734   => SZW 51734
51751  /  121704   => JMP 51704
51752  /  621734   => ISZ 51734
51753  /  072612   => JSR I 52612 (44213)
51754  /  072576   => JSR I 52576 (44033)
51755  /  000005   => LDL 0005
51756  /  072570   => JSR I 52570 (60357)
51757  /  401710   => STA Z 1710
51760  /  154000   => AND I Z 4000 (44002)
51761  /  000007   => LDL 0007
51762  /  162656   => AND 52656
51763  /  221765   => ADD 51765
51764  /  014000   => DSP
51765  /  051766   => JSR I Z 1766 (102002)
51766  /  051777   => JSR I Z 1777 (22010)
51767  /  052026   => JSR I Z 2026 (43406)
51770  /  052032   => JSR I Z 2032 (444157)
51771  /  052040   => JSR I Z 2040 (43631)
51772  /  052046   => JSR I Z 2046 (314157)
51773  /  052054   => JSR I Z 2054 (742041)
51774  /  052062   => JSR I Z 2062 (752055)
51775  /  052071   => JSR I Z 2071 (102077)
51776  /  000000   => 0
51777  /  072570   => JSR I 52570 (60357)
52000  /  241114   => SUB Z 1114
52001  /  240040   => SUB Z 0040
52002  /  000007   => LDL 0007
52003  /  162656   => AND 52656
52004  /  062132   => JSR 52132
52005  /  122017   => JMP 52017
52006  /  024000   => SKP
52007  /  122014   => JMP 52014
52010  /  072570   => JSR I 52570 (60357)
52011  /  555503   => SNW I Z 5503 (43203)
52012  /  171114   => AND I 51114 (121134)
52013  /  400040   => STA Z 0040
52014  /  322656   => IOR 52656
52015  /  034340   => CLL SHR 3
52016  /  121704   => JMP 51704
52017  /  072570   => JSR I 52570 (60357)
52020  /  555520   => SNW I Z 5520 (142006)
52021  /  010230   => 010230
52022  /  400317   => STA Z 0317
52023  /  111440   => JMP I Z 1440 (43406)
52024  /  004040   => LDL 4040
52025  /  122014   => JMP 52014
52026  /  072570   => JSR I 52570 (60357)
52027  /  231017   => ADD I 51017 (421055)
52030  /  222400   => ADD 52400
52031  /  122002   => JMP 52002
52032  /  072570   => JSR I 52570 (60357)
```

```
52033   /   241120    =>    SUB Z 1120
52034   /   550722    =>    SNW I Z 0722 (170301)
52035   /   172516    =>    AND I 52516 (52535)
52036   /   040040    =>    JSR Z 0040
52037   /   122002    =>    JMP 52002
52040   /   072570    =>    JSR I 52570 (60357)
52041   /   221116    =>    ADD 51116
52042   /   075507    =>    JSR I 55507 (0000)
52043   /   221725    =>    ADD 51725
52044   /   160400    =>    AND 50400
52045   /   122002    =>    JMP 52002
52046   /   072570    =>    JSR I 52570 (60357)
52047   /   241120    =>    SUB Z 1120
52050   /   550322    =>    SNW I Z 0322 (444123)
52051   /   172323    =>    AND I 52323 (122317)
52052   /   004040    =>    LDL 4040
52053   /   122002    =>    JMP 52002
52054   /   072570    =>    JSR I 52570 (60357)
52055   /   221116    =>    ADD 51116
52056   /   075503          JSR I 55503 (75603)
52057   /   221723    =>    ADD 51723
52060   /   230040    =>    ADD I 50040 (20010)
52061   /   122002    =>    JMP 52002
52062   /   072570          JSR I 52570 (60357)
52063   /   241120    =>    SUB Z 1120
52064   /   552001    =>    SNW I Z 2001 (101744)
52065   /   023040    =>    SMA SZA CLL
52066   /   031711    =>    031711
52067   /   140040    =>    AND Z 0040
52070   /   122014    =>    JMP 52014
52071   /   072570    =>    JSR I 52570 (60357)
52072   /   221116    =>    ADD 51116
52073   /   075520    =>    JSR I 55520 (125525)
52074   /   010230    =>    010230
52075   /   400317    =>    STA Z 0317
52076   /   111400    =>    JMP I Z 1400 (30004)
52077   /   122014    =>    JMP 52014
52100   /   000000    =>    0
52101   /   000000    =>    0
52102   /   055274    =>    JSR I Z 5274 (42227)
52103   /   055270    =>    JSR I Z 5270 (240102)
52104   /   055272    =>    JSR I Z 5272 (72704)
52105   /   055270    =>    JSR I Z 5270 (240102)
52106   /   055272    =>    JSR I Z 5272 (72704)
52107   /   000000    =>    0
52110   /   000000    =>    0
52111   /   000000    =>    0
52112   /   000000    =>    0
52113   /   422131    =>    STA 52131
52114   /   742127    =>    JZA 52127
52115   /   000007    =>    LDL 0007
52116   /   162131    =>    AND 52131
52117   /   062132    =>    JSR 52132
52120   /   122126    =>    JMP 52126
52121   /   020010    =>    CLA
52122   /   020010    =>    CLA
52123   /   322131    =>    IOR 52131
52124   /   034340    =>    CLL SHR 3
52125   /   122113    =>    JMP 52113
52126   /   000001    =>    LDL 0001
52127   /   462654    =>    SCA 52654
52130   /   132112    =>    JMP I 52112 (0000)
52131   /   000000    =>    0
52132   /   000000    =>    0
52133   /   162551    =>    AND 52551
```

```
52134   /   422140   ⇨   STA 52140
52135   /   742224   ⇨   JZA 52224
52136   /   462650   ⇨   SCA 52650
52137   /   462653   ⇨   SCA 52653
52140   /   000000   ⇨   0
52141   /   020002   ⇨   DAC
52142   /   422175   ⇨   STA 52175
52143   /   222552   ⇨   ADD 52552
52144   /   012000   ⇨   AIL
52145   /   462147   ⇨   SCA 52147
52146   /   072607   ⇨   JSR I 52607 (44536)
52147   /   000000   ⇨   0
52150   /   072577   ⇨   JSR I 52577 (44500)
52151   /   052100   ⇨   JSR I Z 2100 (102110)
52152   /   072614   ⇨   JSR I 52614 (44570)
52153   /   052454   ⇨   JSR I Z 2454 (442466)
52154   /   162553   ⇨   AND 52553
52155   /   742224   ⇨   JZA 52224
52156   /   000004   ⇨   LDL 0004
52157   /   162140   ⇨   AND 52140
52160   /   742165   ⇨   JZA 52165
52161   /   072614   ⇨   JSR I 52614 (44570)
52162   /   052450   ⇨   JSR I Z 2450 (2350)
52163   /   162553   ⇨   AND 52553
52164   /   742224   ⇨   JZA 52224
52165   /   072614   ⇨   JSR I 52614 (44570)
52166   /   052450   ⇨   JSR I Z 2450 (2350)
52167   /   162553   ⇨   AND 52553
52170   /   462653   ⇨   SCA 52653
52171   /   072614   ⇨   JSR I 52614 (44570)
52172   /   052446   ⇨   JSR I Z 2446 (43652)
52173   /   162553   ⇨   AND 52553
52174   /   752224   ⇨   JNA 52224
52175   /   000000   ⇨   0
52176   /   222554   ⇨   ADD 52554
52177   /   012000   ⇨   AIL
52200   /   462210   ⇨   SCA 52210
52201   /   072607   ⇨   JSR I 52607 (44536)
52202   /   052444   ⇨   JSR I Z 2444 (0000)
52203   /   562101   ⇨   SNW 52101
52204   /   122224   ⇨   JMP 52224
52205   /   072610   ⇨   JSR I 52610 (45224)
52206   /   052100   ⇨   JSR I Z 2100 (102110)
52207   /   072614   ⇨   JSR I 52614 (44570)
52210   /   000000   ⇨   0
52211   /   162553   ⇨   AND 52553
52212   /   742224   ⇨   JZA 52224
52213   /   562653   ⇨   SNW 52653
52214   /   122225   ⇨   JMP 52225
52215   /   000002   ⇨   LDL 0002
52216   /   362140   ⇨   XOR 52140
52217   /   742226   ⇨   JZA 52226
52220   /   000003   ⇨   LDL 0003
52221   /   362140   ⇨   XOR 52140
52222   /   742226   ⇨   JZA 52226
52223   /   024000   ⇨   SKP
52224   /   622132   ⇨   ISZ 52132
52225   /   622132   ⇨   ISZ 52132
52226   /   020010   ⇨   CLA
52227   /   072607   ⇨   JSR I 52607 (44536)
52230   /   052100   ⇨   JSR I Z 2100 (102110)
52231   /   132132   ⇨   JMP I 52132 (0000)
52232   /   000000   ⇨   0
52233   /   162551   ⇨   AND 52551
52234   /   222242   ⇨   ADD 52242
52235   /   012000   ⇨   AIL
```

```
52236  /  462240  ->  SCA 52240
52237  /  072607  ->  JSR I 52607 (44536)
52240  /  000000  ->  0
52241  /  132232  ->  JMP I 52232 (0000)
52242  /  052243  ->  JSR I Z 2243 (407600)
52243  /  052253  ->  JSR I Z 2253 (143637)
52244  /  052537  ->  JSR I Z 2537 (43004)
52245  /  052541  ->  JSR I Z 2541 (444155)
52246  /  052543  ->  JSR I Z 2543 (244114)
52247  /  052545  ->  JSR I Z 2545 (102435)
52250  /  052547  ->  JSR I Z 2547 (454025)
52251  /  052253  ->  JSR I Z 2253 (143637)
52252  /  052253  ->  JSR I Z 2253 (143637)
52253  /  000000  ->  0
52254  /  000000      0
52255  /  000000  ->  0
52256  /  000005  ->  LDL 0005
52257  /  462651  ->  SCA 52651
52260  /  462657      SCA 52657
52261  /  322552  ->  IOR 52552
52262  /  462652  ->  SCA 52652
52263  /  322555  ->  IOR 52555
52264  /  462655  ->  SCA 52655
52265  /  332652  ->  IOR I 52652 (0000)
52266  /  622652  ->  ISZ 52652
52267  /  422271  ->  STA 52271
52270  /  072607  ->  JSR I 52607 (44536)
52271  /  000000  ->  0
52272  /  072600  ->  JSR I 52600 (44763)
52273  /  072614  ->  JSR I 52614 (44570)
52274  /  052306  ->  JSR I Z 2306 (604131)
52275  /  162556  ->  AND 52556
52276  /  742301  ->  JZA 52301
52277  /  332655  ->  IOR I 52655 (0000)
52300  /  062310  ->  JSR 52310
52301  /  622655  ->  ISZ 52655
52302  /  020000  ->  NOP
52303  /  662651  ->  DSZ 52651
52304  /  122265  ->  JMP 52265
52305  /  132255  ->  JMP I 52255 (0000)
52306  /  000024  ->  LDL 0024
52307  /  364110  ->  XOR 54110
52310  /  000000  ->  0
52311  /  462345  ->  SCA 52345
52312  /  462346  ->  SCA 52346
52313  /  000007  ->  LDL 0007
52314  /  422347  ->  STA 52347
52315  /  562345  ->  SNW 52345
52316  /  122324  ->  JMP 52324
52317  /  036340  ->  CLL SHL 3
52320  /  622346  ->  ISZ 52346
52321  /  422347  ->  STA 52347
52322  /  662345  ->  DSZ 52345
52323  /  122317  ->  JMP 52317
52324  /  162657  ->  AND 52657
52325  /  742332  ->  JZA 52332
52326  /  000001  ->  LDL 0001
52327  /  462345  ->  SCA 52345
52330  /  322347  ->  IOR 52347
52331  /  122317  ->  JMP 52317
52332  /  000006  ->  LDL 0006
52333  /  262651  ->  SUB 52651
52334  /  562346  ->  SNW 52346
52335  /  122341  ->  JMP 52341
52336  /  036340  ->  CLL SHL 3
52337  /  662346  ->  DSZ 52346
```

```
52340  /  122336   =>   JMP 52336
52341  /  322657   =>   IOR 52657
52342  /  462657   =>   SCA 52657
52343  /  132310   =>   JMP I 52310 (0000)
52344  /  000000   =>   0
52345  /  000000   =>   0
52346  /  000000   =>   0
52347  /  000000   =>   0
52350  /  000000   =>   0
52351  /  020010   =>   CLA
52352  /  322552   =>   IOR 52552
52353  /  462373   =>   SCA 52373
52354  /  322555   =>   IOR 52555
52355  /  462374   =>   SCA 52374
52356  /  332373   =>   IOR I 52373 (0000)
52357  /  422363   =>   STA 52363
52360  /  622373   =>   ISZ 52373
52361  /  742372   =>   JZA 52372
52362  /  072607   =>   JSR I 52607 (44536)
52363  /  000000   =>   0
52364  /  062414   =>   JSR 52414
52365  /  052375   =>   JSR I Z 2375 (102366)
52366  /  472374   =>   SCA I 52374 (0000)
52367  /  622374   =>   ISZ 52374
52370  /  020000   =>   NOP
52371  /  122356   =>   JMP 52356
52372  /  132350   =>   JMP I 52350 (0000)
52373  /  000000   =>   0
52374  /  000000   =>   0
52375  /  052537   =>   JSR I Z 2537 (43004)
52376  /  052541   =>   JSR I Z 2541 (444155)
52377  /  052543   =>   JSR I Z 2543 (244114)
52400  /  052545   =>   JSR I Z 2545 (102435)
52401  /  052547   =>   JSR I Z 2547 (454025)
52402  /  000000   =>   0
52403  /  000000   =>   0
52404  /  000000   =>   0
52405  /  000000   =>   0
52406  /  000000   =>   0
52407  /  000000   =>   0
52410  /  000000   =>   0
52411  /  000000   =>   0
52412  /  000000   =>   0
52413  /  000000   =>   0
52414  /  000000   =>   0
52415  /  162551   =>   AND 52551
52416  /  025000   =>   SNA
52417  /  000001   =>   LDL 0001
52420  /  462443   =>   SCA 52443
52421  /  332414   =>   IOR I 52414 (0000)
52422  /  622414   =>   ISZ 52414
52423  /  462441   =>   SCA 52441
52424  /  462442   =>   SCA 52442
52425  /  332441   =>   IOR I 52441 (0000)
52426  /  622441   =>   ISZ 52441
52427  /  422432   =>   STA 52432
52430  /  742437   =>   JZA 52437
52431  /  072614   =>   JSR I 52614 (44570)
52432  /  000000   =>   0
52433  /  162443   =>   AND 52443
52434  /  021010   =>   SZA CLA
52435  /  622442   =>   ISZ 52442
52436  /  122425   =>   JMP 52425
52437  /  322442   =>   IOR 52442
52440  /  132414   =>   JMP I 52414 (0000)
52441  /  000000   =>   0
```

| | | | | |
|---|---|---|---|---|
| 52442 | / | 000000 | -> | 0 |
| 52443 | / | 000000 | -> | 0 |
| 52444 | / | 000024 | -> | LDL 0024 |
| 52445 | / | 242606 | -> | SUB Z 2606 |
| 52446 | / | 000017 | -> | LDL 0017 |
| 52447 | / | 364110 | -> | XOR 54110 |
| 52450 | / | 000016 | -> | LDL 0016 |
| 52451 | / | 234200 | -> | ADD I 54200 (75350) |
| 52452 | / | 000012 | | LDL 0012 |
| 52453 | / | 372000 | -> | XOR I 52000 (241114) |
| 52454 | / | 000011 | -> | LDL 0011 |
| 52455 | / | 372000 | -> | XOR I 52000 (241114) |
| 52456 | / | 000000 | | 0 |
| 52457 | / | 072607 | -> | JSR I 52607 (44536) |
| 52460 | / | 055250 | -> | JSR I Z 5250 (72407) |
| 52461 | / | 062511 | -> | JSR 52511 |
| 52462 | / | 072577 | -> | JSR I 52577 (44500) |
| 52463 | / | 052537 | -> | JSR I Z 2537 (43004) |
| 52464 | / | 072607 | -> | JSR I 52607 (44536) |
| 52465 | / | 055252 | -> | JSR I Z 5252 (55425) |
| 52466 | / | 062511 | -> | JSR 52511 |
| 52467 | / | 072577 | -> | JSR I 52577 (44500) |
| 52470 | / | 052541 | -> | JSR I Z 2541 (444155) |
| 52471 | / | 072607 | -> | JSR I 52607 (44536) |
| 52472 | / | 055254 | -> | JSR I Z 5254 (172622) |
| 52473 | / | 062511 | -> | JSR 52511 |
| 52474 | / | 072577 | -> | JSR I 52577 (44500) |
| 52475 | / | 052543 | -> | JSR I Z 2543 (244114) |
| 52476 | / | 072607 | -> | JSR I 52607 (44536) |
| 52477 | / | 055256 | -> | JSR I Z 5256 (72422) |
| 52500 | / | 062511 | -> | JSR 52511 |
| 52501 | / | 072577 | -> | JSR I 52577 (44500) |
| 52502 | / | 052545 | -> | JSR I Z 2545 (102435) |
| 52503 | / | 072607 | -> | JSR I 52607 (44536) |
| 52504 | / | 055260 | -> | JSR I Z 5260 (42226) |
| 52505 | / | 062511 | -> | JSR 52511 |
| 52506 | / | 072577 | -> | JSR I 52577 (44500) |
| 52507 | / | 052547 | -> | JSR I Z 2547 (454025) |
| 52510 | / | 132456 | -> | JMP I 52456 (0000) |
| 52511 | / | 000000 | -> | 0 |
| 52512 | / | 072600 | -> | JSR I 52600 (44763) |
| 52513 | / | 532617 | -> | SZW I 52617 (45350) |
| 52514 | / | 122517 | -> | JMP 52517 |
| 52515 | / | 072607 | -> | JSR I 52607 (44536) |
| 52516 | / | 052535 | -> | JSR I Z 2535 (26010) |
| 52517 | / | 072577 | -> | JSR I 52577 (44500) |
| 52520 | / | 052533 | -> | JSR I Z 2533 (204115) |
| 52521 | / | 072607 | -> | JSR I 52607 (44536) |
| 52522 | / | 052531 | -> | JSR I Z 2531 (36240) |
| 52523 | / | 072610 | -> | JSR I 52610 (45224) |
| 52524 | / | 052533 | -> | JSR I Z 2533 (204115) |
| 52525 | / | 000000 | -> | 0 |
| 52526 | / | 021010 | -> | SZA CLA |
| 52527 | / | 072615 | -> | JSR I 52615 (44300) |
| 52530 | / | 132511 | -> | JMP I 52511 (0000) |
| 52531 | / | 000032 | -> | LDL 0032 |
| 52532 | / | 276571 | -> | SUB I 56571 (401116) |
| 52533 | / | 000000 | -> | 0 |
| 52534 | / | 000000 | -> | 0 |
| 52535 | / | 777772 | -> | LDL -0006 |
| 52536 | / | 243656 | -> | SUB Z 3656 |
| 52537 | / | 000000 | -> | 0 |
| 52540 | / | 000000 | -> | 0 |
| 52541 | / | 000000 | -> | 0 |
| 52542 | / | 000000 | -> | 0 |

```
52543  /  000000  ->  0
52544  /  000000  ->  0
52545  /  000000  ->  0
52546  /  000000  ->  0
52547  /  000000  ->  0
52550  /  000000  ->  0
52551  /  000007  ->  LDL 0007
52552  /  052375  ->  JSR I Z 2375 (102366)
52553  /  000001  ->  LDL 0001
52554  /  052102  ->  JSR I Z 2102 (521617)
52555  /  052405  ->  JSR I Z 2405 (304100)
52556  /  000004  ->  LDL 0004
52557  /  053264  ->  JSR I Z 3264 (444136)
52560  /  054614  ->  JSR I Z 4614 (152313)
52561  /  055262  ->  JSR I Z 5262 (260000)
52562  /  055264  ->  JSR I Z 5264 (72422)
52563  /  055300  ->  JSR I Z 5300 (100427)
52564  /  055302  ->  JSR I Z 5302 (45755)
52565  /  055304  ->  JSR I Z 5304 (161700)
52566  /  055306  ->  JSR I Z 5306 (101107)
52567  /  055276  ->  JSR I Z 5276 (20000)
52570  /  060357  ->  JSR 50357
52571  /  060103  ->  JSR 50103
52572  /  060142  ->  JSR 50142
52573  /  060124  ->  JSR 50124
52574  /  060140  ->  JSR 50140
52575  /  043770  ->  JSR Z 3770
52576  /  044033  ->  JSR Z 4033
52577  /  044500  ->  JSR Z 4500
52600  /  044763  ->  JSR Z 4763
52601  /  045123  ->  JSR Z 5123
52602  /  045037  ->  JSR Z 5037
52603  /  044651  ->  JSR Z 4651
52604  /  044547  ->  JSR Z 4547
52605  /  044661  ->  JSR Z 4661
52606  /  044555  ->  JSR Z 4555
52607  /  044536  ->  JSR Z 4536
52610  /  045224  ->  JSR Z 5224
52611  /  045137  ->  JSR Z 5137
52612  /  044213  ->  JSR Z 4213
52613  /  044644  ->  JSR Z 4644
52614  /  044570  ->  JSR Z 4570
52615  /  044300  ->  JSR Z 4300
52616  /  045347  ->  JSR Z 5347
52617  /  045350  ->  JSR Z 5350
52620  /  055434  ->  JSR I Z 5434 (12000)
52621  /  055431  ->  JSR I Z 5431 (11000)
52622  /  055433  ->  JSR I Z 5433 (616200)
52623  /  055430  ->  JSR I Z 5430 (616100)
52624  /  055432  ->  JSR I Z 5432 (132302)
52625  /  055427  ->  JSR I Z 5427 (132302)
52626  /  055413  ->  JSR I Z 5413 (132202)
52627  /  055412  ->  JSR I Z 5412 (210000)
52630  /  055436  ->  JSR I Z 5436 (616300)
52631  /  055421  ->  JSR I Z 5421 (132202)
52632  /  055420  ->  JSR I Z 5420 (212000)
52633  /  055405  ->  JSR I Z 5405 (131513)
52634  /  055404  ->  JSR I Z 5404 (46631)
52635  /  055416  ->  JSR I Z 5416 (132202)
52636  /  055415  ->  JSR I Z 5415 (211000)
52637  /  055414  ->  JSR I Z 5414 (616100)
52640  /  055442  ->  JSR I Z 5442 (46624)
52641  /  055440  ->  JSR I Z 5440 (140123)
52642  /  055443  ->  JSR I Z 5443 (140123)
52643  /  055441  ->  JSR I Z 5441 (10400)
```

```
52644  /  055425   =>   JSR I Z 5425 (616000)
52645  /  055423   =>   JSR I Z 5423 (213000)
52646  /  055426   =>   JSR I Z 5426 (10000)
52647  /  055424   =>   JSR I Z 5424 (132302)
52650  /  000000        0
52651  /  000000   =>   0
52652  /  000000   =>   0
52653  /  000000   =>   0
52654  /  000000        0
52655  /  000000   =>   0
52656  /  000000   =>   0
52657  /  000000   =>   0
52660  /  000000   =>   0
52661  /  020010   =>   CLA
52662  /  332660   =>   IOR I 52660 (0000)
52663  /  622660   =>   ISZ 52660
52664  /  462666   =>   SCA 52666
52665  /  073251   =>   JSR I 53251 (44536)
52666  /  000000   =>   0
52667  /  073241   =>   JSR I 53241 (44500)
52670  /  053207   =>   JSR I Z 3207 (603175)
52671  /  332660   =>   IOR I 52660 (0000)
52672  /  622660   =>   ISZ 52660
52673  /  422710   =>   STA 52710
52674  /  463030   =>   SCA 53030
52675  /  332660   =>   IOR I 52660 (0000)
52676  /  622660   =>   ISZ 52660
52677  /  422720   =>   STA 52720
52700  /  463044   =>   SCA 53044
52701  /  332660   =>   IOR I 52660 (0000)
52702  /  622660   =>   ISZ 52660
52703  /  463262   =>   SCA 53262
52704  /  332660   =>   IOR I 52660 (0000)
52705  /  622660   =>   ISZ 52660
52706  /  463263   =>   SCA 53263
52707  /  073251   =>   JSR I 53251 (44536)
52710  /  000000   =>   0
52711  /  073241   =>   JSR I 53241 (44500)
52712  /  053211   =>   JSR I Z 3211 (444025)
52713  /  073253   =>   JSR I 53253 (45137)
52714  /  053211   =>   JSR I Z 3211 (444025)
52715  /  073241   =>   JSR I 53241 (44500)
52716  /  053215   =>   JSR I Z 3215 (603175)
52717  /  073251   =>   JSR I 53251 (44536)
52720  /  000000   =>   0
52721  /  073241   =>   JSR I 53241 (44500)
52722  /  053213   =>   JSR I Z 3213 (444034)
52723  /  073253   =>   JSR I 53253 (45137)
52724  /  053213   =>   JSR I Z 3213 (444034)
52725  /  073244   =>   JSR I 53244 (45037)
52726  /  053215   =>   JSR I Z 3215 (603175)
52727  /  073252   =>   JSR I 53252 (45224)
52730  /  053205   =>   JSR I Z 3205 (36140)
52731  /  073241   =>   JSR I 53241 (44500)
52732  /  053215   =>   JSR I Z 3215 (603175)
52733  /  073256   =>   JSR I 53256 (44644)
52734  /  123177   =>   JMP 53177
52735  /  073251   =>   JSR I 53251 (44536)
52736  /  053213   =>   JSR I Z 3213 (444034)
52737  /  073256   =>   JSR I 53256 (44644)
52740  /  122755   =>   JMP 52755
52741  /  073251   =>   JSR I 53251 (44536)
52742  /  053211   =>   JSR I Z 3211 (444025)
52743  /  073252   =>   JSR I 53252 (45224)
52744  /  053213   =>   JSR I Z 3213 (444034)
52745  /  073242   =>   JSR I 53242 (44763)
```

```
52746   /  073255   =>    JSR  I  53255  (44570)
52747   /  053203   =>    JSR  I  Z 3203  (34140)
52750   /  163237   =>    AND  53237
52751   /  742755   =>    JZA  52755
52752   /  073246   =>    JSR  I  53246  (44547)
52753   /  073241   =>    JSR  I  53241  (44500)
52754   /  053213   =>    JSR  I  Z 3213  (444034)
52755   /  073251   =>    JSR  I  53251  (44536)
52756   /  053211   =>    JSR  I  Z 3211  (444025)
52757   /  073252   =>    JSR  I  53252  (45224)
52760   /  053215   =>    JSR  I  Z 3215  (603175)
52761   /  073241   =>    JSR  I  53241  (44500)
52762   /  053217   =>    JSR  I  Z 3217  (144067)
52763   /  073243   =>    JSR  I  53243  (45123)
52764   /  053207   =>    JSR  I  Z 3207  (603175)
52765   /  073245   =>    JSR  I  53245  (44651)
52766   /  073246   =>    JSR  I  53246  (44547)
52767   /  073241   =>    JSR  I  53241  (44500)
52770   /  053221   =>    JSR  I  Z 3221  (25040)
52771   /  073251   =>    JSR  I  53251  (44536)
52772   /  053213   =>    JSR  I  Z 3213  (444034)
52773   /  073252   =>    JSR  I  53252  (45224)
52774   /  053215   =>    JSR  I  Z 3215  (603175)
52775   /  073241   =>    JSR  I  53241  (44500)
52776   /  053223   =>    JSR  I  Z 3223  (26010)
52777   /  073251   =>    JSR  I  53251  (44536)
53000   /  053221   =>    JSR  I  Z 3221  (25040)
53001   /  073253   =>    JSR  I  53253  (45137)
53002   /  053221   =>    JSR  I  Z 3221  (25040)
53003   /  073241   =>    JSR  I  53241  (44500)
53004   /  053225   =>    JSR  I  Z 3225  (103235)
53005   /  073251   =>    JSR  I  53251  (44536)
53006   /  053223   =>    JSR  I  Z 3223  (26010)
53007   /  073253   =>    JSR  I  53253  (45137)
53010   /  053223   =>    JSR  I  Z 3223  (26010)
53011   /  073244   =>    JSR  I  53244  (45037)
53012   /  053225   =>    JSR  I  Z 3225  (103235)
53013   /  073252   =>    JSR  I  53252  (45224)
53014   /  053205   =>    JSR  I  Z 3205  (36140)
53015   /  073241   =>    JSR  I  53241  (44500)
53016   /  053225   =>    JSR  I  Z 3225  (103235)
53017   /  073256   =>    JSR  I  53256  (44644)
53020   /  123177   =>    JMP  53177
53021   /  073251   =>    JSR  I  53251  (44536)
53022   /  053221   =>    JSR  I  Z 3221  (25040)
53023   /  073252   =>    JSR  I  53252  (45224)
53024   /  053225   =>    JSR  I  Z 3225  (103235)
53025   /  073241   =>    JSR  I  53241  (44500)
53026   /  053227   =>    JSR  I  Z 3227  (204025)
53027   /  073241   =>    JSR  I  53241  (44500)
53030   /  000000   =>    0
53031   /  073253   =>    JSR  I  53253  (45137)
53032   /  053201   =>    JSR  I  Z 3201  (444036)
53033   /  073254   =>    JSR  I  53254  (44213)
53034   /  473262   =>    SCA  I  53262  (00000)
53035   /  073251   =>    JSR  I  53251  (44536)
53036   /  053223   =>    JSR  I  Z 3223  (26010)
53037   /  073252   =>    JSR  I  53252  (45224)
53040   /  053225   =>    JSR  I  Z 3225  (103235)
53041   /  073241   =>    JSR  I  53241  (44500)
53042   /  053231   =>    JSR  I  Z 3231  (244022)
53043   /  073241   =>    JSR  I  53241  (44500)
53044   /  000000   =>    0
53045   /  073253   =>    JSR  I  53253  (45137)
53046   /  053201   =>    JSR  I  Z 3201  (444036)
53047   /  073254   =>    JSR  I  53254  (44213)
```

```
53050  /  473263  => SCA I 53263 (0000)
53051  /  000000  => 0
53052  /  743177  => JZA 53177
53053  /  073240  => JSR I 53240 (60357)
53054  /  741505  => JZA 51505
53055  /  012325  => 012325
53056  /  220504  => ADD 50504
53057  /  400740  => STA Z 0740
53060  /  754000  => JNA 54000
53061  /  073251  => JSR I 53251 (44536)
53062  /  053211  => JSR I Z 3211 (444025)
53063  /  073257  => JSR I 53257 (44300)
53064  /  073240  => JSR I 53240 (60357)
53065  /  402525  => STA Z 2525
53066  /  404040  => STA Z 4040
53067  /  234075  => ADD I 54075 (55264)
53070  /  400040  => STA Z 0040
53071  /  073251  => JSR I 53251 (44536)
53072  /  053213  => JSR I Z 3213 (444034)
53073  /  073257  => JSR I 53257 (44300)
53074  /  073240  => JSR I 53240 (60357)
53075  /  402525  => STA Z 2525
53076  /  004040  => LDL 4040
53077  /  073240  => JSR I 53240 (60357)
53100  /  742305  => JZA 52305
53101  /  221105  => ADD 51105
53102  /  234040  => ADD I 54040 (464146)
53103  /  402240  => STA Z 2240
53104  /  754000  => JNA 54000
53105  /  073251  => JSR I 53251 (44536)
53106  /  053217  => JSR I Z 3217 (144067)
53107  /  073257  => JSR I 53257 (44300)
53110  /  073240  => JSR I 53240 (60357)
53111  /  401710  => STA Z 1710
53112  /  152340  => AND I Z 2340 (544113)
53113  /  304075  => IOR Z 4075
53114  /  400040  => STA Z 0040
53115  /  073251  => JSR I 53251 (44536)
53116  /  053223  => JSR I Z 3223 (28010)
53117  /  073257  => JSR I 53257 (44300)
53120  /  073240  => JSR I 53240 (60357)
53121  /  401710  => STA Z 1710
53122  /  152300  => AND I Z 2300 (102561)
53123  /  000000  => 0
53124  /  743146  => JZA 53146
53125  /  073240  => JSR I 53240 (60357)
53126  /  740405  => JZA 50405
53127  /  161715  => AND 51715
53130  /  111601  => JMP I Z 1601 (741627)
53131  /  241722  => SUB Z 1722
53132  /  234001  => ADD I 54001 (465444)
53133  /  220540  => ADD 50540
53134  /  004040  => LDL 4040
53135  /  073251  => JSR I 53251 (44536)
53136  /  053215  => JSR I Z 3215 (603175)
53137  /  073257  => JSR I 53257 (44300)
53140  /  073240  => JSR I 53240 (60357)
53141  /  400116  => STA Z 0116
53142  /  044000  => JSR Z 4000
53143  /  073251  => JSR I 53251 (44536)
53144  /  053225  => JSR I Z 3225 (103235)
53145  /  073257  => JSR I 53257 (44300)
53146  /  073240  => JSR I 53240 (60357)
53147  /  740317  => JZA 50317
```

```
53150  /  222205  =>  ADD 52205
53151  /  032405  =>  032405
53152  /  044007  =>  JSR Z 4007
53153  /  407540  =>  STA Z 7540
53154  /  004040  =>  LDL 4040
53155  /  073251  =>  JSR I 53251 (44536)
53156  /  053227  =>  JSR I Z 3227 (204025)
53157  /  073257  =>  JSR I 53257 (44300)
53160  /  073240  =>  JSR I 53240 (60357)
53161  /  402525  =>  STA Z 2525
53162  /  404040  =>  STA Z 4040
53163  /  234075  =>  ADD I 54075 (55264)
53164  /  400040  =>  STA Z 0040
53165  /  073251  =>  JSR I 53251 (44536)
53166  /  053231  =>  JSR I Z 3231 (244022)
53167  /  073257  =>  JSR I 53257 (44300)
53170  /  073240  =>  JSR I 53240 (60357)
53171  /  402525  =>  STA Z 2525
53172  /  407400  =>  STA Z 7400
53173  /  000000  =>  0
53174  /  000000  =>  0
53175  /  000000  =>  0
53176  /  000000  =>  0
53177  /  020010  =>  CLA
53200  /  132660  =>  JMP I 52660 (0000)
53201  /  000004  =>  LDL 0004
53202  /  240000  =>  SUB Z 0000
53203  /  000006  =>  LDL 0006
53204  /  310000  =>  IOR I Z 0000 (100103)
53205  /  000024  =>  LDL 0024
53206  /  364110  =>  XOR 54110
53207  /  000000  =>  0
53210  /  000000  =>  0
53211  /  000000  =>  0
53212  /  000000  =>  0
53213  /  000000  =>  0
53214  /  000000  =>  0
53215  /  000000  =>  0
53216  /  000000  =>  0
53217  /  000000  =>  0
53220  /  000000  =>  0
53221  /  000000  =>  0
53222  /  000000  =>  0
53223  /  000000  =>  0
53224  /  000000  =>  0
53225  /  000000  =>  0
53226  /  000000  =>  0
53227  /  000000  =>  0
53230  /  000000  =>  0
53231  /  000000  =>  0
53232  /  000000  =>  0
53233  /  000000  =>  0
53234  /  000000  =>  0
53235  /  000000  =>  0
53236  /  000000  =>  0
53237  /  000001  =>  LDL 0001
53240  /  060357  =>  JSR 50357
53241  /  044500  =>  JSR Z 4500
53242  /  044763  =>  JSR Z 4763
53243  /  045123  =>  JSR Z 5123
53244  /  045037  =>  JSR Z 5037
53245  /  044651  =>  JSR Z 4651
53246  /  044547  =>  JSR Z 4547
53247  /  044661  =>  JSR Z 4661
53250  /  044555  =>  JSR Z 4555
53251  /  044536  =>  JSR Z 4536
```

```
53252  /  045224   ->  JSR Z 5224
53253  /  045137   ->  JSR Z 5137
53254  /  044213   ->  JSR Z 4213
53255  /  044570   ->  JSR Z 4570
53256  /  044644   ->  JSR Z 4644
53257  /  044300   ->  JSR Z 4300
53260  /  045347   ->  JSR Z 5347
53261  /  045350   ->  JSR Z 5350
53262  /  000000   ->  0
53263  /  000000   ->  0
53264  /  000000   ->  0
53265  /  020010   ->  CLA
53266  /  465417   ->  SCA 55417
53267  /  464440   ->  SCA 54440
53270  /  464437   ->  SCA 54437
53271  /  464436   ->  SCA 54436
53272  /  000001   ->  LDL 0001
53273  /  475362   ->  SCA I 55362 (47561)
53274  /  063361   ->  JSR 53361
53275  /  063650   ->  JSR 53650
53276  /  064033   ->  JSR 54033
53277  /  020010   ->  CLA
53300  /  324440   ->  IOR 54440
53301  /  465417   ->  SCA 55417
53302  /  133264   ->  JMP I 53264 (0000)
53303  /  000000   ->  0
53304  /  020010   ->  CLA
53305  /  465417   ->  SCA 55417
53306  /  464440   ->  SCA 54440
53307  /  464437   ->  SCA 54437
53310  /  464436   ->  SCA 54436
53311  /  475362   ->  SCA I 55362 (47561)
53312  /  063513   ->  JSR 53513
53313  /  123322   ->  JMP 53322
53314  /  064110   ->  JSR 54110
53315  /  063576   ->  JSR 53576
53316  /  020010   ->  CLA
53317  /  324440   ->  IOR 54440
53320  /  465417   ->  SCA 55417
53321  /  133303   ->  JMP I 53303 (0000)
53322  /  020010   ->  CLA
53323  /  465404   ->  SCA 55404
53324  /  465405   ->  SCA 55405
53325  /  465421   ->  SCA 55421
53326  /  465405   ->  SCA 55405
53327  /  465434   ->  SCA 55434
53330  /  465433   ->  SCA 55433
53331  /  465430   ->  SCA 55430
53332  /  465432   ->  SCA 55432
53333  /  465427   ->  SCA 55427
53334  /  465416   ->  SCA 55416
53335  /  465415   ->  SCA 55415
53336  /  465414   ->  SCA 55414
53337  /  075345   ->  JSR I 55345 (44547)
53340  /  075340   ->  JSR I 55340 (44500)
53341  /  055250   ->  JSR I Z 5250 (72407)
53342  /  075340   ->  JSR I 55340 (44500)
53343  /  055256   ->  JSR I Z 5256 (72422)
53344  /  075340   ->  JSR I 55340 (44500)
53345  /  055260   ->  JSR I Z 5260 (42226)
53346  /  075340   ->  JSR I 55340 (44500)
53347  /  055252   ->  JSR I Z 5252 (55425)
53350  /  075340   ->  JSR I 55340 (44500)
53351  /  055254   ->  JSR I Z 5254 (172622)
53352  /  075340   ->  JSR I 55340 (44500)
53353  /  055264   ->  JSR I Z 5264 (72422)
```

```
53354  /  075340  ->  JSR I 55340 (44500)
53355  /  055262  ->  JSR I Z 5262 (260000)
53356  /  075340  ->  JSR I 55340 (44500)
53357  /  055266  ->  JSR I Z 5266 (55426)
53360  /  123316  ->  JMP 53316
53361  /  000000  ->  0
53362  /  535361  ->  SZW I 55361 (57776)
53363  /  123507  ->  JMP 53507
53364  /  000464  ->  LDL 0464
53365  /  075323  ->  JSR I 55323 (46117)
53366  /  064415  ->  JSR 54415
53367  /  465412  ->  SCA 55412
53370  /  064421  ->  JSR 54421
53371  /  000424  ->  LDL 0424
53372  /  075323  ->  JSR I 55323 (46117)
53373  /  064415  ->  JSR 54415
53374  /  425413  ->  STA 55413
53375  /  265412  ->  SUB 55412
53376  /  026010  ->  SPA CLA
53377  /  000001  ->  LDL 0001
53400  /  465437  ->  SCA 55437
53401  /  064421  ->  JSR 54421
53402  /  020010  ->  CLA
53403  /  335375  ->  IOR I 55375 (46670)
53404  /  335365  ->  IOR I 55365 (46660)
53405  /  075324  ->  JSR I 55324 (45362)
53406  /  000424  ->  LDL 0424
53407  /  075323  ->  JSR I 55323 (46117)
53410  /  020000  ->  NOP
53411  /  020010  ->  CLA
53412  /  000004  ->  LDL 0004
53413  /  463431  ->  SCA 53431
53414  /  001611  ->  LDL 1611
53415  /  565437  ->  SNW 55437
53416  /  325310  ->  IOR 55310
53417  /  075323  ->  JSR I 55323 (46117)
53420  /  123426  ->  JMP 53426
53421  /  026000  ->  SPA
53422  /  020006  ->  NAC
53423  /  265311  ->  SUB 55311
53424  /  026010  ->  SPA CLA
53425  /  123430  ->  JMP 53430
53426  /  663431  ->  DSZ 53431
53427  /  123414  ->  JMP 53414
53430  /  020010  ->  CLA
53431  /  000000  ->  0
53432  /  020006  ->  NAC
53433  /  223412  ->  ADD 53412
53434  /  465436  ->  SCA 55436
53435  /  002474  ->  LDL 2474
53436  /  075323  ->  JSR I 55323 (46117)
53437  /  064415  ->  JSR 54415
53440  /  425404  ->  STA 55404
53441  /  020006  ->  NAC
53442  /  425420  ->  STA 55420
53443  /  223506  ->  ADD 53506
53444  /  022010  ->  SMA CLA
53445  /  123456  ->  JMP 53456
53446  /  000464  ->  LDL 0464
53447  /  075323  ->  JSR I 55323 (46117)
53450  /  020000  ->  NOP
53451  /  425420  ->  STA 55420
53452  /  022000  ->  SMA
53453  /  020006  ->  NAC
53454  /  225404  ->  ADD 55404
53455  /  026000  ->  SPA
```

```
53456  /  020010   => CLA
53457  /  465404   => SCA 55404
53460  /  064421   => JSR 54421
53461  /  000434   => LDL 0434
53462  /  075323   => JSR I 55323 (46117)
53463  /  064415   => JSR 54415
53464  /  425405   => STA 55405
53465  /  020006   => NAC
53466  /  425421   => STA 55421
53467  /  223506   => ADD 53506
53470  /  022010   => SMA CLA
53471  /  123502   => JMP 53502
53472  /  000424   => LDL 0424
53473  /  075323   => JSR I 55323 (46117)
53474  /  020000   => NOP
53475  /  425421   => STA 55421
53476  /  022000   => SMA
53477  /  020006   => NAC
53500  /  225405   => ADD 55405
53501  /  026000   => SPA
53502  /  020010   => CLA
53503  /  465405   => SCA 55405
53504  /  064421   => JSR 54421
53505  /  133361   => JMP I 53361 (0000)
53506  /  000062   => LDL 0062
53507  /  020010   => CLA
53510  /  064421   => JSR 54421
53511  /  064421   => JSR 54421
53512  /  123412   => JMP 53412
53513  /  000000   => 0
53514  /  535361   => SZW I 55361 (57776)
53515  /  123571   => JMP 53571
53516  /  000464   => LDL 0464
53517  /  075323   => JSR I 55323 (46117)
53520  /  064415   => JSR 54415
53521  /  465412   => SCA 55412
53522  /  064421   => JSR 54421
53523  /  000424   => LDL 0424
53524  /  075323   => JSR I 55323 (46117)
53525  /  064415   => JSR 54415
53526  /  425413   => STA 55413
53527  /  265412   => SUB 55412
53530  /  026010   => SPA CLA
53531  /  000001   => LDL 0001
53532  /  465437   => SCA 55437
53533  /  064421   => JSR 54421
53534  /  075402   => JSR I 55402 (60026)
53535  /  123570   => JMP 53570
53536  /  020010   => CLA
53537  /  335375   => IOR I 55375 (46670)
53540  /  335365   => IOR I 55365 (46660)
53541  /  075324   => JSR I 55324 (45362)
53542  /  000424   => LDL 0424
53543  /  525437   => SZW 55437
53544  /  325310   => IOR 55310
53545  /  075323   => JSR I 55323 (46117)
53546  /  020000   => NOP
53547  /  020010   => CLA
53550  /  000005   => LDL 0005
53551  /  463575   => SCA 53575
53552  /  000631   => LDL 0631
53553  /  525437   => SZW 55437
53554  /  325310   => IOR 55310
53555  /  075323   => JSR I 55323 (46117)
53556  /  123564   => JMP 53564
53557  /  026000   => SPA
```

```
53560  /  020006   =>    NAC
53561  /  265311   =>    SUB 55311
53562  /  026010   =>    SPA CLA
53563  /  123566   =>    JMP 53566
53564  /  663575   =>    DSZ 53575
53565  /  123552   =>    JMP 53552
53566  /  020010   =>    CLA
53567  /  623513   =>    ISZ 53513
53570  /  133513   =>    JMP I 53513 (0000)
53571  /  020010   =>    CLA
53572  /  064421   =>    JSR 54421
53573  /  064421   =>    JSR 54421
53574  /  123550   =>    JMP 53550
53575  /  000000   =>    0
53576  /  000000   =>    0
53577  /  001474   =>    LDL 1474
53600  /  075323   =>    JSR I 55323 (46117)
53601  /  064415   =>    JSR 54415
53602  /  425404   =>    STA 55404
53603  /  020006   =>    NAC
53604  /  425420   =>    STA 55420
53605  /  223506   =>    ADD 53506
53606  /  022010   =>    SMA CLA
53607  /  123620   =>    JMP 53620
53610  /  000464   =>    LDL 0464
53611  /  075323   =>    JSR I 55323 (46117)
53612  /  020000   =>    NOP
53613  /  425420   =>    STA 55420
53614  /  022000   =>    SMA
53615  /  020006   =>    NAC
53616  /  225404   =>    ADD 55404
53617  /  026000   =>    SPA
53620  /  020010   =>    CLA
53621  /  465404   =>    SCA 55404
53622  /  064421   =>    JSR 54421
53623  /  000434   =>    LDL 0434
53624  /  075323   =>    JSR I 55323 (46117)
53625  /  064415   =>    JSR 54415
53626  /  425405   =>    STA 55405
53627  /  020006   =>    NAC
53630  /  425421   =>    STA 55421
53631  /  223506   =>    ADD 53506
53632  /  022010   =>    SMA CLA
53633  /  123644   =>    JMP 53644
53634  /  000424   =>    LDL 0424
53635  /  075323   =>    JSR I 55323 (46117)
53636  /  020000   =>    NOP
53637  /  425421   =>    STA 55421
53640  /  022000   =>    SMA
53641  /  020006   =>    NAC
53642  /  225405   =>    ADD 55405
53643  /  026000   =>    SPA
53644  /  020010   =>    CLA
53645  /  465405   =>    SCA 55405
53646  /  064421   =>    JSR 54421
53647  /  133576   =>    JMP I 53576 (0000)
53650  /  000000   =>    0
53651  /  000731   =>    LDL 0731
53652  /  525437   =>    SZW 55437
53653  /  325310   =>    IOR 55310
53654  /  075325   =>    JSR I 55325 (47515)
53655  /  064415   =>    JSR 54415
53656  /  064564   =>    JSR 54564
53657  /  465434   =>    SCA 55434
53660  /  064421   =>    JSR 54421
53661  /  335330   =>    IOR I 55330 (47510)
```

```
53662  /  465435  ->  SCA 55435
53663  /  075340  ->  JSR I 55340 (44500)
53664  /  055250  ->  JSR I Z 5250 (72407)
53665  /  000721  ->  LDL 0721
53666  /  075325  ->  JSR I 55325 (47515)
53667  /  064415  ->  JSR 54415
53670  /  064564  ->  JSR 54564
53671  /  465433  ->  SCA 55433
53672  /  465444  ->  SCA 55444
53673  /  064421  ->  JSR 54421
53674  /  064441  ->  JSR 54441
53675  /  465433  ->  SCA 55433
53676  /  075340  ->  JSR I 55340 (44500)
53677  /  055252  ->  JSR I Z 5252 (55425)
53700  /  000761  ->  LDL 0761
53701  /  075325  ->  JSR I 55325 (47515)
53702  /  064415  ->  JSR 54415
53703  /  064564  ->  JSR 54564
53704  /  465430  ->  SCA 55430
53705  /  064421  ->  JSR 54421
53706  /  064441  ->  JSR 54441
53707  /  465430  ->  SCA 55430
53710  /  075340  ->  JSR I 55340 (44500)
53711  /  055254  ->  JSR I Z 5254 (172622)
53712  /  000711  ->  LDL 0711
53713  /  075325  ->  JSR I 55325 (47515)
53714  /  064415  ->  JSR 54415
53715  /  064564  ->  JSR 54564
53716  /  465432  ->  SCA 55432
53717  /  064421  ->  JSR 54421
53720  /  075340  ->  JSR I 55340 (44500)
53721  /  055256  ->  JSR I Z 5256 (72422)
53722  /  525437  ->  SZW 55437
53723  /  123750  ->  JMP 53750
53724  /  075350  ->  JSR I 55350 (44536)
53725  /  055250  ->  JSR I Z 5250 (72407)
53726  /  075342  ->  JSR I 55342 (45123)
53727  /  055256  ->  JSR I Z 5256 (72422)
53730  /  000001  ->  LDL 0001
53731  /  465444  ->  SCA 55444
53732  /  335330  ->  IOR I 55330 (47510)
53733  /  465422  ->  SCA 55422
53734  /  325435  ->  IOR 55435
53735  /  475330  ->  SCA I 55330 (47510)
53736  /  064441  ->  JSR 54441
53737  /  425434  ->  STA 55434
53740  /  465431  ->  SCA 55431
53741  /  465444  ->  SCA 55444
53742  /  075340  ->  JSR I 55340 (44500)
53743  /  055250  ->  JSR I Z 5250 (72407)
53744  /  075350  ->  JSR I 55350 (44536)
53745  /  055256  ->  JSR I Z 5256 (72422)
53746  /  325422  ->  IOR 55422
53747  /  475330  ->  SCA I 55330 (47510)
53750  /  064441  ->  JSR 54441
53751  /  425432  ->  STA 55432
53752  /  026000  ->  SPA
53753  /  020006  ->  NAC
53754  /  465416  ->  SCA 55416
53755  /  075340  ->  JSR I 55340 (44500)
53756  /  055256  ->  JSR I Z 5256 (72422)
53757  /  075341  ->  JSR I 55341 (44763)
53760  /  075340  ->  JSR I 55340 (44500)
53761  /  055262  ->  JSR I Z 5262 (260000)
53762  /  000751  ->  LDL 0751
```

```
53763  /  075325   => JSR I 55325 (47515)
53764  /  064415   => JSR 54415
53765  /  064564   => JSR 54564
53766  /  465427   => SCA 55427
53767  /  064421   => JSR 54421
53770  /  075340   => JSR I 55340 (44500)
53771  /  055260   => JSR I Z 5260 (42226)
53772  /  565437   => SNW 55437
53773  /  124020   => JMP 54020
53774  /  075350   => JSR I 55350 (44536)
53775  /  055250   => JSR I Z 5250 (72407)
53776  /  075342   => JSR I 55342 (45123)
53777  /  055260   => JSR I Z 5260 (42226)
54000  /  000001   => LDL 0001
54001  /  465444   => SCA 55444
54002  /  335330   => IOR I 55330 (47510)
54003  /  465422   => SCA 55422
54004  /  325435   => IOR 55435
54005  /  475330   => SCA I 55330 (47510)
54006  /  064441   => JSR 54441
54007  /  425434   => STA 55434
54010  /  465431   => SCA 55431
54011  /  465444   => SCA 55444
54012  /  325422   => IOR 55422
54013  /  475330   => SCA I 55330 (47510)
54014  /  075340   => JSR I 55340 (44500)
54015  /  055250   => JSR I Z 5250 (72407)
54016  /  075350   => JSR I 55350 (44536)
54017  /  055260   => JSR I Z 5260 (42226)
54020  /  064441   => JSR 54441
54021  /  425427   => STA 55427
54022  /  026000   => SPA
54023  /  020006   => NAC
54024  /  465415   => SCA 55415
54025  /  075340   => JSR I 55340 (44500)
54026  /  055260   => JSR I Z 5260 (42226)
54027  /  075341   => JSR I 55341 (44763)
54030  /  075340   => JSR I 55340 (44500)
54031  /  055264   => JSR I Z 5264 (72422)
54032  /  133650   => JMP I 53650 (0000)
54033  /  000000   => 0
54034  /  000723   => LDL 0723
54035  /  075325   => JSR I 55325 (47515)
54036  /  064415     JSR 54415
54037  /  064564   => JSR 54564
54040  /  464106   => SCA 54106
54041  /  064421   => JSR 54421
54042  /  064441     JSR 54441
54043  /  265416   => SUB 55416
54044  /  026000   => SPA
54045  /  020010   => CLA
54046  /  425416   => STA 55416
54047  /  075342   => JSR I 55342 (45123)
54050  /  055262   => JSR I Z 5262 (260000)
54051  /  075344   => JSR I 55344 (44651)
54052  /  075345   => JSR I 55345 (44547)
54053  /  075340   => JSR I 55340 (44500)
54054  /  055262   => JSR I Z 5262 (260000)
54055  /  000763   => LDL 0763
54056  /  075325   => JSR I 55325 (47515)
54057  /  064415   => JSR 54415
54060  /  064564   => JSR 54564
54061  /  464107   => SCA 54107
54062  /  064421   => JSR 54421
54063  /  064441   => JSR 54441
```

```
54064  /  265415   =>   SUB 55415
54065  /  026000   =>   SPA
54066  /  020010   =>   CLA
54067  /  425415   =>   STA 55415
54070  /  075342   =>   JSR I 55342 (45123)
54071  /  055264   =>   JSR I Z 5264 (72422)
54072  /  075344   =>   JSR I 55344 (44651)
54073  /  075345   =>   JSR I 55345 (44547)
54074  /  075340   =>   JSR I 55340 (44500)
54075  /  055264   =>   JSR I Z 5264 (72422)
54076  /  075342   =>   JSR I 55342 (45123)
54077  /  055262   =>   JSR I Z 5262 (260000)
54100  /  075341   =>   JSR I 55341 (44763)
54101  /  075340   =>   JSR I 55340 (44500)
54102  /  055266   =>   JSR I Z 5266 (55426)
54103  /  075353   =>   JSR I 55353 (44213)
54104  /  465414   =>   SCA 55414
54105  /  134033   =>   JMP I 54033 (0000)
54106  /  000000   =>   0
54107  /  000000   =>   0
54110  /  000000   =>   0
54111  /  000731   =>   LDL 0731
54112  /  525437   =>   SZW 55437
54113  /  325310   =>   IOR 55310
54114  /  075325   =>   JSR I 55325 (47515)
54115  /  064415   =>   JSR 54415
54116  /  064564   =>   JSR 54564
54117  /  465434   =>   SCA 55434
54120  /  064421   =>   JSR 54421
54121  /  335330   =>   IOR I 55330 (47510)
54122  /  465435   =>   SCA 55435
54123  /  075340   =>   JSR I 55340 (44500)
54124  /  055250   =>   JSR I Z 5250 (72407)
54125  /  000721   =>   LDL 0721
54126  /  075325   =>   JSR I 55325 (47515)
54127  /  064415   =>   JSR 54415
54130  /  064564   =>   JSR 54564
54131  /  465433   =>   SCA 55433
54132  /  465444   =>   SCA 55444
54133  /  064421   =>   JSR 54421
54134  /  064441   =>   JSR 54441
54135  /  465433   =>   SCA 55433
54136  /  075340   =>   JSR I 55340 (44500)
54137  /  055252   =>   JSR I Z 5252 (55425)
54140  /  000761   =>   LDL 0761
54141  /  075325   =>   JSR I 55325 (47515)
54142  /  064415   =>   JSR 54415
54143  /  064564   =>   JSR 54564
54144  /  465430   =>   SCA 55430
54145  /  064421   =>   JSR 54421
54146  /  064441   =>   JSR 54441
54147  /  465430   =>   SCA 55430
54150  /  075340   =>   JSR I 55340 (44500)
54151  /  055254   =>   JSR I Z 5254 (172622)
54152  /  000723   =>   LDL 0723
54153  /  075325   =>   JSR I 55325 (47515)
54154  /  064415   =>   JSR 54415
54155  /  064564   =>   JSR 54564
54156  /  465416   =>   SCA 55416
54157  /  064421   =>   JSR 54421
54160  /  075340   =>   JSR I 55340 (44500)
54161  /  034405   =>   JSR I Z 4405 (220705)
54162  /  000763   =>   LDL 0763
54163  /  075325   =>   JSR I 55325 (47515)
54164  /  064415   =>   JSR 54415
54165  /  064564   =>   JSR 54564
```

```
54166  /  465415   => SCA 55415
54167  /  064421   => JSR 54421
54170  /  075340   => JSR I 55340 (44500)
54171  /  054407   => JSR I Z 4407 (12314)
54172  /  075350   => JSR I 55350 (44536)
54173  /  054405   => JSR I Z 4405 (220705)
54174  /  075354   => JSR I 55354 (44570)
54175  /  054411   => JSR I Z 4411 (40417)
54176  /  165312   => AND 55312
54177  /  754227   => JNA 54227
54200  /  075350   => JSR I 55350 (44536)
54201  /  054407   => JSR I Z 4407 (12314)
54202  /  075354   => JSR I 55354 (44570)
54203  /  054411   => JSR I Z 4411 (40417)
54204  /  165312   => AND 55312
54205  /  754227   => JNA 54227
54206  /  075350   => JSR I 55350 (44536)
54207  /  055250   => JSR I Z 5250 (72407)
54210  /  075341   => JSR I 55341 (44763)
54211  /  075354   => JSR I 55354 (44570)
54212  /  054411   => JSR I Z 4411 (40417)
54213  /  165312   => AND 55312
54214  /  754227   => JNA 54227
54215  /  075345   => JSR I 55345 (44547)
54216  /  075340   => JSR I 55340 (44500)
54217  /  055256   => JSR I Z 5256 (72422)
54220  /  075340   => JSR I 55340 (44500)
54221  /  055260   => JSR I Z 5260 (42226)
54222  /  020010   => CLA
54223  /  465432   => SCA 55432
54224  /  465427   => SCA 55427
54225  /  465414   => SCA 55414
54226  /  124400   => JMP 54400
54227  /  000711   => LDL 0711
54230  /  075325   => JSR I 55325 (47515)
54231  /  064415   => JSR 54415
54232  /  064564   => JSR 54564
54233  /  465432   => SCA 55432
54234  /  064421   => JSR 54421
54235  /  075340   => JSR I 55340 (44500)
54236  /  055256   => JSR I Z 5256 (72422)
54237  /  525437   => SZW 55437
54240  /  124265   => JMP 54265
54241  /  075350   => JSR I 55350 (44536)
54242  /  055250   => JSR I Z 5250 (72407)
54243  /  075342   => JSR I 55342 (45123)
54244  /  055256   => JSR I Z 5256 (72422)
54245  /  000001   => LDL 0001
54246  /  465444   => SCA 55444
54247  /  335330   => IOR I 55330 (47510)
54250  /  465422   => SCA 55422
54251  /  325435   => IOR 55435
54252  /  475330   => SCA I 55330 (47510)
54253  /  064441   => JSR 54441
54254  /  425434   => STA 55434
54255  /  465431   => SCA 55431
54256  /  465444   => SCA 55444
54257  /  075340   => JSR I 55340 (44500)
54260  /  055250   => JSR I Z 5250 (72407)
54261  /  075350   => JSR I 55350 (44536)
54262  /  055256   => JSR I Z 5256 (72422)
54263  /  325422   => IOR 55422
54264  /  475330   => SCA I 55330 (47510)
54265  /  064441   => JSR 54441
54266  /  425432   => STA 55432
54267  /  026000   => SPA
```

```
54270  /  020006   ->   NAC
54271  /  465416   ->   SCA 55416
54272  /  075340   ->   JSR I 55340 (44500)
54273  /  055256   ->   JSR I Z 5256 (72422)
54274  /  075341   ->   JSR I 55341 (44763)
54275  /  075340   ->   JSR I 55340 (44500)
54276  /  055262   ->   JSR I Z 5262 (260000)
54277  /  000751   ->   LDL 0751
54300  /  075325   ->   JSR I 55325 (47515)
54301  /  064415   ->   JSR 54415
54302  /  064564   ->   JSR 54564
54303  /  465427   ->   SCA 55427
54304  /  064421   ->   JSR 54421
54305  /  075340   ->   JSR I 55340 (44500)
54306  /  055260   ->   JSR I Z 5260 (42226)
54307  /  565437   ->   SNW 55437
54310  /  124335   ->   JMP 54335
54311  /  075350   ->   JSR I 55350 (44536)
54312  /  055250   ->   JSR I Z 5250 (72407)
54313  /  075342   ->   JSR I 55342 (45123)
54314  /  055260   ->   JSR I Z 5260 (42226)
54315  /  000001   ->   LDL 0001
54316  /  465444   ->   SCA 55444
54317  /  335330   ->   IOR I 55330 (47510)
54320  /  465422   ->   SCA 55422
54321  /  325435   ->   IOR 55435
54322  /  475330   ->   SCA I 55330 (47510)
54323  /  064441   ->   JSR 54441
54324  /  425434   ->   STA 55434
54325  /  465431   ->   SCA 55431
54326  /  465444   ->   SCA 55444
54327  /  325422   ->   IOR 55422
54330  /  475330   ->   SCA I 55330 (47510)
54331  /  075340   ->   JSR I 55340 (44500)
54332  /  055250   ->   JSR I Z 5250 (72407)
54333  /  075350   ->   JSR I 55350 (44536)
54334  /  055260   ->   JSR I Z 5260 (42226)
54335  /  064441   ->   JSR 54441
54336  /  425427   ->   STA 55427
54337  /  026000   ->   SPA
54340  /  020006   ->   NAC
54341  /  465415   ->   SCA 55415
54342  /  075340   ->   JSR I 55340 (44500)
54343  /  055260   ->   JSR I Z 5260 (42226)
54344  /  075341   ->   JSR I 55341 (44763)
54345  /  075340   ->   JSR I 55340 (44500)
54346  /  055264   ->   JSR I Z 5264 (72422)
54347  /  075350   ->   JSR I 55350 (44536)
54350  /  054405   ->   JSR I Z 4405 (220705)
54351  /  075342   ->   JSR I 55342 (45123)
54352  /  055262   ->   JSR I Z 5262 (260000)
54353  /  075344   ->   JSR I 55344 (44651)
54354  /  075345   ->   JSR I 55345 (44547)
54355  /  075340   ->   JSR I 55340 (44500)
54356  /  055262   ->   JSR I Z 5262 (260000)
54357  /  075353   ->   JSR I 55353 (44213)
54360  /  465416   ->   SCA 55416
54361  /  075350   ->   JSR I 55350 (44536)
54362  /  054407   ->   JSR I Z 4407 (12314)
54363  /  075342   ->   JSR I 55342 (45123)
54364  /  055264   ->   JSR I Z 5264 (72422)
54365  /  075344   ->   JSR I 55344 (44651)
54366  /  075345   ->   JSR I 55345 (44547)
54367  /  075340   ->   JSR I 55340 (44500)
54370  /  055264   ->   JSR I Z 5264 (72422)
54371  /  075353   ->   JSR I 55353 (44213)
```

```
54372  /  465415  => SCA 55415
54373  /  075350  => JSR I 55350 (44536)
54374  /  055262  => JSR I Z 5262 (260000)
54375  /  075342  => JSR I 55342 (45123)
54376  /  055264  => JSR I Z 5264 (72422)
54377  /  075341  => JSR I 55341 (44763)
54400  /  075340  => JSR I 55340 (44500)
54401  /  055266  => JSR I Z 5266 (55426)
54402  /  075353  => JSR I 55353 (44213)
54403  /  465414  => SCA 55414
54404  /  134110  => JMP I 54110 (0000)
54405  /  000000  => 0
54406  /  000000  => 0
54407  /  000000  => 0
54410  /  000000  => 0
54411  /  000010  => LDL 0010
54412  /  310000  => IOR I Z 0000 (100103)
54413  /  000000  => 0
54414  /  000000  => 0
54415  /  000000  => 0
54416  /  624436  => ISZ 54436
54417  /  020000  => NOP
54420  /  134415  => JMP I 54415 (0000)
54421  /  000000  => 0
54422  /  020050  => CLA CLL
54423  /  324437  => IOR 54437
54424  /  025000  => SNA
54425  /  020020  => STL
54426  /  032100  => RTL 1
54427  /  424437  => STA 54437
54430  /  324440  => IOR 54440
54431  /  524436  => SZW 54436
54432  /  464440     SCA 54440
54433  /  020010  => CLA
54434  /  464436  => SCA 54436
54435  /  134421  => JMP I 54421 (0000)
54436  /  000000     0
54437  /  000000  => 0
54440  /  000000  => 0
54441  /  000000  => 0
54442  /  020010  => CLA
54443  /  335360  => IOR I 55360 (45350)
54444  /  026010  => SPA CLA
54445  /  000001  => LDL 0001
54446  /  424540  => STA 54540
54447  /  021010  => SZA CLA
54450  /  075347  => JSR I 55347 (44555)
54451  /  075340  => JSR I 55340 (44500)
54452  /  054550  => JSR I Z 4550 (312405)
54453  /  075350  => JSR I 55350 (44536)
54454  /  054560  => JSR I Z 4560 (32405)
54455  /  564551  => SNW 54551
54456  /  124541  => JMP 54541
54457  /  075351  => JSR I 55351 (45224)
54460  /  054550  => JSR I Z 4550 (312405)
54461  /  575330  => SNW I 55330 (47510)
54462  /  124471  => JMP 54471
54463  /  075342  => JSR I 55342 (45123)
54464  /  054556  => JSR I Z 4556 (300310)
54465  /  565444  => SNW 55444
54466  /  124471  => JMP 54471
54467  /  075342  => JSR I 55342 (45123)
54470  /  054556  => JSR I Z 4556 (300310)
54471  /  075344  => JSR I 55344 (44651)
54472  /  075345  => JSR I 55345 (44547)
54473  /  075340  => JSR I 55340 (44500)
```

```
54474  /  054552   ->   JSR I Z 4552 (32315)
54475  /  575360   ->   SNW I 55360 (45350)
54476  /  124545   ->   JMP 54545
54477  /  075350   ->   JSR I 55350 (44536)
54500  /  054560   ->   JSR I Z 4560 (32405)
54501  /  075351   ->   JSR I 55351 (45224)
54502  /  054552   ->   JSR I Z 4552 (32315)
54503  /  524540   ->   SZW 54540
54504  /  075347   ->   JSR I 55347 (44555)
54505  /  075340   ->   JSR I 55340 (44500)
54506  /  054554   ->   JSR I Z 4554 (45753)
54507  /  075353   ->   JSR I 55353 (44213)
54510  /  564536   ->   SNW 54536
54511  /  134441   ->   JMP I 54441 (0000)
54512  /  464537   ->   SCA 54537
54513  /  075315   ->   JSR I 55315 (60357)
54514  /  744000   ->   JZA 54000
54515  /  075356   ->   JSR I 55356 (44300)
54516  /  075315   ->   JSR I 55315 (60357)
54517  /  402501   ->   STA Z 2501
54520  /  404040   ->   STA Z 4040
54521  /  004040   ->   LDL 4040
54522  /  075350   ->   JSR I 55350 (44536)
54523  /  054552   ->   JSR I Z 4552 (32315)
54524  /  075356   ->   JSR I 55356 (44300)
54525  /  075315   ->   JSR I 55315 (60357)
54526  /  401710   ->   STA Z 1710
54527  /  152340   ->   AND I Z 2340 (544113)
54530  /  004040   ->   LDL 4040
54531  /  075350   ->   JSR I 55350 (44536)
54532  /  054554   ->   JSR I Z 4554 (45753)
54533  /  020010   ->   CLA
54534  /  324537   ->   IOR 54537
54535  /  124511   ->   JMP 54511
54536  /  000000   ->   0
54537  /  000000   ->   0
54540  /  000000   ->   0
54541  /  075340   ->   JSR I 55340 (44500)
54542  /  054552   ->   JSR I Z 4552 (32315)
54543  /  075345   ->   JSR I 55345 (44547)
54544  /  124505   ->   JMP 54505
54545  /  075350   ->   JSR I 55350 (44536)
54546  /  054562   ->   JSR I Z 4562 (42450)
54547  /  124505   ->   JMP 54505
54550  /  000000   ->   0
54551  /  000000   ->   0
54552  /  000000   ->   0
54553  /  000000   ->   0
54554  /  000000   ->   0
54555  /  000000   ->   0
54556  /  000012   ->   LDL 0012
54557  /  372000   ->   XOR I 52000 (241114)
54560  /  000032   ->   LDL 0032
54561  /  276570   ->   SUB I 56570 (270522)
54562  /  000034   ->   LDL 0034
54563  /  276570   ->   SUB I 56570 (270522)
54564  /  000000   ->   0
54565  /  424602   ->   STA 54602
54566  /  026000   ->   SPA
54567  /  020006   ->   NAC
54570  /  264613   ->   SUB 54613
54571  /  026010   ->   SPA CLA
54572  /  124600   ->   JMP 54600
54573  /  075340   ->   JSR I 55340 (44500)
54574  /  054611   ->   JSR I Z 4611 (150405)
54575  /  075322   ->   JSR I 55322 (46150)
```

```
54576  /  124605   ->   JMP 54605
54577  /  124603   ->   JMP 54603
54600  /  324602   ->   IOR 54602
54601  /  134564   ->   JMP I 54564 (0000)
54602  /  000000   ->   0
54603  /  075353   ->   JSR I 55353 (44213)
54604  /  124601   ->   JMP 54601
54605  /  075350   ->   JSR I 55350 (44536)
54606  /  054611   ->   JSR I Z 4611 (150405)
54607  /  020010   ->   CLA
54610  /  124600   ->   JMP 54600
54611  /  000000   ->   0
54612  /  000000   ->   0
54613  /  000062   ->   LDL 0062
54614  /  000000   ->   0
54615  /  020010   ->   CLA
54616  /  465403   ->   SCA 55403
54617  /  464440   ->   SCA 54440
54620  /  464437   ->   SCA 54437
54621  /  464436   ->   SCA 54436
54622  /  000726   ->   LDL 0726
54623  /  075326   ->   JSR I 55326 (47436)
54624  /  064415   ->   JSR 54415
54625  /  465425   ->   SCA 55425
54626  /  064421   ->   JSR 54421
54627  /  075340   ->   JSR I 55340 (44500)
54630  /  055270        JSR I Z 5270 (240102)
54631  /  075352   ->   JSR I 55352 (45137)
54632  /  055246   ->   JSR I Z 5246 (260000)
54633  /  075353   ->   JSR I 55353 (44213)
54634  /  465425        SCA 55425
54635  /  065017   ->   JSR 55017
54636  /  064415   ->   JSR 54415
54637  /  465442   ->   SCA 55442
54640  /  064421   ->   JSR 54421
54641  /  075340   ->   JSR I 55340 (44500)
54642  /  055300   ->   JSR I Z 5300 (100427)
54643  /  075352   ->   JSR I 55352 (45137)
54644  /  055246   ->   JSR I Z 5246 (260000)
54645  /  075353   ->   JSR I 55353 (44213)
54646  /  465442   ->   SCA 55442
54647  /  000300   ->   LDL 0300
54650  /  175327   ->   AND I 55327 (45753)
54651  /  465410   ->   SCA 55410
54652  /  000766   ->   LDL 0766
54653  /  075326   ->   JSR I 55326 (47436)
54654  /  064415   ->   JSR 54415
54655  /  465423   ->   SCA 55423
54656  /  064421   ->   JSR 54421
54657  /  075340   ->   JSR I 55340 (44500)
54660  /  055272   ->   JSR I Z 5272 (72704)
54661  /  075352   ->   JSR I 55352 (45137)
54662  /  055246   ->   JSR I Z 5246 (260000)
54663  /  075353   ->   JSR I 55353 (44213)
54664  /  465423   ->   SCA 55423
54665  /  065017   ->   JSR 55017
54666  /  064415   ->   JSR 54415
54667  /  465440   ->   SCA 55440
54670  /  064421   ->   JSR 54421
54671  /  075340   ->   JSR I 55340 (44500)
54672  /  055302   ->   JSR I Z 5302 (45755)
54673  /  075352   ->   JSR I 55352 (45137)
54674  /  055246   ->   JSR I Z 5246 (260000)
54675  /  075353   ->   JSR I 55353 (44213)
54676  /  465440   ->   SCA 55440
54677  /  000300   ->   LDL 0300
```

```
54700  /  175327  ->  AND I 55327 (45753)
54701  /  465406  ->  SCA 55406
54702  /  000736  ->  LDL 0736
54703  /  075326  ->  JSR I 55326 (47436)
54704  /  064415  ->  JSR 54415
54705  /  465426  ->  SCA 55426
54706  /  064421  ->  JSR 54421
54707  /  075340  ->  JSR I 55340 (44500)
54710  /  055274  ->  JSR I Z 5274 (42227)
54711  /  075340  ->  JSR I 55340 (44500)
54712  /  055276  ->  JSR I Z 5276 (20000)
54713  /  075352  ->  JSR I 55352 (45137)
54714  /  055246  ->  JSR I Z 5246 (260000)
54715  /  075353  ->  JSR I 55353 (44213)
54716  /  425426  ->  STA 55426
54717  /  465424  ->  SCA 55424
54720  /  065017  ->  JSR 55017
54721  /  064415  ->  JSR 54415
54722  /  465443  ->  SCA 55443
54723  /  064421  ->  JSR 54421
54724  /  075340  ->  JSR I 55340 (44500)
54725  /  055304  ->  JSR I Z 5304 (161700)
54726  /  075340  ->  JSR I 55340 (44500)
54727  /  055306  ->  JSR I Z 5306 (101107)
54730  /  075352  ->  JSR I 55352 (45137)
54731  /  055246  ->  JSR I Z 5246 (260000)
54732  /  075353  ->  JSR I 55353 (44213)
54733  /  425443  ->  STA 55443
54734  /  465441  ->  SCA 55441
54735  /  000300  ->  LDL 0300
54736  /  175327  ->  AND I 55327 (45753)
54737  /  425407  ->  STA 55407
54740  /  465411  ->  SCA 55411
54741  /  020010  ->  CLA
54742  /  325442  ->  IOR 55442
54743  /  265440  ->  SUB 55440
54744  /  026000  ->  SPA
54745  /  020006  ->  NAC
54746  /  265016  ->  SUB 55016
54747  /  022010  ->  SMA CLA
54750  /  124760  ->  JMP 54760
54751  /  325425  ->  IOR 55425
54752  /  265423  ->  SUB 55423
54753  /  026000  ->  SPA
54754  /  020006  ->  NAC
54755  /  265016  ->  SUB 55016
54756  /  026010  ->  SPA CLA
54757  /  125010  ->  JMP 55010
54760  /  000776  ->  LDL 0776
54761  /  075326  ->  JSR I 55326 (47436)
54762  /  064415  ->  JSR 54415
54763  /  465424  ->  SCA 55424
54764  /  064421  ->  JSR 54421
54765  /  075340  ->  JSR I 55340 (44500)
54766  /  055276  ->  JSR I Z 5276 (20000)
54767  /  075352  ->  JSR I 55352 (45137)
54770  /  055246  ->  JSR I Z 5246 (260000)
54771  /  075353  ->  JSR I 55353 (44213)
54772  /  465424  ->  SCA 55424
54773  /  065017  ->  JSR 55017
54774  /  064415  ->  JSR 54415
54775  /  465441  ->  SCA 55441
54776  /  064421  ->  JSR 54421
54777  /  075340  ->  JSR I 55340 (44500)
55000  /  055306  ->  JSR I Z 5306 (101107)
```

```
55001  /  075352   =>   JSR I 55352 (45137)
55002  /  055246   =>   JSR I Z 5246 (260000)
55003  /  075353   =>   JSR I 55353 (44213)
55004  /  465441   =>   SCA 55441
55005  /  000300   =>   LDL 0300
55006  /  175327   =>   AND I 55327 (45753)
55007  /  465407   =>   SCA 55407
55010  /  020010   =>   CLA
55011  /  324440   =>   IOR 54440
55012  /  465403   =>   SCA 55403
55013  /  020000   =>   NOP
55014  /  065034   =>   JSR 55034
55015  /  134614   =>   JMP I 54614 (0000)
55016  /  000062   =>   LDL 0062
55017  /  000000   =>   0
55020  /  777777   =>   LDL -0001
55021  /  235327   =>   ADD I 55327 (45753)
55022  /  165313   =>   AND 55313
55023  /  475327   =>   SCA I 55327 (45753)
55024  /  075322   =>   JSR I 55322 (46150)
55025  /  024010   =>   SKP CLA
55026  /  125032        JMP 55032
55027  /  335327   =>   IOR I 55327 (45753)
55030  /  075323   =>   JSR I 55323 (46117)
55031  /  024000   =>   SKP
55032  /  625017        ISZ 55017
55033  /  135017   =>   JMP I 55017 (0000)
55034  /  000000   =>   0
55035  /  020010   =>   CLA
55036  /  525410   =>   SZW 55410
55037  /  125046   =>   JMP 55046
55040  /  075363   =>   JSR I 55363 (52660)
55041  /  055100   =>   JSR I Z 5100 (70000)
55042  /  055270   =>   JSR I Z 5270 (240102)
55043  /  055300   =>   JSR I Z 5300 (100427)
55044  /  055425   =>   JSR I Z 5425 (616000)
55045  /  055442   =>   JSR I Z 5442 (46624)
55046  /  525406   =>   SZW 55406
55047  /  125056   =>   JMP 55056
55050  /  075363   =>   JSR I 55363 (52660)
55051  /  055100   =>   JSR I Z 5100 (70000)
55052  /  055272   =>   JSR I Z 5272 (72704)
55053  /  055302   =>   JSR I Z 5302 (45755)
55054  /  055423   =>   JSR I Z 5423 (213000)
55055  /  055440   =>   JSR I Z 5440 (140123)
55056  /  525411   =>   SZW 55411
55057  /  125066   =>   JMP 55066
55060  /  075363   =>   JSR I 55363 (52660)
55061  /  055102   =>   JSR I Z 5102 (62223)
55062  /  055274   =>   JSR I Z 5274 (42227)
55063  /  055304   =>   JSR I Z 5304 (161700)
55064  /  055426   =>   JSR I Z 5426 (10000)
55065  /  055443   =>   JSR I Z 5443 (140123)
55066  /  525407   =>   SZW 55407
55067  /  125076   =>   JMP 55076
55070  /  075363   =>   JSR I 55363 (52660)
55071  /  055102   =>   JSR I Z 5102 (62223)
55072  /  055276   =>   JSR I Z 5276 (20000)
55073  /  055306   =>   JSR I Z 5306 (101107)
55074  /  055424   =>   JSR I Z 5424 (132302)
55075  /  055441   =>   JSR I Z 5441 (10400)
55076  /  020010   =>   CLA
55077  /  135034   =>   JMP I 55034 (0000)
55100  /  000012   =>   LDL 0012
55101  /  372000   =>   XOR I 52000 (241114)
55102  /  000013   =>   LDL 0013
```

```
55103  /  372000   =>   XOR I 52000 (241114)
55104  /  000000   =>   0
55105  /  000001   =>   LDL 0001
55106  /  475335   =>   SCA I 55335 (47646)
55107  /  000426   =>   LDL 0426
55110  /  325410   =>   IOR 55410
55111  /  065203   =>   JSR 55203
55112  /  465425   =>   SCA 55425
55113  /  075340   =>   JSR I 55340 (44500)
55114  /  055270   =>   JSR I Z 5270 (240102)
55115  /  020010   =>   CLA
55116  /  475335   =>   SCA I 55335 (47646)
55117  /  000425   =>   LDL 0425
55120  /  325410   =>   IOR 55410
55121  /  065203   =>   JSR 55203
55122  /  465442   =>   SCA 55442
55123  /  075340   =>   JSR I 55340 (44500)
55124  /  055300   =>   JSR I Z 5300 (100427)
55125  /  000466   =>   LDL 0466
55126  /  325406   =>   IOR 55406
55127  /  065203   =>   JSR 55203
55130  /  465423   =>   SCA 55423
55131  /  075340   =>   JSR I 55340 (44500)
55132  /  055272   =>   JSR I Z 5272 (72704)
55133  /  000465   =>   LDL 0465
55134  /  325406   =>   IOR 55406
55135  /  065203   =>   JSR 55203
55136  /  465440   =>   SCA 55440
55137  /  075340   =>   JSR I 55340 (44500)
55140  /  055302   =>   JSR I Z 5302 (45755)
55141  /  000001   =>   LDL 0001
55142  /  475335   =>   SCA I 55335 (47646)
55143  /  000436   =>   LDL 0436
55144  /  325411   =>   IOR 55411
55145  /  065203   =>   JSR 55203
55146  /  465426   =>   SCA 55426
55147  /  075340   =>   JSR I 55340 (44500)
55150  /  055274   =>   JSR I Z 5274 (42227)
55151  /  020010   =>   CLA
55152  /  475335   =>   SCA I 55335 (47646)
55153  /  000435   =>   LDL 0435
55154  /  325411   =>   IOR 55411
55155  /  065203   =>   JSR 55203
55156  /  465443   =>   SCA 55443
55157  /  075340   =>   JSR I 55340 (44500)
55160  /  055304   =>   JSR I Z 5304 (161700)
55161  /  000001   =>   LDL 0001
55162  /  475335   =>   SCA I 55335 (47646)
55163  /  000476   =>   LDL 0476
55164  /  325407   =>   IOR 55407
55165  /  065203   =>   JSR 55203
55166  /  465424   =>   SCA 55424
55167  /  075340   =>   JSR I 55340 (44500)
55170  /  055276   =>   JSR I Z 5276 (20000)
55171  /  020010   =>   CLA
55172  /  475335   =>   SCA I 55335 (47646)
55173  /  000475   =>   LDL 0475
55174  /  325407   =>   IOR 55407
55175  /  065203   =>   JSR 55203
55176  /  465441   =>   SCA 55441
55177  /  075340   =>   JSR I 55340 (44500)
55200  /  055306   =>   JSR I Z 5306 (101107)
55201  /  065034   =>   JSR 55034
55202  /  135104   =>   JMP I 55104 (0000)
```

```
55203  /  000000   =>   0
55204  /  165314   =>   AND 55314
55205  /  075334   =>   JSR I 55334 (47071)
55206  /  020000   =>   NOP
55207  /  425220   =>   STA 55220
55210  /  032140   =>   CLL RTL 1
55211  /  034300   =>   SHR 3
55212  /  225220   =>   ADD 55220
55213  /  425220   =>   STA 55220
55214  /  755223   =>   JNA 55223
55215  /  075345   =>   JSR I 55345 (44547)
55216  /  135203   =>   JMP I 55203 (0000)
55217  /  000021   =>   LDL 0021
55220  /  000000   =>   0
55221  /  000000   =>   0
55222  /  000000   =>   0
55223  /  075350   =>   JSR I 55350 (44536)
55224  /  055217        JSR I Z 5217 (42224)
55225  /  075352   =>   JSR I 55352 (45137)
55226  /  045761   =>   JSR Z 5761
55227  /  075340   =>   JSR I 55340 (44500)
55230  /  055221        JSR I Z 5221 (260000)
55231  /  075352   =>   JSR I 55352 (45137)
55232  /  055246   =>   JSR I Z 5246 (260000)
55233  /  075353   =>   JSR I 55353 (44213)
55234  /  465245   =>   SCA 55245
55235  /  075350   =>   JSR I 55350 (44536)
55236  /  055221   =>   JSR I Z 5221 (260000)
55237  /  325245   =>   IOR 55245
55240  /  125216   =>   JMP 55216
55241  /  075356   =>   JSR I 55356 (44300)
55242  /  020010   =>   CLA
55243  /  325245   =>   IOR 55245
55244  /  125216   =>   JMP 55216
55245  /  000000   =>   0
55246  /  000004   =>   LDL 0004
55247  /  240000   =>   SUB Z 0000
55250  /  000000   =>   0
55251  /  000000   =>   0
55252  /  000000   =>   0
55253  /  000000   =>   0
55254  /  000000   =>   0
55255  /  000000   =>   0
55256  /  000000   =>   0
55257  /  000000   =>   0
55260  /  000000   =>   0
55261  /  000000   =>   0
55262  /  000000   =>   0
55263  /  000000   =>   0
55264  /  000000   =>   0
55265  /  000000   =>   0
55266  /  000000   =>   0
55267  /  000000   =>   0
55270  /  000000   =>   0
55271  /  000000   =>   0
55272  /  000000   =>   0
55273  /  000000   =>   0
55274  /  000000   =>   0
55275  /  000000   =>   0
55276  /  000000   =>   0
55277  /  000000   =>   0
55300  /  000000   =>   0
55301  /  000000   =>   0
55302  /  000000   =>   0
```

```
55303  /  000000  =>  0
55304  /  000000  =>  0
55305  /  000000  =>  0
55306  /  000000  =>  0
55307  /  000000  =>  0
55310  /  000040  =>  LDL 0040
55311  /  000310  =>  LDL 0310
55312  /  000001  =>  LDL 0001
55313  /  000777  =>  LDL 0777
55314  /  007777  =>  LDL 7777
55315  /  060357  =>  JSR 50357
55316  /  060103  =>  JSR 50103
55317  /  060142  =>  JSR 50142
55320  /  060124  =>  JSR 50124
55321  /  060140  =>  JSR 50140
55322  /  046150  =>  JSR Z 6150
55323  /  046117  =>  JSR Z 6117
55324  /  045362  =>  JSR Z 5362
55325  /  047515  =>  JSR Z 7515
55326  /  047436  =>  JSR Z 7436
55327  /  045753  =>  JSR Z 5753
55330  /  047510  =>  JSR Z 7510
55331  /  047507  =>  JSR Z 7507
55332  /  047511  =>  JSR Z 7511
55333  /  067767  =>  JSR 57767
55334  /  047071  =>  JSR Z 7071
55335  /  047646  =>  JSR Z 7646
55336  /  045763  =>  JSR Z 5763
55337  /  045757  =>  JSR Z 5757
55340  /  044500  =>  JSR Z 4500
55341  /  044763  =>  JSR Z 4763
55342  /  045123  =>  JSR Z 5123
55343  /  045037  =>  JSR Z 5037
55344  /  044651  =>  JSR Z 4651
55345  /  044547  =>  JSR Z 4547
55346  /  044661  =>  JSR Z 4661
55347  /  044555  =>  JSR Z 4555
55350  /  044536  =>  JSR Z 4536
55351  /  045224  =>  JSR Z 5224
55352  /  045137  =>  JSR Z 5137
55353  /  044213  =>  JSR Z 4213
55354  /  044570  =>  JSR Z 4570
55355  /  044644  =>  JSR Z 4644
55356  /  044300  =>  JSR Z 4300
55357  /  045347  =>  JSR Z 5347
55360  /  045350  =>  JSR Z 5350
55361  /  057776  =>  JSR I Z 7776 (74314)
55362  /  047561  =>  JSR Z 7561
55363  /  052660  =>  JSR I Z 2660 (43524)
55364  /  046657  =>  JSR Z 6657
55365  /  046660  =>  JSR Z 6660
55366  /  046661  =>  JSR Z 6661
55367  /  046662  =>  JSR Z 6662
55370  /  046663  =>  JSR Z 6663
55371  /  046664  =>  JSR Z 6664
55372  /  046665  =>  JSR Z 6665
55373  /  046666  =>  JSR Z 6666
55374  /  046667  =>  JSR Z 6667
55375  /  046670  =>  JSR Z 6670
55376  /  046671  =>  JSR Z 6671
55377  /  046672  =>  JSR Z 6672
55400  /  046673  =>  JSR Z 6673
55401  /  046674  =>  JSR Z 6674
55402  /  060026  =>  JSR 50026
```

| | | | |
|---|---|---|---|
| 55403 | / | 000000 | => 0 |
| 55404 | / | 000000 | => 0 |
| 55405 | / | 000000 | => 0 |
| 55406 | / | 000000 | => 0 |
| 55407 | / | 000000 | => 0 |
| 55410 | / | 000000 | => 0 |
| 55411 | / | 000000 | => 0 |
| 55412 | / | 000000 | => 0 |
| 55413 | / | 000000 | => 0 |
| 55414 | / | 000000 | => 0 |
| 55415 | / | 000000 | => 0 |
| 55416 | / | 000000 | => 0 |
| 55417 | / | 000000 | => 0 |
| 55420 | / | 000000 | => 0 |
| 55421 | / | 000000 | => 0 |
| 55422 | / | 000000 | 0 |
| 55423 | / | 000000 | => 0 |
| 55424 | / | 000000 | => 0 |
| 55425 | / | 000000 | => 0 |
| 55426 | / | 000000 | 0 |
| 55427 | / | 000000 | => 0 |
| 55430 | / | 000000 | => 0 |
| 55431 | / | 000000 | => 0 |
| 55432 | / | 000000 | => 0 |
| 55433 | / | 000000 | => 0 |
| 55434 | / | 000000 | => 0 |
| 55435 | / | 000000 | => 0 |
| 55436 | / | 000000 | => 0 |
| 55437 | / | 000000 | => 0 |
| 55440 | / | 000000 | => 0 |
| 55441 | / | 000000 | => 0 |
| 55442 | / | 000000 | => 0 |
| 55443 | / | 000000 | => 0 |
| 55444 | / | 000000 | => 0 |
| 55445 | / | 000000 | => 0 |
| 55446 | / | 020010 | => CLA |
| 55447 | / | 475563 | => SCA I 55563 (67767) |
| 55450 | / | 075624 | => JSR I 55624 (51403) |
| 55451 | / | 075613 | => JSR I 55613 (52456) |
| 55452 | / | 075614 | => JSR I 55614 (52350) |
| 55453 | / | 075615 | => JSR I 55615 (52255) |
| 55454 | / | 075577 | => JSR I 55577 (51067) |
| 55455 | / | 125557 | => JMP 55557 |
| 55456 | / | 020010 | => CLA |
| 55457 | / | 335617 | => IOR I 55617 (52657) |
| 55460 | / | 075620 | => JSR I 55620 (52112) |
| 55461 | / | 020000 | => NOP |
| 55462 | / | 575575 | => SNW I 55575 (52654) |
| 55463 | / | 125475 | => JMP 55475 |
| 55464 | / | 075574 | => JSR I 55574 (60357) |
| 55465 | / | 742001 | => JZA 52001 |
| 55466 | / | 023040 | => SMA SZA CLL |
| 55467 | / | 400040 | => STA Z 0040 |
| 55470 | / | 125511 | => JMP 55511 |
| 55471 | / | 000000 | => 0 |
| 55472 | / | 000000 | => 0 |
| 55473 | / | 000000 | => 0 |
| 55474 | / | 000000 | => 0 |
| 55475 | / | 000007 | => LDL 0007 |
| 55476 | / | 175617 | => AND I 55617 (52657) |
| 55477 | / | 075616 | => JSR I 55616 (51700) |
| 55500 | / | 075602 | => JSR I 55602 (30045) |
| 55501 | / | 000000 | => 0 |
| 55502 | / | 000000 | => 0 |

```
55503  /  075603   =>   JSR I 55603 (17277)
55504  /  000000   =>   0
55505  /  000000   =>   0
55506  /  075606   =>   JSR I 55606 (16315)
55507  /  000000   =>   0
55510  /  000000   =>   0
55511  /  075562   =>   JSR I 55562 (65003)
55512  /  125532   =>   JMP 55532
55513  /  535575   =>   SZW I 55575 (52654)
55514  /  125525   =>   JMP 55525
55515  /  535617   =>   SZW I 55617 (52657)
55516  /  125532   =>   JMP 55532
55517  /  535631   =>   SZW I 55631 (30044)
55520  /  125525   =>   JMP 55525
55521  /  535641   =>   SZW I 55641 (43641)
55522  /  125532   =>   JMP 55532
55523  /  535642   =>   SZW I 55642 (16472)
55524  /  125532   =>   JMP 55532
55525  /  075574   =>   JSR I 55574 (60357)
55526  /  240523   =>   SUB Z 0523
55527  /  240504   =>   SUB Z 0504
55530  /  401713   =>   STA Z 1713
55531  /  400040   =>   STA Z 0040
55532  /  535575   =>   SZW I 55575 (52654)
55533  /  125556   =>   JMP 55556
55534  /  075640   =>   JSR I 55640 (42254)
55535  /  335631   =>   IOR I 55631 (30044)
55536  /  335645   =>   IOR I 55645 (43651)
55537  /  335646   =>   IOR I 55646 (43640)
55540  /  335647   =>   IOR I 55647 (42232)
55541  /  755545   =>   JNA 55545
55542  /  575644   =>   SNW I 55644 (43643)
55543  /  075636   =>   JSR I 55636 (40001)
55544  /  075637   =>   JSR I 55637 (42450)
55545  /  075607   =>   JSR I 55607 (16205)
55546  /  535631   =>   SZW I 55631 (30044)
55547  /  125556   =>   JMP 55556
55550  /  535632   =>   SZW I 55632 (67775)
55551  /  075622   =>   JSR I 55622 (40271)
55552  /  535633   =>   SZW I 55633 (67762)
55553  /  075635   =>   JSR I 55635 (40352)
55554  /  535634   =>   SZW I 55634 (67774)
55555  /  075623   =>   JSR I 55623 (42364)
55556  /  135445   =>   JMP I 55445 (0000)
55557  /  000001   =>   LDL 0001
55560  /  475563   =>   SCA I 55563 (67767)
55561  /  125556   =>   JMP 55556
55562  /  065003   =>   JSR 55003
55563  /  067767   =>   JSR 57767
55564  /  060142   =>   JSR 50142
55565  /  060103   =>   JSR 50103
55566  /  060162   =>   JSR 50162
55567  /  060161   =>   JSR 50161
55570  /  060124   =>   JSR 50124
55571  /  060140   =>   JSR 50140
55572  /  043770   =>   JSR Z 3770
55573  /  044033   =>   JSR Z 4033
55574  /  060357   =>   JSR 50357
55575  /  052654   =>   JSR I Z 2654 (641022)
55576  /  047746   =>   JSR Z 7746
55577  /  051067   =>   JSR I Z 1067 (0000)
55600  /  050004   =>   JSR I Z 0004 (320600)
55601  /  044124   =>   JSR Z 4124
55602  /  030045   =>   030045
```

```
55603  /  017277  ->  017277
55604  /  016475  ->  016475
55605  /  040036  ->  JSR Z 0036
55606  /  016315  ->  016315
55607  /  016205  ->  016205
55610  /  042221  ->  JSR Z 2221
55611  /  042236  ->  JSR Z 2236
55612  /  042241  ->  JSR Z 2241
55613  /  052456  ->  JSR I Z 2456 (37440)
55614  /  052350  ->  JSR I Z 2350 (0007)
55615  /  052255  ->  JSR I Z 2255 (14000)
55616  /  051700  ->  JSR I Z 1700 (704062)
55617  /  052657  ->  JSR I Z 2657 (43406)
55620  /  052112  ->  JSR I Z 2112 (43524)
55621  /  052132  ->  JSR I Z 2132 (244026)
55622  /  040271  ->  JSR Z 0271
55623  /  042364  ->  JSR Z 2364
55624  /  051403  ->  JSR I Z 1403 (60004)
55625  /  051543  ->  JSR I Z 1543 (303702)
55626  /  051544  ->  JSR I Z 1544 (444156)
55627  /  051545  ->  JSR I Z 1545 (441574)
55630  /  055437  ->  JSR I Z 5437 (13000)
55631  /  030044  ->  030044
55632  /  067775  ->  JSR 57775
55633  /  067762  ->  JSR 57762
55634  /  067774  ->  JSR 57774
55635  /  040352  ->  JSR Z 0352
55636  /  040001  ->  JSR Z 0001
55637  /  042450  ->  JSR Z 2450
55640  /  042254  ->  JSR Z 2254
55641  /  043641  ->  JSR Z 3641
55642  /  016472  ->  016472
55643  /  042547  ->  JSR Z 2547
55644  /  043643  ->  JSR Z 3643
55645  /  043651  ->  JSR Z 3651
55646  /  043640  ->  JSR Z 3640
55647  /  042232  ->  JSR Z 2232
55650  /  000207  ->  LDL 0207
55651  /  077711  ->  JSR I 57711 (60103)
55652  /  077712  ->  JSR I 57712 (60357)
55653  /  777440  ->  LDL -0340
55654  /  400040  ->  STA Z 0040
55655  /  065735  ->  JSR 55735
55656  /  527624  ->  SZW 57624
55657  /  125664  ->  JMP 55664
55660  /  067121  ->  JSR 57121
55661  /  125650  ->  JMP 55650
55662  /  467624  ->  SCA 57624
55663  /  066644  ->  JSR 56644
55664  /  527646  ->  SZW 57646
55665  /  126043  ->  JMP 56043
55666  /  077732  ->  JSR I 57732 (44124)
55667  /  077717  ->  JSR I 57717 (67370)
55670  /  077712  ->  JSR I 57712 (60357)
55671  /  746140  ->  JZA 56140
55672  /  061722  ->  JSR 51722
55673  /  401411  ->  STA Z 1411
55674  /  160540  ->  AND 50540
55675  /  231107  ->  ADD I 51107 (54024)
55676  /  160124  ->  AND 50124
55677  /  252205  ->  SUB I Z 2205 (24000)
55700  /  402405  ->  STA Z 2405
55701  /  232440  ->  ADD I 52440 (132414)
55702  /  747040  ->  JZA 57040
```

```
55703  /  241740   => SUB Z 1740
55704  /  232401   => ADD I 52401 (52547)
55705  /  222440   => ADD 52440
55706  /  160527   => AND 50527
55707  /  402305   => STA Z 2305
55710  /  212505   => ADD I Z 2505 (102556)
55711  /  160305   => AND 50305
55712  /  004040   => LDL 4040
55713  /  077720   => JSR I 57720 (67350)
55714  /  077721   => JSR I 57721 (67344)
55715  /  077723   => JSR I 57723 (67265)
55716  /  077716   => JSR I 57716 (43653)
55717  /  000261   => LDL 0261
55720  /  055757   => JSR I Z 5757 (220216)
55721  /  000270   => LDL 0270
55722  /  056637   => JSR I Z 6637 (404040)
55723  /  000272   => LDL 0272
55724  /  062310   => JSR 52310
55725  /  000273   => LDL 0273
55726  /  064407   => JSR 54407
55727  /  000000   => 0
55730  /  000207   => LDL 0207
55731  /  077711   => JSR I 57711 (60103)
55732  /  077712   => JSR I 57712 (60357)
55733  /  770040   => LDL -7740
55734  /  125664   => JMP 55664
55735  /  000000   => 0
55736  /  077731   => JSR I 57731 (67460)
55737  /  077712   => JSR I 57712 (60357)
55740  /  400617   => STA Z 0617
55741  /  224014   => ADD 54014
55742  /  111605   => JMP I Z 1605 (314025)
55743  /  404340   => STA Z 4340
55744  /  004040   => LDL 4040
55745  /  327624   => IOR 57624
55746  /  021000   => SZA
55747  /  077724   => JSR I 57724 (67204)
55750  /  135735   => JMP I 55735 (0000)
55751  /  000000   => 0
55752  /  077722   => JSR I 57722 (67332)
55753  /  077712   => JSR I 57712 (60357)
55754  /  744000   => JZA 54000
55755  /  065735   => JSR 55735
55756  /  135751   => JMP I 55751 (0000)
55757  /  020010   => CLA
55760  /  327624   => IOR 57624
55761  /  077725   => JSR I 57725 (66174)
55762  /  067013   => JSR 57013
55763  /  077712   => JSR I 57712 (60357)
55764  /  404024   => STA Z 4024
55765  /  052324   => JSR I Z 2324 (702463)
55766  /  404000   => STA Z 4000
55767  /  077726   => JSR I 57726 (64743)
55770  /  077732   => JSR I 57732 (44124)
55771  /  077733   => JSR I 57733 (51403)
55772  /  077734   => JSR I 57734 (52456)
55773  /  077735   => JSR I 57735 (52350)
55774  /  077736   => JSR I 57736 (52255)
55775  /  077737   => JSR I 57737 (30045)
55776  /  000000   => 0
55777  /  000000   => 0
56000  /  077740   => JSR I 57740 (17277)
56001  /  000000   => 0
56002  /  000000   => 0
```

```
56003  /  577771  =>  SNW I 57771 (52657)
56004  /  126011  =>  JMP 56011
56005  /  337770  =>  IOR I 57770 (17762)
56006  /  267670  =>  SUB 57670
56007  /  027010  =>  SPA SNA CLA
56010  /  126340  =>  JMP 56340
56011  /  000001  =>  LDL 0001
56012  /  427775  =>  STA 57775
56013  /  467646  =>  SCA 57646
56014  /  337744  =>  IOR I 57744 (55413)
56015  /  467625  =>  SCA 57625
56016  /  337745      IOR I 57745 (55412)
56017  /  467626  =>  SCA 57626
56020  /  337746  =>  IOR I 57746 (55421)
56021  /  467627  =>  SCA 57627
56022  /  337747      IOR I 57747 (55420)
56023  /  467630  =>  SCA 57630
56024  /  337750  =>  IOR I 57750 (41335)
56025  /  467631  =>  SCA 57631
56026  /  337767  =>  IOR I 57767 (42231)
56027  /  467772  =>  SCA 57772
56030  /  337751  =>  IOR I 57751 (43652)
56031  /  467632  =>  SCA 57632
56032  /  337752  =>  IOR I 57752 (43644)
56033  /  467633  =>  SCA 57633
56034  /  337753  =>  IOR I 57753 (43632)
56035  /  467634  =>  SCA 57634
56036  /  337752  =>  IOR I 57752 (43644)
56037  /  337751  =>  IOR I 57751 (43652)
56040  /  021010  =>  SZA CLA
56041  /  000001  =>  LDL 0001
56042  /  467651  =>  SCA 57651
56043  /  527647  =>  SZW 57647
56044  /  126134  =>  JMP 56134
56045  /  065751  =>  JSR 55751
56046  /  066245  =>  JSR 56245
56047  /  066225  =>  JSR 56225
56050  /  077717  =>  JSR I 57717 (67370)
56051  /  077712  =>  JSR I 57712 (60357)
56052  /  746240  =>  JZA 56240
56053  /  061722  =>  JSR 51722
56054  /  401720  =>  STA Z 1720
56055  /  051640  =>  JSR I Z 1640 (171426)
56056  /  031122  =>  031122
56057  /  032511  =>  032511
56060  /  244024  =>  SUB Z 4024
56061  /  052324  =>  JSR I Z 2324 (702463)
56062  /  004040  =>  LDL 4040
56063  /  567651  =>  SNW 57651
56064  /  126076  =>  JMP 56076
56065  /  077712  =>  JSR I 57712 (60357)
56066  /  746740  =>  JZA 56740
56067  /  241740  =>  SUB Z 1740
56070  /  260522  =>  SUB 50522
56071  /  110631  =>  JMP I Z 0631 (0017)
56072  /  402205  =>  STA Z 2205
56073  /  031716  =>  031716
56074  /  160503  =>  AND 50503
56075  /  240040  =>  SUB Z 0040
56076  /  077712  =>  JSR I 57712 (60357)
56077  /  747040  =>  JZA 57040
56100  /  241740  =>  SUB Z 1740
56101  /  232401  =>  ADD I 52401 (52547)
56102  /  222440  =>  ADD 52440
```

```
56103  /  160527   =>   AND 50527
56104  /  402305   =>   STA Z 2305
56105  /  212505   =>   ADD I Z 2505 (102556)
56106  /  160305   =>   AND 50305
56107  /  004040   =>   LDL 4040
56110  /  077720   =>   JSR I 57720 (67350)
56111  /  077721   =>   JSR I 57721 (67344)
56112  /  077723   =>   JSR I 57723 (67265)
56113  /  077716   =>   JSR I 57716 (43653)
56114  /  000262   =>   LDL 0262
56115  /  056655   =>   JSR I Z 6655 (140503)
56116  /  000267   =>   LDL 0267
56117  /  056410   =>   JSR I Z 6410 (60214)
56120  /  000270   =>   LDL 0270
56121  /  056637   =>   JSR I Z 6637 (404040)
56122  /  000272   =>   LDL 0272
56123  /  062310   =>   JSR 52310
56124  /  000273   =>   LDL 0273
56125  /  064407   =>   JSR 54407
56126  /  000000   =>   0
56127  /  000207   =>   LDL 0207
56130  /  077711   =>   JSR I 57711 (60103)
56131  /  077712   =>   JSR I 57712 (60357)
56132  /  770040   =>   LDL -7740
56133  /  126050   =>   JMP 56050
56134  /  527650   =>   SZW 57650
56135  /  127161   =>   JMP 57161
56136  /  065751   =>   JSR 55751
56137  /  066245   =>   JSR 56245
56140  /  066273   =>   JSR 56273
56141  /  066310   =>   JSR 56310
56142  /  077717   =>   JSR I 57717 (67370)
56143  /  077712   =>   JSR I 57712 (60357)
56144  /  746340   =>   JZA 56340
56145  /  271005   =>   SUB I 51005 (6000)
56146  /  164014   =>   AND 54014
56147  /  111605   =>   JMP I Z 1605 (314025)
56150  /  400722   =>   STA Z 0722
56151  /  172516   =>   AND I 52516 (52535)
56152  /  040504   =>   JSR Z 0504
56153  /  004040   =>   LDL 4040
56154  /  567651   =>   SNW 57651
56155  /  126167   =>   JMP 56167
56156  /  077712   =>   JSR I 57712 (60357)
56157  /  746740   =>   JZA 56740
56160  /  241740   =>   SUB Z 1740
56161  /  260522   =>   SUB 50522
56162  /  110631   =>   JMP I Z 0631 (0017)
56163  /  402205   =>   STA Z 2205
56164  /  031716   =>   031716
56165  /  160503   =>   AND 50503
56166  /  240040   =>   SUB Z 0040
56167  /  077712   =>   JSR I 57712 (60357)
56170  /  747040   =>   JZA 57040
56171  /  241740   =>   SUB Z 1740
56172  /  232401   =>   ADD I 52401 (52547)
56173  /  222440   =>   ADD 52440
56174  /  160527   =>   AND 50527
56175  /  402305   =>   STA Z 2305
56176  /  212505   =>   ADD I Z 2505 (102556)
56177  /  160305   =>   AND 50305
56200  /  004040   =>   LDL 4040
56201  /  077720   =>   JSR I 57720 (67350)
56202  /  077721   =>   JSR I 57721 (67344)
```

```
56203  /  077723   =>   JSR I 57723 (67265)
56204  /  077716   =>   JSR I 57716 (43653)
56205  /  000263   =>   LDL 0263
56206  /  056732   =>   JSR I Z 6732 (744040)
56207  /  000267   =>   LDL 0267
56210  /  056410   =>   JSR I Z 6410 (60214)
56211  /  000270   =>   LDL 0270
56212  /  056637   =>   JSR I Z 6637 (404040)
56213  /  000272   =>   LDL 0272
56214  /  062310        JSR 52310
56215  /  000273   =>   LDL 0273
56216  /  064407   =>   JSR 54407
56217  /  000000   =>   0
56220  /  000207        LDL 0207
56221  /  077711   =>   JSR I 57711 (60103)
56222  /  077712   =>   JSR I 57712 (60357)
56223  /  770040   =>   LDL -7740
56224  /  126142   =>   JMP 56142
56225  /  000000   =>   0
56226  /  567651   =>   SNW 57651
56227  /  126244   =>   JMP 56244
56230  /  077712   =>   JSR I 57712 (60357)
56231  /  742211   =>   JZA 52211
56232  /  160705   =>   AND 50705
56233  /  222340   =>   ADD 52340
56234  /  241740   =>   SUB Z 1740
56235  /  072217   =>   JSR I 52217 (742226)
56236  /  251604   =>   SUB I Z 1604 (101631)
56237  /  741720   =>   JZA 51720
56240  /  051640   =>   JSR I Z 1640 (171426)
56241  /  160505   =>   AND 50505
56242  /  040504   =>   JSR Z 0504
56243  /  400040   =>   STA Z 0040
56244  /  136225   =>   JMP I 56225 (0000)
56245  /  000000   =>   0
56246  /  077712   =>   JSR I 57712 (60357)
56247  /  742311   =>   JZA 52311
56250  /  071601   =>   JSR I 51601 (60103)
56251  /  242522   =>   SUB Z 2522
56252  /  054024   =>   JSR I Z 4024 (4441)
56253  /  052324   =>   JSR I Z 2324 (702463)
56254  /  400317   =>   STA Z 0317
56255  /  152014   =>   AND I Z 2014 (0000)
56256  /  052405   =>   JSR I Z 2405 (304100)
56257  /  004040   =>   LDL 4040
56260  /  567772   =>   SNW 57772
56261  /  136245   =>   JMP I 56245 (0000)
56262  /  077712   =>   JSR I 57712 (60357)
56263  /  741411   =>   JZA 51411
56264  /  160540   =>   AND 50540
56265  /  161724   =>   AND 51724
56266  /  402605   =>   STA Z 2605
56267  /  221106   =>   ADD 51106
56270  /  110102   =>   JMP I Z 0102 (1024)
56271  /  140500   =>   AND Z 0500
56272  /  136245   =>   JMP I 56245 (0000)
56273  /  000000   =>   0
56274  /  077712   =>   JSR I 57712 (60357)
56275  /  741720   =>   JZA 51720
56276  /  051640   =>   JSR I Z 1640 (171426)
56277  /  031122   =>   031122
56300  /  032511   =>   032511
56301  /  244024   =>   SUB Z 4024
56302  /  052324   =>   JSR I Z 2324 (702463)
```

```
56303  /  400317   =>   STA Z 0317
56304  /  152014   =>   AND I Z 2014 (0000)
56305  /  052405   =>   JSR I Z 2405 (304100)
56306  /  004040   =>   LDL 4040
56307  /  136273   =>   JMP I 56273 (0000)
56310  /  000000   =>   0
56311  /  567652   =>   SNW 57652
56312  /  126324   =>   JMP 56324
56313  /  077712   =>   JSR I 57712 (60357)
56314  /  742411   =>   JZA 52411
56315  /  204023   =>   ADD Z 4023
56316  /  110405   =>   JMP I Z 0405 (704070)
56317  /  401617   =>   STA Z 1617
56320  /  244007   =>   SUB Z 4007
56321  /  221725   =>   ADD 51725
56322  /  160405   =>   AND 50405
56323  /  040040   =>   JSR Z 0040
56324  /  567653   =>   SNW 57653
56325  /  126337   =>   JMP 56337
56326  /  077712   =>   JSR I 57712 (60357)
56327  /  742211   =>   JZA 52211
56330  /  160740   =>   AND 50740
56331  /  231104   =>   ADD I 51104 (71364)
56332  /  054016   =>   JSR I Z 4016 (114002)
56333  /  172440   =>   AND I 52440 (132414)
56334  /  072217   =>   JSR I 52217 (742226)
56335  /  251604   =>   SUB I Z 1604 (101631)
56336  /  050400   =>   JSR I Z 0400 (43524)
56337  /  136310   =>   JMP I 56310 (0000)
56340  /  077712   =>   JSR I 57712 (60357)
56341  /  742310   =>   JZA 52310
56342  /  172224   =>   AND I 52224 (622132)
56343  /  544003   =>   SNW Z 4003
56344  /  221723   =>   ADD 51723
56345  /  234017   =>   ADD I 54017 (55260)
56346  /  224007   =>   ADD 54007
56347  /  221725   =>   ADD 51725
56350  /  160440   =>   AND 50440
56351  /  171640   =>   AND I 51640 (55431)
56352  /  141116   =>   AND Z 1116
56353  /  054040   =>   JSR I Z 4040 (0001)
56354  /  742516   =>   JZA 52516
56355  /  010214   =>   010214
56356  /  054024   =>   JSR I Z 4024 (4441)
56357  /  174014   =>   AND I 54014 (75340)
56360  /  170301   =>   AND I 50301 (270426)
56361  /  240540   =>   SUB Z 0540
56362  /  020103   =>   020103
56363  /  130722   =>   JMP I 50722 (0400)
56364  /  172516   =>   AND I 52516 (52535)
56365  /  044025   =>   JSR Z 4025
56366  /  162411   =>   AND 52411
56367  /  144014   =>   AND Z 4014
56370  /  111605   =>   JMP I Z 1605 (314025)
56371  /  400314   =>   STA Z 0314
56372  /  050122   =>   JSR I Z 0122 (740217)
56373  /  050474   =>   JSR I Z 0474 (750506)
56374  /  240523   =>   SUB Z 0523
56375  /  244014   =>   SUB Z 4014
56376  /  111605   =>   JMP I Z 1605 (314025)
56377  /  400617   =>   STA Z 0617
56400  /  224006   =>   ADD 54006
56401  /  012514   =>   012514
56402  /  244004   =>   SUB Z 4004
56403  /  110107   =>   JMP I Z 0107 (444157)
```

```
56404  /  161723   =>  AND 51723
56405  /  112374   =>  JMP I Z 2374 (202467)
56406  /  004040   =>  LDL 4040
56407  /  125655   =>  JMP 55655
56410  /  020010   =>  CLA
56411  /  327624   =>  IOR 57624
56412  /  077725   =>  JSR I 57725 (66174)
56413  /  067013   =>  JSR 57013
56414  /  077712   =>  JSR I 57712 (60357)
56415  /  404024   =>  STA Z 4024
56416  /  052324       JSR I Z 2324 (702463)
56417  /  404000   =>  STA Z 4000
56420  /  077726   =>  JSR I 57726 (64743)
56421  /  077732   =>  JSR I 57732 (44124)
56422  /  077733   =>  JSR I 57733 (51403)
56423  /  077734   =>  JSR I 57734 (52456)
56424  /  077735   =>  JSR I 57735 (52350)
56425  /  077736   =>  JSR I 57736 (52255)
56426  /  077737   =>  JSR I 57737 (30045)
56427  /  000000   =>  0
56430  /  000000   =>  0
56431  /  077740   =>  JSR I 57740 (17277)
56432  /  000000   =>  0
56433  /  000000   =>  0
56434  /  337767   =>  IOR I 57767 (42231)
56435  /  327772   =>  IOR 57772
56436  /  746447   =>  JZA 56447
56437  /  077712   =>  JSR I 57712 (60357)
56440  /  402516   =>  STA Z 2516
56441  /  010214   =>  010214
56442  /  054024   =>  JSR I Z 4024 (4441)
56443  /  174026   =>  AND I 54026 (55260)
56444  /  052211   =>  JSR I Z 2211 (102212)
56445  /  063100   =>  JSR 53100
56446  /  127472   =>  JMP 57472
56447  /  337750   =>  IOR I 57750 (41335)
56450  /  267631   =>  SUB 57631
56451  /  026000   =>  SPA
56452  /  020006   =>  NAC
56453  /  427654   =>  STA 57654
56454  /  267671   =>  SUB 57671
56455  /  022010   =>  SMA CLA
56456  /  000001   =>  LDL 0001
56457  /  427655   =>  STA 57655
56460  /  021010   =>  SZA CLA
56461  /  066504   =>  JSR 56504
56462  /  337751   =>  IOR I 57751 (43652)
56463  /  367632   =>  XOR 57632
56464  /  756526   =>  JNA 56526
56465  /  337752   =>  IOR I 57752 (43644)
56466  /  367633   =>  XOR 57633
56467  /  756526   =>  JNA 56526
56470  /  337753   =>  IOR I 57753 (43632)
56471  /  367634   =>  XOR 57634
56472  /  756526   =>  JNA 56526
56473  /  527655   =>  SZW 57655
56474  /  127472   =>  JMP 57472
56475  /  077712   =>  JSR I 57712 (60357)
56476  /  402605   =>  STA Z 2605
56477  /  221106   =>  ADD 51106
56500  /  110504   =>  JMP I Z 0504 (0000)
56501  /  401713   =>  STA Z 1713
56502  /  400040   =>  STA Z 0040
56503  /  127472   =>  JMP 57472
```

```
56504  /  000000  =>     0
56505  /  077712  =>     JSR I 57712 (60357)
56506  /  741411  =>     JZA 51411
56507  /  160540  =>     AND 50540
56510  /  140516  =>     AND Z 0516
56511  /  072410  =>     JSR I 52410 (0000)
56512  /  400411  =>     STA Z 0411
56513  /  060605  =>     JSR 50605
56514  /  220516  =>     ADD 50516
56515  /  244000  =>     SUB Z 4000
56516  /  327654  =>     IOR 57654
56517  /  077715  =>     JSR I 57715 (44033)
56520  /  000004  =>     LDL 0004
56521  /  077712  =>     JSR I 57712 (60357)
56522  /  606040  =>     ISZ Z 6040
56523  /  060505  =>     JSR 50505
56524  /  244000  =>     SUB Z 4000
56525  /  136504  =>     JMP I 56504 (0000)
56526  /  077712  =>     JSR I 57712 (60357)
56527  /  742211  =>     JZA 52211
56530  /  160705  =>     AND 50705
56531  /  224003  =>     ADD 54003
56532  /  172516  =>     AND I 52516 (52535)
56533  /  244004  =>     SUB Z 4004
56534  /  110606  =>     JMP I Z 0606 (454155)
56535  /  052205  =>     JSR I Z 2205 (24000)
56536  /  162440  =>     AND 52440
56537  /  004040  =>     LDL 4040
56540  /  337751  =>     IOR I 57751 (43652)
56541  /  337752  =>     IOR I 57752 (43644)
56542  /  337753  =>     IOR I 57753 (43632)
56543  /  756553  =>     JNA 56553
56544  /  077712  =>     JSR I 57712 (60357)
56545  /  741617  =>     JZA 51617
56546  /  402211  =>     STA Z 2211
56547  /  160705  =>     AND 50705
56550  /  222340  =>     ADD 52340
56551  /  161727  =>     AND 51727
56552  /  400040  =>     STA Z 0040
56553  /  127472  =>     JMP 57472
56554  /  077712  =>     JSR I 57712 (60357)
56555  /  741417  =>     JZA 51417
56556  /  274026  =>     SUB I 54026 (55260)
56557  /  171424  =>     AND I 51424 (55254)
56560  /  010705  =>     010705
56561  /  404040  =>     STA Z 4040
56562  /  740201  =>     JZA 50201
56563  /  031307  =>     031307
56564  /  221725  =>     ADD 51725
56565  /  160440  =>     AND 50440
56566  /  161724  =>     AND 51724
56567  /  402017  =>     STA Z 2017
56570  /  270522  =>     SUB I 50522 (0005)
56571  /  401116  =>     STA Z 1116
56572  /  042503  =>     JSR Z 2503
56573  /  241117  =>     SUB Z 1117
56574  /  160040  =>     AND 50040
56575  /  127472  =>     JMP 57472
56576  /  077712  =>     JSR I 57712 (60357)
56577  /  742605  =>     JZA 52605
56600  /  223140  =>     ADD 53140
56601  /  101107  =>     JMP Z 1107
56602  /  104002  =>     JMP Z 4002
56603  /  010313  =>     010313
```

```
56604  /  072217   =>   JSR I 52217 (742226)
56605  /  251604   =>   SUB I Z 1604 (101631)
56606  /  720040   =>   SMT 50040
56607  /  327662   =>   IOR 57662
56610  /  267672   =>   SUB 57672
56611  /  022000   =>   SMA
56612  /  126627   =>   JMP 56627
56613  /  077712   =>   JSR I 57712 (60357)
56614  /  741417   =>   JZA 51417
56615  /  030124   =>   030124
56616  /  111716   =>   JMP I Z 1716 (44417)
56617  /  401501   =>   STA Z 1501
56620  /  314002   =>   IOR I Z 4002 (4001)
56621  /  054011   =>   JSR I Z 4011 (704071)
56622  /  160103   =>   AND 50103
56623  /  032522   =>   032522
56624  /  012405   =>   012405
56625  /  004040   =>   LDL 4040
56626  /  127217   =>   JMP 57217
56627  /  077712   =>   JSR I 57712 (60357)
56630  /  742516   =>   JZA 52516
56631  /  010214   =>   010214
56632  /  054024   =>   JSR I Z 4024 (4441)
56633  /  174014   =>   AND I 54014 (75340)
56634  /  170301   =>   AND I 50301 (270426)
56635  /  240500   =>   SUB Z 0500
56636  /  127472   =>   JMP 57472
56637  /  020010   =>   CLA
56640  /  467624   =>   SCA 57624
56641  /  066644   =>   JSR 56644
56642  /  065751   =>   JSR 55751
56643  /  125660   =>   JMP 55660
56644  /  000000   =>   0
56645  /  020010   =>   CLA
56646  /  467646   =>   SCA 57646
56647  /  467647   =>   SCA 57647
56650  /  467650   =>   SCA 57650
56651  /  467651   =>   SCA 57651
56652  /  467652   =>   SCA 57652
56653  /  467653   =>   SCA 57653
56654  /  136644   =>   JMP I 56644 (0000)
56655  /  020010   =>   CLA
56656  /  327624   =>   IOR 57624
56657  /  077725   =>   JSR I 57725 (66174)
56660  /  067013   =>   JSR 57013
56661  /  077712   =>   JSR I 57712 (60357)
56662  /  404024   =>   STA Z 4024
56663  /  052324   =>   JSR I Z 2324 (702463)
56664  /  404000   =>   STA Z 4000
56665  /  077726   =>   JSR I 57726 (64743)
56666  /  077732   =>   JSR I 57732 (44124)
56667  /  077733   =>   JSR I 57733 (51403)
56670  /  077734   =>   JSR I 57734 (52456)
56671  /  077735   =>   JSR I 57735 (52350)
56672  /  077736   =>   JSR I 57736 (52255)
56673  /  077737   =>   JSR I 57737 (30045)
56674  /  000000   =>   0
56675  /  000000   =>   0
56676  /  077740   =>   JSR I 57740 (17277)
56677  /  000000   =>   0
56700  /  000000   =>   0
56701  /  000777   =>   LDL 0777
56702  /  177751   =>   AND I 57751 (43652)
56703  /  756043   =>   JNA 56043
56704  /  000777   =>   LDL 0777
```

```
56705  /  177752   ->  AND I 57752 (43644)
56706  /  756043   ->  JNA 56043
56707  /  337755   ->  IOR I 57755 (55442)
56710  /  026000   ->  SPA
56711  /  020006   ->  NAC
56712  /  467637   ->  SCA 57637
56713  /  337756   ->  IOR I 57756 (55440)
56714  /  026000   ->  SPA
56715  /  020006   ->  NAC
56716  /  467640   ->  SCA 57640
56717  /  337754   ->  IOR I 57754 (17764)
56720  /  467643   ->  SCA 57643
56721  /  337750   ->  IOR I 57750 (41335)
56722  /  467773   ->  SCA 57773
56723  /  337757   ->  IOR I 57757 (55416)
56724  /  467641   ->  SCA 57641
56725  /  337760   ->  IOR I 57760 (55415)
56726  /  467642   ->  SCA 57642
56727  /  000001   ->  LDL 0001
56730  /  467647   ->  SCA 57647
56731  /  126134   ->  JMP 56134
56732  /  020010   ->  CLA
56733  /  327624   ->  IOR 57624
56734  /  077725   ->  JSR I 57725 (66174)
56735  /  067013   ->  JSR 57013
56736  /  000000   ->  0
56737  /  746747   ->  JZA 56747
56740  /  077712   ->  JSR I 57712 (60357)
56741  /  405523   ->  STA Z 5523
56742  /  101722   ->  JMP Z 1722
56743  /  245574   ->  SUB Z 5574
56744  /  004040   ->  LDL 4040
56745  /  077714   ->  JSR I 57714 (60142)
56746  /  020010   ->  CLA
56747  /  077712   ->  JSR I 57712 (60357)
56750  /  404024   ->  STA Z 4024
56751  /  052324   ->  JSR I Z 2324 (702463)
56752  /  434000   ->  STA Z 4000
56753  /  077741   ->  JSR I 57741 (53303)
56754  /  077732   ->  JSR I 57732 (44124)
56755  /  020010   ->  CLA
56756  /  337761   ->  IOR I 57761 (55405)
56757  /  467635   ->  SCA 57635
56760  /  337762   ->  IOR I 57762 (55404)
56761  /  467636   ->  SCA 57636
56762  /  337763   ->  IOR I 57763 (55433)
56763  /  026000   ->  SPA
56764  /  020006   ->  NAC
56765  /  267673   ->  SUB 57673
56766  /  026010   ->  SPA CLA
56767  /  000001   ->  LDL 0001
56770  /  467652   ->  SCA 57652
56771  /  337764   ->  IOR I 57764 (55430)
56772  /  026000   ->  SPA
56773  /  020006   ->  NAC
56774  /  267673   ->  SUB 57673
56775  /  026010   ->  SPA CLA
56776  /  000001   ->  LDL 0001
56777  /  427653   ->  STA 57653
57000  /  327652   ->  IOR 57652
57001  /  756134   ->  JNA 56134
57002  /  000001   ->  LDL 0001
57003  /  467650   ->  SCA 57650
57004  /  567775   ->  SNW 57775
57005  /  127161   ->  JMP 57161
```

```
57006  /  327635   =>   IOR 57635
57007  /  227636   =>   ADD 57636
57010  /  467774   =>   SCA 57774
57011  /  467775   =>   SCA 57775
57012  /  127161   =>   JMP 57161
57013  /  000000   =>   0
57014  /  026000   =>   SPA
57015  /  757054   =>   JNA 57054
57016  /  747054   =>   JZA 57054
57017  /  077717   =>   JSR I 57717 (67370)
57020  /  077712   =>   JSR I 57712 (60357)
57021  /  746540   =>   JZA 56540
57022  /  402417   =>   STA Z 2417
57023  /  401726   =>   STA Z 1726
57024  /  052222   =>   JSR I Z 2222 (43004)
57025  /  110405   =>   JMP I Z 0405 (704070)
57026  /  400116   =>   STA Z 0116
57027  /  044024   =>   JSR Z 4024
57030  /  052324   =>   JSR I Z 2324 (702463)
57031  /  004040   =>   LDL 4040
57032  /  077720   =>   JSR I 57720 (67350)
57033  /  077721   =>   JSR I 57721 (67344)
57034  /  077723   =>   JSR I 57723 (67265)
57035  /  427042   =>   STA 57042
57036  /  367674   =>   XOR 57674
57037  /  747056   =>   JZA 57056
57040  /  077732   =>   JSR I 57732 (44124)
57041  /  020000   =>   NOP
57042  /  000000   =>   0
57043  /  077716   =>   JSR I 57716 (43653)
57044  /  000273   =>   LDL 0273
57045  /  064407   =>   JSR 54407
57046  /  000272   =>   LDL 0272
57047  /  062307   =>   JSR 52307
57050  /  000000   =>   0
57051  /  000277   =>   LDL 0277
57052  /  077711   =>   JSR I 57711 (60103)
57053  /  135724   =>   JMP I 55724 (62310)
57054  /  077732   =>   JSR I 57732 (44124)
57055  /  135724   =>   JMP I 55724 (62310)
57056  /  020010   =>   CLA
57057  /  337765   =>   IOR I 57765 (46661)
57060  /  077742   =>   JSR I 57742 (45362)
57061  /  177766   =>   AND I 57766 (46664)
57062  /  757076   =>   JNA 57076
57063  /  077712   =>   JSR I 57712 (60357)
57064  /  402411   =>   STA Z 2411
57065  /  150504   =>   AND I Z 0504 (0000)
57066  /  401725   =>   STA Z 1725
57067  /  244040   =>   SUB Z 4040
57070  /  220504   =>   ADD 50504
57071  /  110114   =>   JMP I Z 0114 (143610)
57072  /  401605   =>   STA Z 1605
57073  /  050405   =>   JSR I Z 0405 (704070)
57074  /  044000   =>   JSR Z 4000
57075  /  127054   =>   JMP 57054
57076  /  000001   =>   LDL 0001
57077  /  467776   =>   SCA 57776
57100  /  077743   =>   JSR I 57743 (50264)
57101  /  024000   =>   SKP
57102  /  137013   =>   JMP I 57013 (0000)
57103  /  077712   =>   JSR I 57712 (60357)
57104  /  740301   =>   JZA 50301
57105  /  161617   =>   AND 51617
57106  /  244022   =>   SUB Z 4022
```

```
57107  /  051405   =>   JSR I Z 1405 (604135)
57110  /  012305   =>   012305
57111  /  402005   =>   STA Z 2005
57112  /  221501   =>   ADD 51501
57113  /  160516   =>   AND 50516
57114  /  244014   =>   SUB Z 4014
57115  /  111605   =>   JMP I Z 1605 (314025)
57116  /  004040   =>   LDL 4040
57117  /  077732   =>   JSR I 57732 (44124)
57120  /  135724   =>   JMP I 55724 (62310)
57121  /  000000   =>   0
57122  /  000004   =>   LDL 0004
57123  /  467157   =>   SCA 57157
57124  /  467160   =>   SCA 57160
57125  /  077723   =>   JSR I 57723 (67265)
57126  /  427135   =>   STA 57135
57127  /  077716   =>   JSR I 57716 (43653)
57130  /  000273   =>   LDL 0273
57131  /  064407   =>   JSR 54407
57132  /  000272   =>   LDL 0272
57133  /  062307   =>   JSR 52307
57134  /  000000   =>   0
57135  /  000000   =>   0
57136  /  367675   =>   XOR 57675
57137  /  427135   =>   STA 57135
57140  /  267676   =>   SUB 57676
57141  /  022010   =>   SMA CLA
57142  /  127154   =>   JMP 57154
57143  /  327160   =>   IOR 57160
57144  /  036440   =>   CLL SHL 4
57145  /  327135   =>   IOR 57135
57146  /  467160   =>   SCA 57160
57147  /  667157   =>   DSZ 57157
57150  /  127125   =>   JMP 57125
57151  /  327160   =>   IOR 57160
57152  /  627121   =>   ISZ 57121
57153  /  137121   =>   JMP I 57121 (0000)
57154  /  000260   =>   LDL 0260
57155  /  367135   =>   XOR 57135
57156  /  127153   =>   JMP 57153
57157  /  000000   =>   0
57160  /  000000   =>   0
57161  /  020010   =>   CLA
57162  /  227635   =>   ADD 57635
57163  /  227636   =>   ADD 57636
57164  /  077710   =>   JSR I 57710 (43670)
57165  /  057677   =>   JSR I Z 7677 (1125)
57166  /  077707   =>   JSR I 57707 (43715)
57167  /  057676   =>   JSR I Z 7676 (447600)
57170  /  427657   =>   STA 57657
57171  /  267700   =>   SUB 57700
57172  /  026010   =>   SPA CLA
57173  /  126554   =>   JMP 56554
57174  /  227641   =>   ADD 57641
57175  /  227642   =>   ADD 57642
57176  /  067340   =>   JSR 57340
57177  /  057657   =>   JSR I Z 7657 (7653)
57200  /  427656   =>   STA 57656
57201  /  077710   =>   JSR I 57710 (43670)
57202  /  057701   =>   JSR I Z 7701 (621002)
57203  /  077707   =>   JSR I 57707 (43715)
57204  /  057702   =>   JSR I Z 7702 (111000)
57205  /  467662   =>   SCA 57662
57206  /  327656   =>   IOR 57656
```

```
57207  /  020006   =>    NAC
57210  /  227637         ADD 57637
57211  /  026010   =>    SPA CLA
57212  /  126576   =>    JMP 56576
57213  /  327640   =>    IOR 57640
57214  /  267656   =>    SUB 57656
57215  /  026010   =>    SPA CLA
57216  /  126576   =>    JMP 56576
57217  /  077712   =>    JSR I 57712 (60357)
57220  /  740305   =>    JZA 50305
57221  /  162405   =>    AND 52405
57222  /  224017   =>    ADD 54017
57223  /  064011   =>    JSR 54011
57224  /  160425   =>    AND 50425
57225  /  032411   =>    032411
57226  /  171640   =>    AND I 51640 (55431)
57227  /  740040   =>    JZA 50040
57230  /  327662   =>    IOR 57662
57231  /  067413   =>    JSR 57413
57232  /  077712   =>    JSR I 57712 (60357)
57233  /  401720   =>    STA Z 1720
57234  /  051600   =>    JSR I Z 1600 (601574)
57235  /  537767   =>    SZW I 57767 (42231)
57236  /  127260   =>    JMP 57260
57237  /  327773   =>    IOR 57773
57240  /  267662   =>    SUB 57662
57241  /  026000   =>    SPA
57242  /  127260   =>    JMP 57260
57243  /  467337   =>    SCA 57337
57244  /  077712   =>    JSR I 57712 (60357)
57245  /  401722   =>    STA Z 1722
57246  /  740040   =>    JZA 50040
57247  /  327337   =>    IOR 57337
57250  /  067413   =>    JSR 57413
57251  /  077712   =>    JSR I 57712 (60357)
57252  /  400305   =>    STA Z 0305
57253  /  162422   =>    AND 52422
57254  /  011440   =>    011440
57255  /  170606   =>    AND I 50606 (320712)
57256  /  110305   =>    JMP I Z 0305 (0324)
57257  /  004040   =>    LDL 4040
57260  /  077713   =>    JSR I 57713 (60055)
57261  /  327774   =>    IOR 57774
57262  /  267635   =>    SUB 57635
57263  /  267636   =>    SUB 57636
57264  /  026000   =>    SPA
57265  /  127321   =>    JMP 57321
57266  /  067340   =>    JSR 57340
57267  /  057774   =>    JSR I Z 7774 (0000)
57270  /  427337   =>    STA 57337
57271  /  267676   =>    SUB 57676
57272  /  026010   =>    SPA CLA
57273  /  127321   =>    JMP 57321
57274  /  327337   =>    IOR 57337
57275  /  267703   =>    SUB 57703
57276  /  023010   =>    SMA SZA CLA
57277  /  127330   =>    JMP 57330
57300  /  327337   =>    IOR 57337
57301  /  077715   =>    JSR I 57715 (44033)
57302  /  000002   =>    LDL 0002
57303  /  077712   =>    JSR I 57712 (60357)
57304  /  402005   =>    STA Z 2005
57305  /  220305   =>    ADD 50305
57306  /  162440   =>    AND 52440
```

```
57307  /  170640   ->    AND I 50640 (320717)
57310  /  111604   ->    JMP I Z 1604 (101631)
57311  /  250324   ->    SUB I Z 0324 (441740)
57312  /  111716   ->    JMP I Z 1716 (444127)
57313  /  400205   ->    STA Z 0205
57314  /  311716   ->    IOR I Z 1716 (444127)
57315  /  044017   ->    JSR Z 4017
57316  /  200516   ->    ADD Z 0516
57317  /  004040   ->    LDL 4040
57320  /  127472   ->    JMP 57472
57321  /  077712   ->    JSR I 57712 (60357)
57322  /  140523   ->    AND Z 0523
57323  /  234024   ->    ADD I 54024 (465415)
57324  /  100116   ->    JMP Z 0116
57325  /  406160   ->    STA Z 6160
57326  /  004040   ->    LDL 4040
57327  /  127303   ->    JMP 57303
57330  /  077712   ->    JSR I 57712 (60357)
57331  /  151722   ->    AND I Z 1722 (444137)
57332  /  054024   ->    JSR I Z 4024 (4441)
57333  /  100116   ->    JMP Z 0116
57334  /  407160   ->    STA Z 7160
57335  /  004040   ->    LDL 4040
57336  /  127303   ->    JMP 57303
57337  /  000000   ->    0
57340  /  000000   ->    0
57341  /  467410   ->    SCA 57410
57342  /  337340   ->    IOR I 57340 (0000)
57343  /  012000   ->    AIL
57344  /  467412   ->    SCA 57412
57345  /  627340   ->    ISZ 57340
57346  /  000002   ->    LDL 0002
57347  /  467411   ->    SCA 57411
57350  /  327410   ->    IOR 57410
57351  /  267704   ->    SUB 57704
57352  /  022010   ->    SMA CLA
57353  /  127362   ->    JMP 57362
57354  /  327410   ->    IOR 57410
57355  /  077710   ->    JSR I 57710 (43670)
57356  /  057676   ->    JSR I Z 7676 (447600)
57357  /  467410   ->    SCA 57410
57360  /  667411   ->    DSZ 57411
57361  /  127350   ->    JMP 57350
57362  /  567411   ->    SNW 57411
57363  /  127376   ->    JMP 57376
57364  /  327412   ->    IOR 57412
57365  /  267676   ->    SUB 57676
57366  /  026010   ->    SPA CLA
57367  /  127376   ->    JMP 57376
57370  /  327412   ->    IOR 57412
57371  /  077707   ->    JSR I 57707 (43715)
57372  /  057676   ->    JSR I Z 7676 (447600)
57373  /  467412   ->    SCA 57412
57374  /  667411   ->    DSZ 57411
57375  /  127364   ->    JMP 57364
57376  /  327410   ->    IOR 57410
57377  /  077707   ->    JSR I 57707 (43715)
57400  /  057412   ->    JSR I Z 7412 (0000)
57401  /  567411   ->    SNW 57411
57402  /  137340         JMP I 57340 (0000)
57403  /  077710   ->    JSR I 57710 (43670)
57404  /  057676   ->    JSR I Z 7676 (447600)
57405  /  667411   ->    DSZ 57411
57406  /  127403         JMP 57403
57407  /  137340   ->    JMP I 57340 (0000)
```

```
57410  /  000000  -> 0
57411  /  000000  -> 0
57412  /  000000  -> 0
57413  /  000000  -> 0
57414  /  427470  -> STA 57470
57415  /  025000  -> SNA
57416  /  127465  -> JMP 57465
57417  /  077710  -> JSR I 57710 (43670)
57420  /  057705  -> JSR I Z 7705 (66403)
57421  /  077707  -> JSR I 57707 (43715)
57422  /  057706  -> JSR I Z 7706 (7777)
57423  /  427471  -> STA 57471
57424  /  077707  -> JSR I 57707 (43715)
57425  /  057676  -> JSR I Z 7676 (447600)
57426  /  077715  -> JSR I 57715 (44033)
57427  /  000002  -> LDL 0002
57430  /  077712  -> JSR I 57712 (60357)
57431  /  560000  -> SNW 50000
57432  /  327471  -> IOR 57471
57433  /  077715  -> JSR I 57715 (44033)
57434  /  000001  -> LDL 0001
57435  /  077712  -> JSR I 57712 (60357)
57436  /  401511  -> STA Z 1511
57437  /  140523  -> AND Z 0523
57440  /  401722  -> STA Z 1722
57441  /  400040  -> STA Z 0040
57442  /  327470  -> IOR 57470
57443  /  077707  -> JSR I 57707 (43715)
57444  /  057676  -> JSR I Z 7676 (447600)
57445  /  025000  -> SNA
57446  /  127453  -> JMP 57453
57447  /  077715  -> JSR I 57715 (44033)
57450  /  000003  -> LDL 0003
57451  /  077712  -> JSR I 57712 (60357)
57452  /  540000  -> SNW Z 0000
57453  /  327470  -> IOR 57470
57454  /  077715  -> JSR I 57715 (44033)
57455  /  000001  -> LDL 0001
57456  /  077712  -> JSR I 57712 (60357)
57457  /  606040  -> ISZ Z 6040
57460  /  060505  -> JSR 50505
57461  /  244006  -> SUB Z 4006
57462  /  221715  -> ADD 51715
57463  /  004040  -> LDL 4040
57464  /  127467  -> JMP 57467
57465  /  077712  -> JSR I 57712 (60357)
57466  /  012400  -> 012400
57467  /  137413  -> JMP I 57413 (0000)
57470  /  000000  -> 0
57471  /  000000  -> 0
57472  /  077717  -> JSR I 57717 (67370)
57473  /  077712  -> JSR I 57712 (60357)
57474  /  746640  -> JZA 56640
57475  /  241740  -> SUB Z 1740
57476  /  220520  -> ADD 50520
57477  /  050124  -> JSR I Z 0124 (244156)
57500  /  402305  -> STA Z 2305
57501  /  212505  -> ADD I Z 2505 (102556)
57502  /  160305  -> AND 50305
57503  /  746740  -> JZA 56740
57504  /  241740  -> SUB Z 1740
57505  /  260522  -> SUB 50522
57506  /  110631  -> JMP I Z 0631 (0017)
57507  /  402205  -> STA Z 2205
```

```
57510  /  031716   =>   031716
57511  /  160503   =>   AND 50503
57512  /  244040   =>   SUB Z 4040
57513  /  747040   =>   JZA 57040
57514  /  241740   =>   SUB Z 1740
57515  /  232401   =>   ADD I 52401 (52547)
57516  /  222440   =>   ADD 52440
57517  /  160527   =>   AND 50527
57520  /  402305   =>   STA Z 2305
57521  /  212505   =>   ADD I Z 2505 (102556)
57522  /  160305   =>   AND 50305
57523  /  004040   =>   LDL 4040
57524  /  077720   =>   JSR I 57720 (67350)
57525  /  077721   =>   JSR I 57721 (67344)
57526  /  077723   =>   JSR I 57723 (67265)
57527  /  077716   =>   JSR I 57716 (43653)
57530  /  000266   =>   LDL 0266
57531  /  057552   =>   JSR I Z 7552 (47566)
57532  /  000267   =>   LDL 0267
57533  /  056410   =>   JSR I Z 6410 (60214)
57534  /  000270   =>   LDL 0270
57535  /  056637   =>   JSR I Z 6637 (404040)
57536  /  000230   =>   LDL 0230
57537  /  057556   =>   JSR I Z 7556 (307705)
57540  /  000272   =>   LDL 0272
57541  /  062310   =>   JSR 52310
57542  /  000273   =>   LDL 0273
57543  /  064407   =>   JSR 54407
57544  /  000000   =>   0
57545  /  000207   =>   LDL 0207
57546  /  077711   =>   JSR I 57711 (60103)
57547  /  077712   =>   JSR I 57712 (60357)
57550  /  770040   =>   LDL -7740
57551  /  127472   =>   JMP 57472
57552  /  020010   =>   CLA
57553  /  467647   =>   SCA 57647
57554  /  467650   =>   SCA 57650
57555  /  125655   =>   JMP 55655
57556  /  020010   =>   CLA
57557  /  327625   =>   IOR 57625
57560  /  477744   =>   SCA I 57744 (55413)
57561  /  327626   =>   IOR 57626
57562  /  477745   =>   SCA I 57745 (55412)
57563  /  327627   =>   IOR 57627
57564  /  477746   =>   SCA I 57746 (55421)
57565  /  327630   =>   IOR 57630
57566  /  477747   =>   SCA I 57747 (55420)
57567  /  327635   =>   IOR 57635
57570  /  477761   =>   SCA I 57761 (55405)
57571  /  327636   =>   IOR 57636
57572  /  477762   =>   SCA I 57762 (55404)
57573  /  327641   =>   IOR 57641
57574  /  477757   =>   SCA I 57757 (55416)
57575  /  327642   =>   IOR 57642
57576  /  477760   =>   SCA I 57760 (55415)
57577  /  077727   =>   JSR I 57727 (66423)
57600  /  077712   =>   JSR I 57712 (60357)
57601  /  742355   =>   JZA 52355
57602  /  020122   =>   020122
57603  /  407540   =>   STA Z 7540
57604  /  004040   =>   LDL 4040
57605  /  327656   =>   IOR 57656
57606  /  077730   =>   JSR I 57730 (66717)
57607  /  077712   =>   JSR I 57712 (60357)
```

```
57610  /  404023  => STA Z 4023
57611  /  240740  => SUB Z 0740
57612  /  754000  => JNA 54000
57613  /  327637  => IOR 57637
57614  /  077730  => JSR I 57730 (66717)
57615  /  077712  => JSR I 57712 (60357)
57616  /  404023  => STA Z 4023
57617  /  220740  => ADD 50740
57620  /  754000  => JNA 54000
57621  /  327640  => IOR 57640
57622  /  077730  => JSR I 57730 (66717)
57623  /  127472  => JMP 57472
57624  /  000000  => 0
57625  /  000000  => 0
57626  /  000000  => 0
57627  /  000000  => 0
57630  /  000000  => 0
57631  /  000000  => 0
57632  /  000000  => 0
57633  /  000000  => 0
57634  /  000000  => 0
57635  /  000000  => 0
57636  /  000000  => 0
57637  /  000000  => 0
57640  /  000000  => 0
57641  /  000000  => 0
57642  /  000000  => 0
57643  /  000000  => 0
57644  /  000000  => 0
57645  /  000000  => 0
57646  /  000000  => 0
57647  /  000000  => 0
57650  /  000000  => 0
57651  /  000000  => 0
57652  /  000000  => 0
57653  /  000000  => 0
57654  /  000000  => 0
57655  /  000000  => 0
57656  /  000000  => 0
57657  /  000000  => 0
57660  /  000000  => 0
57661  /  000000  => 0
57662  /  000000  => 0
57663  /  000000  => 0
57664  /  000000  => 0
57665  /  000000  => 0
57666  /  000000  => 0
57667  /  000000  => 0
57670  /  141520  => AND Z 1520
57671  /  000014  => LDL 0014
57672  /  001020  => LDL 1020
57673  /  001750  => LDL 1750
57674  /  000265  => LDL 0265
57675  /  000260  => LDL 0260
57676  /  000012  => LDL 0012
57677  /  000002  => LDL 0002
57700  /  000024  => LDL 0024
57701  /  000053  => LDL 0053
57702  /  000212  => LDL 0212
57703  /  000132  => LDL 0132
57704  /  023420  => SMA SZA SNL STL
57705  /  000006  => LDL 0006
57706  /  000043  => LDL 0043
57707  /  043715  => JSR Z 3715
```

```
57710  /  043670  ->  JSR Z 3670
57711  /  060103  ->  JSR 50103
57712  /  060357  ->  JSR 50357
57713  /  060055  ->  JSR 50055
57714  /  060142  ->  JSR 50142
57715  /  044033  ->  JSR Z 4033
57716  /  043653  ->  JSR Z 3653
57717  /  067370  ->  JSR 57370
57720  /  067350  ->  JSR 57350
57721  /  067344  ->  JSR 57344
57722  /  067332  ->  JSR 57332
57723  /  067265  ->  JSR 57265
57724  /  067204  ->  JSR 57204
57725  /  066174  ->  JSR 56174
57726  /  064743  ->  JSR 54743
57727  /  066423  ->  JSR 56423
57730  /  066717  ->  JSR 56717
57731  /  067460  ->  JSR 57460
57732  /  044124  ->  JSR Z 4124
57733  /  051403  ->  JSR I Z 1403 (60004)
57734  /  052456  ->  JSR I Z 2456 (37440)
57735  /  052350  ->  JSR I Z 2350 (0007)
57736  /  052255  ->  JSR I Z 2255 (14000)
57737  /  030045  ->  030045
57740  /  017277  ->  017277
57741  /  053303  ->  JSR I Z 3303 (20010)
57742  /  045362  ->  JSR Z 5362
57743  /  050264  ->  JSR I Z 0264 (504150)
57744  /  055413  ->  JSR I Z 5413 (132202)
57745  /  055412  ->  JSR I Z 5412 (210000)
57746  /  055421  ->  JSR I Z 5421 (132202)
57747  /  055420  ->  JSR I Z 5420 (212000)
57750  /  041335  ->  JSR Z 1335
57751  /  043652  ->  JSR Z 3652
57752  /  043644  ->  JSR Z 3644
57753  /  043632  ->  JSR Z 3632
57754  /  017764  ->  017764
57755  /  055442  ->  JSR I Z 5442 (46624)
57756  /  055440  ->  JSR I Z 5440 (140123)
57757  /  055416  ->  JSR I Z 5416 (132202)
57760  /  055415  ->  JSR I Z 5415 (211000)
57761  /  055405  ->  JSR I Z 5405 (131513)
57762  /  055404  ->  JSR I Z 5404 (46631)
57763  /  055433  ->  JSR I Z 5433 (616200)
57764  /  055430  ->  JSR I Z 5430 (616100)
57765  /  046661  ->  JSR Z 6661
57766  /  046664  ->  JSR Z 6664
57767  /  042231  ->  JSR Z 2231
57770  /  017762  ->  017762
57771  /  052657  ->  JSR I Z 2657 (43406)
57772  /  000000  ->  0
57773  /  000000  ->  0
57774  /  000000  ->  0
57775  /  000000  ->  0
57776  /  000000      0
57777  /  000000  ->  0
60004  /  000000  ->  0
60005  /  020010  ->  CLA
60006  /  530022  ->  SZW I 60022 (55437)
60007  /  330024  ->  IOR I 60024 (55412)
60010  /  570022  ->  SNW I 60022 (55437)
60011  /  330023  ->  IOR I 60023 (55413)
60012  /  026000  ->  SPA
60013  /  020006  ->  NAC
```

```
60014  /  260021  => SUB 60021
60015  /  026010  => SPA CLA
60016  /  620004  => ISZ 60004
60017  /  020000  => NOP
60020  /  130004  => JMP I 60004 (0000)
60021  /  001750  => LDL 1750
60022  /  055437  => JSR I Z 5437 (130000)
60023  /  055413  => JSR I Z 5413 (132202)
60024  /  055412  => JSR I Z 5412 (210000)
60025  /  050004  => JSR I Z 0004 (320600)
60026  /  000000  => 0
60027  /  000000  => 0
60030  /  230052  => ADD I 60052 (55413)
60031  /  070054  => JSR I 60054 (50004)
60032  /  774060  => LDL -3720
60033  /  002260  => LDL 2260
60034  /  120042  => JMP 60042
60035  /  000000  => 0
60036  /  230053  => ADD I 60053 (55412)
60037  /  070054  => JSR I 60054 (50004)
60040  /  774060  => LDL -3720
60041  /  002260  => LDL 2260
60042  /  620026  => ISZ 60026
60043  /  020000  => NOP
60044  /  130026  => JMP I 60026 (0000)
60045  /  000000  => 0
60046  /  000000  => 0
60047  /  000000  => 0
60050  /  000000  => 0
60051  /  000000  => 0
60052  /  055413  => JSR I Z 5413 (132202)
60053  /  055412  => JSR I Z 5412 (210000)
60054  /  050004  => JSR I Z 0004 (320600)
60055  /  060412  => JSR 60412
60056  /  000215  => LDL 0215
60057  /  560124  => SNW 60124
60060  /  024000  => SKP
60061  /  560140  => SNW 60140
60062  /  024000  => SKP
60063  /  520070  => SZW 60070
60064  /  060103  => JSR 60103
60065  /  000212  => LDL 0212
60066  /  060103  => JSR 60103
60067  /  130055  => JMP I 60055 (60412)
60070  /  000000  => 0
60071  /  000000  => 0
60072  /  000001  => LDL 0001
60073  /  420124  => STA 60124
60074  /  460140  => SCA 60140
60075  /  130071  => JMP I 60071 (0000)
60076  /  000000  => 0
60077  /  020010  => CLA
60100  /  460124  => SCA 60124
60101  /  460140  => SCA 60140
60102  /  130076  => JMP I 60076 (0000)
60103  /  060416  => JSR 60416
60104  /  070106  => JSR I 60106 (60107)
60105  /  130103  => JMP I 60103 (60416)
60106  /  060107  => JSR 60107
60107  /  060105  => JSR 60105
60110  /  160432  => AND 60432
60111  /  320213  => IOR 60213
60112  /  420442  => STA 60442
60113  /  160432  => AND 60432
60114  /  320211  => IOR 60211
```

```
60115  /  460443  =>  SCA 60443
60116  /  320433  =>  IOR 60433
60117  /  460441  =>  SCA 60441
60120  /  660441  =>  DSZ 60441
60121  /  000001  =>  LDL 0001
60122  /  460141  =>  SCA 60141
60123  /  060162  =>  JSR 60162
60124  /  000000  =>  0
60125  /  160140  =>  AND 60140
60126  /  160141  =>  AND 60141
60127  /  740134  =>  JZA 60134
60130  /  700212  =>  PCT 60212
60131  /  700442  =>  PCT 60442
60132  /  750120  =>  JNA 60120
60133  /  120136  =>  JMP 60136
60134  /  700443  =>  PCT 60443
60135  /  120123  =>  JMP 60123
60136  /  020050  =>  CLA CLL
60137  /  130107  =>  JMP I 60107 (60105)
60140  /  000000  =>  0
60141  /  000001  =>  LDL 0001
60142  /  067267  =>  JSR 67267
60143  /  520147  =>  SZW 60147
60144  /  120147  =>  JMP 60147
60145  /  060162  =>  JSR 60162
60146  /  120143  =>  JMP 60143
60147  /  000000  =>  0
60150  /  460426  =>  SCA 60426
60151  /  460147  =>  SCA 60147
60152  /  320426  =>  IOR 60426
60153  /  130142  =>  JMP I 60142 (67267)
60154  /  460140  =>  SCA 60140
60155  /  460147  =>  SCA 60147
60156  /  320434  =>  IOR 60434
60157  /  460106  =>  SCA 60106
60160  /  130161  =>  JMP I 60161 (62307)
60161  /  062307  =>  JSR 62307
60162  /  060146  =>  JSR 60146
60163  /  460205  =>  SCA 60205
60164  /  060217  =>  JSR 60217
60165  /  320210  =>  IOR 60210
60166  /  460206  =>  SCA 60206
60167  /  030220  =>  STL RTR 2
60170  /  320211  =>  IOR 60211
60171  /  460207  =>  SCA 60207
60172  /  700206  =>  PCT 60206
60173  /  700207  =>  PCT 60207
60174  /  750202  =>  JNA 60202
60175  /  160432      AND 60432
60176  /  320423  =>  IOR 60423
60177  /  420147  =>  STA 60147
60200  /  260204  =>  SUB 60204
60201  /  740154      JZA 60154
60202  /  320205  =>  IOR 60205
60203  /  130162  =>  JMP I 60162 (60146)
60204  /  000272  =>  LDL 0272
60205  /  000000  =>  0
60206  /  000001  =>  LDL 0001
60207  /  210000  =>  ADD I Z 0000 (100103)
60210  /  000001  =>  LDL 0001
60211  /  010000  =>  010000
60212  /  000002  =>  LDL 0002
60213  /  010000  =>  010000
60214  /  001000  =>  LDL 1000
60215  /  063576  =>  JSR 63576
```

```
60216  /  000144  => LDL 0144
60217  /  060165  => JSR 60165
60220  /  020010  => CLA
60221  /  560214  => SNW 60214
60222  /  120242  => JMP 60242
60223  /  660216  => DSZ 60216
60224  /  120242  => JMP 60242
60225  /  000144  => LDL 0144
60226  /  460216  => SCA 60216
60227  /  070440  => JSR I 60440 (50507)
60230  /  020000  => NOP
60231  /  160435  => AND 60435
60232  /  260214  => SUB 60214
60233  /  026020  => SPA STL
60234  /  760242  => JNL 60242
60235  /  021000  => SZA
60236  /  020002  => DAC
60237  /  750242  => JNA 60242
60240  /  520215  => SZW 60215
60241  /  070215  => JSR I 60215 (63576)
60242  /  320354  => IOR 60354
60243  /  360211  => XOR 60211
60244  /  740272  => JZA 60272
60245  /  030220  => STL RTR 2
60246  /  320354  => IOR 60354
60247  /  460355  => SCA 60355
60250  /  700210  => PCT 60210
60251  /  020000  => NOP
60252  /  700355  => PCT 60355
60253  /  750272  => JNA 60272
60254  /  160436  => AND 60436
60255  /  360437  => XOR 60437
60256  /  750350  => JNA 60350
60257  /  000377  => LDL 0377
60260  /  160426  => AND 60426
60261  /  320354  => IOR 60354
60262  /  460355  => SCA 60355
60263  /  700210  => PCT 60210
60264  /  020000  => NOP
60265  /  020000  => NOP
60266  /  700355  => PCT 60355
60267  /  020000  => NOP
60270  /  020010  => CLA
60271  /  660356  => DSZ 60356
60272  /  130217  => JMP I 60217 (60165)
60273  /  000005  => LDL 0005
60274  /  460356  => SCA 60356
60275  /  000000  => 0
60276  /  750336  => JNA 60336
60277  /  620275  => ISZ 60275
60300  /  020000  => NOP
60301  /  000214  => LDL 0214
60302  /  060103  => JSR 60103
60303  /  060357  => JSR 60357
60304  /  747464  => JZA 67464
60305  /  552405  => SNW I Z 2405 (304100)
60306  /  144023  => AND Z 4023
60307  /  052226  => JSR I Z 2226 (444113)
60310  /  110305  => JMP I Z 0305 (0324)
60311  /  747411  => JZA 67411
60312  /  164025  => AND 64025
60313  /  230540  => ADD I 60540 (0001)
60314  /  023140  => 023140
60315  /  240522  => SUB Z 0522
```

```
60316  /  010431  =>  010431
60317  /  160540  =>  AND 60540
60320  /  747403  =>  JZA 67403
60321  /  011414  =>  011414
60322  /  406361  =>  STA Z 6361
60323  /  625564  =>  ISZ 65564
60324  /  717055  =>  PCT I 67055 (404007)
60325  /  666461  =>  DSZ 66461
60326  /  604040  =>  ISZ Z 4040
60327  /  241740  =>  SUB Z 1740
60330  /  220523  =>  ADD 60523
60331  /  241722  =>  SUB Z 1722
60332  /  054023  =>  JSR I Z 4023 (67204)
60333  /  052226  =>  JSR I Z 2226 (444113)
60334  /  110305  =>  JMP I Z 0305 (0324)
60335  /  747400  =>  JZA 67400
60336  /  460275  =>  SCA 60275
60337  /  000207  =>  LDL 0207
60340  /  320354  =>  IOR 60354
60341  /  460355  =>  SCA 60355
60342  /  700355  =>  PCT 60355
60343  /  020000  =>  NOP
60344  /  020010  =>  CLA
60345  /  320353  =>  IOR 60353
60346  /  460161  =>  SCA 60161
60347  /  120154  =>  JMP 60154
60350  /  000005  =>  LDL 0005
60351  /  460356  =>  SCA 60356
60352  /  120272  =>  JMP 60272
60353  /  070000  =>  JSR I 60000 (0000)
60354  /  010000  =>  010000
60355  /  000000  =>  0
60356  /  000005  =>  LDL 0005
60357  /  067343  =>  JSR 67343
60360  /  020010  =>  CLA
60361  /  330357  =>  IOR I 60357 (67343)
60362  /  620357  =>  ISZ 60357
60363  /  420374  =>  STA 60374
60364  /  035440  =>  CLL SHR 14
60365  /  060375  =>  JSR 60375
60366  /  320374  =>  IOR 60374
60367  /  034640  =>  CLL SHR 6
60370  /  060375  =>  JSR 60375
60371  /  320374  =>  IOR 60374
60372  /  060375  =>  JSR 60375
60373  /  120360  =>  JMP 60360
60374  /  745200  =>  JZA 65200
60375  /  060373  =>  JSR 60373
60376  /  160420  =>  AND 60420
60377  /  025000      SNA
60400  /  130357  =>  JMP I 60357 (67343)
60401  /  260421  =>  SUB 60421
60402  /  025000  =>  SNA
60403  /  120411  =>  JMP 60411
60404  /  220417  =>  ADD 60417
60405  /  026000  =>  SPA
60406  /  220422  =>  ADD 60422
60407  /  060413  =>  JSR 60413
60410  /  130375  =>  JMP I 60375 (60373)
60411  /  060055  =>  JSR 60055
60412  /  130375  =>  JMP I 60375 (60373)
60413  /  060410  =>  JSR 60410
60414  /  220425  =>  ADD 60425
60415  /  060103  =>  JSR 60103
```

```
60416  /  130413  =>  JMP I 60413 (60410)
60417  /  000034  =>  LDL 0034
60420  /  000077  =>  LDL 0077
60421  /  000074  =>  LDL 0074
60422  /  000100  =>  LDL 0100
60423  /  000200  =>  LDL 0200
60424  /  210000  =>  ADD I Z 0000 (100103)
60425  /  000240  =>  LDL 0240
60426  /  000000  =>  0
60427  /  000001  =>  LDL 0001
60430  /  000002  =>  LDL 0002
60431  /  010000  =>  010000
60432  /  007777  =>  LDL 7777
60433  /  072460  =>  JSR I 62460 (0012)
60434  /  060107  =>  JSR 60107
60435  /  177777  =>  AND I 67777 (15161)
60436  /  000377  =>  LDL 0377
60437  /  000227  =>  LDL 0227
60440  /  050507  =>  JSR I Z 0507 (244153)
60441  /  072457  =>  JSR I 62457 (122310)
60442  /  010252  =>  010252
60443  /  010252  =>  010252
60444  /  000000  =>  0
60445  /  420504  =>  STA 60504
60446  /  162106  =>  AND 62106
60447  /  750471  =>  JNA 60471
60450  /  000220  =>  LDL 0220
60451  /  360504  =>  XOR 60504
60452  /  162107  =>  AND 62107
60453  /  750470  =>  JNA 60470
60454  /  004400  =>  LDL 4400
60455  /  360504  =>  XOR 60504
60456  /  162110  =>  AND 62110
60457  /  750464  =>  JNA 60464
60460  /  770000  =>  LDL -10000
60461  /  160504  =>  AND 60504
60462  /  222111  =>  ADD 62111
60463  /  120472  =>  JMP 60472
60464  /  777400  =>  LDL -0400
60465  /  160504  =>  AND 60504
60466  /  222112  =>  ADD 62112
60467  /  120472  =>  JMP 60472
60470  /  000020  =>  LDL 0020
60471  /  220504  =>  ADD 60504
60472  /  222113  =>  ADD 62113
60473  /  420504  =>  STA 60504
60474  /  362114  =>  XOR 62114
60475  /  162106  =>  AND 62106
60476  /  750502  =>  JNA 60502
60477  /  777760  =>  LDL -0020
60500  /  160504  =>  AND 60504
60501  /  460504  =>  SCA 60504
60502  /  320504  =>  IOR 60504
60503  /  130444  =>  JMP I 60444 (0000)
60504  /  000000  =>  0
60505  /  000000  =>  0
60506  /  020010  =>  CLA
60507  /  460520  =>  SCA 60520
60510  /  462210  =>  SCA 62210
60511  /  330505  =>  IOR I 60505 (0000)
60512  /  620505  =>  ISZ 60505
60513  /  422207  =>  STA 62207
60514  /  620505  =>  ISZ 60505
60515  /  020010  =>  CLA
```

```
60516  /  130505   =>   JMP I 60505 (0000)
60517  /  000000   =>   0
60520  /  000000   =>   0
60521  /  750550   =>   JNA 60550
60522  /  332207   =>   IOR I 62207 (0000)
60523  /  622207   =>   ISZ 62207
60524  /  432150   =>   STA I 62150 (46715)
60525  /  026000   =>   SPA
60526  /  750546   =>   JNA 60546
60527  /  162115   =>   AND 62115
60530  /  740541   =>   JZA 60541
60531  /  322116   =>   IOR 62116
60532  /  172150   =>   AND I 62150 (46715)
60533  /  472150   =>   SCA I 62150 (46715)
60534  /  322116   =>   IOR 62116
60535  /  172207   =>   AND I 62207 (0000)
60536  /  622207   =>   ISZ 62207
60537  /  462204   =>   SCA 62204
60540  /  000001   =>   LDL 0001
60541  /  460520   =>   SCA 60520
60542  /  332150   =>   IOR I 62150 (46715)
60543  /  620517   =>   ISZ 60517
60544  /  622210   =>   ISZ 62210
60545  /  024000   =>   SKP
60546  /  322210   =>   IOR 62210
60547  /  130517   =>   JMP I 60517 (0000)
60550  /  332150   =>   IOR I 62150 (46715)
60551  /  362204   =>   XOR 62204
60552  /  740522   =>   JZA 60522
60553  /  332150   =>   IOR I 62150 (46715)
60554  /  060444   =>   JSR 60444
60555  /  432150   =>   STA I 62150 (46715)
60556  /  120543   =>   JMP 60543
60557  /  000000   =>   0
60560  /  000000   =>   0
60561  /  000000   =>   0
60562  /  000000   =>   0
60563  /  000000   =>   0
60564  /  000000   =>   0
60565  /  000000   =>   0
60566  /  000000   =>   0
60567  /  000000   =>   0
60570  /  000000   =>   0
60571  /  000000        0
60572  /  000000   =>   0
60573  /  000000   =>   0
60574  /  000000   =>   0
60575  /  000000        0
60576  /  060505   =>   JSR 60505
60577  /  062062   =>   JSR 62062
60600  /  000000   =>   0
60601  /  000000   =>   0
60602  /  061447   =>   JSR 61447
60603  /  030132   =>   030132
60604  /  020010   =>   CLA
60605  /  460562   =>   SCA 60562
60606  /  020000   =>   NOP
60607  /  322117   =>   IOR 62117
60610  /  322120   =>   IOR 62120
60611  /  462205   =>   SCA 62205
60612  /  060517   =>   JSR 60517
60613  /  120674   =>   JMP 60674
60614  /  432150   =>   STA I 62150 (46715)
60615  /  061740   =>   JSR 61740
```

```
60616  /  060657  => JSR 60657
60617  /  120646  => JMP 60646
60620  /  060731  => JSR 60731
60621  /  460656  => SCA 60656
60622  /  000000  => 0
60623  /  740635  => JZA 60635
60624  /  322121  => IOR 62121
60625  /  360656  => XOR 60656
60626  /  750635  => JNA 60635
60627  /  000000  => 0
60630  /  000000  => 0
60631  /  000000  => 0
60632  /  000000  => 0
60633  /  000000  => 0
60634  /  072203  => JSR I 62203 (66423)
60635  /  000001  => LDL 0001
60636  /  740643  => JZA 60643
60637  /  322121  => IOR 62121
60640  /  020004  => CMA
60641  /  160656  => AND 60656
60642  /  740650  => JZA 60650
60643  /  320656  => IOR 60656
60644  /  025000  => SNA
60645  /  120650  => JMP 60650
60646  /  061537  => JSR 61537
60647  /  120674  => JMP 60674
60650  /  072153  => JSR I 62153 (60162)
60651  /  000000  => 0
60652  /  000000  => 0
60653  /  000000  => 0
60654  /  000000  => 0
60655  /  120612  => JMP 60612
60656  /  000000  => 0
60657  /  000000  => 0
60660  /  020010  => CLA
60661  /  000000  => 0
60662  /  000000  => 0
60663  /  000000  => 0
60664  /  000000  => 0
60665  /  072152  => JSR I 62152 (44124)
60666  /  020000  => NOP
60667  /  777776  => LDL -0002
60670  /  220657  => ADD 60657
60671  /  460657  => SCA 60657
60672  /  332150  => IOR I 62150 (46715)
60673  /  130657  => JMP I 60657 (0000)
60674  /  000001  => LDL 0001
60675  /  460562  => SCA 60562
60676  /  000004  => LDL 0004
60677  /  460567  => SCA 60567
60700  /  061757  => JSR 61757
60701  /  062000  => JSR 62000
60702  /  120717  => JMP 60717
60703  /  432150  => STA I 62150 (46715)
60704  /  061740  => JSR 61740
60705  /  060657  => JSR 60657
60706  /  120710  => JMP 60710
60707  /  060731  => JSR 60731
60710  /  061571  => JSR 61571
60711  /  072153  => JSR I 62153 (60162)
60712  /  000000  => 0
60713  /  000000  => 0
60714  /  000000  => 0
60715  /  000000  => 0
```

```
60716  /  120701  -»  JMP 60701
60717  /  020010  -»  CLA
60720  /  460567  -»  SCA 60567
60721  /  072152  -»  JSR I 62152 (44124)
60722  /  130575  -»  JMP I 60575 (0000)
60723  /  000000  -»  0
60724  /  000000  -»  0
60725  /  000000  -»  0
60726  /  000000  -»  0
60727  /  000000  -»  0
60730  /  030010  -»  HLT
60731  /  000000  -»  0
60732  /  020010  -»  CLA
60733  /  462206  -»  SCA 62206
60734  /  072202  -»  JSR I 62202 (53303)
60735  /  020000  -»  NOP
60736  /  072146  -»  JSR I 62146 (60026)
60737  /  121103  -»  JMP 61103
60740  /  061250  -»  JSR 61250
60741  /  121103  -»  JMP 61103
60742  /  072170  -»  JSR I 62170 (52456)
60743  /  072171  -»  JSR I 62171 (52350)
60744  /  072172  -»  JSR I 62172 (52255)
60745  /  572166  -»  SNW I 62166 (52657)
60746  /  121012  -»  JMP 61012
60747  /  000007  -»  LDL 0007
60750  /  172166  -»  AND I 62166 (52657)
60751  /  420775  -»  STA 60775
60752  /  072201  -»  JSR I 62201 (52232)
60753  /  072174  -»  JSR I 62174 (44570)
60754  /  061125  -»  JSR 61125
60755  /  162113  -»  AND 62113
60756  /  751012  -»  JNA 61012
60757  /  072174  -»  JSR I 62174 (44570)
60760  /  061123  -»  JSR 61123
60761  /  162113  -»  AND 62113
60762  /  751007  -»  JNA 61007
60763  /  072174  -»  JSR I 62174 (44570)
60764  /  061121  -»  JSR 61121
60765  /  162113  -»  AND 62113
60766  /  025010  -»  SNA CLA
60767  /  000001      LDL 0001
60770  /  462211  -»  SCA 62211
60771  /  072175  -»  JSR I 62175 (54614)
60772  /  020000  -»  NOP
60773  /  072176      JSR I 62176 (52112)
60774  /  020000  -»  NOP
60775  /  000000  -»  0
60776  /  072177  -»  JSR I 62177 (52132)
60777  /  121031  -»  JMP 61031
61000  /  020000  -»  NOP
61001  /  020010  -»  CLA
61002  /  522211  -»  SZW 62211
61003  /  322122  -»  IOR 62122
61004  /  562211  -»  SNW 62211
61005  /  322123  -»  IOR 62123
61006  /  024000  -»  SKP
61007  /  322124  -»  IOR 62124
61010  /  322206  -»  IOR 62206
61011  /  462206  -»  SCA 62206
61012  /  061131  -»  JSR 61131
61013  /  121021  -»  JMP 61021
61014  /  061145  -»  JSR 61145
61015  /  024010  -»  SKP CLA
```

```
61016  /  121030  => JMP 61030
61017  /  322125  => IOR 62125
61020  /  024000  => SKP
61021  /  322126  => IOR 62126
61022  /  322206  => IOR 62206
61023  /  462206  => SCA 62206
61024  /  322124  => IOR 62124
61025  /  020004  => CMA
61026  /  162206  => AND 62206
61027  /  462206  => SCA 62206
61030  /  024000  => SKP
61031  /  000001  => LDL 0001
61032  /  472165  => SCA I 62165 (52654)
61033  /  332147  => IOR I 62147 (55414)
61034  /  532165  => SZW I 62165 (52654)
61035  /  261116  => SUB 61116
61036  /  261117  => SUB 61117
61037  /  026000  => SPA
61040  /  751056  => JNA 61056
61041  /  261117  => SUB 61117
61042  /  026000  => SPA
61043  /  751053  => JNA 61053
61044  /  261120  => SUB 61120
61045  /  026010  => SPA CLA
61046  /  121051  => JMP 61051
61047  /  322127  => IOR 62127
61050  /  024000  => SKP
61051  /  322130  => IOR 62130
61052  /  024000  => SKP
61053  /  322131  => IOR 62131
61054  /  322206  => IOR 62206
61055  /  462206  => SCA 62206
61056  /  332156  => IOR I 62156 (55416)
61057  /  532165  => SZW I 62165 (52654)
61060  /  261116  => SUB 61116
61061  /  261116  => SUB 61116
61062  /  023010  => SMA SZA CLA
61063  /  121071  => JMP 61071
61064  /  332157  => IOR I 62157 (55415)
61065  /  532165  => SZW I 62165 (52654)
61066  /  261116  => SUB 61116
61067  /  261116  => SUB 61116
61070  /  023010  => SMA SZA CLA
61071  /  322132  => IOR 62132
61072  /  322206  => IOR 62206
61073  /  462206  => SCA 62206
61074  /  061161  => JSR 61161
61075  /  121111  => JMP 61111
61076  /  532167  => SZW I 62167 (55417)
61077  /  121111  => JMP 61111
61100  /  061212  => JSR 61212
61101  /  322133  => IOR 62133
61102  /  322206  => IOR 62206
61103  /  422206  => STA 62206
61104  /  130731  => JMP I 60731 (0000)
61105  /  000000  => 0
61106  /  000000  => 0
61107  /  000000  => 0
61110  /  000000  => 0
61111  /  020010  => CLA
61112  /  322121  => IOR 62121
61113  /  121102  => JMP 61102
61114  /  000310  => LDL 0310
61115  /  001440  => LDL 1440
```

```
61116  /  003100   ->   LDL 3100
61117  /  000226   ->   LDL 0226
61120  /  000764   ->   LDL 0764
61121  /  000016   ->   LDL 0016
61122  /  352300   ->   XOR I Z 2300 (102561)
61123  /  000020   ->   LDL 0020
61124  /  303240   ->   IOR Z 3240
61125  /  000022   ->   LDL 0022
61126  /  303240   ->   IOR Z 3240
61127  /  000022   ->   LDL 0022
61130  /  364110   ->   XOR 64110
61131  /  000000   ->   0
61132  /  020010   ->   CLA
61133  /  332164   ->   IOR I 62164 (55434)
61134  /  026000   ->   SPA
61135  /  020006   ->   NAC
61136  /  262134   ->   SUB 62134
61137  /  026000   ->   SPA
61140  /  751143   ->   JNA 61143
61141  /  262135   ->   SUB 62135
61142  /  022010   ->   SMA CLA
61143  /  621131   ->   ISZ 61131
61144  /  131131   ->   JMP I 61131 (0000)
61145  /  000000   ->   0
61146  /  020010   ->   CLA
61147  /  332164   ->   IOR I 62164 (55434)
61150  /  026000   ->   SPA
61151  /  020006   ->   NAC
61152  /  262136   ->   SUB 62136
61153  /  026000   ->   SPA
61154  /  751157   ->   JNA 61157
61155  /  262137   ->   SUB 62137
61156  /  022010   ->   SMA CLA
61157  /  621145   ->   ISZ 61145
61160  /  131145   ->   JMP I 61145 (0000)
61161  /  000000   ->   0
61162  /  020010   ->   CLA
61163  /  332160   ->   IOR I 62160 (55421)
61164  /  072155   ->   JSR I 62155 (50004)
61165  /  765660        JNL 65660
61166  /  001130   ->   LDL 1130
61167  /  121210   ->   JMP 61210
61170  /  332161   ->   IOR I 62161 (55420)
61171  /  072155        JSR I 62155 (50004)
61172  /  765660   ->   JNL 65660
61173  /  001130   ->   LDL 1130
61174  /  121210   ->   JMP 61210
61175  /  332162   ->   IOR I 62162 (55405)
61176  /  072155   ->   JSR I 62155 (50004)
61177  /  772110   ->   LDL -5670
61200  /  005670   ->   LDL 5670
61201  /  121210   ->   JMP 61210
61202  /  332163   ->   IOR I 62163 (55404)
61203  /  072155   ->   JSR I 62155 (50004)
61204  /  772110   ->   LDL -5670
61205  /  005670   ->   LDL 5670
61206  /  024000   ->   SKP
61207  /  621161   ->   ISZ 61161
61210  /  020000   ->   NOP
61211  /  131161   ->   JMP I 61161 (0000)
61212  /  000000   ->   0
61213  /  061250   ->   JSR 61250
61214  /  121240   ->   JMP 61240
61215  /  332160   ->   IOR I 62160 (55421)
```

```
61216 /  072155  => JSR I 62155 (50004)
61217 /  767154  => JNL 67154
61220 /  774700  => LDL -3100
61221 /  000001  => LDL 0001
61222 /  461247  => SCA 61247
61223 /  332161  => IOR I 62161 (55420)
61224 /  072155  => JSR I 62155 (50004)
61225 /  767154  => JNL 67154
61226 /  774700  => LDL -3100
61227 /  121243  => JMP 61243
61230 /  561247  => SNW 61247
61231 /  121241  => JMP 61241
61232 /  332160  => IOR I 62160 (55421)
61233 /  072155  => JSR I 62155 (50004)
61234 /  767154  => JNL 67154
61235 /  776340  => LDL -1440
61236 /  121240  => JMP 61240
61237 /  121241  => JMP 61241
61240 /  621212  => ISZ 61212
61241 /  020000  => NOP
61242 /  131212  => JMP I 61212 (0000)
61243 /  521247  => SZW 61247
61244 /  121240  => JMP 61240
61245 /  332161  => IOR I 62161 (55420)
61246 /  121233  => JMP 61233
61247 /  000000  => 0
61250 /  000000  => 0
61251 /  020010  => CLA
61252 /  332160  => IOR I 62160 (55421)
61253 /  072155  => JSR I 62155 (50004)
61254 /  773240  => LDL -4540
61255 /  773550  => LDL -4230
61256 /  121263  => JMP 61263
61257 /  332161  => IOR I 62161 (55420)
61260 /  072155  => JSR I 62155 (50004)
61261 /  773240  => LDL -4540
61262 /  773550  => LDL -4230
61263 /  621250  => ISZ 61250
61264 /  020000  => NOP
61265 /  131250  => JMP I 61250 (0000)
61266 /  000000  => 0
61267 /  061757  => JSR 61757
61270 /  320560  => IOR 60560
61271 /  460561  => SCA 60561
61272 /  460566  => SCA 60566
61273 /  062000  => JSR 62000
61274 /  121316  => JMP 61316
61275 /  472150  => SCA I 62150 (46715)
61276 /  330560  => IOR I 60560 (0000)
61277 /  061320  => JSR 61320
61300 /  121312  => JMP 61312
61301 /  332150  => IOR I 62150 (46715)
61302 /  470561  => SCA I 60561 (0000)
61303 /  620561  => ISZ 60561
61304 /  330560  => IOR I 60560 (0000)
61305 /  061362  => JSR 61362
61306 /  470561  => SCA I 60561 (0000)
61307 /  620560  => ISZ 60560
61310 /  620561  => ISZ 60561
61311 /  121273  => JMP 61273
61312 /  620566  => ISZ 60566
61313 /  620560  => ISZ 60560
61314 /  020000  => NOP
61315 /  121273  => JMP 61273
```

```
61316  /  320566   ->   IOR 60566
61317  /  131266   ->   JMP I 61266 (0000)
61320  /  000000   ->   0
61321  /  461360   ->   SCA 61360
61322  /  461361   ->   SCA 61361
61323  /  322140   ->   IOR 62140
61324  /  161360   ->   AND 61360
61325  /  021010   ->   SZA CLA
61326  /  621361   ->   ISZ 61361
61327  /  322141   ->   IOR 62141
61330  /  161360   ->   AND 61360
61331  /  021010   ->   SZA CLA
61332  /  621361   ->   ISZ 61361
61333  /  322142   ->   IOR 62142
61334  /  161360   ->   AND 61360
61335  /  021010   ->   SZA CLA
61336  /  621361   ->   ISZ 61361
61337  /  000003   ->   LDL 0003
61340  /  361361   ->   XOR 61361
61341  /  741352   ->   JZA 61352
61342  /  000000   ->   0
61343  /  751353   ->   JNA 61353
61344  /  000002   ->   LDL 0002
61345  /  361361   ->   XOR 61361
61346  /  751353   ->   JNA 61353
61347  /  000077   ->   LDL 0077
61350  /  161360   ->   AND 61360
61351  /  025010   ->   SNA CLA
61352  /  621320   ->   ISZ 61320
61353  /  020000   ->   NOP
61354  /  131320   ->   JMP I 61320 (0000)
61355  /  000000   ->   0
61356  /  000000   ->   0
61357  /  000000   ->   0
61360  /  000000   ->   0
61361  /  000000   ->   0
61362  /  000000   ->   0
61363  /  461443        SCA 61443
61364  /  461444   ->   SCA 61444
61365  /  000007   ->   LDL 0007
61366  /  161443   ->   AND 61443
61367  /  421445        STA 61445
61370  /  072154   ->   JSR I 62154 (43653)
61371  /  000003   ->   LDL 0003
61372  /  061403   ->   JSR 61403
61373  /  000005   ->   LDL 0005
61374  /  061403   ->   JSR 61403
61375  /  000006   ->   LDL 0006
61376  /  061403   ->   JSR 61403
61377  /  000007   ->   LDL 0007
61400  /  061403   ->   JSR 61403
61401  /  000000   ->   0
61402  /  024000   ->   SKP
61403  /  000001   ->   LDL 0001
61404  /  461444   ->   SCA 61444
61405  /  000070   ->   LDL 0070
61406  /  161443   ->   AND 61443
61407  /  034340   ->   CLL SHR 3
61410  /  321445   ->   IOR 61445
61411  /  362143   ->   XOR 62143
61412  /  751416   ->   JNA 61416
61413  /  000002   ->   LDL 0002
61414  /  321444   ->   IOR 61444
61415  /  461444   ->   SCA 61444
```

```
61416  /  000004   =>   LDL 0004
61417  /  421425   =>   STA 61425
61420  /  461446   =>   SCA 61446
61421  /  000700   =>   LDL 0700
61422  /  421445   =>   STA 61445
61423  /  161443   =>   AND 61443
61424  /  021010   =>   SZA CLA
61425  /  000004   =>   LDL 0004
61426  /  321444   =>   IOR 61444
61427  /  461444   =>   SCA 61444
61430  /  321425   =>   IOR 61425
61431  /  036140   =>   CLL SHL 1
61432  /  461425   =>   SCA 61425
61433  /  321445   =>   IOR 61445
61434  /  036340   =>   CLL SHL 3
61435  /  661446   =>   DSZ 61446
61436  /  121422   =>   JMP 61422
61437  /  000077   =>   LDL 0077
61440  /  161444   =>   AND 61444
61441  /  037440   =>   CLL SHL 14
61442  /  131362   =>   JMP I 61362 (0000)
61443  /  000000   =>   0
61444  /  000000   =>   0
61445  /  000000   =>   0
61446  /  000000   =>   0
61447  /  000000   =>   0
61450  /  020010   =>   CLA
61451  /  331447   =>   IOR I 61447 (0000)
61452  /  621447   =>   ISZ 61447
61453  /  460557   =>   SCA 60557
61454  /  000000   =>   0
61455  /  220557   =>   ADD 60557
61456  /  460560   =>   SCA 60560
61457  /  000000   =>   0
61460  /  222144   =>   ADD 62144
61461  /  012000   =>   AIL
61462  /  222113   =>   ADD 62113
61463  /  470560   =>   SCA I 60560 (0000)
61464  /  000001   =>   LDL 0001
61465  /  220557   =>   ADD 60557
61466  /  012000   =>   AIL
61467  /  420563   =>   STA 60563
61470  /  460564   =>   SCA 60564
61471  /  460565   =>   SCA 60565
61472  /  000002   =>   LDL 0002
61473  /  220557   =>   ADD 60557
61474  /  460560   =>   SCA 60560
61475  /  470560   =>   SCA I 60560 (0000)
61476  /  000003   =>   LDL 0003
61477  /  220557   =>   ADD 60557
61500  /  460560   =>   SCA 60560
61501  /  000001   =>   LDL 0001
61502  /  460567   =>   SCA 60567
61503  /  131447   =>   JMP I 61447 (0000)
61504  /  000000   =>   0
61505  /  000000   =>   0
61506  /  000000   =>   0
61507  /  020010   =>   CLA
61510  /  460565   =>   SCA 60565
61511  /  460567   =>   SCA 60567
61512  /  000000   =>   0
61513  /  220557   =>   ADD 60557
61514  /  460560   =>   SCA 60560
61515  /  470560   =>   SCA I 60560 (0000)
```

```
61516  /  000002   => LDL 0002
61517  /  220557   => ADD 60557
61520  /  460560   => SCA 60560
61521  /  470560   => SCA I 60560 (0000)
61522  /  131506   => JMP I 61506 (0000)
61523  /  000000   => 0
61524  /  020006   => NAC
61525  /  220563   => ADD 60563
61526  /  420563   => STA 60563
61527  /  460565   => SCA 60565
61530  /  000002   => LDL 0002
61531  /  220557   => ADD 60557
61532  /  461536   => SCA 61536
61533  /  320565   => IOR 60565
61534  /  471536   => SCA I 61536 (0000)
61535  /  131523   => JMP I 61523 (0000)
61536  /  000000   => 0
61537  /  000000   => 0
61540  /  025000   => SNA
61541  /  121566   => JMP 61566
61542  /  461570   => SCA 61570
61543  /  620565   => ISZ 60565
61544  /  020000   => NOP
61545  /  777777   => LDL -0001
61546  /  220564   => ADD 60564
61547  /  420564   => STA 60564
61550  /  026010   => SPA CLA
61551  /  121567   => JMP 61567
61552  /  332150   => IOR I 62150 (46715)
61553  /  470560   => SCA I 60560 (0000)
61554  /  321570   => IOR 61570
61555  /  620560   => ISZ 60560
61556  /  470560   => SCA I 60560 (0000)
61557  /  620560   => ISZ 60560
61560  /  020000   => NOP
61561  /  000002   => LDL 0002
61562  /  220557   => ADD 60557
61563  /  461570   => SCA 61570
61564  /  320565   => IOR 60565
61565  /  471570      SCA I 61570 (0000)
61566  /  621537   => ISZ 61537
61567  /  131537   => JMP I 61537 (0000)
61570  /  000000   => 0
61571  /  000000   => 0
61572  /  461725   => SCA 61725
61573  /  461727   => SCA 61727
61574  /  330560   => IOR I 60560 (0000)
61575  /  421726   => STA 61726
61576  /  162205   => AND 62205
61577  /  421730   => STA 61730
61600  /  741622   => JZA 61622
61601  /  322205   => IOR 62205
61602  /  161725   => AND 61725
61603  /  421731   => STA 61731
61604  /  741622   => JZA 61622
61605  /  322120   => IOR 62120
61606  /  161725   => AND 61725
61607  /  161726   => AND 61726
61610  /  025010   => SNA CLA
61611  /  322145   => IOR 62145
61612  /  321730   => IOR 61730
61613  /  321731   => IOR 61731
61614  /  321727   => IOR 61727
61615  /  421727   => STA 61727
```

```
61616  /  470560   =>  SCA I 60560 (0000)
61617  /  620560   =>  ISZ 60560
61620  /  020000   =>  NOP
61621  /  131571   =>  JMP I 61571 (0000)
61622  /  322126   =>  IOR 62126
61623  /  322125   =>  IOR 62125
61624  /  421731   =>  STA 61731
61625  /  161725   =>  AND 61725
61626  /  421730   =>  STA 61730
61627  /  741636   =>  JZA 61636
61630  /  321731   =>  IOR 61731
61631  /  161726   =>  AND 61726
61632  /  021010   =>  SZA CLA
61633  /  321730   =>  IOR 61730
61634  /  321727   =>  IOR 61727
61635  /  461727   =>  SCA 61727
61636  /  322123   =>  IOR 62123
61637  /  322124   =>  IOR 62124
61640  /  322122   =>  IOR 62122
61641  /  061701   =>  JSR 61701
61642  /  322130   =>  IOR 62130
61643  /  322131   =>  IOR 62131
61644  /  322132   =>  IOR 62132
61645  /  322127   =>  IOR 62127
61646  /  061701   =>  JSR 61701
61647  /  322121   =>  IOR 62121
61650  /  322133   =>  IOR 62133
61651  /  421731   =>  STA 61731
61652  /  161725   =>  AND 61725
61653  /  461730   =>  SCA 61730
61654  /  322205   =>  IOR 62205
61655  /  161725   =>  AND 61725
61656  /  741661   =>  JZA 61661
61657  /  321731   =>  IOR 61731
61660  /  461730   =>  SCA 61730
61661  /  321731   =>  IOR 61731
61662  /  161726   =>  AND 61726
61663  /  461732   =>  SCA 61732
61664  /  322205   =>  IOR 62205
61665  /  161726   =>  AND 61726
61666  /  741671   =>  JZA 61671
61667  /  321731   =>  IOR 61731
61670  /  461732   =>  SCA 61732
61671  /  321732   =>  IOR 61732
61672  /  161730   =>  AND 61730
61673  /  121614   =>  JMP 61614
61674  /  000000   =>  0
61675  /  000000   =>  0
61676  /  000000   =>  0
61677  /  000000   =>  0
61700  /  000000   =>  0
61701  /  000000   =>  0
61702  /  421731   =>  STA 61731
61703  /  161725   =>  AND 61725
61704  /  421730   =>  STA 61730
61705  /  741715   =>  JZA 61715
61706  /  321731   =>  IOR 61731
61707  /  322205   =>  IOR 62205
61710  /  300002   =>  IOR Z 0002
61711  /  161726   =>  AND 61726
61712  /  021010   =>  SZA CLA
61713  /  321730   =>  IOR 61730
61714  /  121722   =>  JMP 61722
61715  /  322205   =>  IOR 62205
```

```
61716  /  161725   ->  AND 61725
61717  /  741724   ->  JZA 61724
61720  /  321731   ->  IOR 61731
61721  /  161726   ->  AND 61726
61722  /  321727   ->  IOR 61727
61723  /  461727   ->  SCA 61727
61724  /  131701   ->  JMP I 61701 (0000)
61725  /  000000   ->  0
61726  /  000000   ->  0
61727  /  000000   ->  0
61730  /  000000   ->  0
61731  /  000000   ->  0
61732  /  000000   ->  0
61733  /  000000   ->  0
61734  /  000000   ->  0
61735  /  000000   ->  0
61736  /  000000   ->  0
61737  /  000000   ->  0
61740  /  000000   ->  0
61741  /  072151   ->  JSR I 62151 (46255)
61742  /  121755   ->  JMP 61755
61743  /  026000   ->  SPA
61744  /  751751   ->  JNA 61751
61745  /  751753   ->  JNA 61753
61746  /  621740   ->  ISZ 61740
61747  /  621740   ->  ISZ 61740
61750  /  131740   ->  JMP I 61740 (0000)
61751  /  322120   ->  IOR 62120
61752  /  024000   ->  SKP
61753  /  322117   ->  IOR 62117
61754  /  121747   ->  JMP 61747
61755  /  072152   ->  JSR I 62152 (44124)
61756  /  121750   ->  JMP 61750
61757  /  000000   ->  0
61760  /  000002   ->  LDL 0002
61761  /  220557   ->  ADD 60557
61762  /  012000   ->  AIL
61763  /  420565   ->  STA 60565
61764  /  420563   ->  STA 60563
61765  /  460564   ->  SCA 60564
61766  /  460565   ->  SCA 60565
61767  /  000003   ->  LDL 0003
61770  /  220557   ->  ADD 60557
61771  /  460560   ->  SCA 60560
61772  /  131757   ->  JMP I 61757 (0000)
61773  /  000000   ->  0
61774  /  000000   ->  0
61775  /  000000   ->  0
61776  /  000000   ->  0
61777  /  000000   ->  0
62000  /  000000   ->  0
62001  /  777777   ->  LDL -0001
62002  /  220564   ->  ADD 60564
62003  /  420564   ->  STA 60564
62004  /  026010   ->  SPA CLA
62005  /  122013   ->  JMP 62013
62006  /  620565   ->  ISZ 60565
62007  /  330560   ->  IOR I 60560 (0000)
62010  /  620560   ->  ISZ 60560
62011  /  020000   ->  NOP
62012  /  622000   ->  ISZ 62000
62013  /  132000   ->  JMP I 62000 (0000)
62014  /  000000   ->  0
62015  /  000000   ->  0
```

```
62016  /  000000  =>  0
62017  /  000000  =>  0
62020  /  000000  =>  0
62021  /  460561  =>  SCA 60561
62022  /  332020  =>  IOR I 62020 (0000)
62023  /  622020  =>  ISZ 62020
62024  /  462053  =>  SCA 62053
62025  /  061757  =>  JSR 61757
62026  /  062000  =>  JSR 62000
62027  /  122047  =>  JMP 62047
62030  /  462054  =>  SCA 62054
62031  /  330560  =>  IOR I 60560 (0000)
62032  /  620560  =>  ISZ 60560
62033  /  162053  =>  AND 62053
62034  /  742026  =>  JZA 62026
62035  /  322054  =>  IOR 62054
62036  /  470561  =>  SCA I 60561 (0000)
62037  /  620561  =>  ISZ 60561
62040  /  777777  =>  LDL -0001
62041  /  470561  =>  SCA I 60561 (0000)
62042  /  122026  =>  JMP 62026
62043  /  000000  =>  0
62044  /  000000  =>  0
62045  /  000000  =>  0
62046  /  000000  =>  0
62047  /  020010  =>  CLA
62050  /  777777  =>  LDL -0001
62051  /  470561  =>  SCA I 60561 (0000)
62052  /  132020  =>  JMP I 62020 (0000)
62053  /  000000  =>  0
62054  /  000000  =>  0
62055  /  000000  =>  0
62056  /  000000  =>  0
62057  /  000000  =>  0
62060  /  000000  =>  0
62061  /  000000  =>  0
62062  /  220001  =>  ADD 60001
62063  /  622630  =>  ISZ 62630
62064  /  230001  =>  ADD I 60001 (0000)
62065  /  634630  =>  ISZ I 64630 (77612)
62066  /  250001  =>  SUB I Z 0001 (20000)
62067  /  650630  =>  DSZ I Z 0630 (100550)
62070  /  251001  =>  SUB I Z 1001 (740103)
62071  /  671630  =>  DSZ I 61630 (321731)
62072  /  272001  =>  SUB I 62001 (777777)
62073  /  702630  =>  PCT 62630
62074  /  303001  =>  IOR Z 3001
62075  /  710630  =>  PCT I 60630 (0000)
62076  /  311401  =>  IOR I Z 1401 (40001)
62077  /  714630  =>  PCT I 64630 (77612)
62100  /  777777  =>  LDL -0001
62101  /  777777  =>  LDL -0001
62102  /  000000  =>  0
62103  /  000000  =>  0
62104  /  000000  =>  0
62105  /  004067  =>  LDL 4067
62106  /  000017  =>  LDL 0017
62107  /  000360  =>  LDL 0360
62110  /  007400  =>  LDL 7400
62111  /  010000  =>  010000
62112  /  000400  =>  LDL 0400
62113  /  000001  =>  LDL 0001
62114  /  000012  =>  LDL 0012
62115  /  200000  =>  ADD Z 0000
```

```
62116  /  177777   =>   AND I 67777 (15161)
62117  /  000001   =>   LDL 0001
62120  /  010000   =>   010000
62121  /  000002   =>   LDL 0002
62122  /  040000   =>   JSR Z 0000
62123  /  000004   =>   LDL 0004
62124  /  000010   =>   LDL 0010
62125  /  002000   =>   LDL 2000
62126  /  001000   =>   LDL 1000
62127  /  100000   =>   JMP Z 0000
62130  /  000020   =>   LDL 0020
62131  /  000040   =>   LDL 0040
62132  /  000100   =>   LDL 0100
62133  /  000200   =>   LDL 0200
62134  /  001034   =>   LDL 1034
62135  /  000207   =>   LDL 0207
62136  /  000454   =>   LDL 0454
62137  /  000106   =>   LDL 0106
62140  /  111111   =>   JMP I Z 1111 (0000)
62141  /  222222   =>   ADD 62222
62142  /  444444   =>   SCA Z 4444
62143  /  000007   =>   LDL 0007
62144  /  020050   =>   CLA CLL
62145  /  020000   =>   NOP
62146  /  060026   =>   JSR 60026
62147  /  055414   =>   JSR I Z 5414 (616100)
62150  /  046715   =>   JSR Z 6715
62151  /  046255   =>   JSR Z 6255
62152  /  044124   =>   JSR Z 4124
62153  /  060162   =>   JSR 60162
62154  /  043653   =>   JSR Z 3653
62155  /  050004        JSR I Z 0004 (320600)
62156  /  055416   =>   JSR I Z 5416 (132202)
62157  /  055415   =>   JSR I Z 5415 (211000)
62160  /  055421   =>   JSR I Z 5421 (132202)
62161  /  055420        JSR I Z 5420 (212000)
62162  /  055405   =>   JSR I Z 5405 (131513)
62163  /  055404   =>   JSR I Z 5404 (46631)
62164  /  055434   =>   JSR I Z 5434 (12000)
62165  /  052654   =>   JSR I Z 2654 (641022)
62166  /  052657   =>   JSR I Z 2657 (43406)
62167  /  055417   =>   JSR I Z 5417 (616200)
62170  /  052456   =>   JSR I Z 2456 (37440)
62171  /  052350   =>   JSR I Z 2350 (0007)
62172  /  052255   =>   JSR I Z 2255 (14000)
62173  /  044536   =>   JSR Z 4536
62174  /  044570   =>   JSR Z 4570
62175  /  054614   =>   JSR I Z 4614 (152313)
62176  /  052112   =>   JSR I Z 2112 (43524)
62177  /  052132   =>   JSR I Z 2132 (244026)
62200  /  053264   =>   JSR I Z 3264 (444136)
62201  /  052232   =>   JSR I Z 2232 (142464)
62202  /  053303   =>   JSR I Z 3303 (20010)
62203  /  066423   =>   JSR 66423
62204  /  000000   =>   0
62205  /  000000   =>   0
62206  /  000000   =>   0
62207  /  000000   =>   0
62210  /  000000   =>   0
62211  /  000000   =>   0
62212  /  000000   =>   0
62213  /  126216   =>   JMP 66216
62214  /  126225   =>   JMP 66225
62215  /  126234   =>   JMP 66234
```

```
62216  /  000000  =>  0
62217  /  566252  =>  SNW 66252
62220  /  122310  =>  JMP 62310
62221  /  000000  =>  0
62222  /  000000  =>  0
62223  /  000000  =>  0
62224  /  000000  =>  0
62225  /  000000  =>  0
62226  /  020010  =>  CLA
62227  /  477606  =>  SCA I 67606 (60124)
62230  /  477607  =>  SCA I 67607 (60140)
62231  /  000272  =>  LDL 0272
62232  /  477601  =>  SCA I 67601 (60204)
62233  /  327476  =>  IOR 67476
62234  /  477605  =>  SCA I 67605 (60161)
62235  /  077612  =>  JSR I 67612 (60357)
62236  /  744000  =>  JZA 64000
62237  /  000276  =>  LDL 0276
62240  /  077603  =>  JSR I 67603 (60103)
62241  /  000000  =>  0
62242  /  752245  =>  JNA 62245
62243  /  622241  =>  ISZ 62241
62244  /  122307  =>  JMP 62307
62245  /  077602  =>  JSR I 67602 (60142)
62246  /  422250  =>  STA 62250
62247  /  077603  =>  JSR I 67603 (60103)
62250  /  000000  =>  0
62251  /  077600  =>  JSR I 67600 (43653)
62252  /  000233  =>  LDL 0233
62253  /  062307  =>  JSR 62307
62254  /  000273  =>  LDL 0273
62255  /  066403  =>  JSR 66403
62256  /  000322  =>  LDL 0322
62257  /  066403  =>  JSR 66403
62260  /  000320  =>  LDL 0320
62261  /  066260  =>  JSR 66260
62262  /  000327  =>  LDL 0327
62263  /  066302  =>  JSR 66302
62264  /  000227  =>  LDL 0227
62265  /  066302  =>  JSR 66302
62266  /  000212  =>  LDL 0212
62267  /  062217  =>  JSR 62217
62270  /  000215  =>  LDL 0215
62271  /  062217  =>  JSR 62217
62272  /  000214  =>  LDL 0214
62273  /  062217  =>  JSR 62217
62274  /  000000  =>  0
62275  /  077612  =>  JSR I 67612 (60357)
62276  /  777400  =>  LDL -0400
62277  /  000000  =>  0
62300  /  000000  =>  0
62301  /  000000  =>  0
62302  /  122217  =>  JMP 62217
62303  /  000000  =>  0
62304  /  000000  =>  0
62305  /  000000  =>  0
62306  /  077646  =>  JSR I 67646 (44124)
62307  /  067332  =>  JSR 67332
62310  /  067302  =>  JSR 67302
62311  /  000272  =>  LDL 0272
62312  /  477601  =>  SCA I 67601 (60204)
62313  /  327477  =>  IOR 67477
62314  /  477605  =>  SCA I 67605 (60161)
62315  /  000000  =>  0
```

| | | | |
|---|---|---|---|
| 62316 | / | 467762 | SCA 67762 |
| 62317 | / | 000000 | 0 |
| 62320 | / | 467774 | SCA 67774 |
| 62321 | / | 000000 | 0 |
| 62322 | / | 467775 | SCA 67775 |
| 62323 | / | 067340 | JSR 67340 |
| 62324 | / | 067265 | JSR 67265 |
| 62325 | / | 077600 | JSR I 67600 (43653) |
| 62326 | / | 000233 | LDL 0233 |
| 62327 | / | 062217 | JSR 62217 |
| 62330 | / | 000273 | LDL 0273 |
| 62331 | / | 064410 | JSR 64410 |
| 62332 | / | 000272 | LDL 0272 |
| 62333 | / | 062307 | JSR 62307 |
| 62334 | / | 000261 | LDL 0261 |
| 62335 | / | 062502 | JSR 62502 |
| 62336 | / | 000262 | LDL 0262 |
| 62337 | / | 065124 | JSR 65124 |
| 62340 | / | 000263 | LDL 0263 |
| 62341 | / | 062547 | JSR 62547 |
| 62342 | / | 000264 | LDL 0264 |
| 62343 | / | 055655 | JSR I Z 5655 (172405) |
| 62344 | / | 000260 | LDL 0260 |
| 62345 | / | 062364 | JSR 62364 |
| 62346 | / | 000222 | LDL 0222 |
| 62347 | / | 062763 | JSR 62763 |
| 62350 | / | 000223 | LDL 0223 |
| 62351 | / | 062721 | JSR 62721 |
| 62352 | / | 000224 | LDL 0224 |
| 62353 | / | 062717 | JSR 62717 |
| 62354 | / | 000000 | 0 |
| 62355 | / | 000000 | 0 |
| 62356 | / | 000000 | 0 |
| 62357 | / | 000000 | 0 |
| 62360 | / | 000000 | 0 |
| 62361 | / | 000277 | LDL 0277 |
| 62362 | / | 077603 | JSR I 67603 (60103) |
| 62363 | / | 122323 | JMP 62323 |
| 62364 | / | 067370 | JSR 67370 |
| 62365 | / | 067376 | JSR 67376 |
| 62366 | / | 067407 | JSR 67407 |
| 62367 | / | 067435 | JSR 67435 |
| 62370 | / | 067453 | JSR 67453 |
| 62371 | / | 067350 | JSR 67350 |
| 62372 | / | 122311 | JMP 62311 |
| 62373 | / | 000214 | LDL 0214 |
| 62374 | / | 077603 | JSR I 67603 (60103) |
| 62375 | / | 000003 | LDL 0003 |
| 62376 | / | 462475 | SCA 62475 |
| 62377 | / | 462474 | SCA 62474 |
| 62400 | / | 077612 | JSR I 67612 (60357) |
| 62401 | / | 740530 | JZA 60530 |
| 62402 | / | 031001 | 031001 |
| 62403 | / | 160705 | AND 60705 |
| 62404 | / | 404340 | STA Z 4340 |
| 62405 | / | 004040 | LDL 4040 |
| 62406 | / | 077602 | JSR I 67602 (60142) |
| 62407 | / | 422473 | STA 62473 |
| 62410 | / | 077603 | JSR I 67603 (60103) |
| 62411 | / | 000260 | LDL 0260 |
| 62412 | / | 362473 | XOR 62473 |
| 62413 | / | 422473 | STA 62473 |
| 62414 | / | 267500 | SUB 67500 |
| 62415 | / | 022010 | SMA CLA |

```
62416  /  122460   => JMP 62460
62417  /  322474   => IOR 62474
62420  /  036440   => CLL SHL 4
62421  /  322473   => IOR 62473
62422  /  462474   => SCA 62474
62423  /  662475   => DSZ 62475
62424  /  122406   => JMP 62406
62425  /  322474   => IOR 62474
62426  /  422473   => STA 62473
62427  /  077600   => JSR I 67600 (43653)
62430  /  002525   => LDL 2525
62431  /  062455   => JSR 62455
62432  /  004067   => LDL 4067
62433  /  062455   => JSR 62455
62434  /  000000   => 0
62435  /  077612   => JSR I 67612 (60357)
62436  /  741617   => JZA 61617
62437  /  406455   => STA Z 6455
62440  /  240514   => SUB Z 0514
62441  /  402305   => STA Z 2305
62442  /  222611   => ADD 62611
62443  /  030540   => CLL RTR 5
62444  /  061722   => JSR 61722
62445  /  400530   => STA Z 0530
62446  /  031001   => 031001
62447  /  160705   => AND 60705
62450  /  404340   => STA Z 4340
62451  /  004040   => LDL 4040
62452  /  322473   => IOR 62473
62453  /  065304   => JSR 65304
62454  /  122310   => JMP 62310
62455  /  322473   => IOR 62473
62456  /  477666   => SCA I 67666 (62105)
62457  /  122310   => JMP 62310
62460  /  000012   => LDL 0012
62461  /  362473   => XOR 62473
62462  /  742307   => JZA 62307
62463  /  000013   => LDL 0013
62464  /  362473   => XOR 62473
62465  /  744410   => JZA 64410
62466  /  000207   => LDL 0207
62467  /  077603   => JSR I 67603 (60103)
62470  /  000277   => LDL 0277
62471  /  077603   => JSR I 67603 (60103)
62472  /  122375   => JMP 62375
62473  /  000000   => 0
62474  /  000000   => 0
62475  /  000000   => 0
62476  /  000207   => LDL 0207
62477  /  077603   => JSR I 67603 (60103)
62500  /  077612   => JSR I 67612 (60357)
62501  /  777400   => LDL -0400
62502  /  077612   => JSR I 67612 (60357)
62503  /  401011   => STA Z 1011
62504  /  232417   => ADD I 62417 (322474)
62505  /  223140   => ADD 63140
62506  /  061722   => JSR 61722
62507  /  401411   => STA Z 1411
62510  /  160540   => AND 60540
62511  /  434000   => STA I 64000 (124072)
62512  /  000004   => LDL 0004
62513  /  462545   => SCA 62545
62514  /  462546   => SCA 62546
62515  /  067265   => JSR 67265
```

```
62516  /  422521   => STA 62521
62517  /  367501   => XOR 67501
62520  /  744407   => JZA 64407
62521  /  000000   => 0
62522  /  367502   => XOR 67502
62523  /  422521   => STA 62521
62524  /  267500   => SUB 67500
62525  /  022010   => SMA CLA
62526  /  122476   => JMP 62476
62527  /  322546   => IOR 62546
62530  /  036440   => CLL SHL 4
62531  /  322521   => IOR 62521
62532  /  462546   => SCA 62546
62533  /  662545   => DSZ 62545
62534  /  122515   => JMP 62515
62535  /  077612   => JSR I 67612 (60357)
62536  /  740000   => JZA 60000
62537  /  000001   => LDL 0001
62540  /  477702   => SCA I 67702 (16167)
62541  /  322546   => IOR 62546
62542  /  077703   => JSR I 67703 (15556)
62543  /  020000   => NOP
62544  /  122310   => JMP 62310
62545  /  000000   => 0
62546  /  000000   => 0
62547  /  067442   => JSR 67442
62550  /  067302   => JSR 67302
62551  /  067344      JSR 67344
62552  /  067265   => JSR 67265
62553  /  367502   => XOR 67502
62554  /  020002   => DAC
62555  /  422636      STA 62636
62556  /  026000   => SPA
62557  /  752571   => JNA 62571
62560  /  367500   => XOR 67500
62561  /  744407   => JZA 64407
62562  /  777771   => LDL -0007
62563  /  222636   => ADD 62636
62564  /  027010   => SPA SNA CLA
62565  /  122634   => JMP 62634
62566  /  077612   => JSR I 67612 (60357)
62567  /  770000   => LDL -10000
62570  /  122551   => JMP 62551
62571  /  067370   => JSR 67370
62572  /  077612   => JSR I 67612 (60357)
62573  /  746100   => JZA 66100
62574  /  062641   => JSR 62641
62575  /  062657   => JSR 62657
62576  /  077612   => JSR I 67612 (60357)
62577  /  746200   => JZA 66200
62600  /  062641   => JSR 62641
62601  /  062667   => JSR 62667
62602  /  077612   => JSR I 67612 (60357)
62603  /  746300   => JZA 66300
62604  /  062641   => JSR 62641
62605  /  062677   => JSR 62677
62606  /  077612   => JSR I 67612 (60357)
62607  /  746400   => JZA 66400
62610  /  062641   => JSR 62641
62611  /  062707   => JSR 62707
62612  /  077612   => JSR I 67612 (60357)
62613  /  746500   => JZA 66500
62614  /  062650   => JSR 62650
62615  /  062657   => JSR 62657
```

```
62616  /  077612   =>  JSR I 67612 (60357)
62617  /  746600   =>  JZA 66600
62620  /  062650   =>  JSR 62650
62621  /  062667   =>  JSR 62667
62622  /  077612   =>  JSR I 67612 (60357)
62623  /  746700   =>  JZA 66700
62624  /  062650   =>  JSR 62650
62625  /  062677   =>  JSR 62677
62626  /  077612   =>  JSR I 67612 (60357)
62627  /  747000   =>  JZA 67000
62630  /  062650   =>  JSR 62650
62631  /  062707   =>  JSR 62707
62632  /  067350   =>  JSR 67350
62633  /  122551   =>  JMP 62551
62634  /  337666   =>  IOR I 67666 (62105)
62635  /  077704   =>  JSR I 67704 (15161)
62636  /  000000   =>  0
62637  /  020000   =>  NOP
62640  /  122551   =>  JMP 62551
62641  /  000000   =>  0
62642  /  077612   =>  JSR I 67612 (60357)
62643  /  402422   =>  STA Z 2422
62644  /  172502   =>  AND I 62502 (77612)
62645  /  140540   =>  AND Z 0540
62646  /  004040   =>  LDL 4040
62647  /  132641   =>  JMP I 62641 (0000)
62650  /  000000   =>  0
62651  /  077612   =>  JSR I 67612 (60357)
62652  /  402325   =>  STA Z 2325
62653  /  232005   =>  ADD I 62005 (122013)
62654  /  032440   =>  CLL RTL 4
62655  /  004040   =>  LDL 4040
62656  /  132650   =>  JMP I 62650 (0000)
62657  /  000000   =>  0
62660  /  077612   =>  JSR I 67612 (60357)
62661  /  252040   =>  SUB I Z 2040 (43631)
62662  /  241740   =>  SUB Z 1740
62663  /  614027   =>  ISZ I Z 4027 (7572)
62664  /  050513   =>  JSR I Z 0513 (442467)
62665  /  004040   =>  LDL 4040
62666  /  132657   =>  JMP I 62657 (0000)
62667  /  000000   =>  0
62670  /  077612   =>  JSR I 67612 (60357)
62671  /  406140   =>  STA Z 6140
62672  /  241740   =>  SUB Z 1740
62673  /  644027   =>  DSZ Z 4027
62674  /  050513   =>  JSR I Z 0513 (442467)
62675  /  230040   =>  ADD I 60040 (774060)
62676  /  132667   =>  JMP I 62667 (0000)
62677  /  000000   =>  0
62700  /  077612   =>  JSR I 67612 (60357)
62701  /  406140   =>  STA Z 6140
62702  /  241740   =>  SUB Z 1740
62703  /  624015   =>  ISZ 64015
62704  /  171624   =>  AND I 61624 (421731)
62705  /  102300   =>  JMP Z 2300
62706  /  132677   =>  JMP I 62677 (0000)
62707  /  000000   =>  0
62710  /  077612   =>  JSR I 67612 (60357)
62711  /  401726   =>  STA Z 1726
62712  /  052240   =>  JSR I Z 2240 (702463)
62713  /  624015   =>  ISZ 64015
62714  /  171624   =>  AND I 61624 (421731)
62715  /  102300   =>  JMP Z 2300
```

```
62716  /  132707   => JMP I 62707 (0000)
62717  /  062735   => JSR 62735
62720  /  122310   => JMP 62310
62721  /  062735   => JSR 62735
62722  /  077612   => JSR I 67612 (60357)
62723  /  742305   => JZA 62305
62724  /  244024   => SUB Z 4024
62725  /  111505   => JMP I Z 1505 (443470)
62726  /  402417   => STA Z 2417
62727  /  400040   => STA Z 0040
62730  /  077572   => JSR I 67572 (57121)
62731  /  123075   => JMP 63075
62732  /  077735   => JSR I 67735 (50751)
62733  /  123075   => JMP 63075
62734  /  122717   => JMP 62717
62735  /  000000   => 0
62736  /  077733   => JSR I 67733 (50507)
62737  /  122754   => JMP 62754
62740  /  462762   => SCA 62762
62741  /  077612   => JSR I 67612 (60357)
62742  /  742410   => JZA 62410
62743  /  054024   => JSR I Z 4024 (4441)
62744  /  111505   => JMP I Z 1505 (443470)
62745  /  401123   => STA Z 1123
62746  /  401617   => STA Z 1617
62747  /  274000   => SUB I 64000 (124072)
62750  /  322762   => IOR 62762
62751  /  077734   => JSR I 67734 (50454)
62752  /  020000   => NOP
62753  /  132735   => JMP I 62735 (0000)
62754  /  077612   => JSR I 67612 (60357)
62755  /  741617   => JZA 61617
62756  /  400314   => STA Z 0314
62757  /  170313   => AND I 60313 (230540)
62760  /  410040   => STA I Z 0040 (0000)
62761  /  122310   => JMP 62310
62762  /  000000   => 0
62763  /  000272   => LDL 0272
62764  /  477601   => SCA I 67601 (60204)
62765  /  327503   => IOR 67503
62766  /  477605   => SCA I 67605 (60161)
62767  /  020010   => CLA
62770  /  537736   => SZW I 67736 (60214)
62771  /  063117   => JSR 63117
62772  /  337673   => IOR I 67673 (60567)
62773  /  743160   => JZA 63160
62774  /  077612   => JSR I 67612 (60357)
62775  /  742217   => JZA 62217
62776  /  252411   => SUB I Z 2411 (454122)
62777  /  160540   => AND 60540
63000  /  200125   => ADD Z 0125
63001  /  230504   => ADD I 60504 (0000)
63002  /  742405   => JZA 62405
63003  /  232440   => ADD I 62440 (240514)
63004  /  031715   => 031715
63005  /  201405   => ADD Z 1405
63006  /  240540   => SUB Z 0540
63007  /  171640   => AND I 61640 (322122)
63010  /  434000   => STA I 64000 (124072)
63011  /  323672   => IOR 63672
63012  /  067204   => JSR 67204
63013  /  067370   => JSR 67370
63014  /  563671   => SNW 63671
63015  /  123027   => JMP 63027
```

```
63016  /  077612   => JSR I 67612 (60357)
63017  /  746340   => JZA 66340
63020  /  402417   => STA Z 2417
63021  /  400317   => STA Z 0317
63022  /  162411   => AND 62411
63023  /  162505   => AND 62505
63024  /  402217   => STA Z 2217
63025  /  252411   => SUB I Z 2411 (45422)
63026  /  160500   => AND 60500
63027  /  077612   => JSR I 67612 (60357)
63030  /  746440   => JZA 66440
63031  /  402417   => STA Z 2417
63032  /  401311   => STA Z 1311
63033  /  141440   => AND Z 1440
63034  /  221725   => ADD 61725
63035  /  241116   => SUB Z 1116
63036  /  050040   => JSR I Z 0040 (0000)
63037  /  000004   => LDL 0004
63040  /  377673   => XOR I 67673 (60567)
63041  /  743054   => JZA 63054
63042  /  077612   => JSR I 67612 (60357)
63043  /  747040   => JZA 67040
63044  /  402417   => STA Z 2417
63045  /  400617   => STA Z 0617
63046  /  220305   => ADD 60305
63047  /  400611   => STA Z 0611
63050  /  160114   => AND 60114
63051  /  402001   => STA Z 2001
63052  /  232300   => ADD I 62300 (0000)
63053  /  000001   => LDL 0001
63054  /  463102   => SCA 63102
63055  /  067350   => JSR 67350
63056  /  077612   => JSR I 67612 (60357)
63057  /  743300   => JZA 63300
63060  /  067265   => JSR 67265
63061  /  077600   => JSR I 67600 (43653)
63062  /  000263   => LDL 0263
63063  /  063352   => JSR 63352
63064  /  000264   => LDL 0264
63065  /  063377   => JSR 63377
63066  /  000270   => LDL 0270
63067  /  063102   => JSR 63102
63070  /  000272   => LDL 0272
63071  /  062310   => JSR 62310
63072  /  000273   => LDL 0273
63073  /  064407   => JSR 64407
63074  /  000000   => 0
63075  /  000207   => LDL 0207
63076  /  077603   => JSR I 67603 (60103)
63077  /  077612   => JSR I 67612 (60357)
63100  /  777400   => LDL -0400
63101  /  122310   => JMP 62310
63102  /  000000   => 0
63103  /  743075   => JZA 63075
63104  /  077612   => JSR I 67612 (60357)
63105  /  740611   => JZA 60611
63106  /  160114   => AND 60114
63107  /  402001   => STA Z 2001
63110  /  232340   => ADD I 62340 (0263)
63111  /  400040   => STA Z 0040
63112  /  000272   => LDL 0272
63113  /  477601   => SCA I 67601 (60204)
63114  /  327504   => IOR 67504
63115  /  477605   => SCA I 67605 (60161)
63116  /  137676   => JMP I 67676 (60674)
```

```
63117  /  000000   =>   0
63120  /  077612   =>   JSR I 67612 (60357)
63121  /  742217   =>   JZA 62217
63122  /  252411   =>   SUB I Z 2411 (454122)
63123  /  160540   =>   AND 60540
63124  /  230524   =>   ADD I 60524 (432150)
63125  /  400617   =>   STA Z 0617
63126  /  224000   =>   ADD 64000
63127  /  337736   =>   IOR I 67736 (60214)
63130  /  077734   =>   JSR I 67734 (50454)
63131  /  020000   =>   NOP
63132  /  077612   =>   JSR I 67612 (60357)
63133  /  742411   =>   JZA 62411
63134  /  150540   =>   AND I Z 0540 (44002)
63135  /  161727   =>   AND 61727
63136  /  404000   =>   STA Z 4000
63137  /  077733   =>   JSR I 67733 (50507)
63140  /  123146   =>   JMP 63146
63141  /  077734   =>   JSR I 67734 (50454)
63142  /  020000   =>   NOP
63143  /  077612   =>   JSR I 67612 (60357)
63144  /  740040   =>   JZA 60040
63145  /  133117        JMP I 63117 (0000)
63146  /  077612   =>   JSR I 67612 (60357)
63147  /  777777   =>   LDL -0001
63150  /  777403   =>   LDL -0375
63151  /  141703        AND Z 1703
63152  /  137777   =>   JMP I 67777 (15161)
63153  /  770040   =>   LDL -7740
63154  /  000207   =>   LDL 0207
63155  /  077603   =>   JSR I 67603 (60103)
63156  /  477736   =>   SCA I 67736 (60214)
63157  /  133117   =>   JMP I 63117 (0000)
63160  /  000000   =>   0
63161  /  227505   =>   ADD 67505
63162  /  012000   =>   AIL
63163  /  467766   =>   SCA 67766
63164  /  000000   =>   0
63165  /  227506   =>   ADD 67506
63166  /  012000   =>   AIL
63167  /  427771   =>   STA 67771
63170  /  025000   =>   SNA
63171  /  123245   =>   JMP 63245
63172  /  367766   =>   XOR 67766
63173  /  743333   =>   JZA 63333
63174  /  077612   =>   JSR I 67612 (60357)
63175  /  742217   =>   JZA 62217
63176  /  252411   =>   SUB I Z 2411 (454122)
63177  /  160540   =>   AND 60540
63200  /  031715   =>   031715
63201  /  201405   =>   ADD Z 1405
63202  /  240500   =>   SUB Z 0500
63203  /  067370   =>   JSR 67370
63204  /  077612   =>   JSR I 67612 (60357)
63205  /  746640   =>   JZA 66640
63206  /  402417   =>   STA Z 2417
63207  /  402520   =>   STA Z 2520
63210  /  040124   =>   JSR Z 0124
63211  /  054010   =>   JSR I Z 4010 (444156)
63212  /  112324   =>   JMP I Z 2324 (702463)
63213  /  172231   =>   AND I 62231 (0272)
63214  /  746140   =>   JZA 66140
63215  /  402417   =>   STA Z 2417
63216  /  402205   =>   STA Z 2205
63217  /  232401   =>   ADD I 62401 (740530)
```

```
63220  /  222440  => ADD 62440
63221  /  221725  => ADD 61725
63222  /  241116  => SUB Z 1116
63223  /  050040  => JSR I Z 0040 (0000)
63224  /  067350  => JSR 67350
63225  /  077612  => JSR I 67612 (60357)
63226  /  743300  => JZA 63300
63227  /  067265  => JSR 67265
63230  /  077600  => JSR I 67600 (43653)
63231  /  000266  => LDL 0266
63232  /  063674  => JSR 63674
63233  /  000261  => LDL 0261
63234  /  063412  => JSR 63412
63235  /  000262  => LDL 0262
63236  /  063513  => JSR 63513
63237  /  000272  => LDL 0272
63240  /  062310  => JSR 62310
63241  /  000273  => LDL 0273
63242  /  064407  => JSR 64407
63243  /  000000  => 0
63244  /  123075  => JMP 63075
63245  /  077612  => JSR I 67612 (60357)
63246  /  742217  => JZA 62217
63247  /  252411  => SUB I Z 2411 (454122)
63250  /  160540  => AND 60540
63251  /  131114  => JMP I 61114 (0319)
63252  /  140504  => AND Z 0504
63253  /  004040  => LDL 4040
63254  /  067370  => JSR 67370
63255  /  077612  => JSR I 67612 (60357)
63256  /  746140  => JZA 66140
63257  /  402417  => STA Z 2417
63260  /  402324  => STA Z 2324
63261  /  012224  => 012224
63262  /  402217  => STA Z 2217
63263  /  252411  => SUB I Z 2411 (454122)
63264  /  160500  => AND 60500
63265  /  077612  => JSR I 67612 (60357)
63266  /  746240  => JZA 66240
63267  /  402417  => STA Z 2417
63270  /  402305  => STA Z 2305
63271  /  244022  => SUB Z 4022
63272  /  172524  => AND I 62524 (267500)
63273  /  111605  => JMP I Z 1605 (314025)
63274  /  402411  => STA Z 2411
63275  /  150500  => AND I Z 0500 (521505)
63276  /  577736  => SNW I 67736 (60214)
63277  /  123312  => JMP 63312
63300  /  077612  => JSR I 67612 (60357)
63301  /  746440  => JZA 66440
63302  /  402417  => STA Z 2417
63303  /  401311  => STA Z 1311
63304  /  141440  => AND Z 1440
63305  /  221725  => ADD 61725
63306  /  241116  => SUB Z 1116
63307  /  054023  => JSR I Z 4023 (67204)
63310  /  052425  => JSR I Z 2425 (454116)
63311  /  200040  => ADD Z 0040
63312  /  067350  => JSR 67350
63313  /  077612  => JSR I 67612 (60357)
63314  /  743300  => JZA 63300
63315  /  067265  => JSR 67265
63316  /  077600  => JSR I 67600 (43653)
63317  /  000261  => LDL 0261
63320  /  063412  => JSR 63412
```

```
63321  /  000262  ->  LDL 0262
63322  /  063513  ->  JSR 63513
63323  /  000264  ->  LDL 0264
63324  /  063377  ->  JSR 63377
63325  /  000272  ->  LDL 0272
63326  /  062310  ->  JSR 62310
63327  /  000273  ->  LDL 0273
63330  /  064407  ->  JSR 64407
63331  /  000000  ->  0
63332  /  123075  ->  JMP 63075
63333  /  077612  ->  JSR I 67612 (60357)
63334  /  742217  ->  JZA 62217
63335  /  252411  ->  SUB I Z 2411 (454122)
63336  /  160540  ->  AND 60540
63337  /  031715  ->  031715
63340  /  201405  ->  ADD Z 1405
63341  /  240540  ->  SUB Z 0540
63342  /  011604  ->  011604
63343  /  401011      STA Z 1011
63344  /  232417  ->  ADD I 62417 (322474)
63345  /  223140  ->  ADD 63140
63346  /  252004  ->  SUB I Z 2004 (25010)
63347  /  012405      012405
63350  /  040040  ->  JSR Z 0040
63351  /  123254  ->  JMP 63254
63352  /  563671  ->  SNW 63671
63353  /  123102  ->  JMP 63102
63354  /  077612  ->  JSR I 67612 (60357)
63355  /  740317  ->  JZA 60317
63356  /  162411  ->  AND 62411
63357  /  162505  ->  AND 62505
63360  /  742217  ->  JZA 62217
63361  /  252411  ->  SUB I Z 2411 (454122)
63362  /  160540  ->  AND 60540
63363  /  111640  ->  JMP I Z 1640 (171426)
63364  /  202217  ->  ADD Z 2217
63365  /  030523  ->  030523
63366  /  230040  ->  ADD I 60040 (774060)
63367  /  063606  ->  JSR 63606
63370  /  000272  ->  LDL 0272
63371  /  477601  ->  SCA I 67601 (60204)
63372  /  327504  ->  IOR 67504
63373  /  477605  ->  SCA I 67605 (60161)
63374  /  323672  ->  IOR 63672
63375  /  477670  ->  SCA I 67670 (46715)
63376  /  133671  ->  JMP I 63671 (0000)
63377  /  020010  ->  CLA
63400  /  477736  ->  SCA I 67736 (60214)
63401  /  077675  ->  JSR I 67675 (61506)
63402  /  077612  ->  JSR I 67612 (60357)
63403  /  742217  ->  JZA 62217
63404  /  252411  ->  SUB I Z 2411 (454122)
63405  /  160540  ->  AND 60540
63406  /  131114  ->  JMP I 61114 (0310)
63407  /  140504  ->  AND Z 0504
63410  /  004040  ->  LDL 4040
63411  /  122310  ->  JMP 62310
63412  /  477574  ->  SCA I 67574 (57776)
63413  /  477736  ->  SCA I 67736 (60214)
63414  /  000227  ->  LDL 0227
63415  /  477601  ->  SCA I 67601 (60204)
63416  /  327507  ->  IOR 67507
63417  /  477605  ->  SCA I 67605 (60161)
63420  /  337665  ->  IOR I 67665 (60211)
```

```
63421  /  467776  => SCA 67776
63422  /  327510  => IOR 67510
63423  /  477665  => SCA I 67665 (60211)
63424  /  000214  => LDL 0214
63425  /  077603  => JSR I 67603 (60103)
63426  /  077612  => JSR I 67612 (60357)
63427  /  747422  => JZA 67422
63430  /  172524  => AND I 62524 (267500)
63431  /  111605  => JMP I Z 1605 (314025)
63432  /  401116  => STA Z 1116
63433  /  402022  => STA Z 2022
63434  /  170305  => AND I 60305 (552405)
63435  /  232374  => ADD I 62374 (77603)
63436  /  004040  => LDL 4040
63437  /  000001  => LDL 0001
63440  /  463512  => SCA 63512
63441  /  327776  => IOR 67776
63442  /  477665  => SCA I 67665 (60211)
63443  /  000001  => LDL 0001
63444  /  466252  => SCA 66252
63445  /  077612  => JSR I 67612 (60357)
63446  /  742217  => JZA 62217
63447  /  252411  => SUB I Z 2411 (454122)
63450  /  160540  => AND 60540
63451  /  232401  => ADD I 62401 (740530)
63452  /  222440  => ADD 62440
63453  /  742217  => JZA 62217
63454  /  252411  => SUB I Z 2411 (454122)
63455  /  160540  => AND 60540
63456  /  111640  => JMP I Z 1640 (171426)
63457  /  202217  => ADD Z 2217
63460  /  030523  => 030523
63461  /  230040  => ADD I 60040 (774060)
63462  /  063606  => JSR 63606
63463  /  000272  => LDL 0272
63464  /  477601  => SCA I 67601 (60204)
63465  /  327504  => IOR 67504
63466  /  477605  => SCA I 67605 (60161)
63467  /  077672  => JSR I 67672 (60575)
63470  /  020000  => NOP
63471  /  000272  => LDL 0272
63472  /  477601  => SCA I 67601 (60204)
63473  /  327503  => IOR 67503
63474  /  477605  => SCA I 67605 (60161)
63475  /  000207  => LDL 0207
63476  /  077603  => JSR I 67603 (60103)
63477  /  077612  => JSR I 67612 (60357)
63500  /  742217  => JZA 62217
63501  /  252411  => SUB I Z 2411 (454122)
63502  /  160540  => AND 60540
63503  /  031715  => 031715
63504  /  201405  => ADD Z 1405
63505  /  240500  => SUB Z 0500
63506  /  063606  => JSR 63606
63507  /  323624  => IOR 63624
63510  /  477736  => SCA I 67736 (60214)
63511  /  123673  => JMP 63673
63512  /  000000  => 0
63513  /  077612  => JSR I 67612 (60357)
63514  /  402411  => STA Z 2411
63515  /  150540  => AND I Z 0540 (44002)
63516  /  161727  => AND 61727
63517  /  404000  => STA Z 4000
63520  /  077733  => JSR I 67733 (50507)
```

```
63521  /  122754   ->   JMP 62754
63522  /  423574   ->   STA 63574
63523  /  077734   ->   JSR I 67734 (50454)
63524  /  077612   ->   JSR I 67612 (60357)
63525  /  742217   ->   JZA 62217
63526  /  252411   ->   SUB I Z 2411 (454122)
63527  /  160540   ->   AND 60540
63530  /  232401   ->   ADD I 62401 (740530)
63531  /  222440   ->   ADD 62440
63532  /  012440   ->   012440
63533  /  004040   ->   LDL 4040
63534  /  077572   ->   JSR I 67572 (57121)
63535  /  123075   ->   JMP 63075
63536  /  167511   ->   AND 67511
63537  /  423575   ->   STA 63575
63540  /  267512   ->   SUB 67512
63541  /  022010   ->   SMA CLA
63542  /  123075   ->   JMP 63075
63543  /  563575   ->   SNW 63575
63544  /  123075   ->   JMP 63075
63545  /  077612        JSR I 67612 (60357)
63546  /  740201   ->   JZA 60201
63547  /  031340   ->   CLL RTR 13
63550  /  241740   ->   SUB Z 1740
63551  /  151704   ->   AND I Z 1704 (444134)
63552  /  051540   ->   JSR I Z 1540 (113055)
63553  /  436240   ->   STA I 66240 (0000)
63554  /  742411   ->   JZA 62411
63555  /  150340   ->   AND I Z 0540 (44002)
63556  /  161727   ->   AND 61727
63557  /  400040   ->   STA Z 0040
63560  /  077733   ->   JSR I 67733 (50507)
63561  /  123075   ->   JMP 63075
63562  /  077734   ->   JSR I 67734 (50454)
63563  /  077612   ->   JSR I 67612 (60357)
63564  /  747400   ->   JZA 67400
63565  /  020010   ->   CLA
63566  /  323575   ->   IOR 63575
63567  /  423624   ->   STA 63624
63570  /  477736   ->   SCA I 67736 (60214)
63571  /  327513   ->   IOR 67513
63572  /  477737   ->   SCA I 67737 (60215)
63573  /  126225   ->   JMP 66225
63574  /  000000   ->   0
63575  /  000000   ->   0
63576  /  000000   ->   0
63577  /  000001   ->   LDL 0001
63600  /  477664   ->   SCA I 67664 (60210)
63601  /  327514   ->   IOR 67514
63602  /  477665   ->   SCA I 67665 (60211)
63603  /  337736   ->   IOR I 67736 (60214)
63604  /  463624   ->   SCA 63624
63605  /  123412   ->   JMP 63412
63606  /  000000   ->   0
63607  /  020010   ->   CLA
63610  /  077733   ->   JSR I 67733 (50507)
63611  /  123621   ->   JMP 63621
63612  /  463625   ->   SCA 63625
63613  /  077612   ->   JSR I 67612 (60357)
63614  /  400124   ->   STA Z 0124
63615  /  400040   ->   STA Z 0040
63616  /  323625   ->   IOR 63625
63617  /  077734   ->   JSR I 67734 (50454)
63620  /  020000   ->   NOP
63621  /  077612   ->   JSR I 67612 (60357)
```

```
63622  /  740040   =>   JZA 60040
63623  /  133606   =>   JMP I 63606 (0000)
63624  /  000000   =>   0
63625  /  000000   =>   0
63626  /  020010   =>   CLA
63627  /  337604   =>   IOR I 67604 (60162)
63630  /  463671   =>   SCA 63671
63631  /  327503   =>   IOR 67503
63632  /  477605   =>   SCA I 67605 (60161)
63633  /  000272   =>   LDL 0272
63634  /  477601   =>   SCA I 67601 (60204)
63635  /  337670   =>   IOR I 67670 (46715)
63636  /  463672   =>   SCA 63672
63637  /  077646   =>   JSR I 67646 (44124)
63640  /  077612   =>   JSR I 67612 (60357)
63641  /  742217   =>   JZA 62217
63642  /  252411   =>   SUB I Z 2411 (454122)
63643  /  160540   =>   AND 60540
63644  /  200125   =>   ADD Z 0125
63645  /  230504   =>   ADD I 60504 (0000)
63646  /  401116   =>   STA Z 1116
63647  /  402001   =>   STA Z 2001
63650  /  232340   =>   ADD I 62340 (0263)
63651  /  004040   =>   LDL 4040
63652  /  000007   =>   LDL 0007
63653  /  177673   =>   AND I 67673 (60567)
63654  /  227502   =>   ADD 67502
63655  /  077603   =>   JSR I 67603 (60103)
63656  /  077612   =>   JSR I 67612 (60357)
63657  /  742405   =>   JZA 62405
63660  /  232440   =>   ADD I 62440 (240514)
63661  /  031715   =>   031715
63662  /  201405   =>   ADD Z 1405
63663  /  240540   =>   SUB Z 0540
63664  /  171640   =>   AND I 61640 (322122)
63665  /  434000   =>   STA I 64000 (124072)
63666  /  323672   =>   IOR 63672
63667  /  067204   =>   JSR 67204
63670  /  122310   =>   JMP 62310
63671  /  000000   =>   0
63672  /  000000   =>   0
63673  /  000001   =>   LDL 0001
63674  /  463512   =>   SCA 63512
63675  /  000000   =>   0
63676  /  227506   =>   ADD 67506
63677  /  012000   =>   AIL
63700  /  427771   =>   STA 67771
63701  /  744242   =>   JZA 64242
63702  /  000002   =>   LDL 0002
63703  /  227506   =>   ADD 67506
63704  /  012000   =>   AIL
63705  /  427770   =>   STA 67770
63706  /  744255   =>   JZA 64255
63707  /  000000   =>   0
63710  /  227505   =>   ADD 67505
63711  /  467772   =>   SCA 67772
63712  /  327771   =>   IOR 67771
63713  /  477772   =>   SCA I 67772 (0000)
63714  /  000002   =>   LDL 0002
63715  /  227505   =>   ADD 67505
63716  /  427763   =>   STA 67763
63717  /  012000   =>   AIL
63720  /  467764   =>   SCA 67764
63721  /  000001   =>   LDL 0001
63722  /  227505   =>   ADD 67505
```

```
63723  /  012000   ->  AIL
63724  /  467765   ->  SCA 67765
63725  /  327764   ->  IOR 67764
63726  /  424064   ->  STA 64064
63727  /  744072   ->  JZA 64072
63730  /  000003   ->  LDL 0003
63731  /  227505   ->  ADD 67505
63732  /  020000   ->  NOP
63733  /  467772   ->  SCA 67772
63734  /  327770   ->  IOR 67770
63735  /  424065   ->  STA 64065
63736  /  743755   ->  JZA 63755
63737  /  337772       IOR I 67772 (0000)
63740  /  627772   ->  ISZ 67772
63741  /  464067   ->  SCA 64067
63742  /  000003   ->  LDL 0003
63743  /  227506       ADD 67506
63744  /  427773   ->  STA 67773
63745  /  012000   ->  AIL
63746  /  364067   ->  XOR 64067
63747  /  744037   ->  JZA 64037
63750  /  000002   ->  LDL 0002
63751  /  227773   ->  ADD 67773
63752  /  664065   ->  DSZ 64065
63753  /  123744   ->  JMP 63744
63754  /  024000   ->  SKP
63755  /  627772   ->  ISZ 67772
63756  /  020010   ->  CLA
63757  /  337772   ->  IOR I 67772 (0000)
63760  /  026000   ->  SPA
63761  /  124001   ->  JMP 64001
63762  /  032240   ->  CLL RTL 2
63763  /  167511   ->  AND 67511
63764  /  025000   ->  SNA
63765  /  327515   ->  IOR 67515
63766  /  024400   ->  SZL
63767  /  327516   ->  IOR 67516
63770  /  477772   ->  SCA I 67772 (0000)
63771  /  627772   ->  ISZ 67772
63772  /  000001   ->  LDL 0001
63773  /  237772   ->  ADD I 67772 (0000)
63774  /  477772   ->  SCA I 67772 (0000)
63775  /  627772   ->  ISZ 67772
63776  /  664064   ->  DSZ 64064
63777  /  123734   ->  JMP 63734
64000  /  124072   ->  JMP 64072
64001  /  227517   ->  ADD 67517
64002  /  437772   ->  STA I 67772 (0000)
64003  /  167520   ->  AND 67520
64004  /  264063   ->  SUB 64063
64005  /  026010   ->  SPA CLA
64006  /  123771   ->  JMP 63771
64007  /  777777   ->  LDL -0001
64010  /  227772   ->  ADD 67772
64011  /  427772   ->  STA 67772
64012  /  464066   ->  SCA 64066
64013  /  777777   ->  LDL -0001
64014  /  237763   ->  ADD I 67763 (0000)
64015  /  437763   ->  STA I 67763 (0000)
64016  /  467764   ->  SCA 67764
64017  /  777777   ->  LDL -0001
64020  /  224064   ->  ADD 64064
64021  /  424064   ->  STA 64064
64022  /  036140   ->  CLL SHL 1
64023  /  224064   ->  ADD 64064
```

```
64024  /  424065   ->  STA 64065
64025  /  744072   ->  JZA 64072
64026  /  000003   ->  LDL 0003
64027  /  224066   ->  ADD 64066
64030  /  012000   ->  AIL
64031  /  474066   ->  SCA I 64066 (0000)
64032  /  624066   ->  ISZ 64066
64033  /  020000   ->  NOP
64034  /  664065   ->  DSZ 64065
64035  /  124026   ->  JMP 64026
64036  /  123734   ->  JMP 63734
64037  /  000001   ->  LDL 0001
64040  /  227773   ->  ADD 67773
64041  /  012000   ->  AIL
64042  /  064340   ->  JSR 64340
64043  /  025000   ->  SNA
64044  /  123756   ->  JMP 63756
64045  /  464066   ->  SCA 64066
64046  /  337772   ->  IOR I 67772 (0000)
64047  /  026000   ->  SPA
64050  /  167516   ->  AND 67516
64051  /  032240   ->  CLL RTL 2
64052  /  167511   ->  AND 67511
64053  /  024400   ->  SZL
64054  /  327516   ->  IOR 67516
64055  /  324066   ->  IOR 64066
64056  /  477772   ->  SCA I 67772 (0000)
64057  /  627772   ->  ISZ 67772
64060  /  020000   ->  NOP
64061  /  001001   ->  LDL 1001
64062  /  123773   ->  JMP 63773
64063  /  000016   ->  LDL 0016
64064  /  000000   ->  0
64065  /  000000   ->  0
64066  /  000000   ->  0
64067  /  000000   ->  0
64070  /  000000   ->  0
64071  /  000000   ->  0
64072  /  327770   ->  IOR 67770
64073  /  424234   ->  STA 64234
64074  /  744275   ->  JZA 64275
64075  /  000003   ->  LDL 0003
64076  /  227506   ->  ADD 67506
64077  /  020000   ->  NOP
64100  /  467772   ->  SCA 67772
64101  /  327764   ->  IOR 67764
64102  /  424235   ->  STA 64235
64103  /  744154   ->  JZA 64154
64104  /  337772   ->  IOR I 67772 (0000)
64105  /  627772   ->  ISZ 67772
64106  /  424237   ->  STA 64237
64107  /  064307   ->  JSR 64307
64110  /  000003   ->  LDL 0003
64111  /  227505   ->  ADD 67505
64112  /  427773   ->  STA 67773
64113  /  012000   ->  AIL
64114  /  064317   ->  JSR 64317
64115  /  124163   ->  JMP 64163
64116  /  124231   ->  JMP 64231
64117  /  000003   ->  LDL 0003
64120  /  227773   ->  ADD 67773
64121  /  664235   ->  DSZ 64235
64122  /  124112   ->  JMP 64112
64123  /  467773   ->  SCA 67773
64124  /  337772   ->  IOR I 67772 (0000)
```

```
64125  /  627772   ->   ISZ 67772
64126  /  064340   ->   JSR 64340
64127  /  025000   ->   SNA
64130  /  124151   ->   JMP 64151
64131  /  464240   ->   SCA 64240
64132  /  000001   ->   LDL 0001
64133  /  237763   ->   ADD I 67763 (0000)
64134  /  437763   ->   STA I 67763 (0000)
64135  /  427764   ->   STA 67764
64136  /  267765   ->   SUB 67765
64137  /  023010   ->   SMA SZA CLA
64140  /  124263   ->   JMP 64263
64141  /  324237   ->   IOR 64237
64142  /  477773   ->   SCA I 67773 (0000)
64143  /  627773   ->   ISZ 67773
64144  /  324240   ->   IOR 64240
64145  /  477773   ->   SCA I 67773 (0000)
64146  /  627773   ->   ISZ 67773
64147  /  001001   ->   LDL 1001
64150  /  477773   ->   SCA I 67773 (0000)
64151  /  664234   ->   DSZ 64234
64152  /  124101   ->   JMP 64101
64153  /  124275   ->   JMP 64275
64154  /  337772   ->   IOR I 67772 (0000)
64155  /  627772   ->   ISZ 67772
64156  /  464237   ->   SCA 64237
64157  /  000003   ->   LDL 0003
64160  /  227505   ->   ADD 67505
64161  /  467773   ->   SCA 67773
64162  /  124124   ->   JMP 64124
64163  /  337772   ->   IOR I 67772 (0000)
64164  /  627772   ->   ISZ 67772
64165  /  020000   ->   NOP
64166  /  064340   ->   JSR 64340
64167  /  025000   ->   SNA
64170  /  124151   ->   JMP 64151
64171  /  464240   ->   SCA 64240
64172  /  000001   ->   LDL 0001
64173  /  237763   ->   ADD I 67763 (0000)
64174  /  437763   ->   STA I 67763 (0000)
64175  /  427764   ->   STA 67764
64176  /  267765   ->   SUB 67765
64177  /  023010   ->   SMA SZA CLA
64200  /  124263   ->   JMP 64263
64201  /  324235   ->   IOR 64235
64202  /  036140   ->   CLL SHL 1
64203  /  224235   ->   ADD 64235
64204  /  424235   ->   STA 64235
64205  /  227773   ->   ADD 67773
64206  /  227521   ->   ADD 67521
64207  /  464236   ->   SCA 64236
64210  /  777775   ->   LDL -0003
64211  /  224236   ->   ADD 64236
64212  /  012000   ->   AIL
64213  /  474236   ->   SCA I 64236 (0000)
64214  /  664236   ->   DSZ 64236
64215  /  020000   ->   NOP
64216  /  664235   ->   DSZ 64235
64217  /  124210   ->   JMP 64210
64220  /  001001   ->   LDL 1001
64221  /  474236   ->   SCA I 64236 (0000)
64222  /  664236   ->   DSZ 64236
64223  /  324240   ->   IOR 64240
64224  /  474236   ->   SCA I 64236 (0000)
64225  /  664236   ->   DSZ 64236
```

```
64226  /  324237   => IOR 64237
64227  /  474236   => SCA I 64236 (0000)
64230  /  124151   => JMP 64151
64231  /  627772   => ISZ 67772
64232  /  020000   => NOP
64233  /  124151   => JMP 64151
64234  /  000000   => 0
64235  /  000000   => 0
64236  /  000000   => 0
64237  /  000000   => 0
64240  /  000000   => 0
64241  /  000000   => 0
64242  /  077612   => JSR I 67612 (60357)
64243  /  742217   => JZA 62217
64244  /  252411   => SUB I Z 2411 (45422)
64245  /  160540   => AND 60540
64246  /  230522   => ADD I 60522 (332207)
64247  /  110114   => JMP I Z 0114 (143610)
64250  /  404340   => STA Z 4340
64251  /  232411   => ADD I 62411 (0260)
64252  /  141475   => AND Z 1475
64253  /  607400   => ISZ Z 7400
64254  /  124275   => JMP 64275
64255  /  077612   => JSR I 67612 (60357)
64256  /  741617   => JZA 61617
64257  /  400601   => STA Z 0601
64260  /  251424   => SUB I Z 1424 (43406)
64261  /  237400   => ADD I 67400 (746140)
64262  /  123707   => JMP 63707
64263  /  077612   => JSR I 67612 (60357)
64264  /  741011   => JZA 61011
64265  /  232417   => ADD I 62417 (322474)
64266  /  223140   => ADD 63140
64267  /  022506   => 022506
64270  /  060522   => JSR 60522
64271  /  401726   => STA Z 1726
64272  /  052206   => JSR I Z 2206 (444131)
64273  /  141727   => AND Z 1727
64274  /  740040   => JZA 60040
64275  /  077612   => JSR I 67612 (60357)
64276  /  741011   => JZA 61011
64277  /  232417   => ADD I 62417 (322474)
64300  /  223140   => ADD 63140
64301  /  252004   => SUB I Z 2004 (25010)
64302  /  012405   => 012405
64303  /  047400   => JSR Z 7400
64304  /  523512   => SZW 63512
64305  /  126225   => JMP 66225
64306  /  122310   => JMP 62310
64307  /  000000   => 0
64310  /  424335   => STA 64335
64311  /  167522   => AND 67522
64312  /  025010   => SNA CLA
64313  /  000012   => LDL 0012
64314  /  224335   => ADD 64335
64315  /  464335   => SCA 64335
64316  /  134307   => JMP I 64307 (0000)
64317  /  000000   => 0
64320  /  424336   => STA 64336
64321  /  167522   => AND 67522
64322  /  025010   => SNA CLA
64323  /  000012   => LDL 0012
64324  /  224336   => ADD 64336
64325  /  424336   => STA 64336
64326  /  264335   => SUB 64335
```

```
64327  /  027000  -> SPA SNA
64330  /  624317  -> ISZ 64317
64331  /  026010  -> SPA CLA
64332  /  624317  -> ISZ 64317
64333  /  020000     NOP
64334  /  134317  -> JMP I 64317 (0000)
64335  /  000000  -> 0
64336  /  000000  -> 0
64337  /  000000     0
64340  /  000000  -> 0
64341  /  424377  -> STA 64377
64342  /  167523  -> AND 67523
64343  /  754373  -> JNA 64373
64344  /  327524  -> IOR 67524
64345  /  327525  -> IOR 67525
64346  /  327526  -> IOR 67526
64347  /  327527  -> IOR 67527
64350  /  164377  -> AND 64377
64351  /  754375  -> JNA 64375
64352  /  020000  -> NOP
64353  /  020000  -> NOP
64354  /  327530  -> IOR 67530
64355  /  327531  -> IOR 67531
64356  /  327532  -> IOR 67532
64357  /  327533  -> IOR 67533
64360  /  020010  -> CLA
64361  /  020000  -> NOP
64362  /  020000  -> NOP
64363  /  327534  -> IOR 67534
64364  /  327535  -> IOR 67535
64365  /  327536  -> IOR 67536
64366  /  327537  -> IOR 67537
64367  /  164377  -> AND 64377
64370  /  021010  -> SZA CLA
64371  /  000001  -> LDL 0001
64372  /  134340  -> JMP I 64340 (0000)
64373  /  000003  -> LDL 0003
64374  /  024000  -> SKP
64375  /  227540  -> ADD 67540
64376  /  124372  -> JMP 64372
64377  /  000000  -> 0
64400  /  000000  -> 0
64401  /  020010  -> CLA
64402  /  077612  -> JSR I 67612 (60357)
64403  /  774000  -> LDL -4000
64404  /  000207  -> LDL 0207
64405  /  077603  -> JSR I 67603 (60103)
64406  /  124411  -> JMP 64411
64407  /  077646  -> JSR I 67646 (44124)
64410  /  067332  -> JSR 67332
64411  /  000273  -> LDL 0273
64412  /  477601  -> SCA I 67601 (60204)
64413  /  327541  -> IOR 67541
64414  /  477605  -> SCA I 67605 (60161)
64415  /  000004  -> LDL 0004
64416  /  464466  -> SCA 64466
64417  /  464467  -> SCA 64467
64420  /  477574  -> SCA I 67574 (57776)
64421  /  077612  -> JSR I 67612 (60357)
64422  /  742405  -> JZA 62405
64423  /  232440  -> ADD I 62440 (240514)
64424  /  434000  -> STA I 64000 (124072)
64425  /  067265  -> JSR 67265
64426  /  424437  -> STA 64437
64427  /  367542  -> XOR 67542
```

```
64430  /  744665   => JZA 64665
64431  /  000272   => LDL 0272
64432  /  364437   => XOR 64437
64433  /  742306   => JZA 62306
64434  /  000314   => LDL 0314
64435  /  364437   => XOR 64437
64436  /  744472   => JZA 64472
64437  /  000000   => 0
64440  /  367502   => XOR 67502
64441  /  424437   => STA 64437
64442  /  267500   => SUB 67500
64443  /  022010   => SMA CLA
64444  /  124401   => JMP 64401
64445  /  324467   => IOR 64467
64446  /  036440   => CLL SHL 4
64447  /  324437   => IOR 64437
64450  /  464467   => SCA 64467
64451  /  664466   => DSZ 64466
64452  /  124425   => JMP 64425
64453  /  077612   => JSR I 67612 (60357)
64454  /  404000   => STA Z 4000
64455  /  000000   => 0
64456  /  000000   => 0
64457  /  000000   => 0
64460  /  324467   => IOR 64467
64461  /  066174   => JSR 66174
64462  /  124741   => JMP 64741
64463  /  124472   => JMP 64472
64464  /  000000   => 0
64465  /  000000   => 0
64466  /  000000   => 0
64467  /  000000   => 0
64470  /  000000   => 0
64471  /  000000   => 0
64472  /  000000   => 0
64473  /  000000   => 0
64474  /  000000   => 0
64475  /  077612   => JSR I 67612 (60357)
64476  /  402405   => STA Z 2405
64477  /  232440   => ADD I 62440 (240514)
64500  /  404000   => STA Z 4000
64501  /  467767   => SCA 67767
64502  /  477702   => SCA I 67702 (16167)
64503  /  337670   => IOR I 67670 (46715)
64504  /  077703   => JSR I 67703 (15556)
64505  /  124515   => JMP 64515
64506  /  077612   => JSR I 67612 (60357)
64507  /  402422   => STA Z 2422
64510  /  172502   => AND I 62502 (77612)
64511  /  140540   => AND Z 0540
64512  /  101123   => JMP Z 1123
64513  /  241722   => SUB Z 1722
64514  /  317400   => IOR I Z 7400 (0000)
64515  /  064743   => JSR 64743
64516  /  077646   => JSR I 67646 (44124)
64517  /  000000   => 0
64520  /  000000   => 0
64521  /  000000   => 0
64522  /  000000   => 0
64523  /  000000   => 0
64524  /  077726   => JSR I 67726 (55445)
64525  /  020000   => NOP
64526  /  067302   => JSR 67302
64527  /  124563   => JMP 64563
64530  /  067370   => JSR 67370
```

```
64531  /  067376         JSR 67376
64532  /  077612   =>    JSR I 67612 (60357)
64533  /  746240   =>    JZA 66240
64534  /  231017   =>    ADD I 61017 (322125)
64535  /  222440         ADD 62440
64536  /  031122   =>    031122
64537  /  032511   =>    032511
64540  /  244004   =>    SUB Z 4004
64541  /  110107   =>    JMP I Z 0107 (444157)
64542  /  161723   =>    AND 61723
64543  /  241103   =>    SUB Z 1103
64544  /  746340   =>    JZA 66340
64545  /  172005   =>    AND I 62005 (122013)
64546  /  164040   =>    AND 64040
64547  /  031122   =>    031122
64550  /  032511   =>    032511
64551  /  244004   =>    SUB Z 4004
64552  /  110107   =>    JMP I Z 0107 (444157)
64553  /  161723   =>    AND 61723
64554  /  241103   =>    SUB Z 1103
64555  /  746440   =>    JZA 66440
64556  /  053024   =>    JSR I Z 3024 (440472)
64557  /  220140   =>    ADD 60140
64560  /  040124   =>    JSR Z 0124
64561  /  010040   =>    010040
64562  /  067350   =>    JSR 67350
64563  /  000272   =>    LDL 0272
64564  /  477601   =>    SCA I 67601 (60204)
64565  /  327477   =>    IOR 67477
64566  /  477605   =>    SCA I 67605 (60161)
64567  /  067344   =>    JSR 67344
64570  /  067265   =>    JSR 67265
64571  /  077600   =>    JSR I 67600 (43653)
64572  /  000272   =>    LDL 0272
64573  /  062306   =>    JSR 62306
64574  /  000260   =>    LDL 0260
64575  /  064530   =>    JSR 64530
64576  /  000261   =>    LDL 0261
64577  /  064626   =>    JSR 64626
64600  /  000262   =>    LDL 0262
64601  /  064636   =>    JSR 64636
64602  /  000263   =>    LDL 0263
64603  /  064652   =>    JSR 64652
64604  /  000264   =>    LDL 0264
64605  /  064673   =>    JSR 64673
64606  /  000273   =>    LDL 0273
64607  /  064410   =>    JSR 64410
64610  /  000233   =>    LDL 0233
64611  /  064665   =>    JSR 64665
64612  /  000221   =>    LDL 0221
64613  /  064712   =>    JSR 64712
64614  /  000227   =>    LDL 0227
64615  /  064720   =>    JSR 64720
64616  /  000230   =>    LDL 0230
64617  /  064723   =>    JSR 64723
64620  /  000232   =>    LDL 0232
64621  /  064731   =>    JSR 64731
64622  /  000000   =>    0
64623  /  077612   =>    JSR I 67612 (60357)
64624  /  770040   =>    LDL -7740
64625  /  124563   =>    JMP 64563
64626  /  000001   =>    LDL 0001
64627  /  477702   =>    SCA I 67702 (16167)
64630  /  077612   =>    JSR I 67612 (60357)
64631  /  400000   =>    STA Z 0000
```

| | | | |
|---|---|---|---|
| 64632 | / | 337670 | IOR I 67670 (46715) |
| 64633 | / | 077703 | JSR I 67703 (15556) |
| 64634 | / | 020000 | NOP |
| 64635 | / | 124563 | JMP 64563 |
| 64636 | / | 327767 | IOR 67767 |
| 64637 | / | 337643 | IOR I 67643 (52654) |
| 64640 | / | 337644 | IOR I 67644 (47746) |
| 64641 | / | 744650 | JZA 64650 |
| 64642 | / | 077612 | JSR I 67612 (60357) |
| 64643 | / | 401617 | STA Z 1617 |
| 64644 | / | 402310 | STA Z 2310 |
| 64645 | / | 172224 | AND I 62224 (0000) |
| 64646 | / | 004040 | LDL 4040 |
| 64647 | / | 024000 | SKP |
| 64650 | / | 077651 | JSR I 67651 (16475) |
| 64651 | / | 124563 | JMP 64563 |
| 64652 | / | 327767 | IOR 67767 |
| 64653 | / | 337643 | IOR I 67643 (52654) |
| 64654 | / | 337644 | IOR I 67644 (47746) |
| 64655 | / | 744663 | JZA 64663 |
| 64656 | / | 077612 | JSR I 67612 (60357) |
| 64657 | / | 401617 | STA Z 1617 |
| 64660 | / | 401720 | STA Z 1720 |
| 64661 | / | 051600 | JSR I Z 1600 (601574) |
| 64662 | / | 024000 | SKP |
| 64663 | / | 077652 | JSR I 67652 (40036) |
| 64664 | / | 124563 | JMP 64563 |
| 64665 | / | 000272 | LDL 0272 |
| 64666 | / | 477601 | SCA I 67601 (60204) |
| 64667 | / | 327476 | IOR 67476 |
| 64670 | / | 477605 | SCA I 67605 (60161) |
| 64671 | / | 077646 | JSR I 67646 (44124) |
| 64672 | / | 122217 | JMP 62217 |
| 64673 | / | 066423 | JSR 66423 |
| 64674 | / | 077612 | JSR I 67612 (60357) |
| 64675 | / | 740040 | JZA 60040 |
| 64676 | / | 337722 | IOR I 67722 (52657) |
| 64677 | / | 077721 | JSR I 67721 (51700) |
| 64700 | / | 537722 | SZW I 67722 (52657) |
| 64701 | / | 124563 | JMP 64563 |
| 64702 | / | 077612 | JSR I 67612 (60357) |
| 64703 | / | 741116 | JZA 61116 |
| 64704 | / | 232514 | ADD I 62514 (462546) |
| 64705 | / | 012411 | 012411 |
| 64706 | / | 171640 | AND I 61640 (322122) |
| 64707 | / | 171340 | AND I 61340 (361361) |
| 64710 | / | 004040 | LDL 4040 |
| 64711 | / | 124563 | JMP 64563 |
| 64712 | / | 537714 | SZW I 67714 (55417) |
| 64713 | / | 000256 | LDL 0256 |
| 64714 | / | 077603 | JSR I 67603 (60103) |
| 64715 | / | 066531 | JSR 66531 |
| 64716 | / | 066673 | JSR 66673 |
| 64717 | / | 124563 | JMP 64563 |
| 64720 | / | 077724 | JSR I 67724 (40271) |
| 64721 | / | 077725 | JSR I 67725 (42364) |
| 64722 | / | 124563 | JMP 64563 |
| 64723 | / | 537715 | SZW I 67715 (55403) |
| 64724 | / | 000256 | LDL 0256 |
| 64725 | / | 077603 | JSR I 67603 (60103) |
| 64726 | / | 066747 | JSR 66747 |
| 64727 | / | 067051 | JSR 67051 |
| 64730 | / | 124563 | JMP 64563 |
| 64731 | / | 327767 | IOR 67767 |
| 64732 | / | 337643 | IOR I 67643 (52654) |

```
64733  /  337644  ->  IOR I 67644 (47746)
64734  /  754563  ->  JNA 64563
64735  /  066634  ->  JSR 66634
64736  /  067012  ->  JSR 67012
64737  /  066312  ->  JSR 66312
64740  /  124563  ->  JMP 64563
64741  /  077571  ->  JSR I 67571 (57013)
64742  /  124472  ->  JMP 64472
64743  /  000000  ->  0
64744  /  077710  ->  JSR
64745  /  000000  ->
64746  /  000000  ->
64747  /  000000  ->
64750  /  000000  ->
64751  /  077712  ->                      (54014)
64752  /  000000  ->
64753  /  000000  ->
64754  /  000000  ->
64755  /  000000  ->
64756  /  020010  ->  CLA
64757  /  337635  ->  IOR I 67635 (55443)
64760  /  277636  ->  SUB I 67636 (55441)
64761  /  026000  ->  SPA
64762  /  020006  ->  NAC
64763  /  267543  ->  SUB 67543
64764  /  022010  ->  SMA CLA
64765  /  124775  ->  JMP 64775
64766  /  337641  ->  IOR I 67641 (55426)
64767  /  277642  ->  SUB I 67642 (55424)
64770  /  026000  ->  SPA
64771  /  020006  ->  NAC
64772  /  267543  ->  SUB 67543
64773  /  026010  ->  SPA CLA
64774  /  125002  ->  JMP 65002
64775  /  000000  ->  0
64776  /  000000  ->  0
64777  /  077713  ->  JSR I 67713 (55104)
65000  /  000000  ->  0
65001  /  000000  ->  0
65002  /  134743  ->  JMP I 64743 (0000)
65003  /  000000  ->  0
65004  /  020010  ->  CLA
65005  /  337631  ->  IOR I 67631 (55416)
65006  /  277632  ->  SUB I 67632 (55415)
65007  /  026000  ->  SPA
65010  /  020006  ->  NAC
65011  /  427757  ->  STA 67757
65012  /  265121  ->  SUB 65121
65013  /  537643  ->  SZW I 67643 (52654)
65014  /  265123  ->  SUB 65123
65015  /  026000  ->  SPA
65016  /  755051  ->  JNA 65051
65017  /  265120  ->  SUB 65120
65020  /  537643  ->  SZW I 67643 (52654)
65021  /  265122  ->  SUB 65122
65022  /  026010  ->  SPA CLA
65023  /  125031  ->  JMP 65031
65024  /  077612  ->  JSR I 67612 (60357)
65025  /  742305  ->  JZA 62305
65026  /  260522  ->  SUB 60522
65027  /  050040  ->  JSR I Z 0040 (0000)
65030  /  125036  ->  JMP 65036
65031  /  077612  ->  JSR I 67612 (60357)
65032  /  741517  ->  JZA 61517
65033  /  040522  ->  JSR Z 0522
```

```
65034  /  012405   ->   012405
65035  /  004040   ->   LDL 4040
65036  /  077612   ->   JSR I 67612 (60357)
65037  /  400201   ->   STA Z 0201
65040  /  031307   ->   031307
65041  /  221725   ->   ADD 61725
65042  /  160440   ->   AND 60440
65043  /  041106   ->   JSR Z 1106
65044  /  060522   ->   JSR 60522
65045  /  051624   ->   JSR I Z 1624 (451574)
65046  /  110114   ->   JMP I Z 0114 (143610)
65047  /  404000   ->   STA Z 4000
65050  /  000001   ->   LDL 0001
65051  /  467756   ->   SCA 67756
65052  /  337631   ->   IOR I 67631 (55416)
65053  /  277632   ->   SUB I 67632 (55415)
65054  /  026000   ->   SPA
65055  /  020010   ->   CLA
65056  /  237632   ->   ADD I 67632 (55415)
65057  /  427761   ->   STA 67761
65060  /  265123   ->   SUB 65123
65061  /  537643   ->   SZW I 67643 (52654)
65062  /  265123   ->   SUB 65123
65063  /  026000   ->   SPA
65064  /  755113   ->   JNA 65113
65065  /  265122   ->   SUB 65122
65066  /  537643   ->   SZW I 67643 (52654)
65067  /  265122   ->   SUB 65122
65070  /  026010   ->   SPA CLA
65071  /  125077   ->   JMP 65077
65072  /  077612   ->   JSR I 67612 (60357)
65073  /  742305   ->   JZA 62305
65074  /  260522   ->   SUB 60522
65075  /  050040   ->   JSR I Z 0040 (0000)
65076  /  125104   ->   JMP 65104
65077  /  077612   ->   JSR I 67612 (60357)
65100  /  741517   ->   JZA 61517
65101  /  040522   ->   JSR Z 0522
65102  /  012405   ->   012405
65103  /  004040   ->   LDL 4040
65104  /  077612   ->   JSR I 67612 (60357)
65105  /  400201   ->   STA Z 0201
65106  /  031307   ->   031307
65107  /  221725   ->   ADD 61725
65110  /  160440   ->   AND 60440
65111  /  400040   ->   STA Z 0040
65112  /  000001   ->   LDL 0001
65113  /  427760   ->   STA 67760
65114  /  227756   ->   ADD 67756
65115  /  025010   ->   SNA CLA
65116  /  625003   ->   ISZ 65003
65117  /  135003   ->   JMP I 65003 (0000)
65120  /  000764   ->   LDL 0764
65121  /  000226   ->   LDL 0226
65122  /  002734   ->   LDL 2734
65123  /  000764   ->   LDL 0764
65124  /  000000   ->   0
65125  /  437607        STA I 67607 (60140)
65126  /  477606   ->   SCA I 67606 (60124)
65127  /  067414   ->   JSR 67414
65130  /  067302   ->   JSR 67302
65131  /  020010        CLA
65132  /  067344   ->   JSR 67344
65133  /  067265   ->   JSR 67265
65134  /  077600   ->   JSR I 67600 (43653)
```

```
65135  /  000272   ->   LDL 0272
65136  /  062307   ->   JSR 62307
65137  /  000260   ->   LDL 0260
65140  /  065173   ->   JSR 65173
65141  /  000273   ->   LDL 0273
65142  /  064410   ->   JSR 64410
65143  /  000261   ->   LDL 0261
65144  /  065347   ->   JSR 65347
65145  /  000262   ->   LDL 0262
65146  /  065412   ->   JSR 65412
65147  /  000267   ->   LDL 0267
65150  /  065465   ->   JSR 65465
65151  /  000263   ->   LDL 0263
65152  /  065525   ->   JSR 65525
65153  /  000264   ->   LDL 0264
65154  /  065575   ->   JSR 65575
65155  /  000265   ->   LDL 0265
65156  /  065643   ->   JSR 65643
65157  /  000266   ->   LDL 0266
65160  /  065710   ->   JSR 65710
65161  /  000230   ->   LDL 0230
65162  /  065762   ->   JSR 65762
65163  /  000220   ->   LDL 0220
65164  /  065317   ->   JSR 65317
65165  /  000000   ->   0
65166  /  000000   ->   0
65167  /  000000   ->   0
65170  /  000277   ->   LDL 0277
65171  /  077603   ->   JSR I 67603 (60103)
65172  /  125131   ->   JMP 65131
65173  /  067370   ->   JSR 67370
65174  /  077612   ->   JSR I 67612 (60357)
65175  /  746140   ->   JZA 66140
65176  /  200522   ->   ADD Z 0522
65177  /  150116   ->   AND I Z 0116 (243407)
65200  /  051624   ->   JSR I Z 1624 (451574)
65201  /  400225   ->   STA Z 0225
65202  /  233140   ->   ADD I 63140 (123146)
65203  /  141116   ->   AND Z 1116
65204  /  052340   ->   JSR I Z 2340 (544113)
65205  /  746240   ->   JZA 66240
65206  /  231017   ->   ADD I 61017 (322125)
65207  /  222423   ->   ADD 62423
65210  /  544003   ->   SNW Z 4003
65211  /  221723   ->   ADD 61723
65212  /  230523   ->   ADD I 60523 (622207)
65213  /  400116   ->   STA Z 0116
65214  /  044007   ->   JSR Z 4007
65215  /  221725   ->   ADD 61725
65216  /  160423   ->   AND 60423
65217  /  746340   ->   JZA 66340
65220  /  101107   ->   JMP Z 1107
65221  /  104002   ->   JMP Z 4002
65222  /  010313   ->   010313
65223  /  072217   ->   JSR I 62217 (566252)
65224  /  251604   ->   SUB I Z 1604 (101631)
65225  /  401411   ->   STA Z 1411
65226  /  160523   ->   AND 60523
65227  /  746440   ->   JZA 66440
65230  /  232523   ->   ADD I 62523 (422521)
65231  /  200503   ->   ADD Z 0503
65232  /  244027   ->   SUB Z 4027
65233  /  052440   ->   JSR I Z 2440 (11631)
65234  /  030102   ->   030102
65235  /  140540   ->   AND Z 0540
```

```
65236  /  746540   =>   JZA 66540
65237  /  232523   =>   ADD I 62523 (422521)
65240  /  200503   =>   ADD Z 0503
65241  /  244014   =>   SUB Z 4014
65242  /  111605   =>   JMP I Z 1605 (314025)
65243  /  234040   =>   ADD I 64040 (227773)
65244  /  746640   =>   JZA 66640
65245  /  010324   =>   010324
65246  /  112601   =>   JMP I Z 2601 (304023)
65247  /  240504   =>   SUB Z 0504
65250  /  402022   =>   STA Z 2022
65251  /  052323   =>   JSR I Z 2323 (442334)
65252  /  252205   =>   SUB I Z 2205 (24000)
65253  /  400317   =>   STA Z 0317
65254  /  162401   =>   AND 62401
65255  /  032417   =>   032417
65256  /  222300   =>   ADD 62300
65257  /  067350   =>   JSR 67350
65260  /  125131   =>   JMP 65131
65261  /  000000   =>   0
65262  /  577666   =>   SNW I 67666 (62105)
65263  /  125274   =>   JMP 65274
65264  /  077612   =>   JSR I 67612 (60357)
65265  /  400530   =>   STA Z 0530
65266  /  031001   =>   031001
65267  /  160705   =>   AND 60705
65270  /  404340   =>   STA Z 4340
65271  /  004040   =>   LDL 4040
65272  /  337666   =>   IOR I 67666 (62105)
65273  /  065304   =>   JSR 65304
65274  /  077612   =>   JSR I 67612 (60357)
65275  /  400000   =>   STA Z 0000
65276  /  135261   =>   JMP I 65261 (0000)
65277  /  000000   =>   0
65300  /  167522   =>   AND 67522
65301  /  327502   =>   IOR 67502
65302  /  077603   =>   JSR I 67603 (60103)
65303  /  135277   =>   JMP I 65277 (0000)
65304  /  000000   =>   0
65305  /  425316   =>   STA 65316
65306  /  035040   =>   CLL SHR 10
65307  /  065277   =>   JSR 65277
65310  /  325316   =>   IOR 65316
65311  /  034440   =>   CLL SHR 4
65312  /  065277   =>   JSR 65277
65313  /  325316   =>   IOR 65316
65314  /  065277   =>   JSR 65277
65315  /  135304   =>   JMP I 65304 (0000)
65316  /  000000   =>   0
65317  /  077612   =>   JSR I 67612 (60357)
65320  /  742022   =>   JZA 62022
65321  /  111624   =>   JMP I Z 1624 (451574)
65322  /  052240   =>   JSR I Z 2240 (702463)
65323  /  004040   =>   LDL 4040
65324  /  565411   =>   SNW 65411
65325  /  000001   =>   LDL 0001
65326  /  425411   =>   STA 65411
65327  /  745343   =>   JZA 65343
65330  /  077612   =>   JSR I 67612 (60357)
65331  /  171600   =>   AND I 61600 (741622)
65332  /  000001   =>   LDL 0001
65333  /  437606   =>   STA I 67606 (60124)
65334  /  477607   =>   SCA I 67607 (60140)
65335  /  000214   =>   LDL 0214
65336  /  077603   =>   JSR I 67603 (60103)
```

```
65337  /  020010  -> CLA
65340  /  437606  -> STA I 67606 (60124)
65341  /  477607  -> SCA I 67607 (60140)
65342  /  125131  -> JMP 65131
65343  /  077612  -> JSR I 67612 (60357)
65344  /  170606  -> AND I 60606 (20000)
65345  /  004040  -> LDL 4040
65346  /  125131  -> JMP 65131
65347  /  020010  -> CLA
65350  /  466170  -> SCA 66170
65351  /  020000  -> NOP
65352  /  327523  -> IOR 67523
65353  /  066114  -> JSR 66114
65354  /  755372  -> JNA 65372
65355  /  065261  -> JSR 65261
65356  /  077612  -> JSR I 67612 (60357)
65357  /  100123  -> JMP Z 0123
65360  /  401617  -> STA Z 1617
65361  /  402005  -> STA Z 2005
65362  /  221501  -> ADD 61501
65363  /  160516  -> AND 60516
65364  /  244002  -> SUB Z 4002
65365  /  252331  -> SUB I Z 2331 (402322)
65366  /  401411  -> STA Z 1411
65367  /  160523  -> AND 60523
65370  /  004040  -> LDL 4040
65371  /  125131  -> JMP 65131
65372  /  020010  -> CLA
65373  /  325411  -> IOR 65411
65374  /  437607  -> STA I 67607 (60140)
65375  /  477606  -> SCA I 67606 (60124)
65376  /  065261  -> JSR 65261
65377  /  077612  -> JSR I 67612 (60357)
65400  /  200522  -> ADD Z 0522
65401  /  150116  -> AND I Z 0116 (243407)
65402  /  051624  -> JSR I Z 1624 (451574)
65403  /  400225  -> STA Z 0225
65404  /  233140  -> ADD I 63140 (123146)
65405  /  141116  -> AND Z 1116
65406  /  052300  -> JSR I Z 2300 (102561)
65407  /  126054  -> JMP 66054
65410  /  000000  -> 0
65411  /  000000  -> 0
65412  /  020010  -> CLA
65413  /  327523  -> IOR 67523
65414  /  327544  -> IOR 67544
65415  /  466170  -> SCA 66170
65416  /  327524  -> IOR 67524
65417  /  327526  -> IOR 67526
65420  /  020000  -> NOP
65421  /  066114  -> JSR 66114
65422  /  755444  -> JNA 65444
65423  /  065261  -> JSR 65261
65424  /  077612  -> JSR I 67612 (60357)
65425  /  100123  -> JMP Z 0123
65426  /  401617  -> STA Z 1617
65427  /  402310  -> STA Z 2310
65430  /  172224  -> AND I 62224 (0000)
65431  /  235440  -> ADD I 65440 (44014)
65432  /  032217  -> 032217
65433  /  232305  -> ADD I 62305 (0000)
65434  /  234017  -> ADD I 64017 (777777)
65435  /  224007  -> ADD 64007
65436  /  221725  -> ADD 61725
65437  /  160405  -> AND 60405
```

```
65440  /  044014   => JSR Z 4014
65441  /  111605   => JMP I Z 1605 (314025)
65442  /  230040   => ADD I 60040 (774060)
65443  /  125131   => JMP 65131
65444  /  020010   => CLA
65445  /  325411   => IOR 65411
65446  /  437607   => STA I 67607 (60140)
65447  /  477606   => SCA I 67606 (60124)
65450  /  065261   => JSR 65261
65451  /  077612   => JSR I 67612 (60357)
65452  /  231017   => ADD I 61017 (322125)
65453  /  222423   => ADD 62423
65454  /  544003   => SNW Z 4003
65455  /  221723   => ADD 61723
65456  /  230523   => ADD I 60523 (622207)
65457  /  400116   => STA Z 0116
65460  /  044007   => JSR Z 4007
65461  /  221725   => ADD 61725
65462  /  160423   => AND 60423
65463  /  004040   => LDL 4040
65464  /  126054   => JMP 66054
65465  /  020010   => CLA
65466  /  466170   => SCA 66170
65467  /  020000   => NOP
65470  /  327544   => IOR 67544
65471  /  066114   => JSR 66114
65472  /  755507   => JNA 65507
65473  /  065261   => JSR 65261
65474  /  077612   => JSR I 67612 (60357)
65475  /  100123   => JMP Z 0123
65476  /  401617   => STA Z 1617
65477  /  401011   => STA Z 1011
65500  /  071040   => JSR I 61040 (751056)
65501  /  261714   => SUB 61714
65502  /  240107   => SUB Z 0107
65503  /  054014   => JSR I Z 4014 (24010)
65504  /  111605   => JMP I Z 1605 (314025)
65505  /  230040   => ADD I 60040 (774060)
65506  /  125131   => JMP 65131
65507  /  020010   => CLA
65510  /  325411   => IOR 65411
65511  /  437607   => STA I 67607 (60140)
65512  /  477606   => SCA I 67606 (60124)
65513  /  065261   => JSR 65261
65514  /  077612   => JSR I 67612 (60357)
65515  /  101107   => JMP Z 1107
65516  /  104026   => JMP Z 4026
65517  /  171424   => AND I 61424 (21010)
65520  /  010705   => 010705
65521  /  401411   => STA Z 1411
65522  /  160523   => AND 60523
65523  /  004040   => LDL 4040
65524  /  126054   => JMP 66054
65525  /  020010   => CLA
65526  /  327524   => IOR 67524
65527  /  327523   => IOR 67523
65530  /  327544   => IOR 67544
65531  /  327526   => IOR 67526
65532  /  466170   => SCA 66170
65533  /  020000   => NOP
65534  /  020000   => NOP
65535  /  327525   => IOR 67525
65536  /  327527   => IOR 67527
65537  /  066114   => JSR 66114
65540  /  755556   => JNA 65556
```

```
65541  /  065261   =>   JSR 65261
65542  /  077612   =>   JSR I 67612 (60357)
65543  /  100123   =>   JMP Z 0123
65544  /  401617   =>   STA Z 1617
65545  /  401011   =>   STA Z 1011
65546  /  071040   =>   JSR I 61040 (751056)
65547  /  020103   =>   020103
65550  /  130722   =>   JMP I 60722 (130575)
65551  /  172516   =>   AND I 62516 (422521)
65552  /  044014   =>   JSR Z 4014
65553  /  111605   =>   JMP I Z 1605 (314025)
65554  /  230040   =>   ADD I 60040 (774060)
65555  /  125131   =>   JMP 65131
65556  /  020010   =>   CLA
65557  /  325411   =>   IOR 65411
65560  /  437607   =>   STA I 67607 (60140)
65561  /  477606   =>   SCA I 67606 (60124)
65562  /  065261   =>   JSR 65261
65563  /  077612   =>   JSR I 67612 (60357)
65564  /  101107   =>   JMP Z 1107
65565  /  104002   =>   JMP Z 4002
65566  /  010313   =>   010313
65567  /  072217   =>   JSR I 62217 (566252)
65570  /  251604   =>   SUB I Z 1604 (101631)
65571  /  401411   =>   STA Z 1411
65572  /  160523   =>   AND 60523
65573  /  004040   =>   LDL 4040
65574  /  126054   =>   JMP 66054
65575  /  020010   =>   CLA
65576  /  327524   =>   IOR 67524
65577  /  327523   =>   IOR 67523
65600  /  327544   =>   IOR 67544
65601  /  327525   =>   IOR 67525
65602  /  327526   =>   IOR 67526
65603  /  327527   =>   IOR 67527
65604  /  466170   =>   SCA 66170
65605  /  020000   =>   NOP
65606  /  020000   =>   NOP
65607  /  327537   =>   IOR 67537
65610  /  066114   =>   JSR 66114
65611  /  755626   =>   JNA 65626
65612  /  065261   =>   JSR 65261
65613  /  077612   =>   JSR I 67612 (60357)
65614  /  100123   =>   JMP Z 0123
65615  /  401617   =>   STA Z 1617
65616  /  402325   =>   STA Z 2325
65617  /  232005   =>   ADD I 62005 (122013)
65620  /  032440   =>   CLL RTL 4
65621  /  270524   =>   SUB I 60524 (432150)
65622  /  400301   =>   STA Z 0301
65623  /  021405   =>   021405
65624  /  004040   =>   LDL 4040
65625  /  125131   =>   JMP 65131
65626  /  020010   =>   CLA
65627  /  325411   =>   IOR 65411
65630  /  437607   =>   STA I 67607 (60140)
65631  /  477606   =>   SCA I 67606 (60124)
65632  /  065261   =>   JSR 65261
65633  /  077612   =>   JSR I 67612 (60357)
65634  /  232523   =>   ADD I 62523 (422521)
65635  /  200503   =>   ADD Z 0503
65636  /  244027   =>   SUB Z 4027
65637  /  052440   =>   JSR I Z 2440 (11631)
65640  /  030102   =>   030102
65641  /  140500   =>   AND Z 0500
```

```
65642  /  126054   => JMP 66054
65643  /  020010   => CLA
65644  /  327524   => IOR 67524
65645  /  327523   => IOR 67523
65646  /  327544   => IOR 67544
65647  /  327525   => IOR 67525
65650  /  327537   => IOR 67537
65651  /  327526   => IOR 67526
65652  /  327527   => IOR 67527
65653  /  466170   => SCA 66170
65654  /  020000   => NOP
65655  /  327536   => IOR 67536
65656  /  327534   => IOR 67534
65657  /  327535   => IOR 67535
65660  /  066114   => JSR 66114
65661  /  755674   => JNA 65674
65662  /  065261   => JSR 65261
65663  /  077612   => JSR I 67612 (60357)
65664  /  100123   => JMP Z 0123
65665  /  401617   => STA Z 1617
65666  /  402325   => STA Z 2325
65667  /  232005   => ADD I 62005 (122013)
65670  /  032440   => CLL RTL 4
65671  /  141116   => AND Z 1116
65672  /  052300   => JSR I Z 2300 (102561)
65673  /  125131   => JMP 65131
65674  /  020010   => CLA
65675  /  325411   => IOR 65411
65676  /  437607   => STA I 67607 (60140)
65677  /  477606   => SCA I 67606 (60124)
65700  /  065261   => JSR 65261
65701  /  077612   => JSR I 67612 (60357)
65702  /  232523   => ADD I 62523 (422521)
65703  /  200503   => ADD Z 0503
65704  /  244014   => SUB Z 4014
65705  /  111605   => JMP I Z 1605 (314025)
65706  /  230040   => ADD I 60040 (774060)
65707  /  126054   => JMP 66054
65710  /  020010   => CLA
65711  /  327526   => IOR 67526
65712  /  466170   => SCA 66170
65713  /  020000   => NOP
65714  /  327545   => IOR 67545
65715  /  020010   => CLA
65716  /  327546   => IOR 67546
65717  /  066114   => JSR 66114
65720  /  755741   => JNA 65741
65721  /  065261   => JSR 65261
65722  /  077612   => JSR I 67612 (60357)
65723  /  100123       JMP Z 0123
65724  /  401617   => STA Z 1617
65725  /  400103   => STA Z 0103
65726  /  241126   => SUB Z 1126
65727  /  012405   => 012405
65730  /  044020   => JSR Z 4020
65731  /  220523   => ADD 60523
65732  /  232522   => ADD I 62522 (367502)
65733  /  054003   => JSR I Z 4003 (504127)
65734  /  171624   => AND I 61624 (421731)
65735  /  010324   => 010324
65736  /  172223   => AND I 62223 (0000)
65737  /  004040   => LDL 4040
65740  /  125131   => JMP 65131
65741  /  020010   => CLA
65742  /  325411   => IOR 65411
```

```
65743  /  437607   =>   STA I 67607 (60140)
65744  /  477606   =>   SCA I 67606 (60124)
65745  /  065261   =>   JSR 65261
65746  /  077612   =>   JSR I 67612 (60357)
65747  /  010324   =>   010324
65750  /  112601   =>   JMP I Z 2601 (304023)
65751  /  240504   =>   SUB Z 0504
65752  /  402022   =>   STA Z 2022
65753  /  052323   =>   JSR I Z 2323 (442334)
65754  /  252205   =>   SUB I Z 2205 (24000)
65755  /  400317   =>   STA Z 0317
65756  /  162401   =>   AND 62401
65757  /  032417   =>   032417
65760  /  222300   =>   ADD 62300
65761  /  126054   =>   JMP 66054
65762  /  466053   =>   SCA 66053
65763  /  466170   =>   SCA 66170
65764  /  077612   =>   JSR I 67612 (60357)
65765  /  740530   =>   JZA 60530
65766  /  242201   =>   SUB Z 2201
65767  /  402431   =>   STA Z 2431
65770  /  200540   =>   ADD Z 0540
65771  /  004040   =>   LDL 4040
65772  /  067265   =>   JSR 67265
65773  /  426014   =>   STA 66014
65774  /  077600   =>   JSR I 67600 (43653)
65775  /  000212   =>   LDL 0212
65776  /  066015   =>   JSR 66015
65777  /  000215   =>   LDL 0215
66000  /  066015   =>   JSR 66015
66001  /  000000   =>   0
66002  /  000260   =>   LDL 0260
66003  /  366014   =>   XOR 66014
66004  /  426014   =>   STA 66014
66005  /  167547   =>   AND 67547
66006  /  755762   =>   JNA 65762
66007  /  326053   =>   IOR 66053
66010  /  036340   =>   CLL SHL 3
66011  /  326014   =>   IOR 66014
66012  /  466053   =>   SCA 66053
66013  /  125772   =>   JMP 65772
66014  /  000000   =>   0
66015  /  066103   =>   JSR 66103
66016  /  326053   =>   IOR 66053
66017  /  066114   =>   JSR 66114
66020  /  756027   =>   JNA 66027
66021  /  077612   =>   JSR I 67612 (60357)
66022  /  401617   =>   STA Z 1617
66023  /  401411   =>   STA Z 1411
66024  /  160523   =>   AND 60523
66025  /  400040   =>   STA Z 0040
66026  /  125131   =>   JMP 65131
66027  /  020010   =>   CLA
66030  /  325411   =>   IOR 65411
66031  /  437607   =>   STA I 67607 (60140)
66032  /  437606   =>   STA I 67606 (60124)
66033  /  746054   =>   JZA 66054
66034  /  077612   =>   JSR I 67612 (60357)
66035  /  742431   =>   JZA 62431
66036  /  200540   =>   ADD Z 0540
66037  /  004040   =>   LDL 4040
66040  /  326053   =>   IOR 66053
66041  /  077610   =>   JSR I 67610 (43770)
66042  /  000006   =>   LDL 0006
66043  /  077612   =>   JSR I 67612 (60357)
```

```
66044  /  401411  => STA Z 1411
66045  /  160523  => AND 60523
66046  /  004040  => LDL 4040
66047  /  126054  => JMP 66054
66050  /  000000  => 0
66051  /  000000  => 0
66052  /  000000  => 0
66053  /  000000  => 0
66054  /  066103  => JSR 66103
66055  /  000012  => LDL 0012
66056  /  466072  => SCA 66072
66057  /  077612  => JSR I 67612 (60357)
66060  /  744000  => JZA 64000
66061  /  077612  => JSR I 67612 (60357)
66062  /  404000  => STA Z 4000
66063  /  066141  => JSR 66141
66064  /  126073  => JMP 66073
66065  /  067204  => JSR 67204
66066  /  625410  => ISZ 65410
66067  /  666072  => DSZ 66072
66070  /  126061  => JMP 66061
66071  /  126055  => JMP 66055
66072  /  000000  => 0
66073  /  565411  => SNW 65411
66074  /  126077  => JMP 66077
66075  /  077612  => JSR I 67612 (60357)
66076  /  740040  => JZA 60040
66077  /  000000  => 0
66100  /  437606  => STA I 67606 (60124)
66101  /  477607  => SCA I 67607 (60140)
66102  /  125131  => JMP 65131
66103  /  000000  => 0
66104  /  000002  => LDL 0002
66105  /  227506  => ADD 67506
66106  /  012000  => AIL
66107  /  466172  => SCA 66172
66110  /  000003  => LDL 0003
66111  /  227506  => ADD 67506
66112  /  466171  => SCA 66171
66113  /  136103  => JMP I 66103 (0000)
66114  /  000000  => 0
66115  /  466173  =>    SCA 66173
66116  /  466140  => SCA 66140
66117  /  066103  => JSR 66103
66120  /  566172  => SNW 66172
66121  /  126135  =>    JMP 66135
66122  /  000001  => LDL 0001
66123  /  226171  => ADD 66171
66124  /  426171  => STA 66171
66125  /  012000  => AIL
66126  /  166173  => AND 66173
66127  /  021010  => SZA CLA
66130  /  626140  => ISZ 66140
66131  /  000002  => LDL 0002
66132  /  226171  => ADD 66171
66133  /  666172  => DSZ 66172
66134  /  126124  => JMP 66124
66135  /  020010  => CLA
66136  /  326140  => IOR 66140
66137  /  136114  => JMP I 66114 (0000)
66140  /  000000  => 0
66141  /  000000  => 0
66142  /  020010  => CLA
66143  /  566172  => SNW 66172
66144  /  126167  => JMP 66167
```

```
66145  /  626171   => ISZ 66171
66146  /  336171   => IOR I 66171 (0000)
66147  /  166173   => AND 66173
66150  /  756155   => JNA 66155
66151  /  626171   => ISZ 66171
66152  /  666172   => DSZ 66172
66153  /  126145   => JMP 66145
66154  /  126167   => JMP 66167
66155  /  326170   => IOR 66170
66156  /  176171   => AND I 66171 (0000)
66157  /  756151   => JNA 66151
66160  /  777777   => LDL -0001
66161  /  226171   => ADD 66171
66162  /  012000   => AIL
66163  /  626171   => ISZ 66171
66164  /  666172   => DSZ 66172
66165  /  020000   => NOP
66166  /  626141   => ISZ 66141
66167  /  136141   => JMP I 66141 (0000)
66170  /  000000   => 0
66171  /  000000   => 0
66172  /  000000   => 0
66173  /  000000   => 0
66174  /  000000   => 0
66175  /  426215   => STA 66215
66176  /  477670   => SCA I 67670 (46715)
66177  /  020000   => NOP
66200  /  077612   => JSR I 67612 (60357)
66201  /  404004   => STA Z 4004
66202  /  110114   => JMP I Z 0114 (143610)
66203  /  400040   => STA Z 0040
66204  /  337670   => IOR I 67670 (46715)
66205  /  066341   => JSR 66341
66206  /  024000   => SKP
66207  /  626174   => ISZ 66174
66210  /  466215   => SCA 66215
66211  /  077612   => JSR I 67612 (60357)
66212  /  404000   => STA Z 4000
66213  /  326215   => IOR 66215
66214  /  136174   => JMP I 66174 (0000)
66215  /  000000   => 0
66216  /  000001   => LDL 0001
66217  /  477664   => SCA I 67664 (60210)
66220  /  327514   => IOR 67514
66221  /  477665   => SCA I 67665 (60211)
66222  /  000001   => LDL 0001
66223  /  466252   => SCA 66252
66224  /  126410   => JMP 66410
66225  /  000001   => LDL 0001
66226  /  477664   => SCA I 67664 (60210)
66227  /  327510   => IOR 67510
66230  /  477665   => SCA I 67665 (60211)
66231  /  000000   => 0
66232  /  466252   => SCA 66252
66233  /  126410   => JMP 66410
66234  /  000001   => LDL 0001
66235  /  477664   => SCA I 67664 (60210)
66236  /  327550   => IOR 67550
66237  /  477665   => SCA I 67665 (60211)
66240  /  000000   => 0
66241  /  466252   => SCA 66252
66242  /  126410   => JMP 66410
66243  /  000001   => LDL 0001
66244  /  477664   => SCA I 67664 (60210)
66245  /  327551   => IOR 67551
```

| | | | |
|---|---|---|---|
| 66246 | / | 477665 | -> SCA I 67665 (60211) |
| 66247 | / | 000000 | -> 0 |
| 66250 | / | 466252 | -> SCA 66252 |
| 66251 | / | 126410 | -> JMP 66410 |
| 66252 | / | 000001 | -> LDL 0001 |
| 66253 | / | 077612 | -> JSR I 67612 (60357) |
| 66254 | / | 777427 | -> LDL -0351 |
| 66255 | / | 053005 | -> JSR I Z 3005 (20010) |
| 66256 | / | 034020 | -> STL SHR 0 |
| 66257 | / | 004040 | -> LDL 4040 |
| 66260 | / | 077612 | -> JSR I 67612 (60357) |
| 66261 | / | 010705 | -> 010705 |
| 66262 | / | 774000 | -> LDL -4000 |
| 66263 | / | 077602 | -> JSR I 67602 (60142) |
| 66264 | / | 426266 | -> STA 66266 |
| 66265 | / | 077603 | -> JSR I 67603 (60103) |
| 66266 | / | 000000 | -> 0 |
| 66267 | / | 367502 | -> XOR 67502 |
| 66270 | / | 025000 | -> SNA |
| 66271 | / | 126253 | -> JMP 66253 |
| 66272 | / | 167552 | -> AND 67552 |
| 66273 | / | 756253 | -> JNA 66253 |
| 66274 | / | 000007 | -> LDL 0007 |
| 66275 | / | 166266 | -> AND 66266 |
| 66276 | / | 037440 | -> CLL SHL 14 |
| 66277 | / | 437706 | -> STA I 67706 (60353) |
| 66300 | / | 466311 | -> SCA 66311 |
| 66301 | / | 122217 | -> JMP 62217 |
| 66302 | / | 077612 | -> JSR I 67612 (60357) |
| 66303 | / | 742705 | -> JZA 62705 |
| 66304 | / | 300503 | -> IOR Z 0503 |
| 66305 | / | 402327 | -> STA Z 2327 |
| 66306 | / | 112403 | -> JMP I Z 2403 (302465) |
| 66307 | / | 107400 | -> JMP Z 7400 |
| 66310 | / | 136311 | -> JMP I 66311 (70000) |
| 66311 | / | 070000 | -> JSR I 60000 (0000) |
| 66312 | / | 000000 | -> 0 |
| 66313 | / | 020010 | CLA |
| 66314 | / | 077612 | -> JSR I 67612 (60357) |
| 66315 | / | 740301 | -> JZA 60301 |
| 66316 | / | 021405 | -> 021405 |
| 66317 | / | 400740 | STA Z 0740 |
| 66320 | / | 754000 | -> JNA 64000 |
| 66321 | / | 337654 | -> IOR I 67654 (42221) |
| 66322 | / | 066717 | -> JSR 66717 |
| 66323 | / | 077612 | -> JSR I 67612 (60357) |
| 66324 | / | 740301 | -> JZA 60301 |
| 66325 | / | 021405 | -> 021405 |
| 66326 | / | 402340 | -> STA Z 2340 |
| 66327 | / | 754000 | -> JNA 64000 |
| 66330 | / | 337655 | -> IOR I 67655 (42236) |
| 66331 | / | 066717 | -> JSR 66717 |
| 66332 | / | 077612 | -> JSR I 67612 (60357) |
| 66333 | / | 400116 | -> STA Z 0116 |
| 66334 | / | 044040 | -> JSR Z 4040 |
| 66335 | / | 004040 | -> LDL 4040 |
| 66336 | / | 337656 | -> IOR I 67656 (42241) |
| 66337 | / | 066717 | -> JSR 66717 |
| 66340 | / | 136312 | -> JMP I 66312 (0000) |
| 66341 | / | 000000 | -> 0 |
| 66342 | / | 077667 | -> JSR I 67667 (46255) |
| 66343 | / | 126372 | -> JMP 66372 |
| 66344 | / | 020000 | -> NOP |
| 66345 | / | 426354 | -> STA 66354 |
| 66346 | / | 026000 | -> SPA |

```
66347  /  756355   => JNA 66355
66350  /  756365   => JNA 66365
66351  /  626341   => ISZ 66341
66352  /  326354   => IOR 66354
66353  /  136341   => JMP I 66341 (0000)
66354  /  000000   => 0
66355  /  020010   => CLA
66356  /  077612   => JSR I 67612 (60357)
66357  /  402405   => STA Z 2405
66360  /  232440   => ADD I 62440 (240514)
66361  /  031716   => 031716
66362  /  160503   => AND 60503
66363  /  241722   => SUB Z 1722
66364  /  400040   => STA Z 0040
66365  /  077612   => JSR I 67612 (60357)
66366  /  404002   => STA Z 4002
66367  /  252331   => SUB I Z 2331 (402322)
66370  /  004040   => LDL 4040
66371  /  126352   => JMP 66352
66372  /  077612   => JSR I 67612 (60357)
66373  /  744040   => JZA 64040
66374  /  041101   => JSR Z 1101
66375  /  141116   => AND Z 1116
66376  /  074020   => JSR I 64020 (224064)
66377  /  221702   => ADD 61702
66400  /  140515   => AND Z 0515
66401  /  404000   => STA Z 4000
66402  /  126353   => JMP 66353
66403  /  020010   => CLA
66404  /  326422   => IOR 66422
66405  /  477736   => SCA I 67736 (60214)
66406  /  327513   => IOR 67513
66407  /  477737   => SCA I 67737 (60215)
66410  /  020010   => CLA
66411  /  437606   => STA I 67606 (60124)
66412  /  477607   => SCA I 67607 (60140)
66413  /  020000   => NOP
66414  /  707553   => PCT 67553
66415  /  020000   => NOP
66416  /  707554   => PCT 67554
66417  /  020000   => NOP
66420  /  020010   => CLA
66421  /  122306   => JMP 62306
66422  /  001000   => LDL 1000
66423  /  000000   => 0
66424  /  020010   => CLA
66425  /  077612   => JSR I 67612 (60357)
66426  /  404040   => STA Z 4040
66427  /  404002   => STA Z 4002
66430  /  012424   => 012424
66431  /  052231   => JSR I Z 2231 (20000)
66432  /  404004   => STA Z 4004
66433  /  034026   => 034026
66434  /  171424   => AND I 61424 (21010)
66435  /  234040   => ADD I 64040 (227773)
66436  /  010340   => 010340
66437  /  261714   => SUB 61714
66440  /  242340   => SUB Z 2340
66441  /  400201   => STA Z 0201
66442  /  031307   => 031307
66443  /  221725   => ADD 61725
66444  /  160400   => AND 60400
66445  /  077612   => JSR I 67612 (60357)
66446  /  742211   => JZA 62211
66447  /  160740   => AND 60740
```

```
66450  /  400040   => STA Z 0040
66451  /  337616   => IOR I 67616 (55412)
66452  /  066476   => JSR 66476
66453  /  337620   => IOR I 67620 (55420)
66454  /  066476   => JSR 66476
66455  /  337622   => IOR I 67622 (55404)
66456  /  066476   => JSR 66476
66457  /  337632   => IOR I 67632 (55415)
66460  /  066600   => JSR 66600
66461  /  077612   => JSR I 67612 (60357)
66462  /  742411   => JZA 62411
66463  /  204040   => ADD Z 4040
66464  /  400040   => STA Z 0040
66465  /  337615   => IOR I 67615 (55413)
66466  /  066476   => JSR 66476
66467  /  337617   => IOR I 67617 (55421)
66470  /  066476   => JSR 66476
66471  /  337621   => IOR I 67621 (55405)
66472  /  066476   => JSR 66476
66473  /  337631   => IOR I 67631 (55416)
66474  /  066600   => JSR 66600
66475  /  136423   => JMP I 66423 (0000)
66476  /  000000   => 0
66477  /  426530   => STA 66530
66500  /  026010   => SPA CLA
66501  /  000015   => LDL 0015
66502  /  227555   => ADD 67555
66503  /  077603   => JSR I 67603 (60103)
66504  /  326530   => IOR 66530
66505  /  026000   => SPA
66506  /  020006   => NAC
66507  /  227556   => ADD 67556
66510  /  426530   => STA 66530
66511  /  077576   => JSR I 67576 (43715)
66512  /  067557   => JSR 67557
66513  /  077611   => JSR I 67611 (44033)
66514  /  000003   => LDL 0003
66515  /  000256   => LDL 0256
66516  /  077603   => JSR I 67603 (60103)
66517  /  226530   => ADD 66530
66520  /  077576   => JSR I 67576 (43715)
66521  /  067500   => JSR 67500
66522  /  077611   => JSR I 67611 (44033)
66523  /  777777   => LDL -0001
66524  /  077612   => JSR I 67612 (60357)
66525  /  402640   => STA Z 2640
66526  /  400040   => STA Z 0040
66527  /  136476   => JMP I 66476 (0000)
66530  /  000000   => 0
66531  /  000000   => 0
66532  /  020010   => CLA
66533  /  077612   => JSR I 67612 (60357)
66534  /  741122   => JZA 61122
66535  /  024075   => 024075
66536  /  400040   => STA Z 0040
66537  /  337624   => IOR I 67624 (55427)
66540  /  066600   => JSR 66600
66541  /  077612   => JSR I 67612 (60357)
66542  /  404011   => STA Z 4011
66543  /  220740   => ADD 60740
66544  /  754000   => JNA 64000
66545  /  337626   => IOR I 67626 (55430)
66546  /  066600   => JSR 66600
66547  /  077612   => JSR I 67612 (60357)
66550  /  404011   => STA Z 4011
```

```
66551  /  222440   => ADD 62440
66552  /  754000   => JNA 64000
66553  /  337630   => IOR I 67630 (55431)
66554  /  066600   => JSR 66600
66555  /  077612   => JSR I 67612 (60357)
66556  /  741124   => JZA 61124
66557  /  024075   => 024075
66560  /  400040   => STA Z 0040
66561  /  337623   => IOR I 67623 (55432)
66562  /  066600   => JSR 66600
66563  /  077612   => JSR I 67612 (60357)
66564  /  404011   => STA Z 4011
66565  /  240740   => SUB Z 0740
66566  /  754000   => JNA 64000
66567  /  337625   => IOR I 67625 (55433)
66570  /  066600   => JSR 66600
66571  /  077612   => JSR I 67612 (60357)
66572  /  404011   => STA Z 4011
66573  /  242240   => SUB Z 2240
66574  /  754000   => JNA 64000
66575  /  337627   => IOR I 67627 (55434)
66576  /  066600   => JSR 66600
66577  /  136531   => JMP I 66531 (0000)
66600  /  000000   => 0
66601  /  426633   => STA 66633
66602  /  026010   => SPA CLA
66603  /  000015   => LDL 0015
66604  /  227555   => ADD 67555
66605  /  077603   => JSR I 67603 (60103)
66606  /  326633   => IOR 66633
66607  /  026000   => SPA
66610  /  020006   => NAC
66611  /  077611   => JSR I 67611 (44033)
66612  /  000006   => LDL 0006
66613  /  077612   => JSR I 67612 (60357)
66614  /  402501   => STA Z 2501
66615  /  400040   => STA Z 0040
66616  /  136600   => JMP I 65600 (0000)
66617  /  000000   => 0
66620  /  426633   => STA 66633
66621  /  026010   => SPA CLA
66622  /  000015   => LDL 0015
66623  /  227555   => ADD 67555
66624  /  077603   => JSR I 67603 (60103)
66625  /  326633   => IOR 66633
66626  /  026000   => SPA
66627  /  020006   => NAC
66630  /  077611   => JSR I 67611 (44033)
66631  /  000005   => LDL 0005
66632  /  136617   => JMP I 66617 (0000)
66633  /  000000   => 0
66634  /  000000   => 0
66635  /  020010   => CLA
66636  /  077612   => JSR I 67612 (60357)
66637  /  744040   => JZA 64040
66640  /  404023   => STA Z 4023
66641  /  240740   => SUB Z 0740
66642  /  754000   => JNA 64000
66643  /  337565   => IOR I 67565 (51676)
66644  /  066717   => JSR 66717
66645  /  077612   => JSR I 67612 (60357)
66646  /  404040   => STA Z 4040
66647  /  232422   => ADD I 62422 (462474)
66650  /  407540   => STA Z 7540
66651  /  004040   => LDL 4040
```

```
66652  /  337567   ⊃>   IOR I 67567  (51677)
66653  /  066717   ⊃>   JSR 66717
66654  /  077612   ⊃>   JSR I 67612  (60357)
66655  /  744040   ⊃>   JZA 64040
66656  /  404023   ⊃>   STA Z 4023
66657  /  220740   ⊃>   ADD 60740
66660  /  754000   ⊃>   JNA 64000
66661  /  337566   ⊃>   IOR I 67566  (51674)
66662  /  066717   ⊃>   JSR 66717
66663  /  077612   ⊃>   JSR I 67612  (60357)
66664  /  404040   ⊃>   STA Z 4040
66665  /  232224   ⊃>   ADD I 62224  (0000)
66666  /  407540   ⊃>   STA Z 7540
66667  /  004040   ⊃>   LDL 4040
66670  /  337570   ⊃>   IOR I 67570  (51675)
66671  /  066717   ⊃>   JSR 66717
66672  /  136634   ⊃>   JMP I 66634  (0000)
66673  /  000000   ⊃>   0
66674  /  077612   ⊃>   JSR I 67612  (60357)
66675  /  742405   ⊃>   JZA 62405
66676  /  074075   ⊃>   JSR I 64075  (0003)
66677  /  004040   ⊃>   LDL 4040
66700  /  337731   ⊃>   IOR I 67731  (51544)
66701  /  066717   ⊃>   JSR 66717
66702  /  077612   ⊃>   JSR I 67612  (60357)
66703  /  404022   ⊃>   STA Z 4022
66704  /  050740   ⊃>   JSR I Z 0740 (344104)
66705  /  750040   ⊃>   JNA 60040
66706  /  337732   ⊃>   IOR I 67732  (51545)
66707  /  066717        JSR 66717
66710  /  077612    >   JSR I 67612  (60357)
66711  /  404020   ⊃>   STA Z 4020
66712  /  050740   ·>   JSR I Z 0740 (344104)
66713  /  750040        JNA 60040
66714  /  337730   ⊃>   IOR I 67730  (51543)
66715  /  066717   ⊃>   JSR 66717
66716  /  136673   ⊃>   JMP I 66673  (0000)
66717  /  000000   ⊃>   0
66720  /  426746   ⊃>   STA 66746
66721  /  026010   ⊃>   SPA CLA
66722  /  000015   ⊃>   LDL 0015
66723  /  227555   ⊃>   ADD 67555
66724  /  077603   ⊃>   JSR I 67603  (60103)
66725  /  326746   ⊃>   IOR 66746
66726  /  026000   ⊃>   SPA
66727  /  020006   ⊃>   NAC
66730  /  426746   ⊃>   STA 66746
66731  /  077576   ⊃>   JSR I 67576  (43715)
66732  /  067500   ⊃>   JSR 67500
66733  /  077611   ⊃>   JSR I 67611  (44033)
66734  /  000005   ⊃>   LDL 0005
66735  /  000256   ⊃>   LDL 0256
66736  /  077603   ⊃>   JSR I 67603  (60103)
66737  /  326746   ⊃>   IOR 66746
66740  /  077611   ⊃>   JSR I 67611  (44033)
66741  /  777777   ⊃>   LDL -0001
66742  /  077612   ⊃>   JSR I 67612  (60357)
66743  /  402525   ⊃>   STA Z 2525
66744  /  400040   ⊃>   STA Z 0040
66745  /  136717   ⊃>   JMP I 66717  (0000)
66746  /  000000   ⊃>   0
66747  /  000000   ⊃>   0
66750  /  020010   ⊃>   CLA
66751  /  077612   ⊃>   JSR I 67612  (60357)
66752  /  744040   ⊃>   JZA 64040
```

```
66753  /  404023   => STA Z 4023
66754  /  240740   => SUB Z 0740
66755  /  754000   => JNA 64000
66756  /  337633   => IOR I 67633 (55442)
66757  /  066717   => JSR 66717
66760  /  077612   => JSR I 67612 (60357)
66761  /  404040   => STA Z 4040
66762  /  232422   => ADD I 62422 (462474)
66763  /  407540   => STA Z 7540
66764  /  004040   => LDL 4040
66765  /  337635   => IOR I 67635 (55443)
66766  /  066717   => JSR 66717
66767  /  077612   => JSR I 67612 (60357)
66770  /  744040   => JZA 64040
66771  /  404023   => STA Z 4023
66772  /  220740   => ADD 60740
66773  /  754000   => JNA 64000
66774  /  337634   => IOR I 67634 (55440)
66775  /  066717   => JSR 66717
66776  /  077612   => JSR I 67612 (60357)
66777  /  404040   => STA Z 4040
67000  /  232224   => ADD I 62224 (0000)
67001  /  407540   => STA Z 7540
67002  /  004040   => LDL 4040
67003  /  337636   => IOR I 67636 (55441)
67004  /  066717   => JSR 66717
67005  /  020010   => CLA
67006  /  000040   => 0
67007  /  000000   => 0
67010  /  000000   => 0
67011  /  136747   => JMP I 66747 (0000)
67012  /  000000   => 0
67013  /  020010   => CLA
67014  /  077612   => JSR I 67612 (60357)
67015  /  744040   => JZA 64040
67016  /  404007   => STA Z 4007
67017  /  240740   => SUB Z 0740
67020  /  754000   => JNA 64000
67021  /  337561   => IOR I 67561 (51672)
67022  /  066717   => JSR 66717
67023  /  077612   => JSR I 67612 (60357)
67024  /  404040   => STA Z 4040
67025  /  072422   => JSR I 62422 (462474)
67026  /  407540   => STA Z 7540
67027  /  004040   => LDL 4040
67030  /  337563   => IOR I 67563 (51673)
67031  /  066717   => JSR 66717
67032  /  077612   => JSR I 67612 (60357)
67033  /  744040   => JZA 64040
67034  /  404007   => STA Z 4007
67035  /  220740   => ADD 60740
67036  /  754000   => JNA 64000
67037  /  337562   => IOR I 67562 (51670)
67040  /  066717   => JSR 66717
67041  /  077612   => JSR I 67612 (60357)
67042  /  404040   => STA Z 4040
67043  /  072224   => JSR I 62224 (0000)
67044  /  407540   => STA Z 7540
67045  /  004040   => LDL 4040
67046  /  337564   => IOR I 67564 (51671)
67047  /  066717   => JSR 66717
67050  /  137012   => JMP I 67012 (0000)
67051  /  000000   => 0
67052  /  020010   => CLA
67053  /  077612   => JSR I 67612 (60357)
67054  /  744040   => JZA 64040
```

```
67055  /  404007  ->  STA Z 4007
67056  /  240740  ->  SUB Z 0740
67057  /  754000  ->  JNA 64000
67060  /  337637  ->  IOR I 67637  (55425)
67061  /  066717  ->  JSR 66717
67062  /  077612  ->  JSR I 67612  (60357)
67063  /  404040  ->  STA Z 4040
67064  /  072422  ->  JSR I 62422  (462474)
67065  /  407540  ->  STA Z 7540
67066  /  004040  ->  LDL 4040
67067  /  337641  ->  IOR I 67641  (55426)
67070  /  066717  ->  JSR 66717
67071  /  077612  ->  JSR I 67612  (60357)
67072  /  744040  ->  JZA 64040
67073  /  404007  ->  STA Z 4007
67074  /  220740  ->  ADD 60740
67075  /  754000  ->  JNA 64000
67076  /  337640  ->  IOR I 67640  (55423)
67077  /  066717  ->  JSR 66717
67100  /  077612  ->  JSR I 67612  (60357)
67101  /  404040  ->  STA Z 4040
67102  /  072224  ->  JSR I 62224  (0000)
67103  /  407540  ->  STA Z 7540
67104  /  004040  ->  LDL 4040
67105  /  337642      IOR I 67642  (55424)
67106  /  066717   >  JSR 66717
67107  /  137051  ->  JMP I 67051  (0000)
67110  /  000000  ->  0
67111  /  467166      SCA 67166
67112  /  077602  ->  JSR I 67602  (60142)
67113  /  427120  ->  STA 67120
67114  /  367520  ->  XOR 67520
67115  /  747157  ->  JZA 67157
67116  /  327120  ->  IOR 67120
67117  /  077603  ->  JSR I 67603  (60103)
67120  /  000000  ->  0
67121  /  077600  ->  JSR I 67600  (43653)
67122  /  000212  ->  LDL 0212
67123  /  067164  ->  JSR 67164
67124  /  000215  ->  LDL 0215
67125  /  067164  ->  JSR 67164
67126  /  000337  ->  LDL 0337
67127  /  067145  ->  JSR 67145
67130  /  000377  ->  LDL 0377
67131  /  067157  ->  JSR 67157
67132  /  000000  ->  0
67133  /  000260  ->  LDL 0260
67134  /  367120  ->  XOR 67120
67135  /  427120  ->  STA 67120
67136  /  267500  ->  SUB 67500
67137  /  026010  ->  SPA CLA
67140  /  127152  ->  JMP 67152
67141  /  000207  ->  LDL 0207
67142  /  077603  ->  JSR I 67603  (60103)
67143  /  077612  ->  JSR I 67612  (60357)
67144  /  777400  ->  LDL -0400
67145  /  077612  ->  JSR I 67612  (60357)
67146  /  744040  ->  JZA 64040
67147  /  404040  ->  STA Z 4040
67150  /  434000  ->  STA I 64000  (124072)
67151  /  127111  ->  JMP 67111
67152  /  327166  ->  IOR 67166
67153  /  036440  ->  CLL SHL 4
67154  /  327120  ->  IOR 67120
67155  /  467166  ->  SCA 67166
67156  /  127112  ->  JMP 67112
```

```
67157  /  000334   ->   LDL 0334
67160  /  077603   ->   JSR I 67603 (60103)
67161  /  327166   ->   IOR 67166
67162  /  034440   ->   CLL SHR 4
67163  /  127155   ->   JMP 67155
67164  /  327166   ->   IOR 67166
67165  /  137110   ->   JMP I 67110 (0000)
67166  /  000000   ->   0
67167  /  000000   ->   0
67170  /  035040   ->   CLL SHR 10
67171  /  427175   ->   STA 67175
67172  /  034440   ->   CLL SHR 4
67173  /  227502   ->   ADD 67502
67174  /  077603   ->   JSR I 67603 (60103)
67175  /  000000   ->   0
67176  /  167522   ->   AND 67522
67177  /  227502   ->   ADD 67502
67200  /  077603   ->   JSR I 67603 (60103)
67201  /  077612   ->   JSR I 67612 (60357)
67202  /  606000   ->   ISZ Z 6000
67203  /  137167   ->   JMP I 67167 (0000)
67204  /  000000   ->   0
67205  /  427225   ->   STA 67225
67206  /  035440   ->   CLL SHR 14
67207  /  067217   ->   JSR 67217
67210  /  035040   ->   CLL SHR 10
67211  /  067217   ->   JSR 67217
67212  /  034440   ->   CLL SHR 4
67213  /  067217   ->   JSR 67217
67214  /  067217   ->   JSR 67217
67215  /  020010   ->   CLA
67216  /  137204   ->   JMP I 67204 (0000)
67217  /  000000   ->   0
67220  /  167522   ->   AND 67522
67221  /  227502   ->   ADD 67502
67222  /  077603   ->   JSR I 67603 (60103)
67223  /  327225   ->   IOR 67225
67224  /  137217   ->   JMP I 67217 (0000)
67225  /  000000   ->   0
67226  /  000000   ->   0
67227  /  427253   ->   STA 67253
67230  /  035440   ->   CLL SHR 14
67231  /  167522   ->   AND 67522
67232  /  067255   ->   JSR 67255
67233  /  467254   ->   SCA 67254
67234  /  327253   ->   IOR 67253
67235  /  035040   ->   CLL SHR 10
67236  /  067244   ->   JSR 67244
67237  /  034440   ->   CLL SHR 4
67240  /  067244   ->   JSR 67244
67241  /  167522   ->   AND 67522
67242  /  227254   ->   ADD 67254
67243  /  137226   ->   JMP I 67226 (0000)
67244  /  000000   ->   0
67245  /  167522   ->   AND 67522
67246  /  227254   ->   ADD 67254
67247  /  067255   ->   JSR 67255
67250  /  467254   ->   SCA 67254
67251  /  327253   ->   IOR 67253
67252  /  137244   ->   JMP I 67244 (0000)
67253  /  000000   ->   0
67254  /  000000   ->   0
67255  /  000000   ->   0
67256  /  036140   ->   CLL SHL 1
67257  /  427264   ->   STA 67264
67260  /  036240   ->   CLL SHL 2
```

```
67261  /  227264   ->  ADD 67264
67262  /  427264   ->  STA 67264
67263  /  137255   ->  JMP I 67255 (0000)
67264  /  000000   ->  0
67265  /  062325   ->  JSR 62325
67266  /  077602   ->  JSR I 67602 (60142)
67267  /  427300   ->  STA 67300
67270  /  526252   ->  SZW 66252
67271  /  127277   ->  JMP 67277
67272  /  367502   ->  XOR 67502
67273  /  267560   ->  SUB 67560
67274  /  022010   ->  SMA CLA
67275  /  127266   ->  JMP 67266
67276  /  327300   ->  IOR 67300
67277  /  077603   ->  JSR I 67603 (60103)
67300  /  000000   ->  0
67301  /  137265   ->  JMP I 67265 (62325)
67302  /  062311   ->  JSR 62311
67303  /  000000       0
67304  /  437606   ->  STA I 67606 (60124)
67305  /  437607   ->  STA I 67607 (60140)
67306  /  747311   ->  JZA 67311
67307  /  000214       LDL 0214
67310  /  077603   ->  JSR I 67603 (60103)
67311  /  077612   ->  JSR I 67612 (60357)
67312  /  744064   ->  JZA 64064
67313  /  552405   ->  SNW I Z 2405 (304100)
67314  /  144023   ->  AND Z 4023
67315  /  052226   ->  JSR I Z 2226 (444113)
67316  /  110305   ->  JMP I Z 0305 (0324)
67317  /  404040   ->  STA Z 4040
67320  /  404040   ->  STA Z 4040
67321  /  404040   ->  STA Z 4040
67322  /  404040   ->  STA Z 4040
67323  /  243120   ->  SUB Z 3120
67324  /  054060   ->  JSR I Z 4060 (1022)
67325  /  400617   ->  STA Z 0617
67326  /  224010   ->  ADD 64010
67327  /  051420   ->  JSR I Z 1420 (401417)
67330  /  004040   ->  LDL 4040
67331  /  137302   ->  JMP I 67302 (62311)
67332  /  062310   ->  JSR 62310
67333  /  000214   ->  LDL 0214
67334  /  077603   ->  JSR I 67603 (60103)
67335  /  077612   ->  JSR I 67612 (60357)
67336  /  740000   ->  JZA 60000
67337  /  137332   ->  JMP I 67332 (62310)
67340  /  062324   ->  JSR 62324
67341  /  077612   ->  JSR I 67612 (60357)
67342  /  745200   ->  JZA 65200
67343  /  137340   ->  JMP I 67340 (62324)
67344  /  000000   ->  0
67345  /  077612   ->  JSR I 67612 (60357)
67346  /  747200   ->  JZA 67200
67347  /  137344   ->  JMP I 67344 (0000)
67350  /  000000   ->  0
67351  /  077612   ->  JSR I 67612 (60357)
67352  /  744340   ->  JZA 64340
67353  /  141116   ->  AND Z 1116
67354  /  054024   ->  JSR I Z 4024 (4441)
67355  /  052324   ->  JSR I Z 2324 (702463)
67356  /  745240   ->  JZA 65240
67357  /  202211   ->  ADD Z 2211
67360  /  150122   ->  AND I Z 0122 (740217)
67361  /  314003   ->  IOR I Z 4003 (504127)
67362  /  171515   ->  AND I 61515 (470560)
```

```
67363  /  011604  ->  011604
67364  /  401405  ->  STA Z 1405
67365  /  260514  ->  SUB 60514
67366  /  004040  ->  LDL 4040
67367  /  137350  ->  JMP I 67350 (0000)
67370  /  000000  ->  0
67371  /  077612  ->  JSR I 67612 (60357)
67372  /  742305  ->  JZA 62305
67373  /  140503  ->  AND Z 0503
67374  /  240040  ->  SUB Z 0040
67375  /  137370  ->  JMP I 67370 (0000)
67376  /  000000  ->  0
67377  /  077612  ->  JSR I 67612 (60357)
67400  /  746140  ->  JZA 66140
67401  /  141116  ->  AND Z 1116
67402  /  054010  ->  JSR I Z 4010 (444156)
67403  /  112324  ->  JMP I Z 2324 (702463)
67404  /  172231  ->  AND I 62231 (0272)
67405  /  004040  ->  LDL 4040
67406  /  137376  ->  JMP I 67376 (0000)
67407  /  000000  ->  0
67410  /  077612  ->  JSR I 67612 (60357)
67411  /  746200  ->  JZA 66200
67412  /  067414  ->  JSR 67414
67413  /  137407  ->  JMP I 67407 (0000)
67414  /  000000  ->  0
67415  /  077612  ->  JSR I 67612 (60357)
67416  /  400325  ->  STA Z 0325
67417  /  222205  ->  ADD 62205
67420  /  162440  ->  AND 62440
67421  /  004040  ->  LDL 4040
67422  /  067424  ->  JSR 67424
67423  /  137414  ->  JMP I 67414 (0000)
67424  /  000000  ->  0
67425  /  077612  ->  JSR I 67612 (60357)
67426  /  242217  ->  SUB Z 2217
67427  /  250214  ->  SUB I Z 0214 (0277)
67430  /  054001  ->  JSR I Z 4001 (113772)
67431  /  042611  ->  JSR Z 2611
67432  /  231722  ->  ADD I 61722 (321727)
67433  /  314000  ->  IOR I Z 4000 (44002)
67434  /  137424  ->  JMP I 67424 (0000)
67435  /  000000  ->  0
67436  /  077612  ->  JSR I 67612 (60357)
67437  /  746300  ->  JZA 66300
67440  /  067442  ->  JSR 67442
67441  /  137435  ->  JMP I 67435 (0000)
67442  /  000000  ->  0
67443  /  077612  ->  JSR I 67612 (60357)
67444  /  401011  ->  STA Z 1011
67445  /  232417  ->  ADD I 62417 (322474)
67446  /  221103  ->  ADD 61103
67447  /  011440  ->  011440
67450  /  004040  ->  LDL 4040
67451  /  067424  ->  JSR 67424
67452  /  137442  ->  JMP I 67442 (0000)
67453  /  000000  ->  0
67454  /  077612  ->  JSR I 67612 (60357)
67455  /  746400  ->  JZA 66400
67456  /  067460  ->  JSR 67460
67457  /  137453  ->  JMP I 67453 (0000)
67460  /  000000  ->  0
67461  /  077612  ->  JSR I 67612 (60357)
67462  /  400201  ->  STA Z 0201
67463  /  031307  ->  031307
67464  /  221725  ->  ADD 61725
```

```
67465  /  160440   => AND 60440
67466  /  141703   => AND Z 1703
67467  /  012411   => 012411
67470  /  171640   => AND I 61640 (322122)
67471  /  230521   => ADD I 60521 (750550)
67472  /  250516   => SUB I Z 0516 (604127)
67473  /  030540   => CLL RTR 5
67474  /  004040   => LDL 4040
67475  /  137460   => JMP I 67460 (0000)
67476  /  062217   => JSR 62217
67477  /  062307   => JSR 62307
67500  /  000012   => LDL 0012
67501  /  000273   .  LDL 0273
67502  /  000260   >  LDL 0260
67503  /  062310   => JSR 62310
67504  /  063626   -> JSR 63626
67505  /  020050   .  CLA CLL
67506  /  030132   => 030132
67507  /  063437   => JSR 63437
67510  /  020000   => NOP
67511  /  177777   => AND I 67777 (15161)
67512  /  022000   => SMA
67513  /  063576   => JSR 63576
67514  /  010000   => 010000
67515  /  400010   => STA Z 0010
67516  /  200000   => ADD Z 0000
67517  /  000001   => LDL 0001
67520  /  000377   => LDL 0377
67521  /  000002   => LDL 0002
67522  /  000017   => LDL 0017
67523  /  020000   => NOP
67524  /  000004   => LDL 0004
67525  /  000020   => LDL 0020
67526  /  040000   => JSR Z 0000
67527  /  100000   => JMP Z 0000
67530  /  100000   => JMP Z 0000
67531  /  040000   => JSR Z 0000
67532  /  200000   => ADD Z 0000
67533  /  400000   => STA Z 0000
67534  /  000010   => LDL 0010
67535  /  000040   => LDL 0040
67536  /  000100   => LDL 0100
67537  /  000200   => LDL 0200
67540  /  200002   => ADD Z 0002
67541  /  064407   => JSR 64407
67542  /  000233   => LDL 0233
67543  /  000036   => LDL 0036
67544  /  000002   => LDL 0002
67545  /  002000   => LDL 2000
67546  /  001000   => LDL 1000
67547  /  000010   => LDL 0010
67550  /  030000   => 030000
67551  /  070000   => JSR I 60000 (0000)
67552  /  000770   => LDL 0770
67553  /  000003   => LDL 0003
67554  /  010017   => 010017
67555  /  000240   => LDL 0240
67556  /  000004   => LDL 0004
67557  /  000144   => LDL 0144
67560  /  000015   => LDL 0015
67561  /  051672   => JSR I Z 1672 (0001)
67562  /  051670   => JSR I Z 1670 (641660)
67563  /  051673   => JSR I Z 1673 (204104)
67564  /  051671   => JSR I Z 1671 (101660)
67565  /  051676   => JSR I Z 1676 (454156)
67566  /  051674   => JSR I Z 1674 (201374)
```

```
67567  /  051677  => JSR I Z 1677 (704071)
67570  /  051675  => JSR I Z 1675 (444156)
67571  /  057013  => JSR I Z 7013 (0000)
67572  /  057121  => JSR I Z 7121 (0000)
67573  /  050264  => JSR I Z 0264 (504150)
67574  /  057776  => JSR I Z 7776 (74314)
67575  /  050452  => JSR I Z 0452 (404025)
67576  /  043715  => JSR Z 3715
67577  /  043670  => JSR Z 3670
67600  /  043653  => JSR Z 3653
67601  /  060204  => JSR 60204
67602  /  060142  => JSR 60142
67603  /  060103  => JSR 60103
67604  /  060162  => JSR 60162
67605  /  060161  => JSR 60161
67606  /  060124  => JSR 60124
67607  /  060140  => JSR 60140
67610  /  043770  => JSR Z 3770
67611  /  044033  => JSR Z 4033
67612  /  060357  => JSR 60357
67613  /  046117  => JSR Z 6117
67614  /  045362  => JSR Z 5362
67615  /  055413  => JSR I Z 5413 (132202)
67616  /  055412  => JSR I Z 5412 (210000)
67617  /  055421  => JSR I Z 5421 (132202)
67620  /  055420  => JSR I Z 5420 (212000)
67621  /  055405  => JSR I Z 5405 (131513)
67622  /  055404  => JSR I Z 5404 (46631)
67623  /  055432  => JSR I Z 5432 (132302)
67624  /  055427  => JSR I Z 5427 (132302)
67625  /  055433  => JSR I Z 5433 (616200)
67626  /  055430  => JSR I Z 5430 (616100)
67627  /  055434  => JSR I Z 5434 (12000)
67630  /  055431  => JSR I Z 5431 (11000)
67631  /  055416  => JSR I Z 5416 (132202)
67632  /  055415  => JSR I Z 5415 (211000)
67633  /  055442  => JSR I Z 5442 (46624)
67634  /  055440  => JSR I Z 5440 (140123)
67635  /  055443  => JSR I Z 5443 (140123)
67636  /  055441  => JSR I Z 5441 (10400)
67637  /  055425  => JSR I Z 5425 (616000)
67640  /  055423  => JSR I Z 5423 (213000)
67641  /  055426  => JSR I Z 5426 (10000)
67642  /  055424  => JSR I Z 5424 (132302)
67643  /  052654  => JSR I Z 2654 (641022)
67644  /  047746  => JSR Z 7746
67645  /  051067  => JSR I Z 1067 (0000)
67646  /  044124  => JSR Z 4124
67647  /  030045  => 030045
67650  /  017277  => 017277
67651  /  016475  => 016475
67652  /  040036  => JSR Z 0036
67653  /  016315  => 016315
67654  /  042221  => JSR Z 2221
67655  /  042236  => JSR Z 2236
67656  /  042241  => JSR Z 2241
67657  /  041335  => JSR Z 1335
67660  /  043632  => JSR Z 3632
67661  /  043652  => JSR Z 3652
67662  /  043644  => JSR Z 3644
67663  /  017764  => 017764
67664  /  060210  => JSR 60210
67665  /  060211  => JSR 60211
67666  /  062105  => JSR 62105
67667  /  046255  => JSR Z 6255
67670  /  046715  => JSR Z 6715
```

```
67671  /  047071  ->  JSR Z 7071
67672  /  060575  ->  JSR 60575
67673  /  060567  ->  JSR 60567
67674  /  061447  ->  JSR 61447
67675  /  061506  ->  JSR 61506
67676  /  060674  ->  JSR 60674
67677  /  010000      010000
67700  /  000001  ->  LDL 0001
67701  /  000400  ->  LDL 0400
67702  /  016167  ->  016167
67703  /  015556      015556
67704  /  015161      015161
67705  /  016203  ->  016203
67706  /  060353  ->  JSR 60353
67707  /  061212  ->  JSR 61212
67710  /  053264  ->  JSR I Z 3264 (444136)
67711  /  053303  ->  JSR I Z 3303 (20010)
67712  /  054614  ->  JSR I Z 4614 (152313)
67713  /  055104  ->  JSR I Z 5104 (45761)
67714  /  055417  ->  JSR I Z 5417 (616200)
67715  /  055403  ->  JSR I Z 5403 (41431)
67716  /  052456  ->  JSR I Z 2456 (37440)
67717  /  052350  ->  JSR I Z 2350 (0007)
67720  /  052255  ->  JSR I Z 2255 (14000)
67721  /  051700  ->  JSR I Z 1700 (704062)
67722  /  052657  ->  JSR I Z 2657 (43406)
67723  /  052132  ->  JSR I Z 2132 (244026)
67724  /  040271  ->  JSR Z 0271
67725  /  042364  ->  JSR Z 2364
67726  /  055445  ->  JSR I Z 5445 (46607)
67727  /  051403  ->  JSR I Z 1403 (60004)
67730  /  051543  ->  JSR I Z 1543 (303702)
67731  /  051544  ->  JSR I Z 1544 (444156)
67732  /  051545  ->  JSR I Z 1545 (441574)
67733  /  050507  ->  JSR I Z 0507 (244153)
67734  /  050454  ->  JSR I Z 0454 (143610)
67735  /  050751  ->  JSR I Z 0751 (304156)
67736  /  060214  ->  JSR 60214
67737  /  060215  ->  JSR 60215
67740  /  046657  ->  JSR Z 6657
67741  /  046660  ->  JSR Z 6660
67742  /  046661  ->  JSR Z 6661
67743  /  046662  ->  JSR Z 6662
67744  /  046663  ->  JSR Z 6663
67745  /  046664  ->  JSR Z 6664
67746  /  046665  ->  JSR Z 6665
67747  /  046666  ->  JSR Z 6666
67750  /  046667  ->  JSR Z 6667
67751  /  046670  ->  JSR Z 6670
67752  /  046671  ->  JSR Z 6671
67753  /  046672  ->  JSR Z 6672
67754  /  046673  ->  JSR Z 6673
67755  /  046674  ->  JSR Z 6674
67756  /  000000  ->  0
67757  /  000000  ->  0
67760  /  000000  ->  0
67761  /  000000  ->  0
67762  /  000000  ->  0
67763  /  000000  ->  0
67764  /  000000  ->  0
67765  /  000000  ->  0
67766  /  000000  ->  0
67767  /  000000  ->  0
67770  /  000000  ->  0
67771  /  000000  ->  0
67772  /  000000  ->  0
```

```
67773  /  000000  ->  0
67774  /  000000  ->  0
67775  /  000000  ->  0
67776  /  000000  ->  0
67777  /  015161  ->  015161
```

We claim:

1. Apparatus for diagnostic testing of two wire telephone lines comprising:

first line test means, responsive to a first test command signal to measure for a selected two wire telephone line the resistance between a point of potential reference and each of said wires and the resistance between said wires, a second line test means responsive to a second test command signal to measure for said selected line the reactance between said point of potential reference and each of said two wires and the reactance between said two wires, a control means including a programmed digital computer and associated memory, and providing means for selecting said line, means for generating a first and second test command signals associated with selected line, and means responsive to the measurements by said first and second line test means on said selected line to provide a test result signal, said test result signal being indicative of the identity of said selected line, the length of said line, the type of termination of said line, the type and location of equipment attached to said line, and the existence and approximate position along said line of faults in said line.

2. Apparatus in accordance with claim 1 further comprising a display terminal responsive to said test result signal to display said test result signal.

3. Apparatus in accordance with claim 1 further comprising a printer responsive to said test result signal to provide a hard copy of said test result signal.

4. An apparatus in accordance with claim 1 wherein said control means includes means responsive to the tests by said line test means on said selected telephone line to provide a further test result signal which is indicative of the type of fault on said selected line and the impedance characteristics of said fault in terms of its resistive and reactive components.

5. Apparatus in accordance with claim 1 further comprising a user controlled unit and wherein said control means includes:

A. means for periodically selecting a succession of said lines, and for generating said first and second test command signals in association with each selected line, B. means for storing fault data representative of the identity of all selected lines on which a fault is detected, and C. means selectively responsive to a specific user-generated control signal from said user controlled unit, to provide an output signal which is indicative of a listing of the identity of all of said lines having a fault indicated by said testing during a current testing period.

6. Apparatus in accordance with claim 5 wherein said control means includes:

A. means to generate, store and update historical data in said memory, said historical data being representative of the identity of lines characterized by fault data for predetermined time periods, and B. means selectively responsive to a specific user-generated control signal from said user controlled unit, to provide an historical data output signal which is indicative of one or more of said lines having a fault detected during the respective ones of said predetermined time periods.

7. Apparatus in accordance with claim 5 wherein said control means includes means for storing test result data in said memory, said test result data being representative of said test result signal and wherein said means for providing said test result signal is further selectively responsive to said user-controlled unit to provide said test result signals only in response to a specific user-generated control signal.

8. Apparatus in accordance with claim 7 wherein said control means includes means for retrieving selected portions of said test result data from said memory in response to a selectively generated specific fault control signal from said user-controlled unit, said selected portions including data indicative of the identity of lines characterized by a specific type of fault associated with the specific fault control signal.

9. Apparatus in accordance with claim 1 further comprising a user controlled unit and wherein said line selecting means is selectively responsive to a user-generated line select control signal associated with a specific line and generated at said user-controlled unit, to select said specific line.

10. Apparatus in accordance with claim 1 wherein said second line test means provides a test signal to the said selected line at a frequency substantially equal to $1/n \times 30$ Hz where n is an integer or 1/3, 1/5 or 1/7.

11. Apparatus in accordance with claim 1 further comprising a user controlled unit and wherein said control means includes means selectively responsive to a specific user-generated control signal from said user controlled unit, to provide an output signal indicative of the test results for a selected line, in terms of having faults detected or not detected over a specific period of time.

12. Apparatus in accordance with claim 1 wherein said means to provide said test result signal is adaptively responsive to said measurements by said first and second line test means.

13. Apparatus in accordance with claim 5 wherein said line selecting means is selectively responsive to a user-generated line select control signal associated with a specific line and generated at said user-controlled unit, to select said specific line.

14. Apparatus in accordance with claim 13 wherein said control means includes means selectively responsive to a specific user-generated control signal from said user controlled unit, to provide an output signal indicative of the test results for a selected line, in terms of having faults detected or not detected over a specific period of time.

* * * * *